US006739392B2

(12) United States Patent
Cook et al.

(10) Patent No.: US 6,739,392 B2
(45) Date of Patent: May 25, 2004

(54) FORMING A WELLBORE CASING WHILE SIMULTANEOUSLY DRILLING A WELLBORE

(75) Inventors: Robert Lance Cook, Katy, TX (US); R. Bruce Stewart, The Hague (NL); Lev Ring, Houston, TX (US)

(73) Assignee: Shell Oil Company, Houston, TX (US)

( * ) Notice: Subject to any disclaimer, the term of this patent is extended or adjusted under 35 U.S.C. 154(b) by 169 days.

(21) Appl. No.: 09/962,471

(22) Filed: Sep. 25, 2001

(65) Prior Publication Data

US 2002/0060069 A1 May 23, 2002

Related U.S. Application Data

(60) Division of application No. 09/523,468, filed on Mar. 10, 2000, which is a continuation-in-part of application No. 09/510,913, filed on Feb. 23, 2000, now abandoned, which is a continuation-in-part of application No. 09/502,350, filed on Feb. 10, 2000, now abandoned, which is a continuation-in-part of application No. 09/454,139, filed on Dec. 3, 1999.

(60) Provisional application No. 60/124,042, filed on Mar. 11, 1999, provisional application No. 60/121,702, filed on Feb. 25, 1999, provisional application No. 60/119,611, filed on Feb. 11, 1999, and provisional application No. 60/111,293, filed on Dec. 7, 1998.

(51) Int. Cl.[7] .................................................. E21B 19/16

(52) U.S. Cl. ........................................ 166/207; 166/380

(58) Field of Search .......................... 166/380, 207–216

(56) References Cited

U.S. PATENT DOCUMENTS

| | | | | |
|---|---|---|---|---|
| ,002,626 A | 6/1842 | Frank | .......................... | 175/57 |
| 46,818 A | 3/1865 | Patterson | | |
| 331,940 A | 12/1885 | Bole | | |
| 332,184 A | 12/1885 | Bole | | |
| 341,237 A | 5/1886 | Healey | | |

(List continued on next page.)

FOREIGN PATENT DOCUMENTS

| | | | |
|---|---|---|---|
| CA | 736288 | 6/1966 | .................. 166/16 |
| CA | 771462 | 11/1967 | .................. 166/16 |
| CA | 1171310 | 7/1984 | ........... F16B/13/06 |
| DE | 174521 | 4/1953 | |
| DE | 2458188 | 6/1979 | |
| DE | 203767 | 11/1983 | ........... E21B/43/10 |

(List continued on next page.)

OTHER PUBLICATIONS

Turcotte and Schubert, Geodynamics (1982) John Wiley & Sons, Inc., pp 9, 432.*

Turcotte and Schubert, Geodynamics (1982) John Wiley & Sons, Inc., pp 9, 432.

Baker Hughes Incorporated, "EXPatch Expandable Cladding System" (2002).

Baker Hughes Incorporated, "EXPress Expandable Screen System".

High–Tech Wells, "World's First Completion Set Inside Expandable Screen" (2003) Gilmer, J.M., Emerson, A.B.

Baker Hughes Incorporated, "Technical Overview Production Enhancement Technology" (Mar. 10, 2003) Geir Owe Egge.

Baker Hughes Incorporated, "FORMlock Expandable Liner Hangers".

Weatherford Completion Systems, "Expandable Sand Screens" (2002).

Expandable Tubular Technology, "EIS Expandable Isolation Sleeve" (Feb. 2003).

Oilfield Catalog; "Jet–Lok Product Application Description" (Aug. 8, 2003).

(List continued on next page.)

*Primary Examiner*—David Bagnell
*Assistant Examiner*—Jennifer R Dougherty
(74) *Attorney, Agent, or Firm*—Haynes and Boone LLP; Todd Mattingly

(57) ABSTRACT

A wellbore casing is formed simultaneously with the drilling out of the wellbore.

29 Claims, 51 Drawing Sheets

U.S. PATENT DOCUMENTS

| | | | | | |
|---|---|---|---|---|---|
| 519,805 | A | | 5/1894 | Bavier | |
| 806,156 | A | | 12/1905 | Marshall | |
| 958,517 | A | | 5/1910 | Mettler | |
| 984,449 | A | | 2/1911 | Stewart | |
| 1,233,888 | A | | 7/1917 | Leonard | |
| 1,589,781 | A | | 6/1926 | Anderson | |
| 1,590,357 | A | | 6/1926 | Feisthamel | |
| 1,880,218 | A | | 10/1932 | Simmons | |
| 1,981,525 | A | | 11/1934 | Price | |
| 2,046,870 | A | | 7/1936 | Clasen et al. | |
| 2,087,185 | A | | 7/1937 | Dillom | |
| 2,122,757 | A | | 7/1938 | Scott | |
| 2,160,263 | A | | 5/1939 | Fletcher | |
| 2,187,275 | A | | 1/1940 | McLennan | |
| 2,204,586 | A | | 6/1940 | Grau | |
| 2,214,226 | A | | 9/1940 | English | |
| 2,226,804 | A | | 12/1940 | Carroll | |
| 2,273,017 | A | | 2/1942 | Boynton | |
| 2,301,495 | A | | 11/1942 | Abegg | |
| 2,447,629 | A | | 8/1948 | Beissinger et al. | |
| 2,500,276 | A | | 3/1950 | Church | |
| 2,583,316 | A | | 1/1952 | Bannister | |
| 2,734,580 | A | | 2/1956 | Layne | |
| 2,796,134 | A | | 6/1957 | Binkley | |
| 2,812,025 | A | | 11/1957 | Teague et al. | |
| 2,907,589 | A | | 10/1959 | Knox | |
| 3,015,500 | A | | 1/1962 | Barnett | |
| 3,018,547 | A | | 1/1962 | Marskell | |
| 3,067,819 | A | | 12/1962 | Gore | |
| 3,104,703 | A | | 9/1963 | Rike et al. | |
| 3,111,991 | A | | 11/1963 | O'Neal | |
| 3,131,265 | A | | 4/1964 | Bird | |
| 3,167,122 | A | | 1/1965 | Lang | |
| 3,175,618 | A | | 3/1965 | Lang et al. | |
| 3,179,168 | A | | 4/1965 | Vincent | |
| 3,188,816 | A | | 6/1965 | Koch | |
| 3,191,677 | A | | 6/1965 | Kinley | |
| 3,191,680 | A | | 6/1965 | Vincent | |
| 3,203,451 | A | | 8/1965 | Vincent | |
| 3,203,483 | A | | 8/1965 | Vincent | |
| 3,209,546 | A | | 10/1965 | Lawton | |
| 3,245,471 | A | | 4/1966 | Howard | |
| 3,270,817 | A | | 9/1966 | Papaila | |
| 3,297,092 | A | | 1/1967 | Jennings | |
| 3,326,293 | A | | 6/1967 | Skipper | |
| 3,353,599 | A | | 11/1967 | Swift | |
| 3,354,955 | A | | 11/1967 | Berry | |
| 3,358,760 | A | | 12/1967 | Blagg | |
| 3,358,769 | A | | 12/1967 | Berry | |
| 3,364,993 | A | | 1/1968 | Skipper | |
| 3,412,565 | A | | 11/1968 | Lindsey et al. | |
| 3,419,080 | A | | 12/1968 | Lebourg | |
| 3,424,244 | A | | 1/1969 | Kinley | |
| 3,477,506 | A | | 11/1969 | Malone | |
| 3,489,220 | A | | 1/1970 | Kinley | |
| 3,498,376 | A | | 3/1970 | Sizer et al. | |
| 3,568,773 | A | | 3/1971 | Chancellor | 166/315 |
| 3,665,591 | A | | 5/1972 | Kowal | |
| 3,669,190 | A | | 6/1972 | Sizer et al. | 166/315 |
| 3,682,256 | A | * | 8/1972 | Stuart | 175/40 |
| 3,687,196 | A | | 8/1972 | Mullins | 166/217 |
| 3,691,624 | A | | 9/1972 | Kinley | 29/523 |
| 3,693,717 | A | | 9/1972 | Wuenschel | 166/285 |
| 3,704,730 | A | | 12/1972 | Witzig | |
| 3,711,123 | A | | 1/1973 | Arnold | |
| 3,712,376 | A | | 1/1973 | Owen et al. | 166/277 |
| 3,746,068 | A | | 7/1973 | Deckert et al. | |
| 3,746,091 | A | | 7/1973 | Owen et al. | 166/207 |
| 3,746,092 | A | | 7/1973 | Land | 166/207 |
| 3,764,168 | A | | 10/1973 | Kisling, III et al. | 285/302 |
| 3,776,307 | A | | 12/1973 | Young | 166/125 |
| 3,779,025 | A | | 12/1973 | Godley et al. | 61/53.52 |
| 3,780,562 | A | | 12/1973 | Kinley | 72/479 |
| 3,785,193 | A | | 1/1974 | Kinley et al. | 72/393 |
| 3,797,259 | A | | 3/1974 | Kammerer, Jr. | 61/53.68 |
| 3,812,912 | A | | 5/1974 | Wuenschel | 166/207 |
| 3,818,734 | A | | 6/1974 | Bateman | 72/75 |
| 3,866,954 | A | | 2/1975 | Slator et al. | |
| 3,885,298 | A | | 5/1975 | Pogonowski | |
| 3,887,006 | A | | 6/1975 | Pitts | 166/124 |
| 3,893,718 | A | | 7/1975 | Powell | |
| 3,898,163 | A | | 8/1975 | Mott | |
| 3,915,478 | A | | 10/1975 | Al et al. | |
| 3,935,910 | A | | 2/1976 | Gaudy et al. | |
| 3,945,444 | A | | 3/1976 | Knudson | 175/92 |
| 3,948,321 | A | | 4/1976 | Owen et al. | 166/277 |
| 3,970,336 | A | | 7/1976 | O'Sickey et al. | |
| 3,977,473 | A | | 8/1976 | Page, Jr. | 166/315 |
| 3,997,193 | A | | 12/1976 | Tsuda et al. | |
| 4,011,652 | A | | 3/1977 | Black | |
| 4,026,583 | A | | 5/1977 | Gottlieb | |
| 4,053,247 | A | | 10/1977 | Marsh, Jr. | |
| 4,069,573 | A | | 1/1978 | Rogers, Jr. et al. | 29/421 R |
| 4,076,287 | A | | 2/1978 | Bill et al. | 285/382.4 |
| 4,096,913 | A | | 6/1978 | Kenneday et al. | 166/290 |
| 4,098,334 | A | | 7/1978 | Crowe | 166/208 |
| 4,152,821 | A | | 5/1979 | Scott | |
| 4,190,108 | A | | 2/1980 | Webber | |
| 4,205,422 | A | | 6/1980 | Hardwick | 29/402.13 |
| 4,253,687 | A | | 3/1981 | Maples | 285/332 |
| 4,274,665 | A | | 6/1981 | Marsh, Jr. | |
| RE30,802 | E | | 11/1981 | Rogers, Jr. | 29/421 R |
| 4,304,428 | A | | 12/1981 | Grigorian et al. | |
| 4,359,889 | A | | 11/1982 | Kelly | 72/62 |
| 4,363,358 | A | | 12/1982 | Ellis | 166/212 |
| 4,366,971 | A | | 1/1983 | Lula | |
| 4,368,571 | A | | 1/1983 | Cooper, Jr. | 29/421 R |
| 4,379,471 | A | | 4/1983 | Kuenzel | |
| 4,380,347 | A | | 4/1983 | Sable | |
| 4,391,325 | A | | 7/1983 | Baker et al. | 166/208 |
| 4,393,931 | A | | 7/1983 | Muse et al. | 166/208 |
| 4,396,061 | A | | 8/1983 | Tamplen et al. | |
| 4,402,372 | A | | 9/1983 | Cherrington | |
| 4,407,681 | A | | 10/1983 | Ina et al. | |
| 4,411,435 | A | | 10/1983 | McStravick | 277/9.5 |
| 4,413,395 | A | | 11/1983 | Garnier | |
| 4,413,682 | A | | 11/1983 | Callihan et al. | 166/382 |
| 4,420,866 | A | | 12/1983 | Mueller | 29/421 R |
| 4,421,169 | A | | 12/1983 | Dearth et al. | 166/285 |
| 4,423,889 | A | | 1/1984 | Weise | 285/39 |
| 4,423,986 | A | | 1/1984 | Skogberg | 405/259 |
| 4,429,741 | A | | 2/1984 | Hyland | 166/63 |
| 4,440,233 | A | | 4/1984 | Baugh et al. | 166/382 |
| 4,444,250 | A | * | 4/1984 | Keithahn et al. | 166/84.4 |
| 4,462,471 | A | | 7/1984 | Hipp | |
| 4,469,356 | A | | 9/1984 | Duret et al. | |
| 4,473,245 | A | | 9/1984 | Raulins et al. | |
| 4,483,399 | A | | 11/1984 | Colgate | 166/308 |
| 4,485,847 | A | | 12/1984 | Wentzell | 138/89 |
| 4,501,327 | A | | 2/1985 | Retz | 166/285 |
| 4,505,017 | A | | 3/1985 | Schukei | 29/157.3 R |
| 4,508,129 | A | | 4/1985 | Brown | |
| 4,511,289 | A | | 4/1985 | Herron | 405/259 |
| 4,519,456 | A | | 5/1985 | Cochran | |
| 4,526,232 | A | | 7/1985 | Hughson et al. | |
| 4,553,776 | A | | 11/1985 | Dodd | 285/212 |
| 4,573,248 | A | | 3/1986 | Hackett | |
| 4,576,386 | A | | 3/1986 | Benson et al. | |
| 4,590,227 | A | | 5/1986 | Nakamura et al. | |
| 4,590,995 | A | | 5/1986 | Evans | 166/127 |
| 4,592,577 | A | | 6/1986 | Ayres et al. | |

| | | | | | |
|---|---|---|---|---|---|
| 4,605,063 | A | | 8/1986 | Ross | 166/216 |
| 4,611,662 | A | | 9/1986 | Harrington | |
| 4,629,218 | A | | 12/1986 | Dubois | |
| 4,630,849 | A | | 12/1986 | Fukui et al. | |
| 4,632,944 | A | | 12/1986 | Thompson | |
| 4,634,317 | A | | 1/1987 | Skogberg et al. | 405/259 |
| 4,635,333 | A | | 1/1987 | Finch | 29/157.4 |
| 4,637,436 | A | | 1/1987 | Stewart, Jr. et al. | 138/89 |
| 4,646,787 | A | | 3/1987 | Rush et al. | |
| 4,651,836 | A | | 3/1987 | Richards | |
| 4,656,779 | A | | 4/1987 | Fedeli | |
| 4,660,863 | A | | 4/1987 | Bailey et al. | |
| 4,662,446 | A | | 5/1987 | Brisco et al. | 166/278 |
| 4,669,541 | A | | 6/1987 | Bissonnette | |
| 4,682,797 | A | | 7/1987 | Hildner | |
| 4,685,191 | A | | 8/1987 | Mueller et al. | 29/523 |
| 4,685,834 | A | | 8/1987 | Jordan | |
| 4,693,498 | A | | 9/1987 | Baugh et al. | |
| 4,711,474 | A | | 12/1987 | Patrick | |
| 4,714,117 | A | | 12/1987 | Dech | |
| 4,730,851 | A | | 3/1988 | Watts | 285/4 |
| 4,735,444 | A | | 4/1988 | Skipper | |
| 4,739,654 | A | | 4/1988 | Pilkington et al. | |
| 4,739,916 | A | | 4/1988 | Ayres et al. | |
| 4,776,394 | A | | 10/1988 | Lynde et al. | |
| 4,793,382 | A | | 12/1988 | Szalvay | 138/98 |
| 4,796,668 | A | | 1/1989 | Depret | |
| 4,817,710 | A | | 4/1989 | Edwards et al. | |
| 4,817,716 | A | | 4/1989 | Taylor et al. | 166/277 |
| 4,827,594 | A | | 5/1989 | Cartry et al. | |
| 4,828,033 | A | * | 5/1989 | Frison | 166/307 |
| 4,830,109 | A | | 5/1989 | Wedel | 166/277 |
| 4,865,127 | A | | 9/1989 | Koster | 166/277 |
| 4,872,253 | A | | 10/1989 | Carstensen | |
| 4,887,646 | A | | 12/1989 | Groves | |
| 4,892,337 | A | | 1/1990 | Gunderson et al. | |
| 4,893,658 | A | | 1/1990 | Kimura et al. | |
| 4,907,828 | A | | 3/1990 | Change | |
| 4,911,237 | A | | 3/1990 | Melenyzer | |
| 4,913,758 | A | | 4/1990 | Koster | 156/191 |
| 4,915,426 | A | | 4/1990 | Skipper | |
| 4,934,312 | A | | 6/1990 | Koster et al. | 118/410 |
| 4,941,512 | A | | 7/1990 | McParland | 138/97 |
| 4,941,532 | A | | 7/1990 | Hurt et al. | 166/216 |
| 4,942,926 | A | | 7/1990 | Lessi | |
| 4,958,691 | A | | 9/1990 | Hipp | |
| 4,968,184 | A | | 11/1990 | Reid | 405/225 |
| 4,971,152 | A | | 11/1990 | Koster et al. | 166/277 |
| 4,976,322 | A | | 12/1990 | Abdrakhmanov et al. | 175/57 |
| 4,981,250 | A | | 1/1991 | Persson | 228/107 |
| 5,014,779 | A | | 5/1991 | Meling et al. | 166/55.7 |
| 5,015,017 | A | | 5/1991 | Geary | |
| 5,026,074 | A | | 6/1991 | Hoes et al. | |
| 5,031,699 | A | | 7/1991 | Artynov et al. | 166/285 |
| 5,040,283 | A | | 8/1991 | Pelgrom | 29/447 |
| 5,044,676 | A | | 9/1991 | Burton et al. | |
| 5,052,483 | A | | 10/1991 | Hudson | 166/55 |
| 5,059,043 | A | | 10/1991 | Kuhne | |
| 5,079,837 | A | | 1/1992 | Vanselow | |
| 5,083,608 | A | | 1/1992 | Abdrakhmanov et al. | 166/55 |
| 5,093,015 | A | | 3/1992 | Oldiges | |
| 5,095,991 | A | | 3/1992 | Milberger | |
| 5,101,653 | A | | 4/1992 | Hermes et al. | |
| 5,105,888 | A | | 4/1992 | Pollock et al. | |
| 5,107,221 | A | | 4/1992 | N'Guyen et al. | 328/233 |
| 5,119,661 | A | | 6/1992 | Abdrakhmanov et al. | 72/276 |
| 5,156,043 | A | | 10/1992 | Ose | 73/49.8 |
| 5,156,223 | A | | 10/1992 | Hipp | |
| 5,174,376 | A | | 12/1992 | Singeetham | 166/208 |
| 5,181,571 | A | | 1/1993 | Mueller et al. | |
| 5,197,553 | A | | 3/1993 | Leturno | 175/57 |
| 5,209,600 | A | | 5/1993 | Koster | 403/344 |
| 5,226,492 | A | | 7/1993 | Solaeche P. et al. | 166/196 |
| 5,286,393 | A | | 2/1994 | Oldiges et al. | |
| 5,314,209 | A | | 5/1994 | Kuhne | |
| 5,318,122 | A | | 6/1994 | Murray et al. | 166/313 |
| 5,318,131 | A | | 6/1994 | Baker | 166/382 |
| 5,325,923 | A | | 7/1994 | Surjaatmadja et al. | 166/308 |
| 5,330,850 | A | | 7/1994 | Suzuki et al. | |
| 5,332,038 | A | | 7/1994 | Tapp et al. | 166/278 |
| 5,332,049 | A | | 7/1994 | Tew | |
| 5,333,692 | A | | 8/1994 | Baugh et al. | |
| 5,335,736 | A | | 8/1994 | Windsor | 175/57 |
| 5,337,808 | A | | 8/1994 | Graham | |
| 5,337,823 | A | | 8/1994 | Nobileau | |
| 5,339,894 | A | | 8/1994 | Stotler | |
| 5,343,949 | A | | 9/1994 | Ross et al. | |
| 5,346,007 | A | | 9/1994 | Dillon et al. | |
| 5,348,087 | A | | 9/1994 | Williamson, Jr. | 166/115 |
| 5,348,093 | A | | 9/1994 | Wood et al. | |
| 5,348,095 | A | | 9/1994 | Worrall et al. | 166/380 |
| 5,348,668 | A | | 9/1994 | Oldiges et al. | |
| 5,351,752 | A | | 10/1994 | Wood et al. | |
| 5,360,292 | A | | 11/1994 | Allen et al. | 405/249 |
| 5,361,843 | A | | 11/1994 | Shy et al. | 166/297 |
| 5,366,010 | A | | 11/1994 | Zwart | 166/120 |
| 5,366,012 | A | | 11/1994 | Lohbeck | 166/277 |
| 5,368,075 | A | | 11/1994 | Baro et al. | |
| 5,370,425 | A | | 12/1994 | Dougherty et al. | |
| 5,375,661 | A | | 12/1994 | Daneshy et al. | |
| 5,388,648 | A | | 2/1995 | Jordan, Jr. | 166/380 |
| 5,390,735 | A | | 2/1995 | Williamson, Jr. | 166/115 |
| 5,390,742 | A | | 2/1995 | Dines et al. | 166/297 |
| 5,396,957 | A | | 3/1995 | Surjaatmadja et al. | 166/308 |
| 5,405,171 | A | | 4/1995 | Allen et al. | |
| 5,425,559 | A | | 6/1995 | Nobileau | 285/330 |
| 5,426,130 | A | | 6/1995 | Thurder et al. | |
| 5,435,395 | A | | 7/1995 | Connell | |
| 5,439,320 | A | | 8/1995 | Abrams | 405/154 |
| 5,447,201 | A | | 9/1995 | Mohn | |
| 5,454,419 | A | | 10/1995 | Vloedman | |
| 5,462,120 | A | | 10/1995 | Gondouin | |
| 5,467,822 | A | | 11/1995 | Zwart | 166/179 |
| 5,472,055 | A | | 12/1995 | Simson et al. | |
| 5,474,334 | A | | 12/1995 | Eppink | |
| 5,494,106 | A | | 2/1996 | Gueguen et al. | 166/277 |
| 5,507,343 | A | | 4/1996 | Carlton et al. | 166/277 |
| 5,511,620 | A | | 4/1996 | Baugh et al. | |
| 5,524,937 | A | | 6/1996 | Sides et al. | |
| 5,535,824 | A | | 7/1996 | Hudson | 166/207 |
| 5,536,422 | A | | 7/1996 | Oldiges et al. | |
| 5,540,281 | A | | 7/1996 | Round | |
| 5,576,485 | A | | 11/1996 | Serata | |
| 5,606,792 | A | | 3/1997 | Schafer | 29/727 |
| 5,611,399 | A | | 3/1997 | Richard et al. | |
| 5,613,557 | A | | 3/1997 | Blount et al. | 166/277 |
| 5,617,918 | A | | 4/1997 | Cooksey et al. | 166/115 |
| 5,642,560 | A | | 7/1997 | Tabuchi et al. | |
| 5,642,781 | A | | 7/1997 | Richard | |
| 5,664,327 | A | | 9/1997 | Swars | 29/888.08 |
| 5,667,011 | A | | 9/1997 | Gill et al. | 166/295 |
| 5,667,252 | A | | 9/1997 | Schafer et al. | 285/15 |
| 5,678,609 | A | | 10/1997 | Washburn | |
| 5,685,369 | A | | 11/1997 | Ellis et al. | 166/195 |
| 5,689,871 | A | | 11/1997 | Carstensen | |
| 5,695,008 | A | | 12/1997 | Bertet et al. | 166/187 |
| 5,695,009 | A | | 12/1997 | Hipp | |
| 5,718,288 | A | | 2/1998 | Bertet et al. | 166/287 |
| 5,775,422 | A | * | 7/1998 | Wong et al. | 166/135 |
| 5,785,120 | A | | 7/1998 | Smalley et al. | 166/55 |
| 5,787,933 | A | | 8/1998 | Russ et al. | |
| 5,791,419 | A | | 8/1998 | Valisalo | 175/53 |

| | | | | | |
|---|---|---|---|---|---|
| 5,794,702 | A | | 8/1998 | Nobileau | 166/380 |
| 5,797,454 | A | | 8/1998 | Hipp | |
| 5,829,520 | A | | 11/1998 | Johnson | 166/250.01 |
| 5,829,524 | A | | 11/1998 | Flanders et al. | 166/277 |
| 5,833,001 | A | | 11/1998 | Song et al. | |
| 5,845,945 | A | | 12/1998 | Carstensen | |
| 5,849,188 | A | | 12/1998 | Voll et al. | |
| 5,857,524 | A | | 1/1999 | Harris | 166/382 |
| 5,875,851 | A | | 3/1999 | Vick, Jr. et al. | 166/386 |
| 5,885,941 | A | | 3/1999 | Sateva et al. | |
| 5,901,789 | A | | 5/1999 | Donnelly et al. | 166/381 |
| 5,918,677 | A | | 7/1999 | Head | |
| 5,924,745 | A | | 7/1999 | Campbell | 285/90 |
| 5,931,511 | A | | 8/1999 | DeLange et al. | |
| 5,944,100 | A | | 8/1999 | Hipp | |
| 5,944,107 | A | | 8/1999 | Ohmer | 166/313 |
| 5,951,207 | A | | 9/1999 | Chen | 405/232 |
| 5,957,195 | A | | 9/1999 | Bailey et al. | 166/55 |
| 5,979,560 | A | | 11/1999 | Nobileau | 166/381 |
| 5,984,369 | A | | 11/1999 | Crook et al. | |
| 5,984,568 | A | | 11/1999 | Lohbeck | 403/375 |
| 6,012,522 | A | | 1/2000 | Donnelly et al. | 166/276 |
| 6,012,523 | A | | 1/2000 | Campbell et al. | 166/277 |
| 6,012,874 | A | | 1/2000 | Groneck et al. | 405/239 |
| 6,015,012 | A | | 1/2000 | Reddick | |
| 6,017,168 | A | | 1/2000 | Fraser et al. | 405/224.4 |
| 6,021,850 | A | | 2/2000 | Wood et al. | 166/380 |
| 6,029,748 | A | | 2/2000 | Forsyth et al. | 166/380 |
| 6,035,954 | A | | 3/2000 | Hipp | |
| 6,044,906 | A | | 4/2000 | Saltel | 166/187 |
| 6,047,505 | A | | 4/2000 | Willow | |
| 6,047,774 | A | | 4/2000 | Allen | |
| 6,050,341 | A | | 4/2000 | Metcalf | 166/383 |
| 6,050,346 | A | | 4/2000 | Hipp | |
| 6,056,059 | A | | 5/2000 | Ohmer | 166/313 |
| 6,062,324 | A | | 5/2000 | Hipp | |
| 6,065,500 | A | | 5/2000 | Metcalfe | 138/118 |
| 6,070,671 | A | | 6/2000 | Cumming et al. | 166/381 |
| 6,074,133 | A | | 6/2000 | Kelsey | 405/244 |
| 6,078,031 | A | | 6/2000 | Bliault et al. | 219/607 |
| 6,079,495 | A | | 6/2000 | Ohmer | 166/313 |
| 6,085,838 | A | * | 7/2000 | Vercaemer et al. | 166/277 |
| 6,089,320 | A | | 7/2000 | LaGrange | 166/313 |
| 6,098,717 | A | | 8/2000 | Bailey et al. | 166/382 |
| 6,102,119 | A | | 8/2000 | Raines | 166/244.1 |
| 6,109,355 | A | | 8/2000 | Reid | |
| 6,112,818 | A | | 9/2000 | Campbell | 166/384 |
| 6,131,265 | A | | 10/2000 | Bird | |
| 6,135,208 | A | | 10/2000 | Gano et al. | 166/313 |
| 6,142,230 | A | | 11/2000 | Smalley et al. | |
| 6,182,775 | B1 | | 2/2001 | Hipp | |
| 6,196,336 | B1 | | 3/2001 | Fincher et al. | |
| 6,226,855 | B1 | | 5/2001 | Maine | 29/507 |
| 6,250,385 | B1 | | 6/2001 | Montaron | 166/207 |
| 6,263,968 | B1 | | 7/2001 | Freeman et al. | |
| 6,263,972 | B1 | | 7/2001 | Richard et al. | |
| 6,283,211 | B1 | | 9/2001 | Vloedman | |
| 6,315,043 | B1 | | 11/2001 | Farrant et al. | |
| 6,322,109 | B1 | | 11/2001 | Campbell et al. | |
| 6,328,113 | B1 | | 12/2001 | Cook | |
| 6,334,351 | B1 | | 1/2002 | Tsuchiya | |
| 6,345,431 | B1 | | 2/2002 | Greig | |
| 6,354,373 | B1 | | 3/2002 | Vercaemer et al. | |
| 6,409,175 | B1 | | 6/2002 | Evans et al. | |
| 6,419,033 | B1 | | 7/2002 | Hahn et al. | |
| 6,419,147 | B1 | | 7/2002 | Daniel | |
| 6,425,444 | B1 | | 7/2002 | Metcalfe et al. | |
| 6,446,724 | B2 | | 9/2002 | Baugh et al. | |
| 6,454,013 | B1 | | 9/2002 | Metcalfe | |
| 6,457,532 | B1 | | 10/2002 | Simpson | |
| 6,457,533 | B1 | | 10/2002 | Metcalfe | |
| 6,457,749 | B1 | | 10/2002 | Heijnen | |
| 6,460,615 | B1 | | 10/2002 | Heijnen | |
| 6,470,966 | B2 | | 10/2002 | Cook et al. | |
| 6,497,289 | B1 | | 12/2002 | Cook et al. | |
| 6,517,126 | B1 | | 2/2003 | Peterson et al. | |
| 6,527,049 | B2 | | 3/2003 | Metcalfe et al. | |
| 6,543,552 | B1 | | 4/2003 | Metcalfe et al. | |
| 6,550,821 | B2 | | 4/2003 | DeLange et al. | |
| 6,557,640 | B1 | | 5/2003 | Cook et al. | |
| 6,561,227 | B2 | | 5/2003 | Cook et al. | |
| 6,564,875 | B1 | | 5/2003 | Bullock | |
| 6,568,471 | B1 | | 5/2003 | Cook et al. | |
| 6,575,240 | B1 | | 6/2003 | Haut et al. | |
| 6,578,630 | B2 | | 6/2003 | Simpson et al. | |
| 6,585,053 | B2 | | 7/2003 | Coon | |
| 6,604,763 | B1 | | 8/2003 | Ring et al. | |
| 2001/0020532 | A1 | | 9/2001 | Baugh et al. | |
| 2001/0045284 | A1 | | 11/2001 | Simpson et al. | |
| 2001/0047870 | A1 | | 12/2001 | Cook et al. | |
| 2002/0011339 | A1 | | 1/2002 | Murray | |
| 2002/0014339 | A1 | | 2/2002 | Ross | |
| 2002/0062956 | A1 | | 5/2002 | Murray et al. | |
| 2002/0066576 | A1 | | 6/2002 | Cook et al. | |
| 2002/0066578 | A1 | | 6/2002 | Broome | |
| 2002/0070023 | A1 | | 6/2002 | Turner et al. | |
| 2002/0070031 | A1 | | 6/2002 | Voll et al. | |
| 2002/0079101 | A1 | | 6/2002 | Baugh et al. | |
| 2002/0084070 | A1 | | 7/2002 | Voll et al. | |
| 2002/0092654 | A1 | | 7/2002 | Coronado et al. | |
| 2002/0108756 | A1 | | 8/2002 | Harrall et al. | |
| 2002/0139540 | A1 | | 10/2002 | Lauritzen | |
| 2002/0144822 | A1 | | 10/2002 | Hackworth et al. | |
| 2002/0148612 | A1 | | 10/2002 | Cook et al. | |
| 2002/0185274 | A1 | | 12/2002 | Simpson et al. | |
| 2002/0189816 | A1 | | 12/2002 | Cook et al. | |
| 2002/0195252 | A1 | | 12/2002 | Maguire et al. | |
| 2002/0195256 | A1 | | 12/2002 | Metcalfe et al. | |
| 2003/0024711 | A1 | | 2/2003 | Simpson et al. | |
| 2003/0047322 | A1 | | 3/2003 | Maguire et al. | |
| 2003/0047323 | A1 | | 3/2003 | Jackson et al. | |
| 2003/0056991 | A1 | | 3/2003 | Hahn et al. | |
| 2003/0066655 | A1 | | 4/2003 | Cook et al. | |
| 2003/0075337 | A1 | | 4/2003 | Maguire | |
| 2003/0075338 | A1 | | 4/2003 | Sivley | |
| 2003/0075339 | A1 | | 4/2003 | Gano et al. | |
| 2003/0094277 | A1 | | 5/2003 | Cook et al. | |
| 2003/0094278 | A1 | | 5/2003 | Cook et al. | |
| 2003/0094279 | A1 | | 5/2003 | Ring et al. | |
| 2003/0098154 | A1 | | 5/2003 | Cook et al. | |
| 2003/0098162 | A1 | | 5/2003 | Cook | |
| 2003/0107217 | A1 | | 6/2003 | Daigle et al. | |
| 2003/0111234 | A1 | | 6/2003 | McClurkin et al. | |
| 2003/0116325 | A1 | | 6/2003 | Cook et al. | |
| 2003/0121558 | A1 | | 7/2003 | Coook et al. | |
| 2003/0121655 | A1 | | 7/2003 | Lauritzen et al. | |
| 2003/0121669 | A1 | | 7/2003 | Cook et al. | |
| 2003/0140673 | A1 | | 7/2003 | Marr et al. | |

FOREIGN PATENT DOCUMENTS

| | | | | |
|---|---|---|---|---|
| DE | 233607 | | 3/1986 | E21B/17/00 |
| DE | 278517 | | 5/1990 | B21D/28/28 |
| DE | 10007547 | | 9/2000 | E02D/7/28 |
| EP | 0272511 | | 12/1987 | |
| EP | 0294264 | | 5/1988 | |
| EP | 0553566 | A1 | 12/1992 | |
| EP | 0633391 | A2 | 1/1995 | E21B/34/14 |
| EP | 0713953 | B1 | 11/1995 | |
| EP | 0823534 | | 2/1998 | E21B/7/06 |
| EP | 0881354 | | 12/1998 | E21B/43/10 |
| EP | 0881359 | | 12/1998 | E21D/9/08 |
| EP | 0899420 | | 3/1999 | E21B/43/10 |

| | | | | |
|---|---|---|---|---|
| EP | 0937861 | | 8/1999 | E21B/43/10 |
| EP | 0952305 | | 10/1999 | E21B/43/10 |
| EP | 0952306 | | 10/1999 | E21B/43/10 |
| EP | 1152120 | A3 | 11/2001 | |
| EP | 1152120 | A2 | 11/2001 | |
| FR | 2717855 | | 9/1995 | E21B/17/00 |
| FR | 2741907 | | 6/1997 | E21B/7/20 |
| FR | 2771133 | A | 5/1999 | |
| FR | 2780751 | | 1/2000 | E21B/33/127 |
| GB | 557823 | | 12/1943 | |
| GB | 961750 | | 6/1964 | |
| GB | 1062610 | | 3/1967 | |
| GB | 1111536 | | 5/1968 | |
| GB | 1448304 | | 9/1976 | |
| GB | 1460864 | | 1/1977 | |
| GB | 1542847 | | 3/1979 | |
| GB | 1563740 | | 3/1980 | |
| GB | 2058877 | | 4/1981 | |
| GB | 2108228 | A | 5/1983 | |
| GB | 2115860 | | 9/1983 | |
| GB | 2125876 | A | 3/1984 | |
| GB | 2211573 | A | 7/1989 | |
| GB | 2216926 | | 10/1989 | |
| GB | 2243191 | | 10/1991 | |
| GB | 2256910 | | 12/1992 | F16L/9/18 |
| GB | 2305682 | | 4/1997 | |
| GB | 2325949 | A | 5/1998 | |
| GB | 2322655 | | 9/1998 | E21B/23/04 |
| GB | 2326896 | | 1/1999 | E21B/17/00 |
| GB | 2329916 | | 4/1999 | E21B/17/00 |
| GB | 2329918 | | 4/1999 | E21B/29/00 |
| GB | 2336383 | | 10/1999 | E21B/43/08 |
| GB | 2355738 | A | 4/2000 | |
| GB | 2343691 | | 5/2000 | E21B/43/14 |
| GB | 2344606 | | 6/2000 | E21B/33/14 |
| GB | 2368865 | A | 7/2000 | |
| GB | 2346165 | | 8/2000 | E21B/43/10 |
| GB | 2346632 | | 8/2000 | E21B/43/10 |
| GB | 2347445 | | 9/2000 | E21B/7/20 |
| GB | 2347446 | A | 9/2000 | E21B/43/10 |
| GB | 2347950 | A | 9/2000 | |
| GB | 2347950 | A | 9/2000 | E21B/33/047 |
| GB | 2347952 | A | 9/2000 | E21B/43/10 |
| GB | 2348223 | A | 9/2000 | E21B/7/20 |
| GB | 2348657 | A | 10/2000 | E21B/43/10 |
| GB | 2357099 | A | 12/2000 | |
| GB | 2356651 | A | 5/2001 | |
| GB | 2350137 | B | 8/2001 | |
| GB | 2359837 | B | 4/2002 | |
| GB | 2370301 | A | 6/2002 | |
| GB | 2371064 | A | 7/2002 | |
| GB | 2371574 | A | 7/2002 | |
| GB | 2373524 | | 9/2002 | |
| GB | 2367842 | A | 10/2002 | |
| GB | 2375560 | A | 11/2002 | |
| GB | 2380213 | A | 4/2003 | |
| GB | 2380503 | A | 4/2003 | |
| GB | 2381019 | A | 4/2003 | |
| GB | 2343691 | B | 5/2003 | |
| GB | 2347950 | B | 8/2003 | |
| JP | 208458 | | 10/1985 | C22C/38/52 |
| JP | 64-75715 | | 3/1989 | |
| JP | 102875 | | 4/1995 | E21D/5/10 |
| JP | 94068 | | 4/2000 | B21D/39/20 |
| JP | 107870 | | 4/2000 | B23K/20/00 |
| JP | 162192 | | 6/2000 | G01N/29/14 |
| NL | 9001081 | | 12/1991 | E21B/33/12 |
| RO | 113267 | | 5/1998 | E21B/10/32 |
| RU | 2016345 | | 7/1994 | F16L/58/00 |
| RU | 2039214 | | 7/1995 | E21B/43/00 |
| RU | 2056201 | | 3/1996 | B21D/39/10 |
| RU | 2064357 | | 7/1996 | B21D/39/10 |
| RU | 2068940 | | 11/1996 | E21B/29/10 |
| RU | 2068943 | | 11/1996 | E21B/33/13 |
| RU | 2079633 | | 5/1997 | E21B/7/06 |
| RU | 2083798 | | 7/1997 | E21B/33/12 |
| RU | 2091655 | | 9/1997 | F16L/9/02 |
| RU | 2095179 | | 11/1997 | B21D/39/04 |
| RU | 2105128 | | 2/1998 | E21B/29/00 |
| RU | 2108445 | | 4/1998 | E21B/33/13 |
| RU | 2144128 | | 1/2000 | E21B/29/10 |
| SU | 350833 | | 9/1972 | C21C/5/52 |
| SU | 511468 | | 9/1976 | |
| SU | 607950 | | 5/1978 | E21B/29/00 |
| SU | 612004 | | 5/1978 | E21B/29/00 |
| SU | 620582 | | 7/1978 | E21B/29/00 |
| SU | 641070 | | 1/1979 | |
| SU | 832049 | | 5/1981 | |
| SU | 853089 | | 8/1981 | |
| SU | 874952 | | 10/1981 | E21B/17/28 |
| SU | 894169 | | 1/1982 | E21B/7/28 |
| SU | 899850 | | 1/1982 | E21B/33/00 |
| SU | 907220 | | 2/1982 | E21B/33/12 |
| SU | 909114 | | 2/1982 | |
| SU | 953172 | | 8/1982 | E21B/7/20 |
| SU | 959878 | | 9/1982 | B21D/41/02 |
| SU | 976019 | | 11/1982 | E21B/29/10 |
| SU | 976020 | | 11/1982 | E21B/29/10 |
| SU | 989038 | | 1/1983 | E21B/29/10 |
| SU | 1002514 | | 3/1983 | E21B/29/10 |
| SU | 1041671 | | 9/1983 | E21B/29/10 |
| SU | 1051222 | | 10/1983 | E21B/29/10 |
| SU | 1086118 | | 4/1984 | E21B/29/00 |
| SU | 1077803 | A | 7/1984 | |
| SU | 1158400 | | 5/1985 | B60M/3/00 |
| SU | 1212575 | | 2/1986 | E21B/7/28 |
| SU | 1250637 | | 8/1986 | E21B/7/20 |
| SU | 1324722 | A1 | 7/1987 | |
| SU | 1411434 | | 7/1988 | E21B/29/10 |
| SU | 1430498 | | 10/1988 | E21B/29/10 |
| SU | 1432190 | | 10/1988 | E21B/29/10 |
| SU | 1601330 | | 10/1990 | E21B/29/10 |
| SU | 1627663 | | 2/1991 | E21B/29/10 |
| SU | 1659621 | A1 | 6/1991 | |
| SU | 1663179 | | 7/1991 | E21B/29/10 |
| SU | 1663180 | | 7/1991 | E21B/29/10 |
| SU | 1677225 | | 9/1991 | E21B/7/28 |
| SU | 16772248 | | 9/1991 | E21B/29/10 |
| SU | 1686123 | | 10/1991 | E21B/29/10 |
| SU | 1686124 | | 10/1991 | E21B/29/10 |
| SU | 1686125 | | 10/1991 | E21B/29/10 |
| SU | 1698413 | | 12/1991 | E21B/7/28 |
| SU | 1710694 | | 2/1992 | E21B/29/10 |
| SU | 1730429 | | 4/1992 | E21B/33/13 |
| SU | 1745873 | | 7/1992 | E21B/29/10 |
| SU | 1747673 | | 7/1992 | E21B/29/10 |
| SU | 1749267 | | 7/1992 | C21D/9/08 |
| SU | 1786241 | | 1/1993 | E21B/33/10 |
| SU | 1804543 | | 3/1993 | E21B/29/10 |
| SU | 1810482 | | 4/1993 | E21B/29/10 |
| SU | 1818459 | | 5/1993 | E21B/29/10 |
| SU | 1295799 | | 2/1995 | E21B/29/10 |
| WO | 8100132 | | 1/1981 | E21B/43/10 |
| WO | 9005598 | | 3/1990 | B21C/3/08 |
| WO | 9201859 | | 2/1992 | E21D/20/00 |
| WO | 9208875 | | 5/1992 | E21B/43/14 |
| WO | 9325799 | | 12/1993 | E21B/43/10 |
| WO | 9325800 | | 12/1993 | E21B/43/10 |
| WO | 9421887 | | 9/1994 | E21B/33/14 |
| WO | 9425655 | | 11/1994 | D04C/1/06 |
| WO | 9503476 | | 2/1995 | E21B/43/10 |
| WO | 9601937 | | 1/1996 | E21B/33/127 |

| | | | |
|---|---|---|---|
| WO | 9621083 | 7/1996 | E21B/43/10 |
| WO | 9626350 | 8/1996 | E21B/43/11 |
| WO | 9637681 | 11/1996 | E21B/17/08 |
| WO | 9706346 | 2/1997 | E21B/43/10 |
| WO | 9711306 | 3/1997 | F16L/55/165 |
| WO | 9717524 | 5/1997 | E21B/43/08 |
| WO | 9717526 | 5/1997 | E21B/43/10 |
| WO | 9717527 | 5/1997 | E21B/43/10 |
| WO | 9720130 | 6/1997 | E21B/43/10 |
| WO | 9721901 | 6/1997 | E21B/17/08 |
| WO | WO97/35084 | 9/1997 | |
| WO | 9800626 | 1/1998 | E21B/43/10 |
| WO | 9807957 | 2/1998 | E21B/43/10 |
| WO | 9809053 | 3/1998 | E21B/33/14 |
| WO | 9822690 | 5/1998 | E21B/17/08 |
| WO | 9826152 | 6/1998 | E21B/17/08 |
| WO | 9842947 | 10/1998 | E21B/17/08 |
| WO | 9849423 | 11/1998 | E21B/43/10 |
| WO | 9902818 | 1/1999 | E21B/43/10 |
| WO | 9904135 | 1/1999 | E21B/23/00 |
| WO | 9906670 | 2/1999 | E21B/43/10 |
| WO | 9908827 | 2/1999 | B23K/13/02 |
| WO | 9908828 | 2/1999 | B23K/20/02 |
| WO | 9918328 | 4/1999 | E21B/23/01 |
| WO | 9923354 | 5/1999 | E21B/43/10 |
| WO | 9925524 | 5/1999 | B26F/1/00 |
| WO | 9925951 | 5/1999 | E21B/43/10 |
| WO | 9935368 | 7/1999 | E21B/43/10 |
| WO | 9943923 | 9/1999 | E21B/33/13 |
| WO | 0001926 | 1/2000 | E21B/43/26 |
| WO | 0004271 | 1/2000 | E21B/17/07 |
| WO | 0008301 | 2/2000 | E21B/43/08 |
| WO | 0026500 | 5/2000 | E21B/19/22 |
| WO | 0026501 | 5/2000 | E21B/23/01 |
| WO | 0026502 | 5/2000 | E21B/29/10 |
| WO | 0031375 | 6/2000 | E21B/43/10 |
| WO | 0037767 | 6/2000 | E21B/29/00 |
| WO | 0037768 | 6/2000 | E21B/29/10 |
| WO | 0037771 | 6/2000 | E21B/43/10 |
| WO | 0037772 | 6/2000 | E21B/43/10 |
| WO | 0039432 | 7/2000 | E21B/43/10 |
| WO | 0046484 | 8/2000 | E21B/43/10 |
| WO | 0050727 | 8/2000 | E21B/7/08 |
| WO | 0050732 | 8/2000 | E21B/43/10 |
| WO | 0050733 | 8/2000 | E21B/43/10 |
| WO | 0077431 A2 | 12/2000 | |
| WO | WO01/04535 A1 | 1/2001 | |
| WO | WO01/18354 A1 | 3/2001 | |
| WO | WO01/26860 A1 | 4/2001 | |
| WO | WO01/83943 A1 | 11/2001 | |
| WO | WO02/25059 A1 | 3/2002 | |
| WO | WO02/095181 A1 | 5/2002 | |
| WO | WO02/53867 A3 | 7/2002 | |
| WO | WO02/053867 A3 | 7/2002 | |
| WO | WO02/075107 A1 | 9/2002 | |
| WO | WO02/077411 A1 | 10/2002 | |
| WO | WO02/081863 A1 | 10/2002 | |
| WO | WO02/081864 A2 | 10/2002 | |
| WO | WO02/086285 A1 | 10/2002 | |
| WO | WO02/086286 A2 | 10/2002 | |
| WO | WO02/090713 | 11/2002 | |
| WO | WO02/103150 A2 | 12/2002 | |
| WO | WO03/004819 A2 | 1/2003 | |
| WO | WO03/012255 A1 | 2/2003 | |
| WO | WO03/023178 A2 | 3/2003 | |
| WO | WO03/023179 A2 | 3/2003 | |
| WO | WO03/029607 A1 | 4/2003 | |
| WO | WO03/029608 A1 | 4/2003 | |
| WO | WO03/042486 A2 | 5/2003 | |
| WO | WO03/042487 A2 | 5/2003 | |
| WO | WO03/048520 A1 | 6/2003 | |
| WO | WO03/048521 A2 | 6/2003 | |
| WO | WO03/58022 A2 | 7/2003 | |
| WO | WO03/055616 A2 | 7/2003 | |
| WO | WO03/059549 A1 | 7/2003 | |

OTHER PUBLICATIONS

International Search Report, Application PCT/US01/04753, Jul. 3, 2001.
International Search Report, Application PCT/IL00/00245, Sep. 18, 2000.
International Search Report, Application PCT/US00/18635, Nov. 24, 2000.
International Search Report, Application PCT/US00/30022, Mar. 27, 2001.
International Search Report, Application PCT/US00/27645, Dec. 29, 2000.
International Search Report, Application PCT/US01/19014, Nov. 23, 2001.
International Search Report, Application PCT/US01/41446, Oct. 30, 2001.
International Search Report, Application PCT/US01/23815, Nov. 16, 2001.
International Search Report, Application PCT/US01/28960, Jan. 22, 2002.
International Search Report, Application PCT/US01/30256, Jan. 3, 2002.
International Search Report, Application PCT/US02/04353, Jun. 24, 2002.
International Search Report, Application PCT/US02/00677, Jul. 17, 2002.
International Search Report, Application PCT/US02/00093, Aug. 6, 2002.
International Search Report, Application PCT/US02/29856, Dec. 16, 2002.
International Search Report, Application PCT/US02/20256, Jan. 3, 2003.
International Search Report, Application PCT/US02/39418, Mar. 24, 2003.
International Search Report, Application PCT/US03/15020; Jul. 30, 2003.
Search Report to Application No. GB 9926449.1, Mar. 27, 2000.
Search Report to Application No. GB 0004285.3, Jul. 12, 2000.
Search Report to Application No. GB 0004282.0, Jul. 31, 2000.
Search Report to Application No. GB 0013661.4, Oct. 20, 2000.
Search Report to Application No. GB 0004282.0 Jan. 15, 2001.
Search Report to Application No. GB 0013661.4, Apr. 17, 2001.
Search Report to Application No. GB 9926449.1, Sep. 5, 2001.
Search Report to Application No. GB 0004285.3, Aug. 28, 2002.
Search Report to Application No. GB 0013661.4, Feb. 19, 2003.
Examination Report to Application No. 0004285.3, Mar. 28, 2003.
Examination Report to Application No. GB 0208367.3, Apr. 4, 2003.
Examination Report to Application No. GB 0212443.6, Apr. 10, 2003.

Search and Examination Report to Application No. GB 0308296.3, Jun. 2, 2003.
Search and Examination Report to Application No. GB 0308297.1, Jun. 2, 2003.
Search and Examination Report to Application No. GB 0308295.5, Jun. 2, 2003.
Search and Examination Report to Application No. GB 0308293.0, Jun. 2, 2003.
Search and Examination Report to Application No. GB 0308294.8, Jun. 2, 2003.
Search and Examination Report to Application No. GB 0308303.7, Jun. 2, 2003.
Search and Examination Report to Application No. GB 0308290.6, Jun. 2, 2003.
Search and Examination Report to Application No. GB 0308299.7, Jun. 2, 2003.
Search and Examination Report to Application No. GB 0308302.9, Jun. 2, 2003.
Search and Examination Report to Application No. GB 0004282.0, Jun. 3, 2003.
Search and Examination Report to Application No. GB 0310757.0, Jun. 12, 2003.
Search and Examination Report to Application No. GB 0310836.2, Jun. 12, 2003.
Search and Examination Report to Application No. GB 0310785.1, Jun. 12, 2003.
Search and Examination Report to Application No. GB 0310759.6, Jun. 12, 2003.
Search and Examination Report to Application No. GB 0310801.6, Jun. 12, 2003.
Search and Examination Report to Application No. GB 0310772.9, Jun. 12, 2003.
Search and Examination Report to Application No. GB 0310795.0, Jun. 12, 2003.
Search and Examination Report to Application No. GB 0310833.9, Jun. 12, 2003.
Search and Examination Report to Application No. GB 0310799.2, Jun. 12, 2003.
Search and Examination Report to Application No. GB 0310797.6, Jun. 12, 2003.
Search and Examination Report to Application No. GB 0310770.3, Jun. 12, 2003.
Search and Examination Report to Application No. GB 0310099.7, Jun. 24, 2003.
Search and Examination Report to Application No. GB 0310104.5, Jun. 24, 2003.
Search and Examination Report to Application No. GB 0310101.1, Jun. 24, 2003.
Search and Examination Report to Application No. GB 0310118.5, Jun. 24, 2003.
Search and Examination Report to Application No. GB 0310090.6, Jun. 24, 2003.
Search and Examination Report to Application No. GB 0225505.7, Jul. 1, 2003.
Examination Report to Application No. GB 0310836.2, Aug. 7, 2003.
Search and Examination Report to Application No. GB 0316883.8, Aug. 14, 2003.
Search and Examination Report to Application No. GB 0316886.1, Aug. 14, 2003.
Search and Examination Report to Application No. GB 0316887.9, Aug. 14, 2003.
Halliburton Energy Services, "Halliburton Completion Products" 1996, Page Packers 5–37, United States of America.
Search Report to Application No. GB 9926450.9, Claims Searched 1–8, Feb. 28, 2000.
Search Report to Application No. GB 0003251.6, Claims Searched 1–5, Jul. 13, 2000.
International Search Report, Application No. PCT/US00/30022, Oct. 31, 2000.
International Search Report, Application No. PCT/US01/19014, Jun. 12, 2001.
Examination Report to Application No. GB 9926450.9, May 15, 2002.
Search Report to Application No. 1999 5593, Claims 1–8., Aug. 20, 2002.
Examination Report to Application No. GB 9926450.9, Nov. 22, 2002.
Search Report to Application No. GB 0219757.2, Claims Searched 1–7, Nov. 25, 2002.
Search Report to Application No. GB 0220872.6, Claims Searched 1–4, Dec. 5, 2002.
Search Report to Application No. GB 0219757.2, Claims Searched 9–13, Jan. 20, 2003.
Search Report to Application No. GB 0225505.7, Claim Searched 1, Mar. 5, 2003.
Search Report to Application No. GB 0220872.6, Claim Searched 6, 7–8, 9–12, 13, 14, 15–16, 17–19, 20, 21–22, 23, 24–25, 26–37, 38–51, 52–61, Mar. 13, 2003.
Search Report to Application No. GB 0004285.3, Claims Searched 2–3, 8–9, 13–16, Jan. 17, 2001.
Search Report to Application No. GB 0005399.1, Claims Searched 25–29, Feb. 15, 2001.
Search Report to Application No. GB 9930398.4, Claims Searched 1–35, Jun. 27, 2000.
Search Report to Application No. GB 9926449.1, Claims Searched 6, 7, 8, 74–81, and 82–88, Jul. 4, 2001.
International Search Report, Application No. PCT/US01/04753, Jun. 17, 2001.

* cited by examiner

FORMING A WELLBORE CASING WHILE SIMULTANEOUSLY DRILLING A WELLBORE

CROSS REFERENCE TO RELATED APPLICATIONS

This application claims the benefit of the filing date of U.S. Provisional Patent Application Serial No. 60/124,042, filed on Mar. 11, 1999, the disclosure of which is incorporated herein by reference.

This application is a division of U.S. patent application Ser. No. 09/523,468, filed on Mar. 10, 2000, which was a continuation-in-part of U.S. patent application Ser. No. 09/510,913, filed Feb. 23, 2000, now abandoned, which claimed the benefit of the filing date of U.S. provisional patent application serial No. 60/121,702, filed on Feb. 25, 1999, which was a continuation-in-part of U.S. patent application Ser. No. 09/502,350, filed on Feb. 10, 2000, now abandoned, which claimed the benefit of the filing date of U.S. provisional patent application serial No. 60/119,611, filed on Feb. 11, 1999, which was a continuation-in-part of U.S. patent application Ser. No. 09/454,139, filed on Dec. 3, 1999, which claimed the benefit of the filing date of U.S. provisional patent application serial No. 60/111,293, filed on Dec. 7, 1998.

This application is related to the following U.S. patent applications: (1) utility patent application Ser. No. 09/940, 338, attorney docket number 25791.9.02, filed on Nov. 16, 1999, which claimed the benefit of the filing date of provisional patent application No. 60/108,558, attorney docket number 25791.9, filed on Nov. 16, 1998; (2) utility patent application Ser. No. 09/454,139, attorney docket number 25791.3.02, filed on Dec. 3, 1999, which claimed the benefit of the filing date of provisional patent application No. 60/111,293, attorney docket number 25791.3, filed on Dec. 7, 1998; (3) utility patent application Ser. No. 09/502,350, attorney docket number 25791.8.02, filed on Feb. 10, 2000, which claimed the benefit of the filing date of provisional patent application No. 60/119,611, attorney docket number 25791.8, filed on Feb. 11, 1999; (4) provisional patent application No. 60/121,702, attorney docket number 25791.7, filed on Feb. 25, 1999; (5) provisional patent application No. 60/121,841, attorney docket number 25791.12, filed on Feb. 26, 1999; (6) provisional patent application No. 60/121,907, attorney docket number 25791.16, filed on Feb. 26, 1999; (7) provisional patent application No. 60/124,042, attorney docket number 25791.11, filed on Mar. 11, 1999; (8) provisional patent application No. 60/131,106, attorney docket number 25791.23, filed on Apr. 26, 1999; (9) provisional patent application No. 60/137,998, attorney docket number 25791.17, filed on Jun. 7, 1999; (10) provisional patent application No. 60/143,039, attorney docket number 25791.26, filed on Jul. 9, 1999; (11) provisional patent application No. 60/146,203, attorney docket number 25791.25, filed on Jul. 29, 1999; (12) provisional patent application No. 60/154,047, attorney docket number 25791.29, filed on Sep. 16, 1999; (13) provisional patent application No. 60/159,082, attorney docket number 25791.34, filed on Oct. 12, 1999; (14) provisional patent application No. 60/159,039, attorney docket number 25791.36, filed on Oct. 12, 1999; (13) provisional patent application No. 60/159,033, attorney docket number 25791.37, filed on Oct. 12, 1999; and (15) provisional patent application No. 60/162,171, attorney docket number 25791.27, filed on Nov. 1, 1999.

BACKGROUND OF THE INVENTION

This invention relates generally to wellbore casings, and in particular to wellbore casings that are formed using expandable tubing.

Conventionally, when a wellbore is created, a number of casings are installed in the borehole to prevent collapse of the borehole wall and to prevent undesired outflow of drilling fluid into the formation or inflow of fluid from the formation into the borehole. The borehole is drilled in intervals whereby a casing which is to be installed in a lower borehole interval is lowered through a previously installed casing of an upper borehole interval. As a consequence of this procedure the casing of the lower interval is of smaller diameter than the casing of the upper interval. Thus, the casings are in a nested arrangement with casing diameters decreasing in downward direction. Cement annuli are provided between the outer surfaces of the casings and the borehole wall to seal the casings from the borehole wall. As a consequence of this nested arrangement a relatively large borehole diameter is required at the upper part of the wellbore. Such a large borehole diameter involves increased costs due to heavy casing handling equipment, large drill bits and increased volumes of drilling fluid and drill cuttings. Moreover, increased drilling rig time is involved due to required cement pumping, cement hardening, required equipment changes due to large variations in hole diameters drilled in the course of the well, and the large volume of cuttings drilled and removed.

Conventionally, at the surface end of the wellbore, a wellhead is formed that typically includes a surface casing, a number of production and/or drilling spools, valving, and a Christmas tree. Typically the wellhead further includes a concentric arrangement of casings including a production casing and one or more intermediate casings. The casings are typically supported using load bearing slips positioned above the ground. The conventional design and construction of wellheads is expensive and complex.

Conventionally, a wellbore casing cannot be formed during the drilling of a wellbore. Typically, the wellbore is drilled and then a wellbore casing is formed in the newly drilled section of the wellbore. This delays the completion of a well.

The present invention is directed to overcoming one or more of the limitations of the existing procedures for forming wellbores and wellheads.

SUMMARY OF THE INVENTION

According to one aspect of the present invention, a method of forming a wellbore casing is provided that includes installing a tubular liner and a mandrel in the borehole, injecting fluidic material into the borehole, and radially expanding the liner in the borehole by extruding the liner off of the mandrel.

According to another aspect of the present invention, a method of forming a wellbore casing is provided that includes drilling out a new section of the borehole adjacent to the already existing casing. A tubular liner and a mandrel are then placed into the new section of the borehole with the tubular liner overlapping an already existing casing. A hardenable fluidic sealing material is injected into an annular region between the tubular liner and the new section of the borehole. The annular region between the tubular liner and the new section of the borehole is then fluidicly isolated from an interior region of the tubular liner below the mandrel. A non hardenable fluidic material is then injected into the interior region of the tubular liner below the mandrel. The tubular liner is extruded off of the mandrel. The overlap between the tubular liner and the already existing casing is sealed. The tubular liner is supported by overlap with the already existing casing. The mandrel is removed from the borehole. The integrity of the seal of the overlap between the tubular liner and the already existing casing is tested. At least a portion of the second quantity of the hardenable fluidic sealing material is removed from the interior of the tubular liner. The remaining portions of the fluidic hardenable fluidic sealing material are cured. At least a portion of cured fluidic hardenable sealing material within the tubular liner is removed.

According to another aspect of the present invention, an apparatus for expanding a tubular member is provided that includes a support member, a mandrel, a tubular member, and a shoe. The support member includes a first fluid passage. The mandrel is coupled to the support member and includes a second fluid passage. The tubular member is coupled to the mandrel. The shoe is coupled to the tubular liner and includes a third fluid passage. The first, second and third fluid passages are operably coupled.

According to another aspect of the present invention, an apparatus for expanding a tubular member is provided that includes a support member, an expandable mandrel, a tubular member, a shoe, and at least one sealing member. The support member includes a first fluid passage, a second fluid passage, and a flow control valve coupled to the first and second fluid passages. The expandable mandrel is coupled to the support member and includes a third fluid passage. The tubular member is coupled to the mandrel and includes one or more sealing elements. The shoe is coupled to the tubular member and includes a fourth fluid passage. The at least one sealing member is adapted to prevent the entry of foreign material into an interior region of the tubular member.

According to another aspect of the present invention, a method of joining a second tubular member to a first tubular member, the first tubular member having an inner diameter greater than an outer diameter of the second tubular member, is provided that includes positioning a mandrel within an interior region of the second tubular member. A portion of an interior region of the second tubular member is pressurized and the second tubular member is extruded off of the mandrel into engagement with the first tubular member.

According to another aspect of the present invention, a tubular liner is provided that includes an annular member having one or more sealing members at an end portion of the annular member, and one or more pressure relief passages at an end portion of the annular member.

According to another aspect of the present invention, a wellbore casing is provided that includes a tubular liner and an annular body of a cured fluidic sealing material. The tubular liner is formed by the process of extruding the tubular liner off of a mandrel.

According to another aspect of the present invention, a tie-back liner for lining an existing wellbore casing is provided that includes a tubular liner and an annular body of cured fluidic sealing material. The tubular liner is formed by the process of extruding the tubular liner off of a mandrel. The annular body of a cured fluidic sealing material is coupled to the tubular liner.

According to another aspect of the present invention, an apparatus for expanding a tubular member is provided that includes a support member, a mandrel, a tubular member and a shoe. The support member includes a first fluid passage. The mandrel is coupled to the support member. The mandrel includes a second fluid passage operably coupled to the first fluid passage, an interior portion, and an exterior portion. The interior portion of the mandrel is drillable. The tubular member is coupled to the mandrel. The shoe is coupled to the tubular member. The shoe includes a third fluid passage operably coupled to the second fluid passage, an interior portion, and an exterior portion. The interior portion of the shoe is drillable.

According to another aspect of the present invention, a wellhead is provided that includes an outer casing and a plurality of concentric inner casings coupled to the outer casing. Each inner casing is supported by contact pressure between an outer surface of the inner casing and an inner surface of the outer casing.

According to another aspect of the present invention, a wellhead is provided that include an outer casing at least partially positioned within a wellbore and a plurality of substantially concentric inner casings coupled to the interior surface of the outer casing. One or more of the inner casings are coupled to the outer casing by expanding one or more of the inner casings into contact with at least a portion of the interior surface of the outer casing.

According to another aspect of the present invention, a method of forming a wellhead is provided that includes drilling a wellbore. An outer casing is positioned at least partially within an upper portion of the wellbore. A first tubular member is positioned within the outer casing. At least a portion of the first tubular member is expanded into contact with an interior surface of the outer casing. A second tubular member is positioned within the outer casing and the first tubular member. At least a portion of the second tubular member is expanded into contact with an interior portion of the outer casing.

According to another aspect of the present invention, an apparatus is provided that includes an outer tubular member, and a plurality of substantially concentric and overlapping inner tubular members coupled to the outer tubular member. Each inner tubular member is supported by contact pressure between an outer surface of the inner casing and an inner surface of the outer inner tubular member.

According to another aspect of the present invention, an apparatus is provided that includes an outer tubular member, and a plurality of substantially concentric inner tubular members coupled to the interior surface of the outer tubular member by the process of expanding one or more of the inner tubular members into contact with at least a portion of the interior surface of the outer tubular member.

According to another aspect of the present invention, a wellbore casing is provided that includes a first tubular member, and a second tubular member coupled to the first tubular member in an overlapping relationship. The inner diameter of the first tubular member is substantially equal to the inner diameter of the second tubular member.

According to another aspect of the present invention, a wellbore casing is provided that includes a tubular member including at least one thin wall section and a thick wall section, and a compressible annular member coupled to each thin wall section.

According to another aspect of the present invention, a method of creating a casing in a borehole located in a subterranean formation is provided that includes supporting a tubular liner and a mandrel in the borehole using a support member. A fluidic material is injected into the borehole. An interior region of the mandrel is pressurized. A portion of the mandrel is displaced relative to the support member. The tubular liner is expanded.

According to another aspect of the present invention, a wellbore casing is provided that includes a first tubular member having a first inside diameter, and a second tubular member having a second inside diameter substantially equal to the first inside diameter coupled to the first tubular member in an overlapping relationship. The first and second tubular members are coupled by the process of deforming a portion of the second tubular member into contact with a portion of the first tubular member According to another aspect of the present invention, an apparatus for expanding a tubular member is provided that includes a support member including a fluid passage, a mandrel movably coupled to the support member including an expansion cone, at least one pressure chamber defined by and positioned between the support member and mandrel fluidicly coupled to the first fluid passage, and one or more releasable supports coupled to the support member adapted to support the tubular member.

According to another aspect of the present invention, an apparatus is provided that includes one or more solid tubular members, each solid tubular member including one or more external seals, one or more slotted tubular members coupled to the solid tubular members, and a shoe coupled to one of the slotted tubular members.

According to another aspect of the present invention, a method of joining a second tubular member to a first tubular member, the first tubular member having an inner diameter greater than an outer diameter of the second tubular member is provided that includes positioning a mandrel within an interior region of the second tubular member. A portion of the interior region of the mandrel is pressurized. The mandrel is displaced relative to the second tubular member. At least a portion of the second tubular member is extruded off of the mandrel into engagement with the first tubular member.

According to another aspect of the present invention, an apparatus is provided that includes one or more primary solid tubulars, each primary solid tubular including one or more external annular seals, n slotted tubulars coupled to the primary solid tubulars, n−1 intermediate solid tubulars coupled to and interleaved among the slotted tubulars, each intermediate solid tubular including one or more external annular seals, and a shoe coupled to one of the slotted tubulars.

According to another aspect of the present invention, a method of isolating a first subterranean zone from a second subterranean zone in a wellbore is provided that includes positioning one or more primary solid tubulars within the wellbore, the primary solid tubulars traversing the first subterranean zone. One or more slotted tubulars are also positioned within the wellbore, the slotted tubulars traversing the second subterranean zone. The slotted tubulars and the solid tubulars are fluidicly coupled. The passage of fluids from the first subterranean zone to the second subterranean zone within the wellbore external to the solid and slotted tubulars is prevented.

According to another aspect of the present invention, a method of extracting materials from a producing subterranean zone in a wellbore, at least a portion of the wellbore including a casing, is provided that includes positioning one or more primary solid tubulars within the wellbore. The primary solid tubulars with the casing are fluidicly coupled. One or more slotted tubulars are positioned within the wellbore, the slotted tubulars traversing the producing subterranean zone. The slotted tubulars are fluidicly coupled with the solid tubulars. The producing subterranean zone is fluidicly isolated from at least one other subterranean zone within the wellbore. At least one of the slotted tubulars is fluidicly isolated from the producing subterranean zone.

According to another aspect of the present invention, a method of creating a casing in a borehole while also drilling the borehole is also provided that includes installing a tubular liner, a mandrel, and a drilling assembly in the borehole. A fluidic material is injected within the tubular liner, mandrel and drilling assembly. At least a portion of the tubular liner is radially expanded while the borehole is drilled using the drilling assembly. In a preferred embodiment, the injecting includes injecting the fluidic material within an expandible chamber.

According to another aspect of the present invention, an apparatus is also provided that includes a support member, the support member including a first fluid passage; a mandrel coupled to the support member, the mandrel including: a second fluid passage; a tubular member coupled to the mandrel; and a shoe coupled to the tubular liner, the shoe including a third fluid passage; and a drilling assembly coupled to the shoe; wherein the first, second and third fluid passages and the drilling assembly are operably coupled.

According to another aspect of the present invention, a method of forming an underground pipeline within an underground tunnel including at least a first tubular member and a second tubular member, the first tubular member having an inner diameter greater than an outer diameter of the second tubular member, is also provided that includes positioning the first tubular member within the tunnel; positioning the second tubular member within the tunnel in an overlapping relationship with the first tubular member; positioning a mandrel and a drilling assembly within an interior region of the second tubular member; injecting a fluidic material within the mandrel, drilling assembly and the second tubular member; extruding at least a portion of the second tubular member off of the mandrel into engagement with the first tubular member; and drilling the tunnel.

According to another aspect of the present invention, an apparatus is also provided that includes a wellbore, the wellbore formed by the process of drilling the wellbore; and a tubular liner positioned within the wellbore, the tubular liner formed by the process of extruding the tubular liner off of a mandrel while drilling the wellbore. In a preferred embodiment, the tubular liner is formed by the process of: placing the tubular liner and mandrel within the wellbore; and pressurizing an interior portion of the tubular liner.

According to another aspect of the present invention, a method of forming a wellbore casing in a wellbore is also provided that includes drilling out the wellbore while forming the wellbore casing.

DETAILED DESCRIPTION OF THE ILLUSTRATIVE EMBODIMENTS

Figure 1:
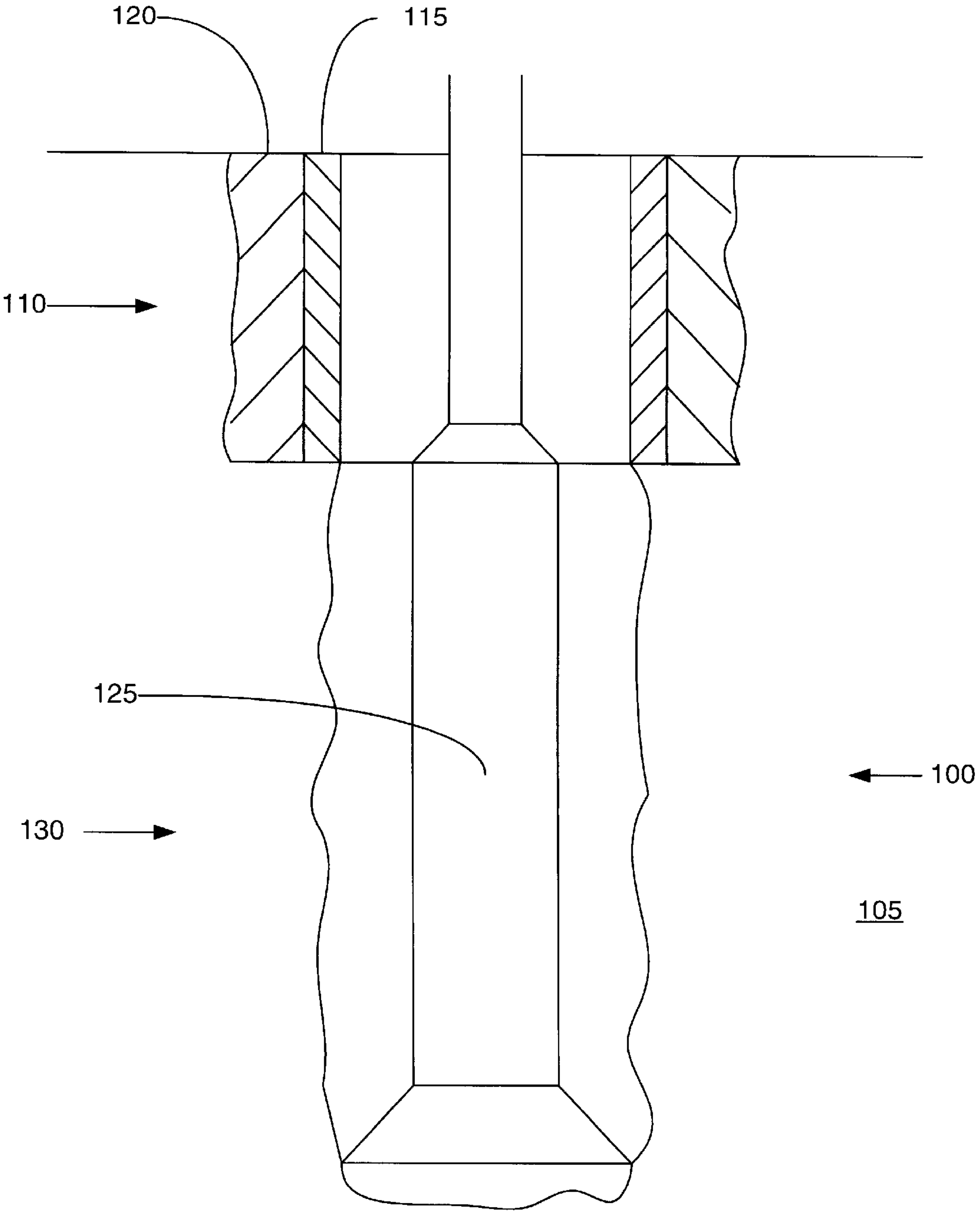
FIG. 1 is a fragmentary cross-sectional view illustrating the drilling of a new section of a well borehole.

An apparatus and method for forming a wellbore casing within a subterranean formation is provided. The apparatus and method permits a wellbore casing to be formed in a subterranean formation by placing a tubular member and a mandrel in a new section of a wellbore, and then extruding the tubular member off of the mandrel by pressurizing an interior portion of the tubular member. The apparatus and method further permits adjacent tubular members in the wellbore to be joined using an overlapping joint that prevents fluid and or gas passage. The apparatus and method further permits a new tubular member to be supported by an existing tubular member by expanding the new tubular member into engagement with the existing tubular member. The apparatus and method further minimizes the reduction in the hole size of the wellbore casing necessitated by the addition of new sections of wellbore casing.

An apparatus and method for forming a tie-back liner using an expandable tubular member is also provided. The apparatus and method permits a tie-back liner to be created by extruding a tubular member off of a mandrel by pressurizing and interior portion of the tubular member. In this manner, a tie-back liner is produced. The apparatus and method further permits adjacent tubular members in the wellbore to be joined using an overlapping joint that prevents fluid and/or gas passage. The apparatus and method further permits a new tubular member to be supported by an existing tubular member by expanding the new tubular member into engagement with the existing tubular member.

An apparatus and method for expanding a tubular member is also provided that includes an expandable tubular member, mandrel and a shoe. In a preferred embodiment, the interior portions of the apparatus is composed of materials that permit the interior portions to be removed using a conventional drilling apparatus. In this manner, in the event of a malfunction in a downhole region, the apparatus may be easily removed.

An apparatus and method for hanging an expandable tubular liner in a wellbore is also provided. The apparatus and method permit a tubular liner to be attached to an existing section of casing. The apparatus and method further have application to the joining of tubular members in general.

An apparatus and method for forming a wellhead system is also provided. The apparatus and method permit a wellhead to be formed including a number of expandable tubular members positioned in a concentric arrangement. The wellhead preferably includes an outer casing that supports a plurality of concentric casings using contact pressure between the inner casings and the outer casing. The resulting wellhead system eliminates many of the spools conventionally required, reduces the height of the Christmas tree facilitating servicing, lowers the load bearing areas of the wellhead resulting in a more stable system, and eliminates costly and expensive hanger systems.

An apparatus and method for forming a mono-diameter well casing is also provided. The apparatus and method permit the creation of a well casing in a wellbore having a substantially constant internal diameter. In this manner, the operation of an oil or gas well is greatly simplified.

An apparatus and method for expanding tubular members is also provided. The apparatus and method utilize a piston-cylinder configuration in which a pressurized chamber is used to drive a mandrel to radially expand tubular members. In this manner, higher operating pressures can be utilized. Throughout the radial expansion process, the tubular member is never placed in direct contact with the operating pressures. In this manner, damage to the tubular member is prevented while also permitting controlled radial expansion of the tubular member in a wellbore.

An apparatus and method for forming a mono-diameter wellbore casing is also provided. The apparatus and method utilize a piston-cylinder configuration in which a pressurized chamber is used to drive a mandrel to radially expand tubular members. In this manner, higher operating pressures can be utilized. Throughput the radial expansion process, the tubular member is never placed in direct contact with the operating pressures. In this manner, damage to the tubular member is prevented while also permitting controlled radial expansion of the tubular member in a wellbore.

An apparatus and method for isolating one or more subterranean zones from one or more other subterranean zones is also provided. The apparatus and method permits a producing zone to be isolated from a nonproducing zone using a combination of solid and slotted tubulars. In the production mode, the teachings of the present disclosure may be used in combination with conventional, well known, production completion equipment and methods using a series of packers, solid tubing, perforated tubing, and sliding sleeves, which will be inserted into the disclosed apparatus to permit the commingling and/or isolation of the subterranean zones from each other.

An apparatus and method for forming a wellbore casing while the wellbore is drilled is also provided. In this manner, a wellbore casing can be formed simultaneous with the drilling out of a new section of the wellbore. In a preferred embodiment, the apparatus and method is used in combination with one or more of the apparatus and methods disclosed in the present disclosure for forming wellbore casings using expandable tubulars. Alternatively, the method and apparatus can be used to create a pipeline or tunnel in a time efficient manner.

Referring initially to FIGS. 1–5, an embodiment of an apparatus and method for forming a wellbore casing within a subterranean formation will now be described. As illustrated in FIG. 1, a wellbore 100 is positioned in a subterranean formation 105. The wellbore 100 includes an existing cased section 110 having a tubular casing 115 and an annular outer layer of cement 120.

In order to extend the wellbore 100 into the subterranean formation 105, a drill string 125 is used in a well known manner to drill out material from the subterranean formation 105 to form a new section 130.

Figure 2:
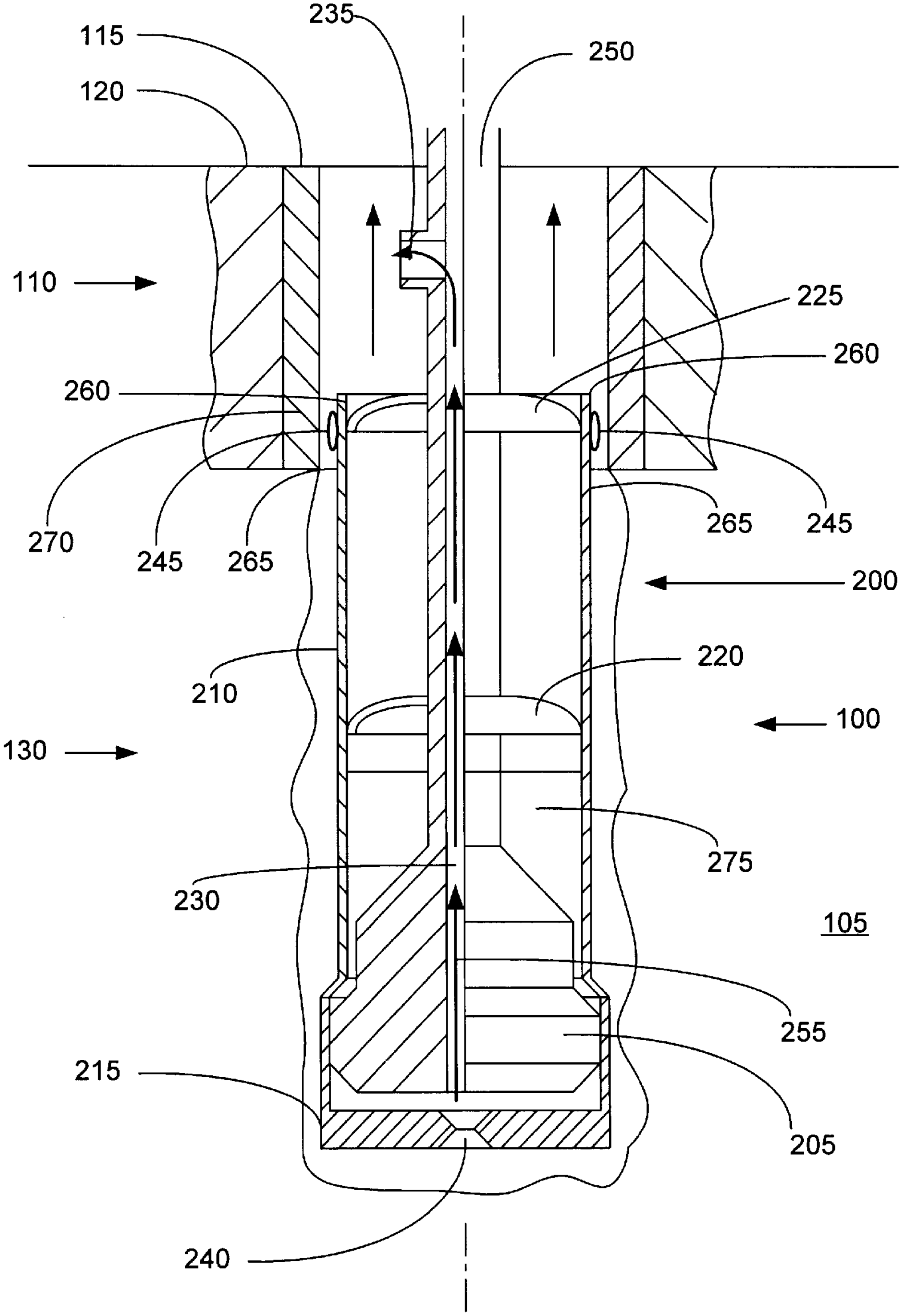
FIG. 2 is a fragmentary cross-sectional view illustrating the placement of an embodiment of an apparatus for creating a casing within the new section of the well borehole.

As illustrated in FIG. 2, an apparatus 200 for forming a wellbore casing in a subterranean formation is then positioned in the new section 130 of the wellbore 100. The apparatus 200 preferably includes an expandable mandrel or pig 205, a tubular member 210, a shoe 215, a lower cup seal 220, an upper cup seal 225, a fluid passage 230, a fluid passage 235, a fluid passage 240, seals 245, and a support member 250.

The expandable mandrel 205 is coupled to and supported by the support member 250. The expandable mandrel 205 is preferably adapted to controllably expand in a radial direction. The expandable mandrel 205 may comprise any number of conventional commercially available expandable mandrels modified in accordance with the teachings of the present disclosure. In a preferred embodiment, the expandable mandrel 205 comprises a hydraulic expansion tool as disclosed in U.S. Pat. No. 5,348,095, the contents of which are incorporated herein by reference, modified in accordance with the teachings of the present disclosure.

The tubular member 210 is supported by the expandable mandrel 205. The tubular member 210 is expanded in the radial direction and extruded off of the expandable mandrel 205. The tubular member 210 may be fabricated from any number of conventional commercially available materials such as, for example, Oilfield Country Tubular Goods (OCTG), 13 chromium steel tubing/casing, or plastic tubing/casing. In a preferred embodiment, the tubular member 210 is fabricated from OCTG in order to maximize strength after expansion. The inner and outer diameters of the tubular member 210 may range, for example, from approximately 0.75 to 47 inches and 1.05 to 48 inches, respectively. In a preferred embodiment, the inner and outer diameters of the tubular member 210 range from about 3 to 15.5 inches and 3.5 to 16 inches, respectively in order to optimally provide minimal telescoping effect in the most commonly drilled wellbore sizes. The tubular member 210 preferably comprises a solid member.

In a preferred embodiment, the end portion 260 of the tubular member 210 is slotted, perforated, or otherwise modified to catch or slow down the mandrel 205 when it completes the extrusion of tubular member 210. In a preferred embodiment, the length of the tubular member 210 is limited to minimize the possibility of buckling. For typical tubular member 210 materials, the length of the tubular member 210 is preferably limited to between about 40 to 20,000 feet in length.

The shoe 215 is coupled to the expandable mandrel 205 and the tubular member 210. The shoe 215 includes fluid passage 240. The shoe 215 may comprise any number of conventional commercially available shoes such as, for example, Super Seal II float shoe, Super Seal II Down-Jet float shoe or a guide shoe with a sealing sleeve for a latch down plug modified in accordance with the teachings of the present disclosure. In a preferred embodiment, the shoe 215 comprises an aluminum down-jet guide shoe with a sealing sleeve for a latch-down plug available from Halliburton Energy Services in Dallas, Tex. modified in accordance with the teachings of the present disclosure, in order to optimally guide the tubular member 210 in the wellbore, optimally provide an adequate seal between the interior and exterior diameters of the overlapping joint between the tubular members, and to optimally allow the complete drill out of the shoe and plug after the completion of the cementing and expansion operations.

In a preferred embodiment, the shoe 215 includes one or more through and side outlet ports in fluidic communication with the fluid passage 240. In this manner, the shoe 215 optimally injects hardenable fluidic sealing material into the region outside the shoe 215 and tubular member 210. In a preferred embodiment, the shoe 215 includes the fluid passage 240 having an inlet geometry that can receive a dart and/or a ball sealing member. In this manner, the fluid passage 240 can be optimally sealed off by introducing a plug, dart and/or ball sealing elements into the fluid passage 230.

The lower cup seal 220 is coupled to and supported by the support member 250. The lower cup seal 220 prevents foreign materials from entering the interior region of the tubular member 210 adjacent to the expandable mandrel 205. The lower cup seal 220 may comprise any number of conventional commercially available cup seals such as, for example, TP cups, or Selective Injection Packer (SIP) cups modified in accordance with the teachings of the present disclosure. In a preferred embodiment, the lower cup seal 220 comprises a SIP cup seal, available from Halliburton Energy Services in Dallas, Tex. in order to optimally block foreign material and contain a body of lubricant.

The upper cup seal 225 is coupled to and supported by the support member 250. The upper cup seal 225 prevents foreign materials from entering the interior region of the tubular member 210. The upper cup seal 225 may comprise any number of conventional commercially available cup seals such as, for example, TP cups or SIP cups modified in accordance with the teachings of the present disclosure. In a preferred embodiment, the upper cup seal 225 comprises a SIP cup, available from Halliburton Energy Services in Dallas, Tex. in order to optimally block the entry of foreign materials and contain a body of lubricant.

The fluid passage 230 permits fluidic materials to be transported to and from the interior region of the tubular member 210 below the expandable mandrel 205. The fluid passage 230 is coupled to and positioned within the support member 250 and the expandable mandrel 205. The fluid passage 230 preferably extends from a position adjacent to the surface to the bottom of the expandable mandrel 205. The fluid passage 230 is preferably positioned along a centerline of the apparatus 200.

The fluid passage 230 is preferably selected, in the casing running mode of operation, to transport materials such as drilling mud or formation fluids at flow rates and pressures ranging from about 0 to 3,000 gallons/minute and 0 to 9,000 psi in order to minimize drag on the tubular member being run and to minimize surge pressures exerted on the wellbore which could cause a loss of wellbore fluids and lead to hole collapse.

The fluid passage 235 permits fluidic materials to be released from the fluid passage 230. In this manner, during placement of the apparatus 200 within the new section 130 of the wellbore 100, fluidic materials 255 forced up the fluid passage 230 can be released into the wellbore 100 above the tubular member 210 thereby minimizing surge pressures on the wellbore section 130. The fluid passage 235 is coupled to and positioned within the support member 250. The fluid passage is further fluidicly coupled to the fluid passage 230.

The fluid passage 235 preferably includes a control valve for controllably opening and closing the fluid passage 235. In a preferred embodiment, the control valve is pressure activated in order to controllably minimize surge pressures. The fluid passage 235 is preferably positioned substantially orthogonal to the centerline of the apparatus 200.

The fluid passage 235 is preferably selected to convey fluidic materials at flow rates and pressures ranging from about 0 to 3,000 gallons/minute and 0 to 9,000 psi in order to reduce the drag on the apparatus 200 during insertion into the new section 130 of the wellbore 100 and to minimize surge pressures on the new wellbore section 130.

The fluid passage 240 permits fluidic materials to be transported to and from the region exterior to the tubular member 210 and shoe 215. The fluid passage 240 is coupled to and positioned within the shoe 215 in fluidic communication with the interior region of the tubular member 210 below the expandable mandrel 205. The fluid passage 240 preferably has a cross-sectional shape that permits a plug, or other similar device, to be placed in fluid passage 240 to thereby block further passage of fluidic materials. In this manner, the interior region of the tubular member 210 below the expandable mandrel 205 can be fluidicly isolated from the region exterior to the tubular member 210. This permits the interior region of the tubular member 210 below the expandable mandrel 205 to be pressurized. The fluid passage 240 is preferably positioned substantially along the centerline of the apparatus 200.

The fluid passage 240 is preferably selected to convey materials such as cement, drilling mud or epoxies at flow rates and pressures ranging from about 0 to 3,000 gallons/minute and 0 to 9,000 psi in order to optimally fill the annular region between the tubular member 210 and the new section 130 of the wellbore 100 with fluidic materials. In a preferred embodiment, the fluid passage 240 includes an inlet geometry that can receive a dart and/or a ball sealing member. In this manner, the fluid passage 240 can be sealed off by introducing a plug, dart and/or ball sealing elements into the fluid passage 230.

The seals 245 are coupled to and supported by an end portion 260 of the tubular member 210. The seals 245 are further positioned on an outer surface 265 of the end portion 260 of the tubular member 210. The seals 245 permit the overlapping joint between the end portion 270 of the casing 115 and the portion 260 of the tubular member 210 to be fluidicly sealed. The seals 245 may comprise any number of conventional commercially available seals such as, for example, lead, rubber, Teflon, or epoxy seals modified in accordance with the teachings of the present disclosure. In a preferred embodiment, the seals 245 are molded from Stratalock epoxy available from Halliburton Energy Services in Dallas, Tex. in order to optimally provide a load bearing interference fit between the end 260 of the tubular member 210 and the end 270 of the existing casing 115.

In a preferred embodiment, the seals 245 are selected to optimally provide a sufficient frictional force to support the expanded tubular member 210 from the existing casing 115. In a preferred embodiment, the frictional force optimally provided by the seals 245 ranges from about 1,000 to 1,000,000 lbf in order to optimally support the expanded tubular member 210.

The support member 250 is coupled to the expandable mandrel 205, tubular member 210, shoe 215, and seals 220 and 225. The support member 250 preferably comprises an annular member having sufficient strength to carry the apparatus 200 into the new section 130 of the wellbore 100. In a preferred embodiment, the support member 250 further includes one or more conventional centralizers (not illustrated) to help stabilize the apparatus 200. In a preferred embodiment, the support member 250 comprises coiled tubing.

In a preferred embodiment, a quantity of lubricant 275 is provided in the annular region above the expandable mandrel 205 within the interior of the tubular member 210. In this manner, the extrusion of the tubular member 210 off of the expandable mandrel 205 is facilitated. The lubricant 275 may comprise any number of conventional commercially available lubricants such as, for example, Lubriplate, chlorine based lubricants, oil based lubricants or Climax 1500 Antisieze (3100). In a preferred embodiment, the lubricant 275 comprises Climax 1500 Antisieze (3100) available from Climax Lubricants and Equipment Co. in Houston, Tex. in order to optimally provide optimum lubrication to faciliate the expansion process.

In a preferred embodiment, the support member 250 is thoroughly cleaned prior to assembly to the remaining portions of the apparatus 200. In this manner, the introduction of foreign material into the apparatus 200 is minimized. This minimizes the possibility of foreign material clogging the various flow passages and valves of the apparatus 200.

In a preferred embodiment, before or after positioning the apparatus 200 within the new section 130 of the wellbore 100, a couple of wellbore volumes are circulated in order to ensure that no foreign materials are located within the wellbore 100 that might clog up the various flow passages and valves of the apparatus 200 and to ensure that no foreign material interferes with the expansion process.

Figure 3:
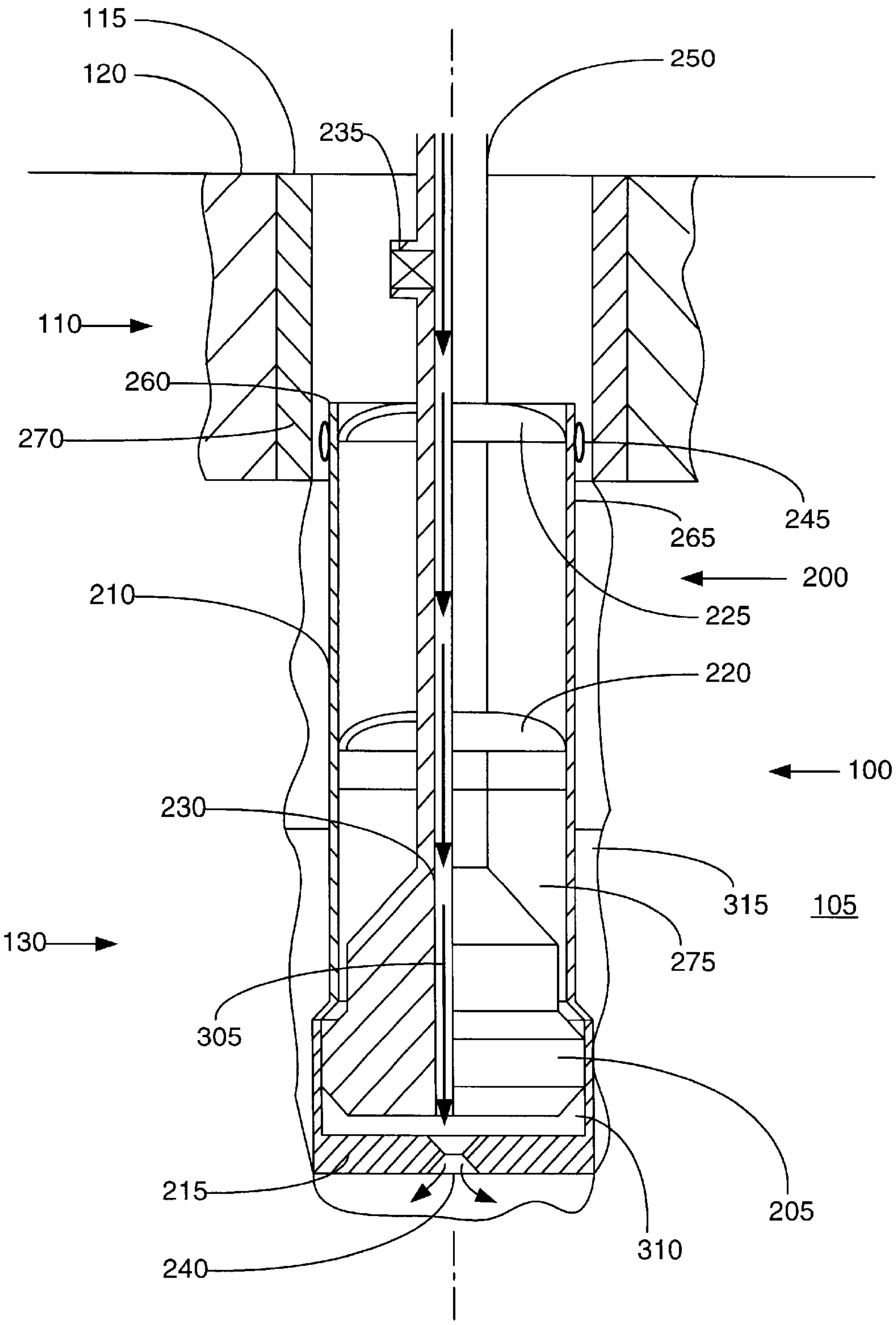
FIG. 3 is a fragmentary cross-sectional view illustrating the injection of a first quantity of a fluidic material into the new section of the well borehole.

As illustrated in FIG. 3, the fluid passage 235 is then closed and a hardenable fluidic sealing material 305 is then pumped from a surface location into the fluid passage 230. The material 305 then passes from the fluid passage 230 into the interior region 310 of the tubular member 210 below the expandable mandrel 205. The material 305 then passes from the interior region 310 into the fluid passage 240. The material 305 then exits the apparatus 200 and fills the annular region 315 between the exterior of the tubular member 210 and the interior wall of the new section 130 of the wellbore 100. Continued pumping of the material 305 causes the material 305 to fill up at least a portion of the annular region 315.

The material 305 is preferably pumped into the annular region 315 at pressures and flow rates ranging, for example, from about 0 to 5000 psi and 0 to 1,500 gallons/min, respectively. The optimum flow rate and operating pressures vary as a function of the casing and wellbore sizes, wellbore section length, available pumping equipment, and fluid properties of the fluidic material being pumped. The optimum flow rate and operating pressure are preferably determined using conventional empirical methods.

The hardenable fluidic sealing material 305 may comprise any number of conventional commercially available hardenable fluidic sealing materials such as, for example, slag mix, cement or epoxy. In a preferred embodiment, the hardenable fluidic sealing material 305 comprises a blended cement prepared specifically for the particular well section being drilled from Halliburton Energy Services in Dallas, Tex. in order to provide optimal support for tubular member 210 while also maintaining optimum flow characteristics so as to minimize difficulties during the displacement of cement in the annular region 315. The optimum blend of the blended cement is preferably determined using conventional empirical methods.

The annular region 315 preferably is filled with the material 305 in sufficient quantities to ensure that, upon radial expansion of the tubular member 210, the annular region 315 of the new section 130 of the wellbore 100 will be filled with material 305.

Figure 3A:
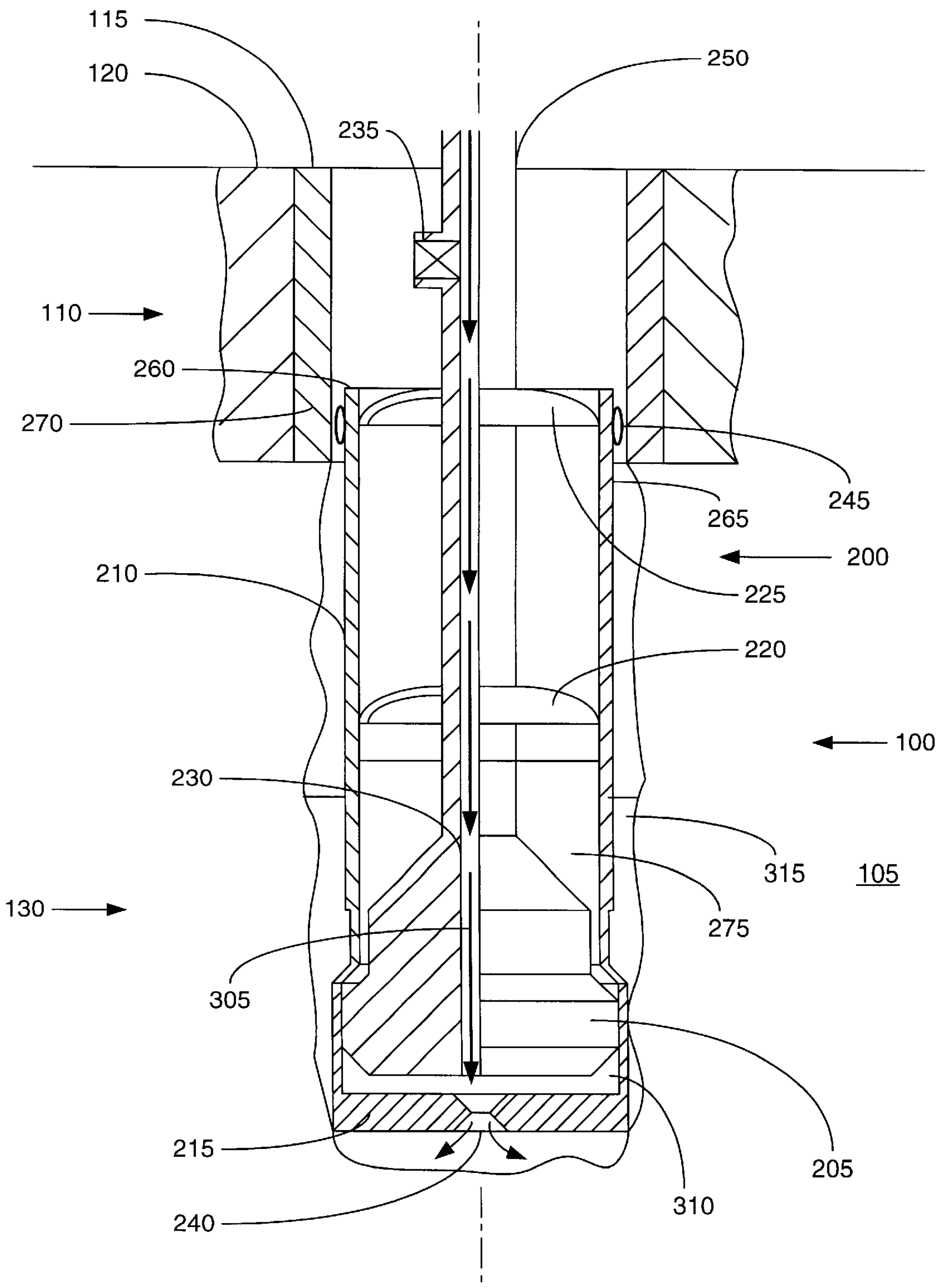
FIG. 3*a* is another fragmentary cross-sectional view illustrating the injection of a first quantity of a hardenable fluidic sealing material into the new section of the well borehole.

In a particularly preferred embodiment, as illustrated in FIG. 3*a*, the wall thickness and/or the outer diameter of the tubular member 210 is reduced in the region adjacent to the mandrel 205 in order optimally permit placement of the apparatus 200 in positions in the wellbore with tight clearances. Furthermore, in this manner, the initiation of the radial expansion of the tubular member 210 during the extrusion process is optimally facilitated.

Figure 4:
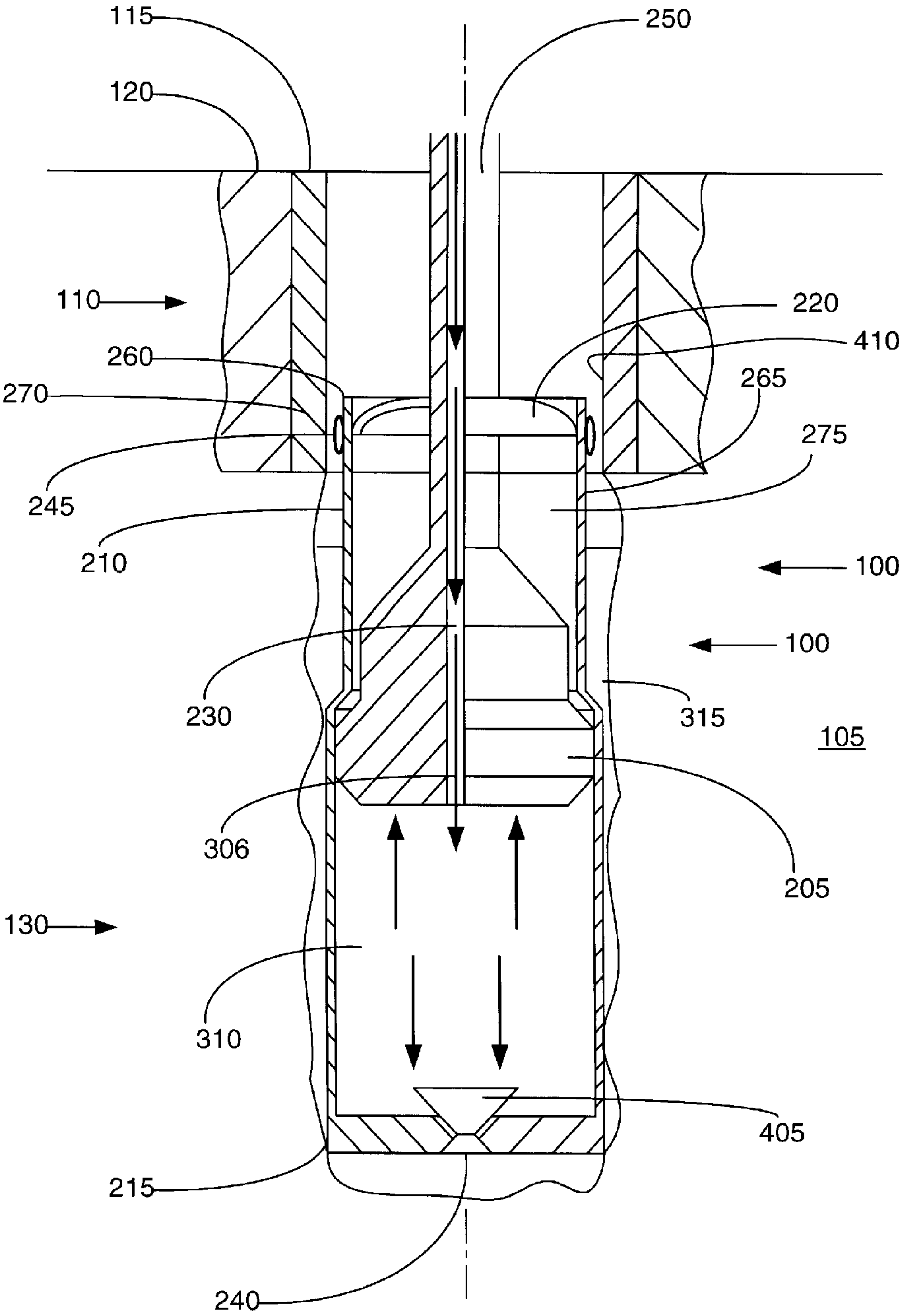
FIG. 4 is a fragmentary cross-sectional view illustrating the injection of a second quantity of a fluidic material into the new section of the well borehole.

As illustrated in FIG. 4, once the annular region 315 has been adequately filled with material 305, a plug 405, or other similar device, is introduced into the fluid passage 240 thereby fluidicly isolating the interior region 310 from the annular region 315. In a preferred embodiment, a non-hardenable fluidic material 306 is then pumped into the interior region 310 causing the interior region to pressurize. In this manner, the interior of the expanded tubular member 210 will not contain significant amounts of cured material 305. This reduces and simplifies the cost of the entire process. Alternatively, the material 305 may be used during this phase of the process.

Once the interior region 310 becomes sufficiently pressurized, the tubular member 210 is extruded off of the expandable mandrel 205. During the extrusion process, the expandable mandrel 205 may be raised out of the expanded portion of the tubular member 210. In a preferred embodiment, during the extrusion process, the mandrel 205 is raised at approximately the same rate as the tubular member 210 is expanded in order to keep the tubular member 210 stationary relative to the new wellbore section 130. In an alternative preferred embodiment, the extrusion process is commenced with the tubular member 210 positioned above the bottom of the new wellbore section 130, keeping the mandrel 205 stationary, and allowing the tubular member 210 to extrude off of the mandrel 205 and fall down the new wellbore section 130 under the force of gravity.

The plug 405 is preferably placed into the fluid passage 240 by introducing the plug 405 into the fluid passage 230 at a surface location in a conventional manner. The plug 405 preferably acts to fluidicly isolate the hardenable fluidic sealing material 305 from the non hardenable fluidic material 306.

The plug 405 may comprise any number of conventional commercially available devices from plugging a fluid passage such as, for example, Multiple Stage Cementer (MSC) latch-down plug, Omega latch-down plug or three-wiper latch-down plug modified in accordance with the teachings of the present disclosure. In a preferred embodiment, the plug 405 comprises a MSC latch-down plug available from Halliburton Energy Services in Dallas, Tex.

After placement of the plug 405 in the fluid passage 240, a non hardenable fluidic material 306 is preferably pumped into the interior region 310 at pressures and flow rates ranging, for example, from approximately 400 to 10,000 psi and 30 to 4,000 gallons/min. In this manner, the amount of hardenable fluidic sealing material within the interior 310 of the tubular member 210 is minimized. In a preferred embodiment, after placement of the plug 405 in the fluid passage 240, the non hardenable material 306 is preferably pumped into the interior region 310 at pressures and flow rates ranging from approximately 500 to 9,000 psi and 40 to 3,000 gallons/min in order to maximize the extrusion speed.

In a preferred embodiment, the apparatus 200 is adapted to minimize tensile, burst, and friction effects upon the tubular member 210 during the expansion process. These effects will depend upon the geometry of the expansion mandrel 205, the material composition of the tubular member 210 and expansion mandrel 205, the inner diameter of the tubular member 210, the wall thickness of the tubular member 210, the type of lubricant, and the yield strength of the tubular member 210. In general, the thicker the wall thickness, the smaller the inner diameter, and the greater the yield strength of the tubular member 210, then the greater the operating pressures required to extrude the tubular member 210 off of the mandrel 205.

For typical tubular members 210, the extrusion of the tubular member 210 off of the expandable mandrel will begin when the pressure of the interior region 310 reaches, for example, approximately 500 to 9,000 psi.

During the extrusion process, the expandable mandrel 205 may be raised out of the expanded portion of the tubular member 210 at rates ranging, for example, from about 0 to 5 ft/sec. In a preferred embodiment, during the extrusion process, the expandable mandrel 205 is raised out of the expanded portion of the tubular member 210 at rates ranging from about 0 to 2 ft/sec in order to minimize the time required for the expansion process while also permitting easy control of the expansion process.

When the end portion 260 of the tubular member 210 is extruded off of the expandable mandrel 205, the outer surface 265 of the end portion 260 of the tubular member 210 will preferably contact the interior surface 410 of the end portion 270 of the casing 115 to form an fluid tight overlapping joint. The contact pressure of the overlapping joint may range, for example, from approximately 50 to 20,000 psi. In a preferred embodiment, the contact pressure of the overlapping joint ranges from approximately 400 to 10,000 psi in order to provide optimum pressure to activate the annular sealing members 245 and optimally provide resistance to axial motion to accommodate typical tensile and compressive loads.

The overlapping joint between the section 410 of the existing casing 115 and the section 265 of the expanded tubular member 210 preferably provides a gaseous and fluidic seal. In a particularly preferred embodiment, the sealing members 245 optimally provide a fluidic and gaseous seal in the overlapping joint.

In a preferred embodiment, the operating pressure and flow rate of the non hardenable fluidic material 306 is controllably ramped down when the expandable mandrel 205 reaches the end portion 260 of the tubular member 210. In this manner, the sudden release of pressure caused by the complete extrusion of the tubular member 210 off of the expandable mandrel 205 can be minimized. In a preferred embodiment, the operating pressure is reduced in a substantially linear fashion from 100% to about 10% during the end of the extrusion process beginning when the mandrel 205 is within about 5 feet from completion of the extrusion process.

Alternatively, or in combination, a shock absorber is provided in the support member 250 in order to absorb the shock caused by the sudden release of pressure. The shock absorber may comprise, for example, any conventional commercially available shock absorber adapted for use in wellbore operations.

Alternatively, or in combination, a mandrel catching structure is provided in the end portion 260 of the tubular member 210 in order to catch or at least decelerate the mandrel 205.

Once the extrusion process is completed, the expandable mandrel 205 is removed from the wellbore 100. In a preferred embodiment, either before or after the removal of the expandable mandrel 205, the integrity of the fluidic seal of the overlapping joint between the upper portion 260 of the tubular member 210 and the lower portion 270 of the casing 115 is tested using conventional methods.

If the fluidic seal of the overlapping joint between the upper portion 260 of the tubular member 210 and the lower portion 270 of the casing 115 is satisfactory, then any uncured portion of the material 305 within the expanded tubular member 210 is then removed in a conventional manner such as, for example, circulating the uncured material out of the interior of the expanded tubular member 210. The mandrel 205 is then pulled out of the wellbore section 130 and a drill bit or mill is used in combination with a conventional drilling assembly 505 to drill out any hardened material 305 within the tubular member 210. The material 305 within the annular region 315 is then allowed to cure.

Figure 5:
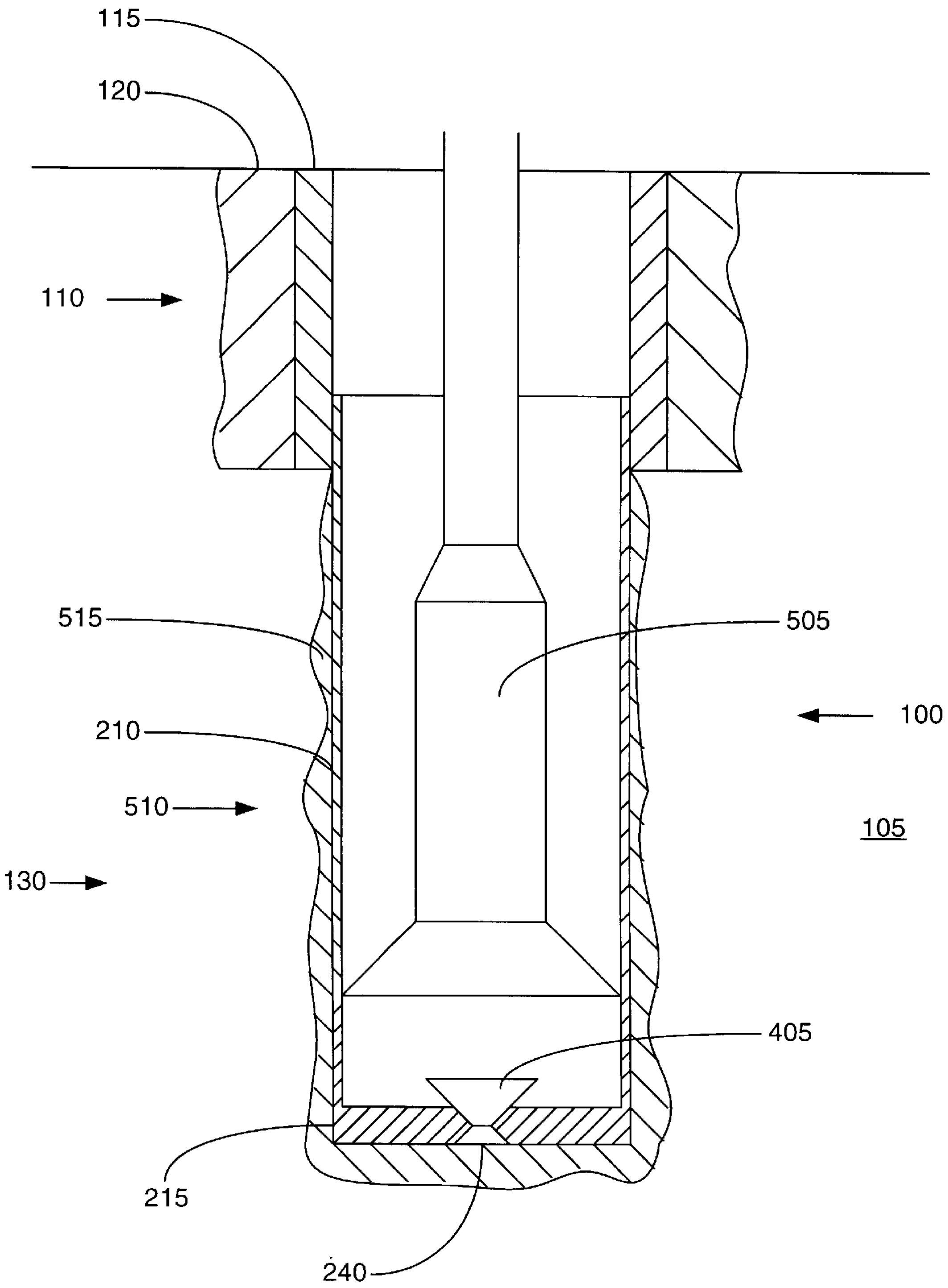
FIG. 5 is a fragmentary cross-sectional view illustrating the drilling out of a portion of the cured hardenable fluidic sealing material from the new section of the well borehole.

As illustrated in FIG. 5, preferably any remaining cured material 305 within the interior of the expanded tubular member 210 is then removed in a conventional manner using a conventional drill string 505. The resulting new section of casing 510 includes the expanded tubular member 210 and an outer annular layer 515 of cured material 305. The bottom portion of the apparatus 200 comprising the shoe 215 and dart 405 may then be removed by drilling out the shoe 215 and dart 405 using conventional drilling methods.

Figure 6:
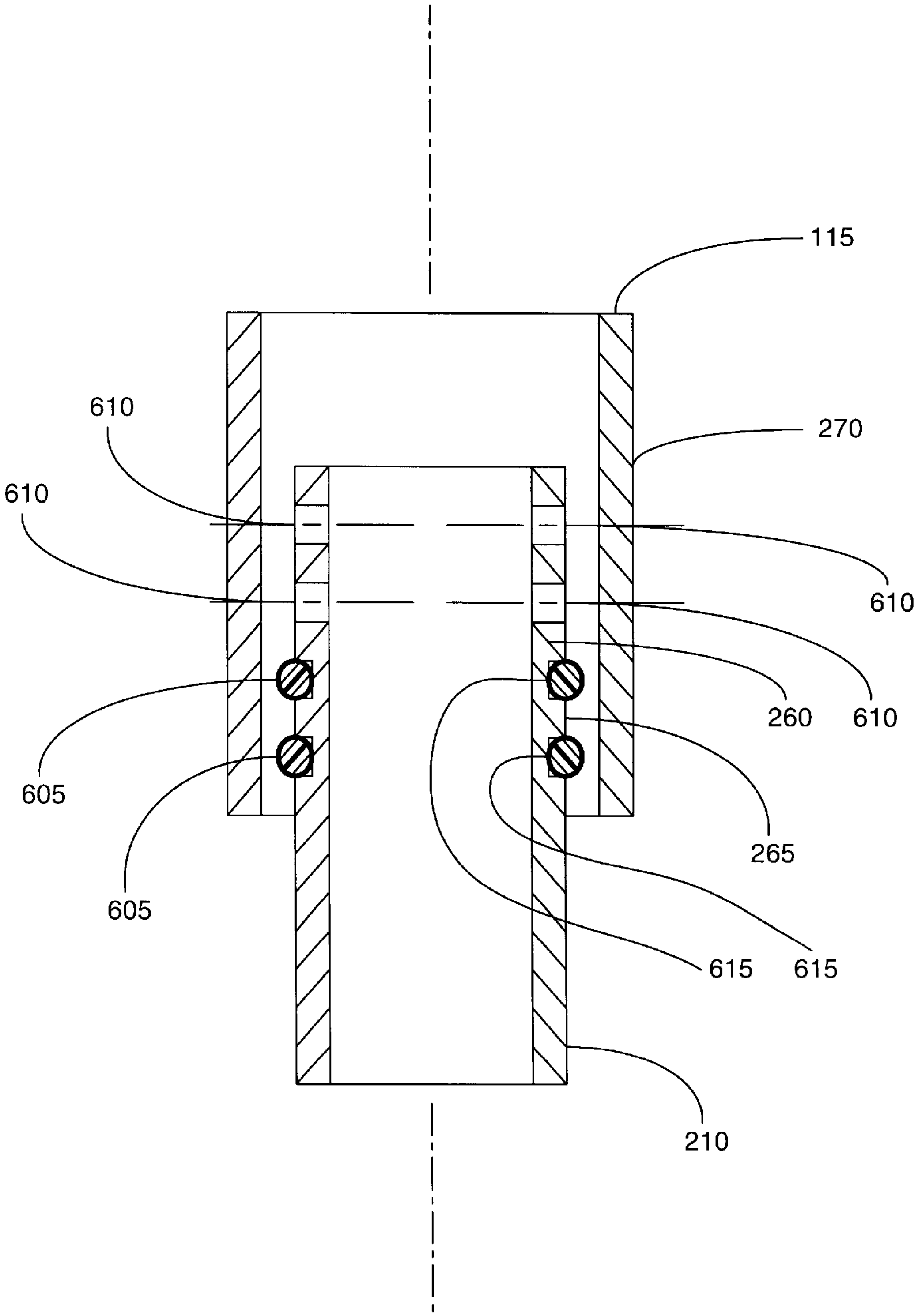
FIG. 6 is a cross-sectional view of an embodiment of the overlapping joint between adjacent tubular members.

In a preferred embodiment, as illustrated in FIG. 6, the upper portion 260 of the tubular member 210 includes one or more sealing members 605 and one or more pressure relief holes 610. In this manner, the overlapping joint between the lower portion 270 of the casing 115 and the upper portion 260 of the tubular member 210 is pressure-tight and the pressure on the interior and exterior surfaces of the tubular member 210 is equalized during the extrusion process.

In a preferred embodiment, the sealing members 605 are seated within recesses 615 formed in the outer surface 265 of the upper portion 260 of the tubular member 210. In an alternative preferred embodiment, the sealing members 605 are bonded or molded onto the outer surface 265 of the upper portion 260 of the tubular member 210. The pressure relief holes 610 are preferably positioned in the last few feet of the tubular member 210. The pressure relief holes reduce the operating pressures required to expand the upper portion 260 of the tubular member 210. This reduction in required operating pressure in turn reduces the velocity of the mandrel 205 upon the completion of the extrusion process. This reduction in velocity in turn minimizes the mechanical shock to the entire apparatus 200 upon the completion of the extrusion process.

Figure 7:
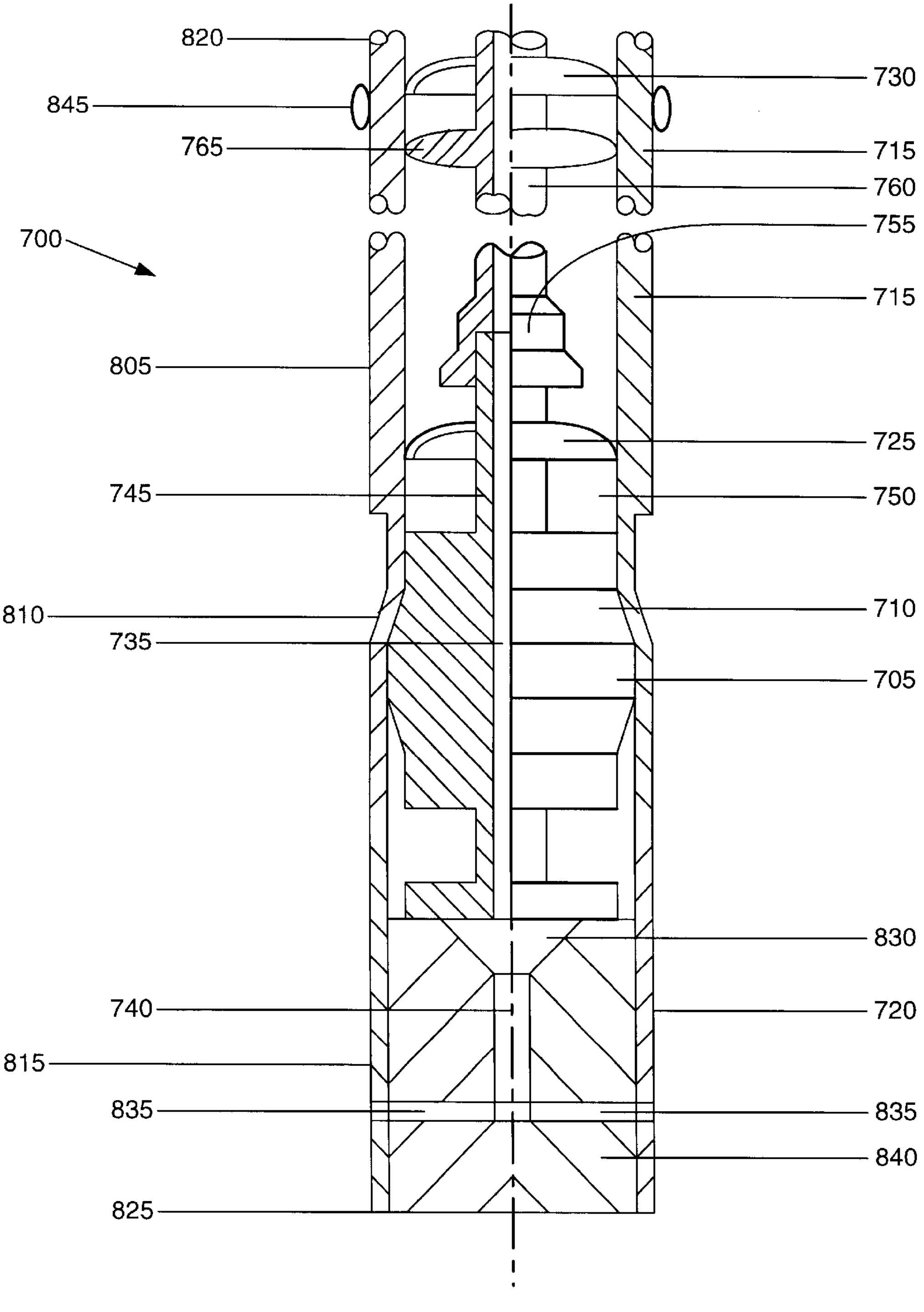
FIG. 7 is a fragmentary cross-sectional view of a preferred embodiment of the apparatus for creating a casing within a well borehole.

Referring now to FIG. 7, a particularly preferred embodiment of an apparatus 700 for forming a casing within a wellbore preferably includes an expandable mandrel or pig 705, an expandable mandrel or pig container 710, a tubular member 715, a float shoe 720, a lower cup seal 725, an upper cup seal 730, a fluid passage 735, a fluid passage 740, a support member 745, a body of lubricant 750, an overshot connection 755, another support member 760, and a stabilizer 765.

The expandable mandrel 705 is coupled to and supported by the support member 745. The expandable mandrel 705 is further coupled to the expandable mandrel container 710. The expandable mandrel 705 is preferably adapted to controllably expand in a radial direction. The expandable mandrel 705 may comprise any number of conventional commercially available expandable mandrels modified in accordance with the teachings of the present disclosure. In a preferred embodiment, the expandable mandrel 705 comprises a hydraulic expansion tool substantially as disclosed in U.S. Pat. No. 5,348,095, the contents of which are incorporated herein by reference, modified in accordance with the teachings of the present disclosure.

The expandable mandrel container 710 is coupled to and supported by the support member 745. The expandable mandrel container 710 is further coupled to the expandable mandrel 705. The expandable mandrel container 710 may be constructed from any number of conventional commercially available materials such as, for example, Oilfield Country Tubular Goods, stainless steel, titanium or high strength steels. In a preferred embodiment, the expandable mandrel container 710 is fabricated from material having a greater strength than the material from which the tubular member 715 is fabricated. In this manner, the container 710 can be fabricated from a tubular material having a thinner wall thickness than the tubular member 210. This permits the container 710 to pass through tight clearances thereby facilitating its placement within the wellbore.

In a preferred embodiment, once the expansion process begins, and the thicker, lower strength material of the tubular member 715 is expanded, the outside diameter of the tubular member 715 is greater than the outside diameter of the container 710.

The tubular member 715 is coupled to and supported by the expandable mandrel 705. The tubular member 715 is preferably expanded in the radial direction and extruded off of the expandable mandrel 705 substantially as described above with reference to FIGS. 1–6. The tubular member 715 may be fabricated from any number of materials such as, for example, Oilfield Country Tubular Goods (OCTG), automotive grade steel or plastics. In a preferred embodiment, the tubular member 715 is fabricated from OCTG.

In a preferred embodiment, the tubular member 715 has a substantially annular cross-section. In a particularly preferred embodiment, the tubular member 715 has a substantially circular annular cross-section.

The tubular member 715 preferably includes an upper section 805, an intermediate section 810, and a lower section 815. The upper section 805 of the tubular member 715 preferably is defined by the region beginning in the vicinity of the mandrel container 710 and ending with the top section 820 of the tubular member 715. The intermediate section 810 of the tubular member 715 is preferably defined by the region beginning in the vicinity of the top of the mandrel container 710 and ending with the region in the vicinity of the mandrel 705. The lower section of the tubular member 715 is preferably defined by the region beginning in the vicinity of the mandrel 705 and ending at the bottom 825 of the tubular member 715.

In a preferred embodiment, the wall thickness of the upper section 805 of the tubular member 715 is greater than the wall thicknesses of the intermediate and lower sections 810 and 815 of the tubular member 715 in order to optimally faciliate the initiation of the extrusion process and optimally permit the apparatus 700 to be positioned in locations in the wellbore having tight clearances.

The outer diameter and wall thickness of the upper section 805 of the tubular member 715 may range, for example, from about 1.05 to 48 inches and ⅛ to 2 inches, respectively. In a preferred embodiment, the outer diameter and wall thickness of the upper section 805 of the tubular member 715 range from about 3.5 to 16 inches and ⅜ to 1.5 inches, respectively.

The outer diameter and wall thickness of the intermediate section 810 of the tubular member 715 may range, for example, from about 2.5 to 50 inches and 1/16 to 1.5 inches, respectively. In a preferred embodiment, the outer diameter and wall thickness of the intermediate section 810 of the tubular member 715 range from about 3.5 to 19 inches and ⅛ to 1.25 inches, respectively.

The outer diameter and wall thickness of the lower section 815 of the tubular member 715 may range, for example, from about 2.5 to 50 inches and 1/16 to 1.25 inches, respectively. In a preferred embodiment, the outer diameter and wall thickness of the lower section 810 of the tubular member 715 range from about 3.5 to 19 inches and ⅛ to 1.25 inches, respectively. In a particularly preferred embodiment, the wall thickness of the lower section 815 of the tubular member 715 is further increased to increase the strength of the shoe 720 when drillable materials such as, for example, aluminum are used.

The tubular member 715 preferably comprises a solid tubular member. In a preferred embodiment, the end portion 820 of the tubular member 715 is slotted, perforated, or otherwise modified to catch or slow down the mandrel 705 when it completes the extrusion of tubular member 715. In a preferred embodiment, the length of the tubular member 715 is limited to minimize the possibility of buckling. For typical tubular member 715 materials, the length of the tubular member 715 is preferably limited to between about 40 to 20,000 feet in length.

The shoe 720 is coupled to the expandable mandrel 705 and the tubular member 715. The shoe 720 includes the fluid passage 740. In a preferred embodiment, the shoe 720 further includes an inlet passage 830, and one or more jet ports 835. In a particularly preferred embodiment, the cross-sectional shape of the inlet passage 830 is adapted to receive a latch-down dart, or other similar elements, for blocking the inlet passage 830. The interior of the shoe 720 preferably includes a body of solid material 840 for increasing the strength of the shoe 720. In a particularly preferred embodiment, the body of solid material 840 comprises aluminum.

The shoe 720 may comprise any number of conventional commercially available shoes such as, for example, Super Seal II Down-Jet float shoe, or guide shoe with a sealing sleeve for a latch down plug modified in accordance with the teachings of the present disclosure. In a preferred embodiment, the shoe 720 comprises an aluminum down-jet guide shoe with a sealing sleeve for a latch-down plug available from Halliburton Energy Services in Dallas, Tex., modified in accordance with the teachings of the present disclosure, in order to optimize guiding the tubular member 715 in the wellbore, optimize the seal between the tubular member 715 and an existing wellbore casing, and to optimally faciliate the removal of the shoe 720 by drilling it out after completion of the extrusion process.

The lower cup seal 725 is coupled to and supported by the support member 745. The lower cup seal 725 prevents foreign materials from entering the interior region of the tubular member 715 above the expandable mandrel 705. The lower cup seal 725 may comprise any number of conventional commercially available cup seals such as, for example, TP cups or Selective Injection Packer (SIP) cups modified in accordance with the teachings of the present disclosure. In a preferred embodiment, the lower cup seal 725 comprises a SIP cup, available from Halliburton Energy Services in Dallas, Tex. in order to optimally provide a debris barrier and hold a body of lubricant.

The upper cup seal 730 is coupled to and supported by the support member 760. The upper cup seal 730 prevents foreign materials from entering the interior region of the tubular member 715. The upper cup seal 730 may comprise any number of conventional commercially available cup seals such as, for example, TP cups or Selective Injection Packer (SIP) cup modified in accordance with the teachings of the present disclosure. In a preferred embodiment, the upper cup seal 730 comprises a SIP cup available from Halliburton Energy Services in Dallas, Tex. in order to optimally provide a debris barrier and contain a body of lubricant.

The fluid passage 735 permits fluidic materials to be transported to and from the interior region of the tubular member 715 below the expandable mandrel 705. The fluid passage 735 is fluidicly coupled to the fluid passage 740. The fluid passage 735 is preferably coupled to and positioned within the support member 760, the support member 745, the mandrel container 710, and the expandable mandrel 705. The fluid passage 735 preferably extends from a position adjacent to the surface to the bottom of the expandable mandrel 705. The fluid passage 735 is preferably positioned along a centerline of the apparatus 700. The fluid passage 735 is preferably selected to transport materials such as cement, drilling mud or epoxies at flow rates and pressures ranging from about 40 to 3,000 gallons/minute and 500 to 9,000 psi in order to optimally provide sufficient operating pressures to extrude the tubular member 715 off of the expandable mandrel 705.

As described above with reference to FIGS. 1–6, during placement of the apparatus 700 within a new section of a wellbore, fluidic materials forced up the fluid passage 735 can be released into the wellbore above the tubular member 715. In a preferred embodiment, the apparatus 700 further includes a pressure release passage that is coupled to and positioned within the support member 260. The pressure release passage is further fluidicly coupled to the fluid passage 735. The pressure release passage preferably includes a control valve for controllably opening and closing the fluid passage. In a preferred embodiment, the control valve is pressure activated in order to controllably minimize surge pressures. The pressure release passage is preferably positioned substantially orthogonal to the centerline of the apparatus 700. The pressure release passage is preferably selected to convey materials such as cement, drilling mud or epoxies at flow rates and pressures ranging from about 0 to 500 gallons/minute and 0 to 1,000 psi in order to reduce the drag on the apparatus 700 during insertion into a new section of a wellbore and to minimize surge pressures on the new wellbore section.

The fluid passage 740 permits fluidic materials to be transported to and from the region exterior to the tubular member 715. The fluid passage 740 is preferably coupled to and positioned within the shoe 720 in fluidic communication with the interior region of the tubular member 715 below the expandable mandrel 705. The fluid passage 740 preferably has a cross-sectional shape that permits a plug, or other similar device, to be placed in the inlet 830 of the fluid passage 740 to thereby block further passage of fluidic materials. In this manner, the interior region of the tubular member 715 below the expandable mandrel 705 can be optimally fluidicly isolated from the region exterior to the tubular member 715. This permits the interior region of the tubular member 715 below the expandable mandrel 205 to be pressurized.

The fluid passage 740 is preferably positioned substantially along the centerline of the apparatus 700. The fluid passage 740 is preferably selected to convey materials such as cement, drilling mud or epoxies at flow rates and pressures ranging from about 0 to 3,000 gallons/minute and 0 to 9,000 psi in order to optimally fill an annular region between the tubular member 715 and a new section of a wellbore with fluidic materials. In a preferred embodiment, the fluid passage 740 includes an inlet passage 830 having a geometry that can receive a dart and/or a ball sealing member. In this manner, the fluid passage 240 can be sealed off by introducing a plug, dart and/or ball sealing elements into the fluid passage 230.

In a preferred embodiment, the apparatus 700 further includes one or more seals 845 coupled to and supported by the end portion 820 of the tubular member 715. The seals 845 are further positioned on an outer surface of the end portion 820 of the tubular member 715. The seals 845 permit the overlapping joint between an end portion of preexisting casing and the end portion 820 of the tubular member 715 to be fluidicly sealed. The seals 845 may comprise any number of conventional commercially available seals such as, for example, lead, rubber, Teflon, or epoxy seals modified in accordance with the teachings of the present disclosure. In a preferred embodiment, the seals 845 comprise seals molded from StrataLock epoxy available from Halliburton Energy Services in Dallas, Tex. in order to optimally provide a hydraulic seal and a load bearing interference fit in the overlapping joint between the tubular member 715 and an existing casing with optimal load bearing capacity to support the tubular member 715.

In a preferred embodiment, the seals 845 are selected to provide a sufficient frictional force to support the expanded tubular member 715 from the existing casing. In a preferred embodiment, the frictional force provided by the seals 845 ranges from about 1,000 to 1,000,000 lbf in order to optimally support the expanded tubular member 715.

The support member 745 is preferably coupled to the expandable mandrel 705 and the overshot connection 755. The support member 745 preferably comprises an annular member having sufficient strength to carry the apparatus 700 into a new section of a wellbore. The support member 745 may comprise any number of conventional commercially available support members such as, for example, steel drill pipe, coiled tubing or other high strength tubular modified in accordance with the teachings of the present disclosure. In a preferred embodiment, the support member 745 comprises conventional drill pipe available from various steel mills in the United States.

In a preferred embodiment, a body of lubricant 750 is provided in the annular region above the expandable mandrel container 710 within the interior of the tubular member 715. In this manner, the extrusion of the tubular member 715 off of the expandable mandrel 705 is facilitated. The lubricant 705 may comprise any number of conventional commercially available lubricants such as, for example, Lubriplate, chlorine based lubricants, oil based lubricants, or Climax 1500 Antisieze (3100). In a preferred embodiment, the lubricant 750 comprises Climax 1500 Antisieze (3100) available from Halliburton Energy Services in Houston, Tex. in order to optimally provide lubrication to faciliate the extrusion process.

The overshot connection 755 is coupled to the support member 745 and the support member 760. The overshot connection 755 preferably permits the support member 745 to be removably coupled to the support member 760. The overshot connection 756 may comprise any number of conventional commercially available overshot connections such as, for example, Innerstring Sealing Adapter, Innerstring Flat-Face Sealing Adapter or EZ Drill Setting Tool Stinger. In a preferred embodiment, the overshot connection 755 comprises a Innerstring Adapter with an Upper Guide available from Halliburton Energy Services in Dallas, Tex.

The support member 760 is preferably coupled to the overshot connection 755 and a surface support structure (not illustrated). The support member 760 preferably comprises an annular member having sufficient strength to carry the apparatus 700 into a new section of a wellbore. The support member 760 may comprise any number of conventional commercially available support members such as, for example, steel drill pipe, coiled tubing or other high strength tubulars modified in accordance with the teachings of the present disclosure. In a preferred embodiment, the support member 760 comprises a conventional drill pipe available from steel mills in the United States.

The stabilizer 765 is preferably coupled to the support member 760. The stabilizer 765 also preferably stabilizes the components of the apparatus 700 within the tubular member 715. The stabilizer 765 preferably comprises a spherical member having an outside diameter that is about 80 to 99% of the interior diameter of the tubular member 715 in order to optimally minimize buckling of the tubular member 715. The stabilizer 765 may comprise any number of conventional commercially available stabilizers such as, for example, EZ Drill Star Guides, packer shoes or drag blocks modified in accordance with the teachings of the present disclosure. In a preferred embodiment, the stabilizer 765 comprises a sealing adapter upper guide available from Halliburton Energy Services in Dallas, Tex.

In a preferred embodiment, the support members 745 and 760 are thoroughly cleaned prior to assembly to the remaining portions of the apparatus 700. In this manner, the introduction of foreign material into the apparatus 700 is minimized. This minimizes the possibility of foreign material clogging the various flow passages and valves of the apparatus 700.

In a preferred embodiment, before or after positioning the apparatus 700 within a new section of a wellbore, a couple of wellbore volumes are circulated through the various flow passages of the apparatus 700 in order to ensure that no foreign materials are located within the wellbore that might clog up the various flow passages and valves of the apparatus 700 and to ensure that no foreign material interferes with the expansion mandrel 705 during the expansion process.

In a preferred embodiment, the apparatus 700 is operated substantially as described above with reference to FIGS. 1–7 to form a new section of casing within a wellbore.

Figure 8:
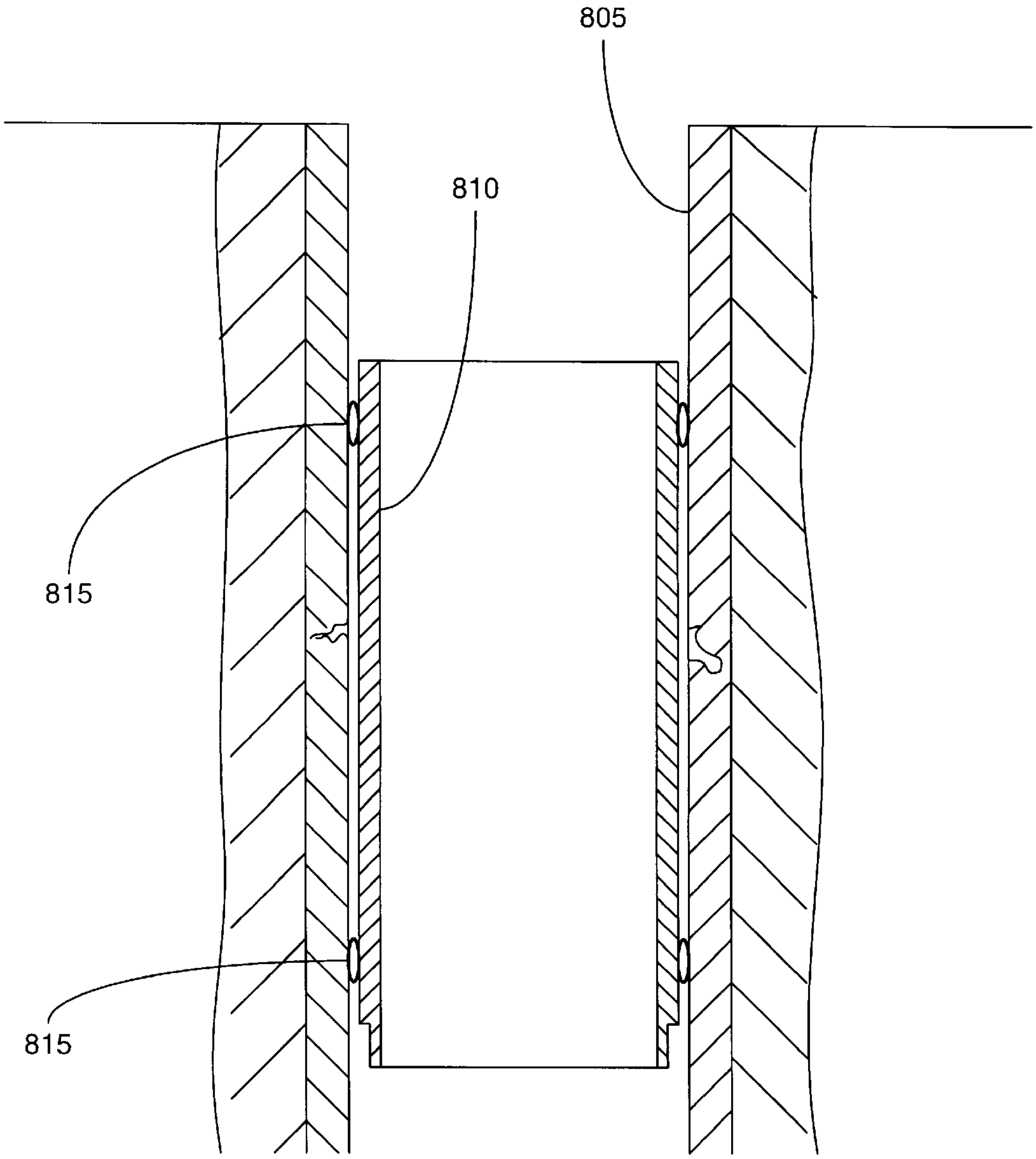
FIG. 8 is a fragmentary cross-sectional illustration of the placement of an expanded tubular member within another tubular member.

As illustrated in FIG. 8, in an alternative preferred embodiment, the method and apparatus described herein is used to repair an existing wellbore casing 805 by forming a tubular liner 810 inside of the existing wellbore casing 805. In a preferred embodiment, an outer annular lining of cement is not provided in the repaired section. In the alternative preferred embodiment, any number of fluidic materials can be used to expand the tubular liner 810 into intimate contact with the damaged section of the wellbore casing such as, for example, cement, epoxy, slag mix, or drilling mud. In the alternative preferred embodiment, sealing members 815 are preferably provided at both ends of the tubular member in order to optimally provide a fluidic seal. In an alternative preferred embodiment, the tubular liner 810 is formed within a horizontally positioned pipeline section, such as those used to transport hydrocarbons or water, with the tubular liner 810 placed in an overlapping relationship with the adjacent pipeline section. In this manner, underground pipelines can be repaired without having to dig out and replace the damaged sections.

In another alternative preferred embodiment, the method and apparatus described herein is used to directly line a wellbore with a tubular liner 810. In a preferred embodiment, an outer annular lining of cement is not provided between the tubular liner 810 and the wellbore. In the alternative preferred embodiment, any number of fluidic materials can be used to expand the tubular liner 810 into intimate contact with the wellbore such as, for example, cement, epoxy, slag mix, or drilling mud.

Figure 9:
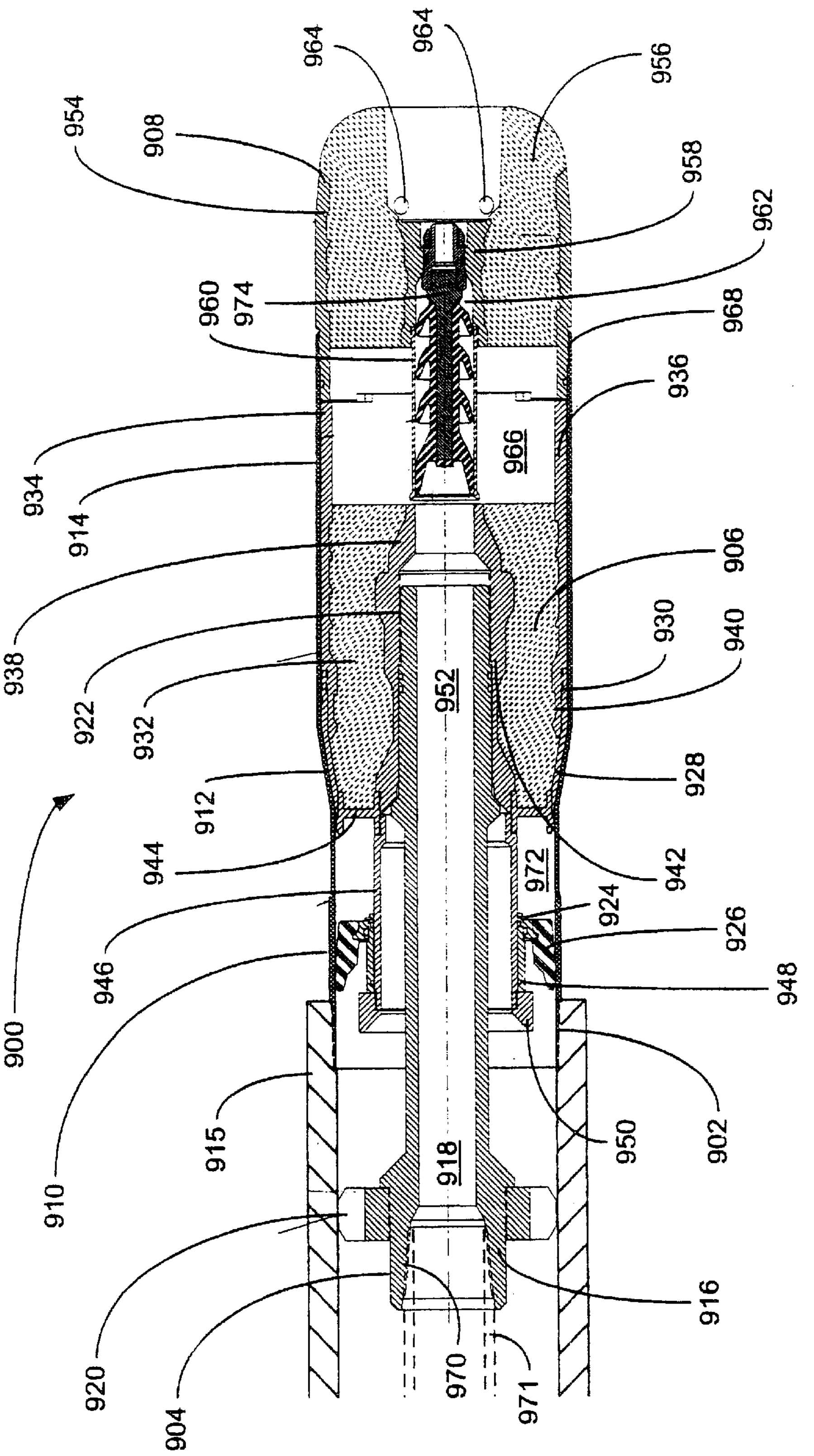
FIG. 9 is a cross-sectional illustration of a preferred embodiment of an apparatus for forming a casing including a drillable mandrel and shoe.
Figure 9A:
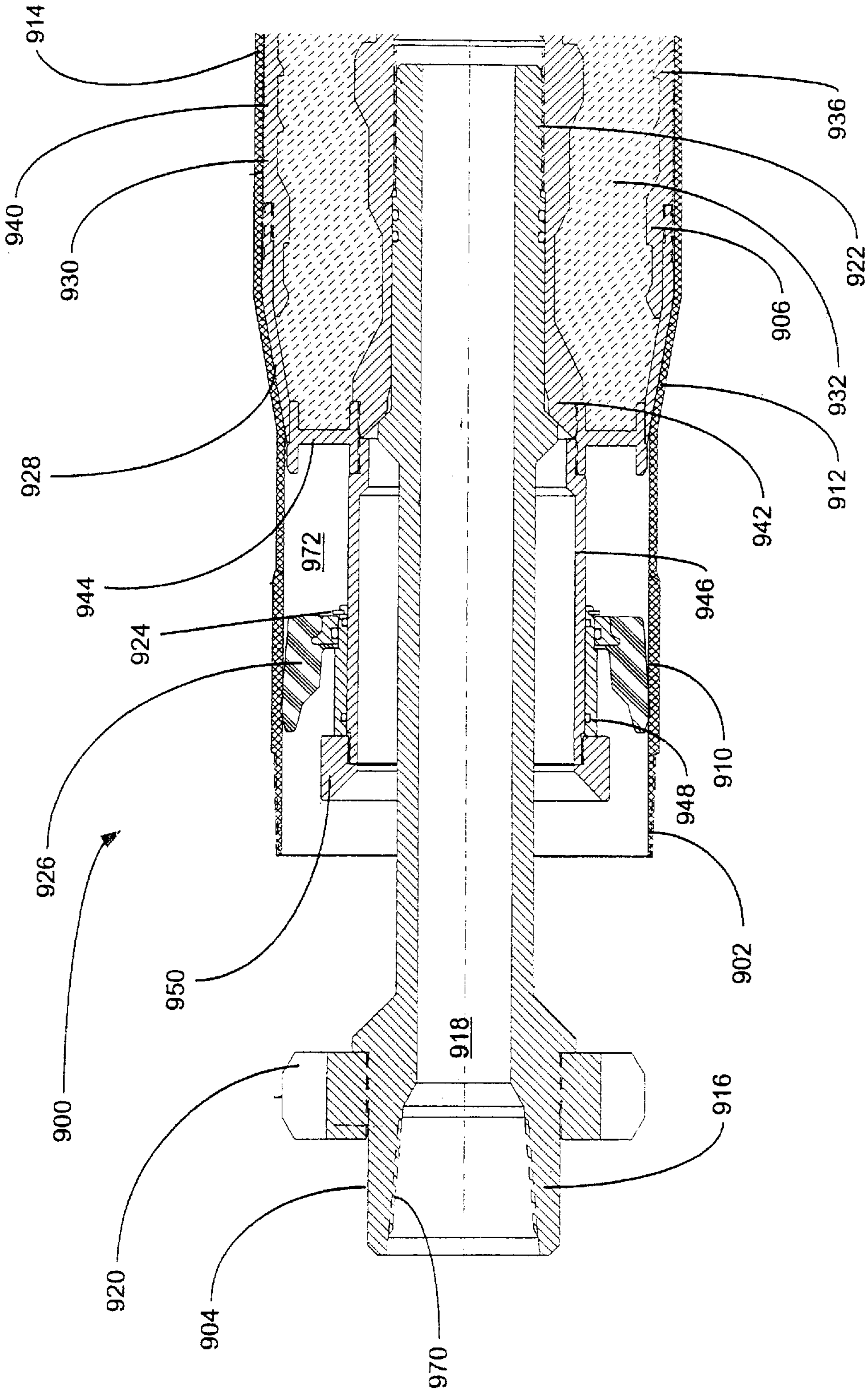
FIG. 9*a* is another cross-sectional illustration of the apparatus of FIG. 9.
Figure 9B:
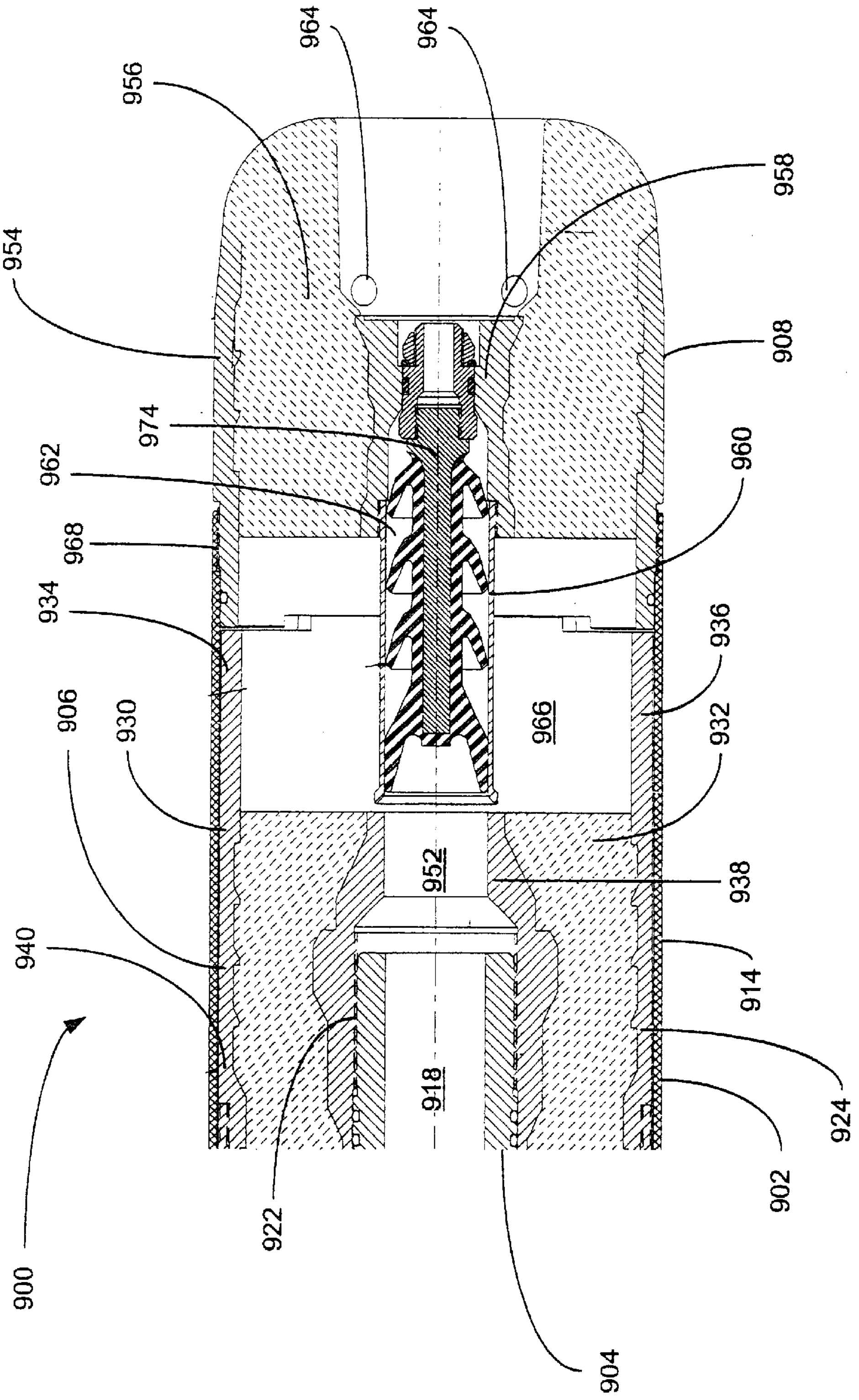
FIG. 9*b* is another cross-sectional illustration of the apparatus of FIG. 9.

Referring now to FIGS. 9, **9*a*, 9*b* and 9*c*, a preferred embodiment of an apparatus 900 for forming a wellbore casing includes an expandible tubular member 902, a support member 904, an expandible mandrel or pig 906, and a shoe 908. In a preferred embodiment, the design and construction of the mandrel 906 and shoe 908 permits easy removal of those elements by drilling them out. In this manner, the assembly 900** can be easily removed from a wellbore using a conventional drilling apparatus and corresponding drilling methods.

The expandible tubular member 902 preferably includes an upper portion 910, an intermediate portion 912 and a lower portion 914. During operation of the apparatus 900, the tubular member 902 is preferably extruded off of the mandrel 906 by pressurizing an interior region 966 of the tubular member 902. The tubular member 902 preferably has a substantially annular cross-section.

In a particularly preferred embodiment, an expandable tubular member 915 is coupled to the upper portion 910 of the expandable tubular member 902. During operation of the apparatus 900, the tubular member 915 is preferably extruded off of the mandrel 906 by pressurizing the interior region 966 of the tubular member 902. The tubular member 915 preferably has a substantially annular cross-section. In a preferred embodiment, the wall thickness of the tubular member 915 is greater than the wall thickness of the tubular member 902.

The tubular member 915 may be fabricated from any number of conventional commercially available materials such as, for example, oilfield tubulars, low alloy steels, titanium or stainless steels. In a preferred embodiment, the tubular member 915 is fabricated from oilfield tubulars in order to optimally provide approximately the same mechanical properties as the tubular member 902. In a particularly preferred embodiment, the tubular member 915 has a plastic yield point ranging from about 400,000 to 135,000 psi in order to optimally provide approximately the same yield properties as the tubular member 902. The tubular member 915 may comprise a plurality of tubular members coupled end to end.

In a preferred embodiment, the upper end portion of the tubular member 915 includes one or more sealing members for optimally providing a fluidic and/or gaseous seal with an existing section of wellbore casing.

In a preferred embodiment, the combined length of the tubular members 902 and 915 are limited to minimize the possibility of buckling. For typical tubular member materials, the combined length of the tubular members 902 and 915 are limited to between about 40 to 20,000 feet in length.

The lower portion 914 of the tubular member 902 is preferably coupled to the shoe 908 by a threaded connection 968. The intermediate portion 912 of the tubular member 902 preferably is placed in intimate sliding contact with the mandrel 906.

The tubular member 902 may be fabricated from any number of conventional commercially available materials such as, for example, oilfield tubulars, low alloy steels, titanium or stainless steels. In a preferred embodiment, the tubular member 902 is fabricated from oilfield tubulars in order to optimally provide approximately the same mechanical properties as the tubular member 915. In a particularly preferred embodiment, the tubular member 902 has a plastic yield point ranging from about 400,000 to 135,000 psi in order to optimally provide approximately the same yield properties as the tubular member 915.

The wall thickness of the upper, intermediate, and lower portions, 910, 912 and 914 of the tubular member 902 may range, for example, from about 1/16 to 1.5 inches. In a preferred embodiment, the wall thickness of the upper, intermediate, and lower portions, 910, 912 and 914 of the tubular member 902 range from about 1/8 to 1.25 in order to optimally provide wall thickness that are about the same as the tubular member 915. In a preferred embodiment, the wall thickness of the lower portion 914 is less than or equal to the wall thickness of the upper portion 910 in order to optimally provide a geometry that will fit into tight clearances downhole.

The outer diameter of the upper, intermediate, and lower portions, 910, 912 and 914 of the tubular member 902 may range, for example, from about 1.05 to 48 inches. In a preferred embodiment, the outer diameter of the upper, intermediate, and lower portions, 910, 912 and 914 of the tubular member 902 range from about 3½ to 19 inches in order to optimally provide the ability to expand the most commonly used oilfield tubulars.

The length of the tubular member 902 is preferably limited to between about 2 to 5 feet in order to optimally provide enough length to contain the mandrel 906 and a body of lubricant.

The tubular member 902 may comprise any number of conventional commercially available tubular members modified in accordance with the teachings of the present disclosure. In a preferred embodiment, the tubular member 902 comprises Oilfield Country Tubular Goods available from various U.S. steel mills. The tubular member 915 may comprise any number of conventional commercially available tubular members modified in accordance with the teachings of the present disclosure. In a preferred embodiment, the tubular member 915 comprises Oilfield Country Tubular Goods available from various U.S. steel mills.

The various elements of the tubular member 902 may be coupled using any number of conventional process such as, for example, threaded connections, welding or machined from one piece. In a preferred embodiment, the various elements of the tubular member 902 are coupled using welding. The tubular member 902 may comprise a plurality of tubular elements that are coupled end to end. The various elements of the tubular member 915 may be coupled using any number of conventional process such as, for example, threaded connections, welding or machined from one piece. In a preferred embodiment, the various elements of the tubular member 915 are coupled using welding. The tubular member 915 may comprise a plurality of tubular elements that are coupled end to end. The tubular members 902 and 915 may be coupled using any number of conventional process such as, for example, threaded connections, welding or machined from one piece.

The support member 904 preferably includes an innerstring adapter 916, a fluid passage 918, an upper guide 920, and a coupling 922. During operation of the apparatus 900, the support member 904 preferably supports the apparatus 900 during movement of the apparatus 900 within a wellbore. The support member 904 preferably has a substantially annular cross-section.

The support member 904 may be fabricated from any number of conventional commercially available materials such as, for example, oilfield tubulars, low alloy steel, coiled tubing or stainless steel. In a preferred embodiment, the support member 904 is fabricated from low alloy steel in order to optimally provide high yield strength.

The innerstring adaptor 916 preferably is coupled to and supported by a conventional drill string support from a surface location. The innerstring adaptor 916 may be coupled to a conventional drill string support 971 by a threaded connection 970.

The fluid passage 918 is preferably used to convey fluids and other materials to and from the apparatus 900. In a preferred embodiment, the fluid passage 918 is fluidicly coupled to the fluid passage 952. In a preferred embodiment, the fluid passage 918 is used to convey hardenable fluidic sealing materials to and from the apparatus 900. In a particularly preferred embodiment, the fluid passage 918 may include one or more pressure relief passages (not illustrated) to release fluid pressure during positioning of the apparatus 900 within a wellbore. In a preferred embodiment, the fluid passage 918 is positioned along a longitudinal centerline of the apparatus 900. In a preferred embodiment, the fluid passage 918 is selected to permit the conveyance of hardenable fluidic materials at operating pressures ranging from about 0 to 9,000 psi.

The upper guide 920 is coupled to an upper portion of the support member 904. The upper guide 920 preferably is adapted to center the support member 904 within the tubular member 915. The upper guide 920 may comprise any number of conventional guide members modified in accordance with the teachings of the present disclosure. In a preferred embodiment, the upper guide 920 comprises an innerstring adapter available from Halliburton Energy Services in Dallas, Tex. order to optimally guide the apparatus 900 within the tubular member 915.

The coupling 922 couples the support member 904 to the mandrel 906. The coupling 922 preferably comprises a conventional threaded connection.

The various elements of the support member 904 may be coupled using any number of conventional processes such as, for example, welding, threaded connections or machined from one piece. In a preferred embodiment, the various elements of the support member 904 are coupled using threaded connections.

The mandrel 906 preferably includes a retainer 924, a rubber cup 926, an expansion cone 928, a lower cone retainer 930, a body of cement 932, a lower guide 934, an extension sleeve 936, a spacer 938, a housing 940, a sealing sleeve 942, an upper cone retainer 944, a lubricator mandrel 946, a lubricator sleeve 948, a guide 950, and a fluid passage 952.

The retainer 924 is coupled to the lubricator mandrel 946, lubricator sleeve 948, and the rubber cup 926. The retainer 924 couples the rubber cup 926 to the lubricator sleeve 948. The retainer 924 preferably has a substantially annular cross-section. The retainer 924 may comprise any number of conventional commercially available retainers such as, for example, slotted spring pins or roll pin.

The rubber cup 926 is coupled to the retainer 924, the lubricator mandrel 946, and the lubricator sleeve 948. The rubber cup 926 prevents the entry of foreign materials into the interior region 972 of the tubular member 902 below the rubber cup 926. The rubber cup 926 may comprise any number of conventional commercially available rubber cups such as, for example, TP cups or Selective Injection Packer (SIP) cup. In a preferred embodiment, the rubber cup 926 comprises a SIP cup available from Halliburton Energy Services in Dallas, Tex. in order to optimally block foreign materials.

In a particularly preferred embodiment, a body of lubricant is further provided in the interior region 972 of the tubular member 902 in order to lubricate the interface between the exterior surface of the mandrel 902 and the interior surface of the tubular members 902 and 915. The lubricant may comprise any number of conventional commercially available lubricants such as, for example, Lubriplate, chlorine based lubricants, oil based lubricants or Climax 1500 Antiseize (3100). In a preferred embodiment, the lubricant comprises Climax 1500 Antiseize (3100) available from Climax Lubricants and Equipment Co. in Houston, Tex. in order to optimally provide lubrication to faciliate the extrusion process.

The expansion cone 928 is coupled to the lower cone retainer 930, the body of cement 932, the lower guide 934, the extension sleeve 936, the housing 940, and the upper cone retainer 944. In a preferred embodiment, during operation of the apparatus 900, the tubular members 902 and 915 are extruded off of the outer surface of the expansion cone 928. In a preferred embodiment, axial movement of the expansion cone 928 is prevented by the lower cone retainer 930, housing 940 and the upper cone retainer 944. Inner radial movement of the expansion cone 928 is prevented by the body of cement 932, the housing 940, and the upper cone retainer 944.

The expansion cone 928 preferably has a substantially annular cross section. The outside diameter of the expansion cone 928 is preferably tapered to provide a cone shape. The wall thickness of the expansion cone 928 may range, for example, from about 0.125 to 3 inches. In a preferred embodiment, the wall thickness of the expansion cone 928 ranges from about 0.25 to 0.75 inches in order to optimally provide adequate compressive strength with minimal material. The maximum and minimum outside diameters of the expansion cone 928 may range, for example, from about 1 to 47 inches. In a preferred embodiment, the maximum and minimum outside diameters of the expansion cone 928 range from about 3.5 to 19 in order to optimally provide expansion of generally available oilfield tubulars.

The expansion cone 928 may be fabricated from any number of conventional commercially available materials such as, for example, ceramic, tool steel, titanium or low alloy steel. In a preferred embodiment, the expansion cone 928 is fabricated from tool steel in order to optimally provide high strength and abrasion resistance. The surface hardness of the outer surface of the expansion cone 928 may range, for example, from about 50 Rockwell C to 70 Rockwell C. In a preferred embodiment, the surface hardness of the outer surface of the expansion cone 928 ranges from about 58 Rockwell C to 62 Rockwell C in order to optimally provide high yield strength. In a preferred embodiment, the expansion cone 928 is heat treated to optimally provide a hard outer surface and a resilient interior body in order to optimally provide abrasion resistance and fracture toughness.

The lower cone retainer 930 is coupled to the expansion cone 928 and the housing 940. In a preferred embodiment, axial movement of the expansion cone 928 is prevented by the lower cone retainer 930. Preferably, the lower cone retainer 930 has a substantially annular cross-section.

The lower cone retainer 930 may be fabricated from any number of conventional commercially available materials such as, for example, ceramic, tool steel, titanium or low alloy steel. In a preferred embodiment, the lower cone retainer 930 is fabricated from tool steel in order to optimally provide high strength and abrasion resistance. The surface hardness of the outer surface of the lower cone retainer 930 may range, for example, from about 50 Rockwell C to 70 Rockwell C. In a preferred embodiment, the surface hardness of the outer surface of the lower cone retainer 930 ranges from about 58 Rockwell C to 62 Rockwell C in order to optimally provide high yield strength. In a preferred embodiment, the lower cone retainer 930 is heat treated to optimally provide a hard outer surface and a resilient interior body in order to optimally provide abrasion resistance and fracture toughness.

In a preferred embodiment, the lower cone retainer 930 and the expansion cone 928 are formed as an integral one-piece element in order reduce the number of components and increase the overall strength of the apparatus. The outer surface of the lower cone retainer 930 preferably mates with the inner surfaces of the tubular members 902 and 915.

The body of cement 932 is positioned within the interior of the mandrel 906. The body of cement 932 provides an inner bearing structure for the mandrel 906. The body of cement 932 further may be easily drilled out using a conventional drill device. In this manner, the mandrel 906 may be easily removed using a conventional drilling device.

The body of cement 932 may comprise any number of conventional commercially available cement compounds. Alternatively, aluminum, cast iron or some other drillable metallic, composite, or aggregate material may be substituted for cement. The body of cement 932 preferably has a substantially annular cross-section.

The lower guide 934 is coupled to the extension sleeve 936 and housing 940. During operation of the apparatus 900, the lower guide 934 preferably helps guide the movement of the mandrel 906 within the tubular member 902. The lower guide 934 preferably has a substantially annular cross-section.

The lower guide 934 may be fabricated from any number of conventional commercially available materials such as, for example, oilfield tubulars, low alloy steel or stainless steel. In a preferred embodiment, the lower guide 934 is fabricated from low alloy steel in order to optimally provide high yield strength. The outer surface of the lower guide 934 preferably mates with the inner surface of the tubular member 902 to provide a sliding fit.

The extension sleeve 936 is coupled to the lower guide 934 and the housing 940. During operation of the apparatus 900, the extension sleeve 936 preferably helps guide the movement of the mandrel 906 within the tubular member 902. The extension sleeve 936 preferably has a substantially annular cross-section.

The extension sleeve 936 may be fabricated from any number of conventional commercially available materials such as, for example, oilfield tubulars, low alloy steel or stainless steel. In a preferred embodiment, the extension sleeve 936 is fabricated from low alloy steel in order to optimally provide high yield strength. The outer surface of the extension sleeve 936 preferably mates with the inner surface of the tubular member 902 to provide a sliding fit. In a preferred embodiment, the extension sleeve 936 and the lower guide 934 are formed as an integral one-piece element in order to minimize the number of components and increase the strength of the apparatus.

The spacer 938 is coupled to the sealing sleeve 942. The spacer 938 preferably includes the fluid passage 952 and is adapted to mate with the extension tube 960 of the shoe 908. In this manner, a plug or dart can be conveyed from the surface through the fluid passages 918 and 952 into the fluid passage 962. Preferably, the spacer 938 has a substantially annular cross-section.

The spacer 938 may be fabricated from any number of conventional commercially available materials such as, for example, steel, aluminum or cast iron. In a preferred embodiment, the spacer 938 is fabricated from aluminum in order to optimally provide drillability. The end of the spacer 938 preferably mates with the end of the extension tube 960. In a preferred embodiment, the spacer 938 and the sealing sleeve 942 are formed as an integral one-piece element in order to reduce the number of components and increase the strength of the apparatus.

The housing 940 is coupled to the lower guide 934, extension sleeve 936, expansion cone 928, body of cement 932, and lower cone retainer 930. During operation of the apparatus 900, the housing 940 preferably prevents inner radial motion of the expansion cone 928. Preferably, the housing 940 has a substantially annular cross-section.

The housing 940 may be fabricated from any number of conventional commercially available materials such as, for example, oilfield tubulars, low alloy steel or stainless steel. In a preferred embodiment, the housing 940 is fabricated from low alloy steel in order to optimally provide high yield strength. In a preferred embodiment, the lower guide 934, extension sleeve 936 and housing 940 are formed as an integral one-piece element in order to minimize the number of components and increase the strength of the apparatus.

In a particularly preferred embodiment, the interior surface of the housing 940 includes one or more protrusions to faciliate the connection between the housing 940 and the body of cement 932.

The sealing sleeve 942 is coupled to the support member 904, the body of cement 932, the spacer 938, and the upper cone retainer 944. During operation of the apparatus, the sealing sleeve 942 preferably provides support for the mandrel 906. The sealing sleeve 942 is preferably coupled to the support member 904 using the coupling 922. Preferably, the sealing sleeve 942 has a substantially annular cross-section.

The sealing sleeve 942 may be fabricated from any number of conventional commercially available materials such as, for example, steel, aluminum or cast iron. In a preferred embodiment, the sealing sleeve 942 is fabricated from aluminum in order to optimally provide drillability of the sealing sleeve 942.

In a particularly preferred embodiment, the outer surface of the sealing sleeve 942 includes one or more protrusions to faciliate the connection between the sealing sleeve 942 and the body of cement 932.

In a particularly preferred embodiment, the spacer 938 and the sealing sleeve 942 are integrally formed as a one-piece element in order to minimize the number of components.

The upper cone retainer 944 is coupled to the expansion cone 928, the sealing sleeve 942, and the body of cement 932. During operation of the apparatus 900, the upper cone retainer 944 preferably prevents axial motion of the expansion cone 928. Preferably, the upper cone retainer 944 has a substantially annular cross-section.

The upper cone retainer 944 may be fabricated from any number of conventional commercially available materials such as, for example, steel, aluminum or cast iron. In a preferred embodiment, the upper cone retainer 944 is fabricated from aluminum in order to optimally provide drillability of the upper cone retainer 944.

In a particularly preferred embodiment, the upper cone retainer 944 has a cross-sectional shape designed to provide increased rigidity. In a particularly preferred embodiment, the upper cone retainer 944 has a cross-sectional shape that is substantially I-shaped to provide increased rigidity and minimize the amount of material that would have to be drilled out.

The lubricator mandrel 946 is coupled to the retainer 924, the rubber cup 926, the upper cone retainer 944, the lubricator sleeve 948, and the guide 950. During operation of the apparatus 900, the lubricator mandrel 946 preferably contains the body of lubricant in the annular region 972 for lubricating the interface between the mandrel 906 and the tubular member 902. Preferably, the lubricator mandrel 946 has a substantially annular cross-section.

The lubricator mandrel 946 may be fabricated from any number of conventional commercially available materials such as, for example, steel, aluminum or cast iron. In a preferred embodiment, the lubricator mandrel 946 is fabricated from aluminum in order to optimally provide drillability of the lubricator mandrel 946.

The lubricator sleeve 948 is coupled to the lubricator mandrel 946, the retainer 924, the rubber cup 926, the upper cone retainer 944, the lubricator sleeve 948, and the guide 950. During operation of the apparatus 900, the lubricator sleeve 948 preferably supports the rubber cup 926. Preferably, the lubricator sleeve 948 has a substantially annular cross-section.

The lubricator sleeve 948 may be fabricated from any number of conventional commercially available materials such as, for example, steel, aluminum or cast iron. In a preferred embodiment, the lubricator sleeve 948 is fabricated from aluminum in order to optimally provide drillability of the lubricator sleeve 948.

Figure 9C:
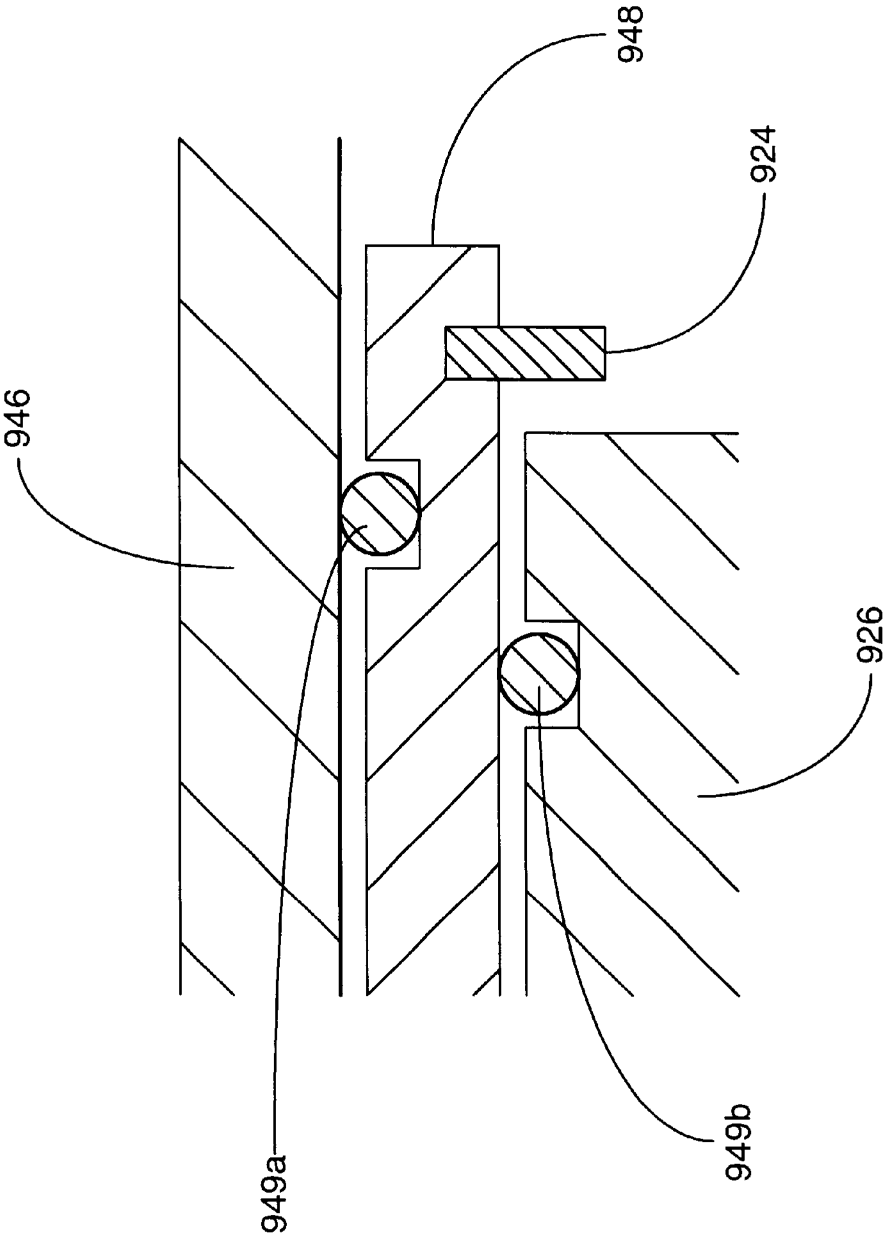
FIG. 9*c* is another cross-sectional illustration of the apparatus of FIG. 9.

As illustrated in FIG. 9*c*, the lubricator sleeve 948 is supported by the lubricator mandrel 946. The lubricator sleeve 948 in turn supports the rubber cup 926. The retainer 924 couples the rubber cup 926 to the lubricator sleeve 948. In a preferred embodiment, seals 949*a* and 949*b* are provided between the lubricator mandrel 946, lubricator sleeve 948, and rubber cup 926 in order to optimally seal off the interior region 972 of the tubular member 902.

The guide 950 is coupled to the lubricator mandrel 946, the retainer 924, and the lubricator sleeve 948. During operation of the apparatus 900, the guide 950 preferably guides the apparatus on the support member 904. Preferably, the guide 950 has a substantially annular cross-section.

The guide 950 may be fabricated from any number of conventional commercially available materials such as, for example, steel, aluminum or cast iron. In a preferred embodiment, the guide 950 is fabricated from aluminum order to optimally provide drillability of the guide 950.

The fluid passage 952 is coupled to the mandrel 906. During operation of the apparatus, the fluid passage 952 preferably conveys hardenable fluidic materials. In a preferred embodiment, the fluid passage 952 is positioned about the centerline of the apparatus 900. In a particularly preferred embodiment, the fluid passage 952 is adapted to convey hardenable fluidic materials at pressures and flow rate ranging from about 0 to 9,000 psi and 0 to 3,000 gallons/min in order to optimally provide pressures and flow rates to displace and circulate fluids during the installation of the apparatus 900.

The various elements of the mandrel 906 may be coupled using any number of conventional process such as, for example, threaded connections, welded connections or cementing. In a preferred embodiment, the various elements of the mandrel 906 are coupled using threaded connections and cementing.

The shoe 908 preferably includes a housing 954, a body of cement 956, a sealing sleeve 958, an extension tube 960, a fluid passage 962, and one or more outlet jets 964.

The housing 954 is coupled to the body of cement 956 and the lower portion 914 of the tubular member 902. During operation of the apparatus 900, the housing 954 preferably couples the lower portion of the tubular member 902 to the shoe 908 to facilitate the extrusion and positioning of the tubular member 902. Preferably, the housing 954 has a substantially annular cross-section.

The housing 954 may be fabricated from any number of conventional commercially available materials such as, for example, steel or aluminum. In a preferred embodiment, the housing 954 is fabricated from aluminum in order to optimally provide drillability of the housing 954.

In a particularly preferred embodiment, the interior surface of the housing 954 includes one or more protrusions to faciliate the connection between the body of cement 956 and the housing 954.

The body of cement 956 is coupled to the housing 954, and the sealing sleeve 958. In a preferred embodiment, the composition of the body of cement 956 is selected to permit the body of cement to be easily drilled out using conventional drilling machines and processes.

The composition of the body of cement 956 may include any number of conventional cement compositions. In an alternative embodiment, a drillable material such as, for example, aluminum or iron may be substituted for the body of cement 956.

The sealing sleeve 958 is coupled to the body of cement 956, the extension tube 960, the fluid passage 962, and one or more outlet jets 964. During operation of the apparatus 900, the sealing sleeve 958 preferably is adapted to convey a hardenable fluidic material from the fluid passage 952 into the fluid passage 962 and then into the outlet jets 964 in order to inject the hardenable fluidic material into an annular region external to the tubular member 902. In a preferred embodiment, during operation of the apparatus 900, the sealing sleeve 958 further includes an inlet geometry that permits a conventional plug or dart 974 to become lodged in the inlet of the sealing sleeve 958. In this manner, the fluid passage 962 may be blocked thereby fluidicly isolating the interior region 966 of the tubular member 902.

In a preferred embodiment, the sealing sleeve 958 has a substantially annular cross-section. The sealing sleeve 958 may be fabricated from any number of conventional commercially available materials such as, for example, steel, aluminum or cast iron. In a preferred embodiment, the sealing sleeve 958 is fabricated from aluminum in order to optimally provide drillability of the sealing sleeve 958.

The extension tube 960 is coupled to the sealing sleeve 958, the fluid passage 962, and one or more outlet jets 964. During operation of the apparatus 900, the extension tube 960 preferably is adapted to convey a hardenable fluidic material from the fluid passage 952 into the fluid passage 962 and then into the outlet jets 964 in order to inject the hardenable fluidic material into an annular region external to the tubular member 902. In a preferred embodiment, during operation of the apparatus 900, the sealing sleeve 960 further includes an inlet geometry that permits a conventional plug or dart 974 to become lodged in the inlet of the sealing sleeve 958. In this manner, the fluid passage 962 is blocked thereby fluidicly isolating the interior region 966 of the tubular member 902. In a preferred embodiment, one end of the extension tube 960 mates with one end of the spacer 938 in order to optimally faciliate the transfer of material between the two.

In a preferred embodiment, the extension tube 960 has a substantially annular cross-section. The extension tube 960 may be fabricated from any number of conventional commercially available materials such as, for example, steel, aluminum or cast iron. In a preferred embodiment, the extension tube 960 is fabricated from aluminum in order to optimally provide drillability of the extension tube 960.

The fluid passage 962 is coupled to the sealing sleeve 958, the extension tube 960, and one or more outlet jets 964. During operation of the apparatus 900, the fluid passage 962 is preferably conveys hardenable fluidic materials. In a preferred embodiment, the fluid passage 962 is positioned about the centerline of the apparatus 900. In a particularly preferred embodiment, the fluid passage 962 is adapted to convey hardenable fluidic materials at pressures and flow rate ranging from about 0 to 9,000 psi and 0 to 3,000 gallons/min in order to optimally provide fluids at operationally efficient rates.

The outlet jets 964 are coupled to the sealing sleeve 958, the extension tube 960, and the fluid passage 962. During operation of the apparatus 900, the outlet jets 964 preferably convey hardenable fluidic material from the fluid passage 962 to the region exterior of the apparatus 900. In a preferred embodiment, the shoe 908 includes a plurality of outlet jets 964.

In a preferred embodiment, the outlet jets 964 comprise passages drilled in the housing 954 and the body of cement 956 in order to simplify the construction of the apparatus 900.

The various elements of the shoe 908 may be coupled using any number of conventional process such as, for example, threaded connections, cement or machined from one piece of material. In a preferred embodiment, the various elements of the shoe 908 are coupled using cement.

In a preferred embodiment, the assembly 900 is operated substantially as described above with reference to FIGS. 1–8 to create a new section of casing in a wellbore or to repair a wellbore casing or pipeline.

In particular, in order to extend a wellbore into a subterranean formation, a drill string is used in a well known manner to drill out material from the subterranean formation to form a new section.

The apparatus 900 for forming a wellbore casing in a subterranean formation is then positioned in the new section of the wellbore. In a particularly preferred embodiment, the apparatus 900 includes the tubular member 915. In a preferred embodiment, a hardenable fluidic sealing hardenable fluidic sealing material is then pumped from a surface location into the fluid passage 918. The hardenable fluidic sealing material then passes from the fluid passage 918 into the interior region 966 of the tubular member 902 below the mandrel 906. The hardenable fluidic sealing material then passes from the interior region 966 into the fluid passage 962. The hardenable fluidic sealing material then exits the apparatus 900 via the outlet jets 964 and fills an annular region between the exterior of the tubular member 902 and the interior wall of the new section of the wellbore. Continued pumping of the hardenable fluidic sealing material causes the material to fill up at least a portion of the annular region.

The hardenable fluidic sealing material is preferably pumped into the annular region at pressures and flow rates ranging, for example, from about 0 to 5,000 psi and 0 to 1,500 gallons/min, respectively. In a preferred embodiment, the hardenable fluidic sealing material is pumped into the annular region at pressures and flow rates that are designed for the specific wellbore section in order to optimize the displacement of the hardenable fluidic sealing material while not creating high enough circulating pressures such that circulation might be lost and that could cause the wellbore to collapse. The optimum pressures and flow rates are preferably determined using conventional empirical methods.

The hardenable fluidic sealing material may comprise any number of conventional commercially available hardenable fluidic sealing materials such as, for example, slag mix, cement or epoxy. In a preferred embodiment, the hardenable fluidic sealing material comprises blended cements designed specifically for the well section being lined available from Halliburton Energy Services in Dallas, Tex. in order to optimally provide support for the new tubular member while also maintaining optimal flow characteristics so as to minimize operational difficulties during the displacement of the cement in the annular region. The optimum composition of the blended cements is preferably determined using conventional empirical methods.

The annular region preferably is filled with the hardenable fluidic sealing material in sufficient quantities to ensure that, upon radial expansion of the tubular member 902, the annular region of the new section of the wellbore will be filled with hardenable material.

Once the annular region has been adequately filled with hardenable fluidic sealing material, a plug or dart 974, or other similar device, preferably is introduced into the fluid passage 962 thereby fluidicly isolating the interior region 966 of the tubular member 902 from the external annular region. In a preferred embodiment, a non hardenable fluidic material is then pumped into the interior region 966 causing the interior region 966 to pressurize. In a particularly preferred embodiment, the plug or dart 974, or other similar device, preferably is introduced into the fluid passage 962 by introducing the plug or dart 974, or other similar device into the non hardenable fluidic material. In this manner, the amount of cured material within the interior of the tubular members 902 and 915 is minimized.

Once the interior region 966 becomes sufficiently pressurized, the tubular members 902 and 915 are extruded off of the mandrel 906. The mandrel 906 may be fixed or it may be expandible. During the extrusion process, the mandrel 906 is raised out of the expanded portions of the tubular members 902 and 915 using the support member 904. During this extrusion process, the shoe 908 is preferably substantially stationary.

The plug or dart 974 is preferably placed into the fluid passage 962 by introducing the plug or dart 974 into the fluid passage 918 at a surface location in a conventional manner. The plug or dart 974 may comprise any number of conventional commercially available devices for plugging a fluid passage such as, for example, Multiple Stage Cementer (MSC) latch-down plug, Omega latch-down plug or three-wiper latch down plug modified in accordance with the teachings of the present disclosure. In a preferred embodiment, the plug or dart 974 comprises a MSC latch-down plug available from Halliburton Energy Services in Dallas, Tex.

After placement of the plug or dart 974 in the fluid passage 962, the non hardenable fluidic material is preferably pumped into the interior region 966 at pressures and flow rates ranging from approximately 500 to 9,000 psi and 40 to 3,000 gallons/min in order to optimally extrude the tubular members 902 and 915 off of the mandrel 906.

For typical tubular members 902 and 915, the extrusion of the tubular members 902 and 915 off of the expandable mandrel will begin when the pressure of the interior region 966 reaches approximately 500 to 9,000 psi. In a preferred embodiment, the extrusion of the tubular members 902 and 915 off of the mandrel 906 begins when the pressure of the interior region 966 reaches approximately 1,200 to 8,500 psi with a flow rate of about 40 to 1250 gallons/minute.

During the extrusion process, the mandrel 906 may be raised out of the expanded portions of the tubular members 902 and 915 at rates ranging, for example, from about 0 to 5 ft/sec. In a preferred embodiment, during the extrusion process, the mandrel 906 is raised out of the expanded portions of the tubular members 902 and 915 at rates ranging from about 0 to 2 ft/sec in order to optimally provide pulling speed fast enough to permit efficient operation and permit full expansion of the tubular members 902 and 915 prior to curing of the hardenable fluidic sealing material; but not so fast that timely adjustment of operating parameters during operation is prevented.

When the upper end portion of the tubular member 915 is extruded off of the mandrel 906, the outer surface of the upper end portion of the tubular member 915 will preferably contact the interior surface of the lower end portion of the existing casing to form an fluid tight overlapping joint. The contact pressure of the overlapping joint may range, for example, from approximately 50 to 20,000 psi. In a preferred embodiment, the contact pressure of the overlapping joint between the upper end of the tubular member 915 and the existing section of wellbore casing ranges from approximately 400 to 10,000 psi in order to optimally provide contact pressure to activate the sealing members and provide optimal resistance such that the tubular member 915 and existing wellbore casing will carry typical tensile and compressive loads.

In a preferred embodiment, the operating pressure and flow rate of the non hardenable fluidic material will be controllably ramped down when the mandrel 906 reaches the upper end portion of the tubular member 915. In this manner, the sudden release of pressure caused by the complete extrusion of the tubular member 915 off of the expandable mandrel 906 can be minimized. In a preferred embodiment, the operating pressure is reduced in a substantially linear fashion from 100% to about 10% during the end of the extrusion process beginning when the mandrel 906 has completed approximately all but about the last 5 feet of the extrusion process.

In an alternative preferred embodiment, the operating pressure and/or flow rate of the hardenable fluidic sealing material and/or the non hardenable fluidic material are controlled during all phases of the operation of the apparatus 900 to minimize shock.

Alternatively, or in combination, a shock absorber is provided in the support member 904 in order to absorb the shock caused by the sudden release of pressure.

Alternatively, or in combination, a mandrel catching structure is provided above the support member 904 in order to catch or at least decelerate the mandrel 906.

Once the extrusion process is completed, the mandrel 906 is removed from the wellbore. In a preferred embodiment, either before or after the removal of the mandrel 906, the integrity of the fluidic seal of the overlapping joint between the upper portion of the tubular member 915 and the lower portion of the existing casing is tested using conventional methods. If the fluidic seal of the overlapping joint between the upper portion of the tubular member 915 and the lower portion of the existing casing is satisfactory, then the uncured portion of any of the hardenable fluidic sealing material within the expanded tubular member 915 is then removed in a conventional manner. The hardenable fluidic sealing material within the annular region between the expanded tubular member 915 and the existing casing and new section of wellbore is then allowed to cure.

Preferably any remaining cured hardenable fluidic sealing material within the interior of the expanded tubular members 902 and 915 is then removed in a conventional manner using a conventional drill string. The resulting new section of casing preferably includes the expanded tubular members 902 and 915 and an outer annular layer of cured hardenable fluidic sealing material. The bottom portion of the apparatus 900 comprising the shoe 908 may then be removed by drilling out the shoe 908 using conventional drilling methods.

In an alternative embodiment, during the extrusion process, it may be necessary to remove the entire apparatus 900 from the interior of the wellbore due to a malfunction. In this circumstance, a conventional drill string is used to drill out the interior sections of the apparatus 900 in order to facilitate the removal of the remaining sections. In a preferred embodiment, the interior elements of the apparatus 900 are fabricated from materials such as, for example, cement and aluminum, that permit a conventional drill string to be employed to drill out the interior components.

In particular, in a preferred embodiment, the composition of the interior sections of the mandrel 906 and shoe 908, including one or more of the body of cement 932, the spacer 938, the sealing sleeve 942, the upper cone retainer 944, the lubricator mandrel 946, the lubricator sleeve 948, the guide 950, the housing 954, the body of cement 956, the sealing sleeve 958, and the extension tube 960, are selected to permit at least some of these components to be drilled out using conventional drilling methods and apparatus. In this manner, in the event of a malfunction downhole, the apparatus 900 may be easily removed from the wellbore.

Figure 10A:
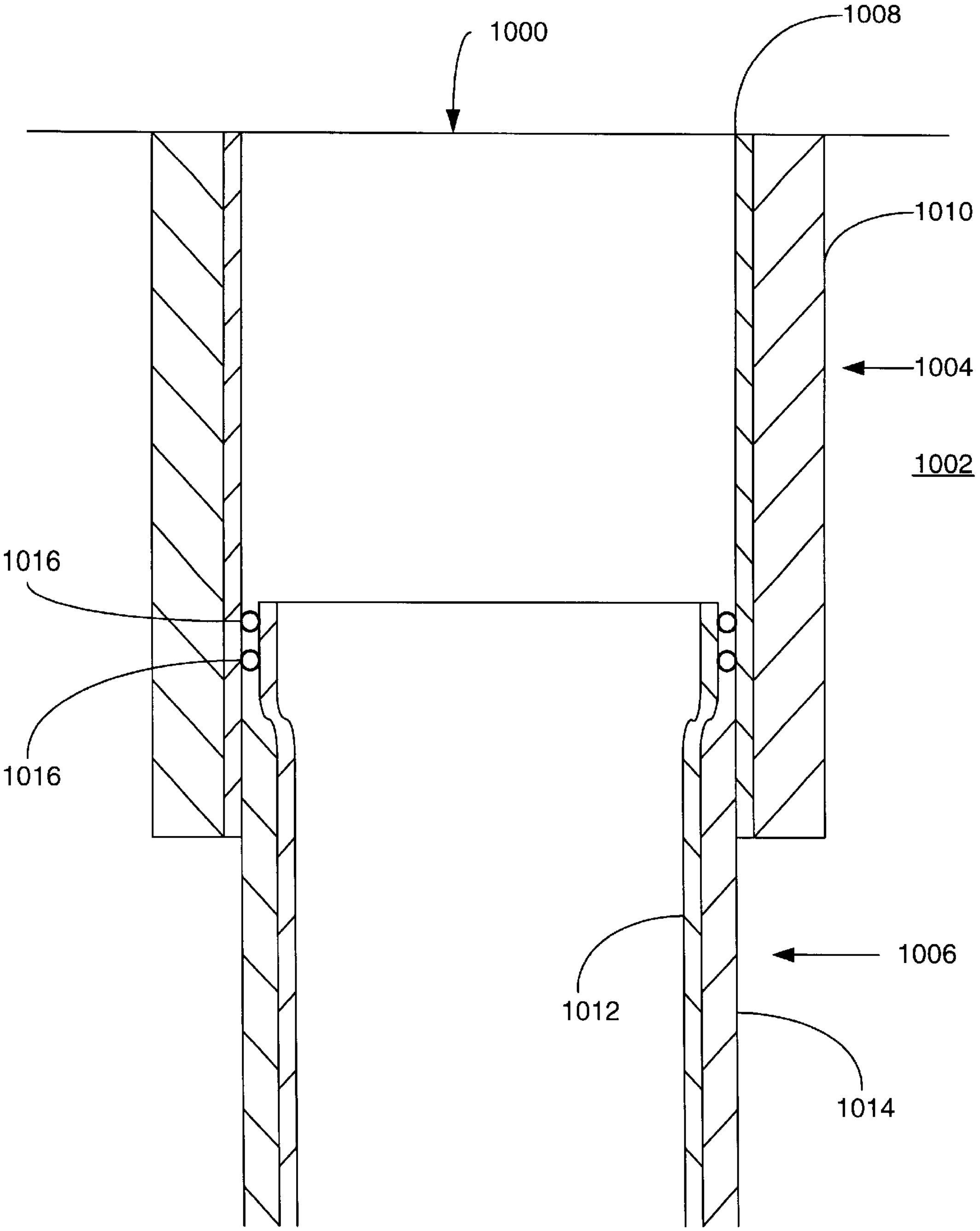
FIG. 10*a* is a cross-sectional illustration of a wellbore including a pair of adjacent overlapping casings.

Referring now to FIGS. 10*a*, 10*b*, 10*c*, 10*d*, 10*e*, 10*f*, and 10*g* a method and apparatus for creating a tie-back liner in a wellbore will now be described. As illustrated in FIG. 10*a*, a wellbore 1000 positioned in a subterranean formation 1002 includes a first casing 1004 and a second casing 1006.

The first casing 1004 preferably includes a tubular liner 1008 and a cement annulus 1010. The second casing 1006 preferably includes a tubular liner 1012 and a cement annulus 1014. In a preferred embodiment, the second casing 1006 is formed by expanding a tubular member substantially as described above with reference to FIGS. 1–9*c* or below with reference to FIGS. 11*a*–11*f*.

In a particularly preferred embodiment, an upper portion of the tubular liner 1012 overlaps with a lower portion of the tubular liner 1008. In a particularly preferred embodiment, an outer surface of the upper portion of the tubular liner 1012 includes one or more sealing members 1016 for providing a fluidic seal between the tubular liners 1008 and 1012.

Figure 10B:
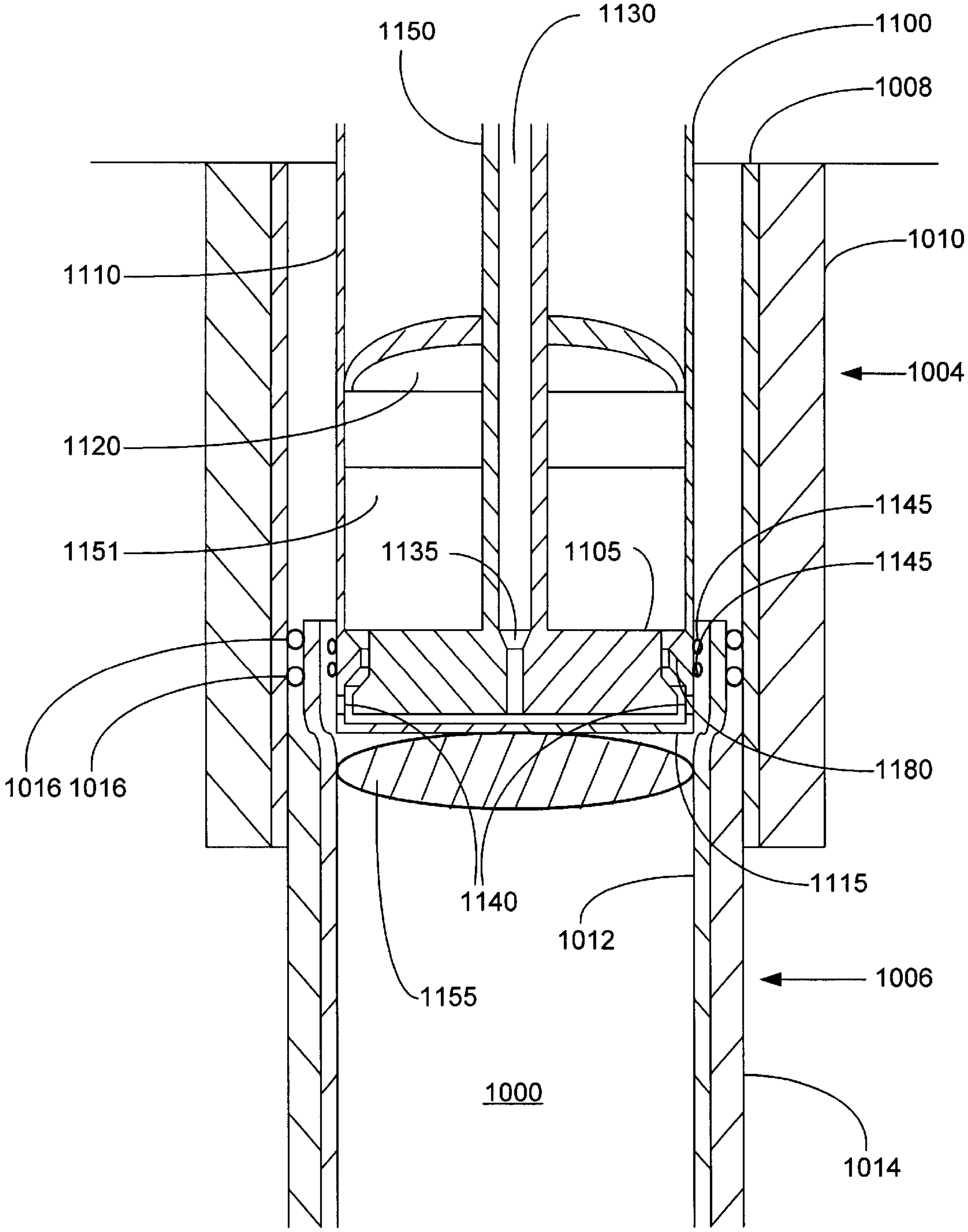
FIG. 10*b* is a cross-sectional illustration of an apparatus and method for creating a tie-back liner using an expandible tubular member.

Referring to FIG. 10*b*, in order to create a tie-back liner that extends from the overlap between the first and second casings, 1004 and 1006, an apparatus 1100 is preferably provided that includes an expandable mandrel or pig 1105, a tubular member 1110, a shoe 1115, one or more cup seals 1120, a fluid passage 1130, a fluid passage 1135, one or more fluid passages 1140, seals 1145, and a support member 1150.

The expandable mandrel or pig 1105 is coupled to and supported by the support member 1150. The expandable mandrel 1105 is preferably adapted to controllably expand in a radial direction. The expandable mandrel 1105 may comprise any number of conventional commercially available expandable mandrels modified in accordance with the teachings of the present disclosure. In a preferred embodiment, the expandable mandrel 1105 comprises a hydraulic expansion tool substantially as disclosed in U.S. Pat. No. 5,348,095, the disclosure of which is incorporated herein by reference, modified in accordance with the teachings of the present disclosure.

The tubular member 1110 is coupled to and supported by the expandable mandrel 1105. The tubular member 1105 is expanded in the radial direction and extruded off of the expandable mandrel 1105. The tubular member 1110 may be fabricated from any number of materials such as, for example, Oilfield Country Tubular Goods, 13 chromium tubing or plastic piping. In a preferred embodiment, the tubular member 1110 is fabricated from Oilfield Country Tubular Goods.

The inner and outer diameters of the tubular member 1110 may range, for example, from approximately 0.75 to 47 inches and 1.05 to 48 inches, respectively. In a preferred embodiment, the inner and outer diameters of the tubular member 1110 range from about 3 to 15.5 inches and 3.5 to 16 inches, respectively in order to optimally provide coverage for typical oilfield casing sizes. The tubular member 1110 preferably comprises a solid member.

In a preferred embodiment, the upper end portion of the tubular member 1110 is slotted, perforated, or otherwise modified to catch or slow down the mandrel 1105 when it completes the extrusion of tubular member 1110. In a preferred embodiment, the length of the tubular member 1110 is limited to minimize the possibility of buckling. For typical tubular member 1110 materials, the length of the tubular member 1110 is preferably limited to between about 40 to 20,000 feet in length.

The shoe 1115 is coupled to the expandable mandrel 1105 and the tubular member 1110. The shoe 1115 includes the fluid passage 1135. The shoe 1115 may comprise any number of conventional commercially available shoes such as, for example, Super Seal II float shoe, Super Seal II Down-Jet float shoe or a guide shoe with a sealing sleeve for a latch down plug modified in accordance with the teachings of the present disclosure. In a preferred embodiment, the shoe 1115 comprises an aluminum down-jet guide shoe with a sealing sleeve for a latch-down plug with side ports radiating off of the exit flow port available from Halliburton Energy Services in Dallas, Tex., modified in accordance with the teachings of the present disclosure, in order to optimally guide the tubular member 1100 to the overlap between the tubular member 1100 and the casing 1012, optimally fluidicly isolate the interior of the tubular member 1100 after the latch down plug has seated, and optimally permit drilling out of the shoe 1115 after completion of the expansion and cementing operations.

In a preferred embodiment, the shoe 1115 includes one or more side outlet ports 1140 in fluidic communication with the fluid passage 1135. In this manner, the shoe 1115 injects hardenable fluidic sealing material into the region outside the shoe 1115 and tubular member 1110. In a preferred embodiment, the shoe 1115 includes one or more of the fluid passages 1140 each having an inlet geometry that can receive a dart and/or a ball sealing member. In this manner, the fluid passages 1140 can be sealed off by introducing a plug, dart and/or ball sealing elements into the fluid passage 1130.

The cup seal 1120 is coupled to and supported by the support member 1150. The cup seal 1120 prevents foreign materials from entering the interior region of the tubular member 1110 adjacent to the expandable mandrel 1105. The cup seal 1120 may comprise any number of conventional commercially available cup seals such as, for example, TP cups or Selective Injection Packer (SIP) cups modified in accordance with the teachings of the present disclosure. In a preferred embodiment, the cup seal 1120 comprises a SIP cup, available from Halliburton Energy Services in Dallas, Tex. in order to optimally provide a barrier to debris and contain a body of lubricant.

The fluid passage 1130 permits fluidic materials to be transported to and from the interior region of the tubular member 1110 below the expandable mandrel 1105. The fluid passage 1130 is coupled to and positioned within the support member 1150 and the expandable mandrel 1105. The fluid passage 1130 preferably extends from a position adjacent to the surface to the bottom of the expandable mandrel 1105. The fluid passage 1130 is preferably positioned along a centerline of the apparatus 1100. The fluid passage 1130 is preferably selected to transport materials such as cement, drilling mud or epoxies at flow rates and pressures ranging from about 0 to 3,000 gallons/minute and 0 to 9,000 psi in order to optimally provide sufficient operating pressures to circulate fluids at operationally efficient rates.

The fluid passage 1135 permits fluidic materials to be transmitted from fluid passage 1130 to the interior of the tubular member 1110 below the mandrel 1105.

The fluid passages 1140 permits fluidic materials to be transported to and from the region exterior to the tubular member 1110 and shoe 1115. The fluid passages 1140 are coupled to and positioned within the shoe 1115 in fluidic communication with the interior region of the tubular member 1110 below the expandable mandrel 1105. The fluid passages 1140 preferably have a cross-sectional shape that permits a plug, or other similar device, to be placed in the fluid passages 1140 to thereby block further passage of fluidic materials. In this manner, the interior region of the tubular member 1110 below the expandable mandrel 1105 can be fluidicly isolated from the region exterior to the tubular member 1105. This permits the interior region of the tubular member 1110 below the expandable mandrel 1105 to be pressurized.

The fluid passages 1140 are preferably positioned along the periphery of the shoe 1115. The fluid passages 1140 are preferably selected to convey materials such as cement, drilling mud or epoxies at flow rates and pressures ranging from about 0 to 3,000 gallons/minute and 0 to 9,000 psi in order to optimally fill the annular region between the tubular member 1110 and the tubular liner 1008 with fluidic materials. In a preferred embodiment, the fluid passages 1140 include an inlet geometry that can receive a dart and/or a ball sealing member. In this manner, the fluid passages 1140 can be sealed off by introducing a plug, dart and/or ball sealing elements into the fluid passage 1130. In a preferred embodiment, the apparatus 1100 includes a plurality of fluid passage 1140.

In an alternative embodiment, the base of the shoe 1115 includes a single inlet passage coupled to the fluid passages 1140 that is adapted to receive a plug, or other similar device, to permit the interior region of the tubular member 1110 to be fluidicly isolated from the exterior of the tubular member 1110.

The seals 1145 are coupled to and supported by a lower end portion of the tubular member 1110. The seals 1145 are further positioned on an outer surface of the lower end portion of the tubular member 1110. The seals 1145 permit the overlapping joint between the upper end portion of the casing 1012 and the lower end portion of the tubular member 1110 to be fluidicly sealed.

The seals 1145 may comprise any number of conventional commercially available seals such as, for example, lead, rubber, Teflon or epoxy seals modified in accordance with the teachings of the present disclosure. In a preferred embodiment, the seals 1145 comprise seals molded from Stratalock epoxy available from Halliburton Energy Services in Dallas, Tex. in order to optimally provide a hydraulic seal in the overlapping joint and optimally provide load carrying capacity to withstand the range of typical tensile and compressive loads.

In a preferred embodiment, the seals 1145 are selected to optimally provide a sufficient frictional force to support the expanded tubular member 1110 from the tubular liner 1008. In a preferred embodiment, the frictional force provided by the seals 1145 ranges from about 1,000 to 1,000,000 lbf in tension and compression in order to optimally support the expanded tubular member 1110.

The support member 1150 is coupled to the expandable mandrel 1105, tubular member 1110, shoe 1115, and seal 1120. The support member 1150 preferably comprises an annular member having sufficient strength to carry the apparatus 1100 into the wellbore 1000. In a preferred embodiment, the support member 1150 further includes one or more conventional centralizers (not illustrated) to help stabilize the tubular member 1110.

In a preferred embodiment, a quantity of lubricant 1150 is provided in the annular region above the expandable mandrel 1105 within the interior of the tubular member 1110. In this manner, the extrusion of the tubular member 1110 off of the is expandable mandrel 1105 is facilitated. The lubricant 1150 may comprise any number of conventional commercially available lubricants such as, for example, Lubriplate, chlorine based lubricants or Climax 1500 Antiseize (3100). In a preferred embodiment, the lubricant 1150 comprises Climax 1500 Antiseize (3100) available from Climax Lubricants and Equipment Co. in Houston, Tex. in order to optimally provide lubrication for the extrusion process.

In a preferred embodiment, the support member 1150 is thoroughly cleaned prior to assembly to the remaining portions of the apparatus 1100. In this manner, the introduction of foreign material into the apparatus 1100 is minimized. This minimizes the possibility of foreign material clogging the various flow passages and valves of the apparatus 1100 and to ensure that no foreign material interferes with the expansion mandrel 1105 during the extrusion process.

In a particularly preferred embodiment, the apparatus 1100 includes a packer 1155 coupled to the bottom section of the shoe 1115 for fluidicly isolating the region of the wellbore 1000 below the apparatus 1100. In this manner, fluidic materials are prevented from entering the region of the wellbore 1000 below the apparatus 1100. The packer 1155 may comprise any number of conventional commercially available packers such as, for example, EZ Drill Packer, EZ SV Packer or a drillable cement retainer. In a preferred embodiment, the packer 1155 comprises an EZ Drill Packer available from Halliburton Energy Services in Dallas, Tex. In an alternative embodiment, a high gel strength pill may be set below the tie-back in place of the packer 1155. In another alternative embodiment, the packer 1155 may be omitted.

In a preferred embodiment, before or after positioning the apparatus 1100 within the wellbore 1100, a couple of wellbore volumes are circulated in order to ensure that no foreign materials are located within the wellbore 1000 that might clog up the various flow passages and valves of the apparatus 1100 and to ensure that no foreign material interferes with the operation of the expansion mandrel 1105.

Figure 10C:
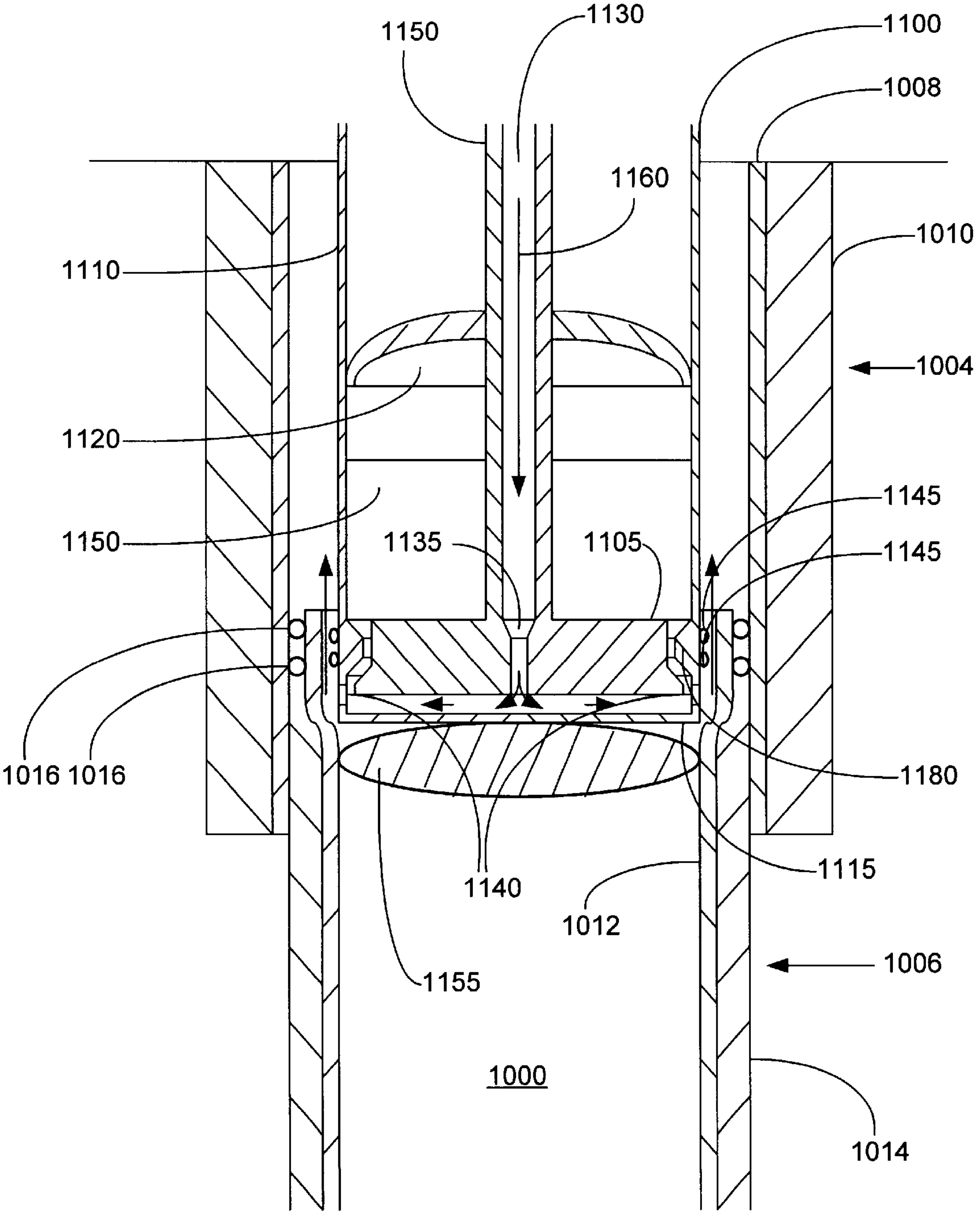
FIG. 10*c* is a cross-sectional illustration of the pumping of a fluidic sealing material into the annular region between the tubular member and the existing casing.

As illustrated in FIG. 10*c*, a hardenable fluidic sealing material 1160 is then pumped from a surface location into the fluid passage 1130. The material 1160 then passes from the fluid passage 1130 into the interior region of the tubular member 1110 below the expandable mandrel 1105. The material 1160 then passes from the interior region of the tubular member 1110 into the fluid passages 1140. The material 1160 then exits the apparatus 1100 and fills the annular region between the exterior of the tubular member 1110 and the interior wall of the tubular liner 1008. Continued pumping of the material 1160 causes the material 1160 to fill up at least a portion of the annular region.

The material 1160 may be pumped into the annular region at pressures and flow rates ranging, for example, from about 0 to 5,000 psi and 0 to 1,500 gallons/min, respectively. In a preferred embodiment, the material 1160 is pumped into the annular region at pressures and flow rates specifically designed for the casing sizes being run, the annular spaces being filled, the pumping equipment available, and the properties of the fluid being pumped. The optimum flow rates and pressures are preferably calculated using conventional empirical methods.

The hardenable fluidic sealing material 1160 may comprise any number of conventional commercially available hardenable fluidic sealing materials such as, for example, slag mix, cement or epoxy. In a preferred embodiment, the hardenable fluidic sealing material 1160 comprises blended cements specifically designed for well section being tied-back, available from Halliburton Energy Services in Dallas, Tex. in order to optimally provide proper support for the tubular member 1110 while maintaining optimum flow characteristics so as to minimize operational difficulties during the displacement of cement in the annular region. The optimum blend of the blended cements are preferably determined using conventional empirical methods.

The annular region may be filled with the material 1160 in sufficient quantities to ensure that, upon radial expansion of the tubular member 1110, the annular region will be filled with material 1160.

Figure 10D:
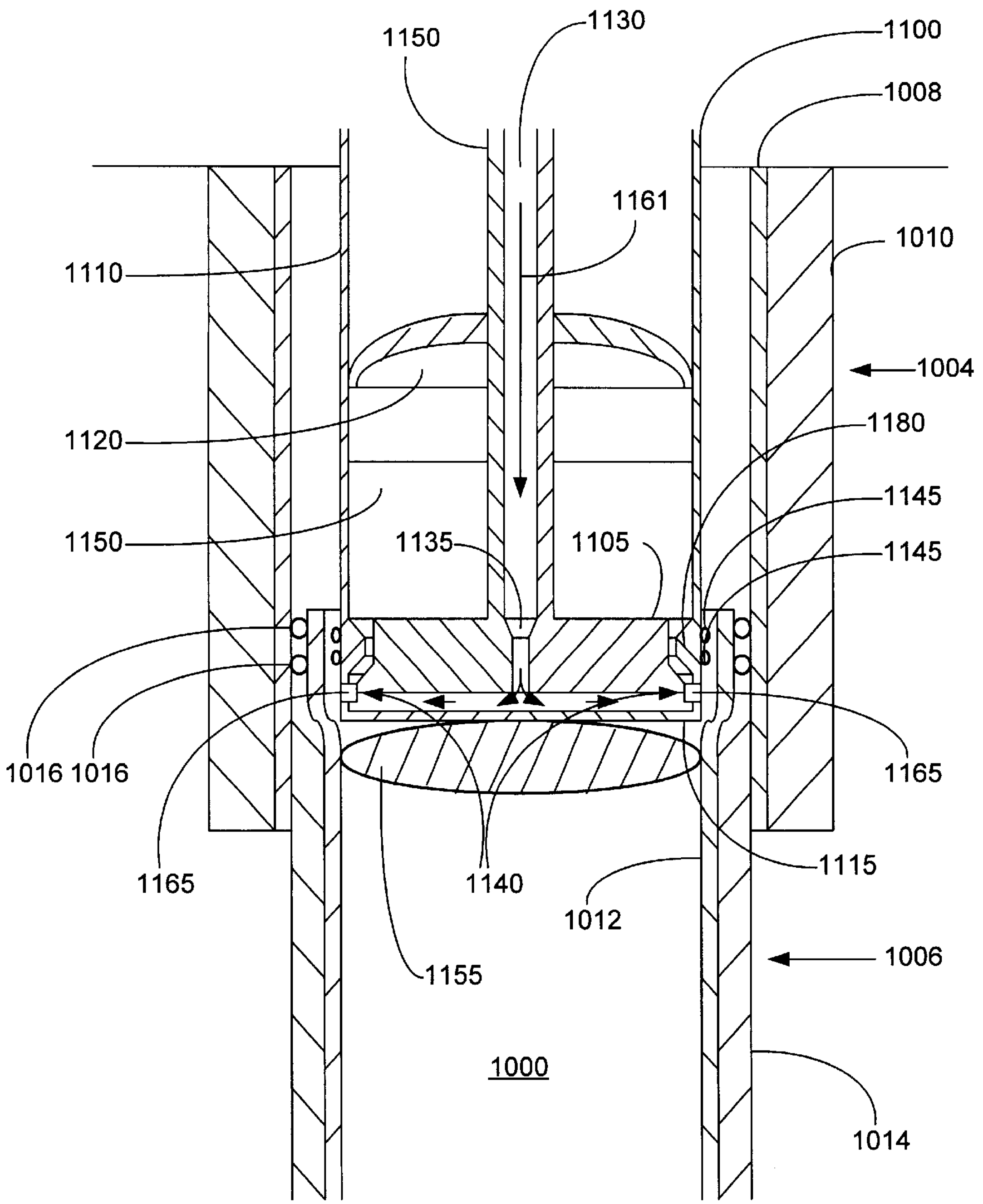
FIG. 10*d* is a cross-sectional illustration of the pressurizing of the interior of the tubular member below the mandrel.

As illustrated in FIG. 10*d*, once the annular region has been adequately filled with material 1160, one or more plugs 1165, or other similar devices, preferably are introduced into the fluid passages 1140 thereby fluidicly isolating the interior region of the tubular member 1110 from the annular region external to the tubular member 1110. In a preferred embodiment, a non hardenable fluidic material 1161 is then pumped into the interior region of the tubular member 1110 below the mandrel 1105 causing the interior region to pressurize. In a particularly preferred embodiment, the one or more plugs 1165, or other similar devices, are introduced into the fluid passage 1140 with the introduction of the non hardenable fluidic material. In this manner, the amount of hardenable fluidic material within the interior of the tubular member 1110 is minimized.

Figure 10E:
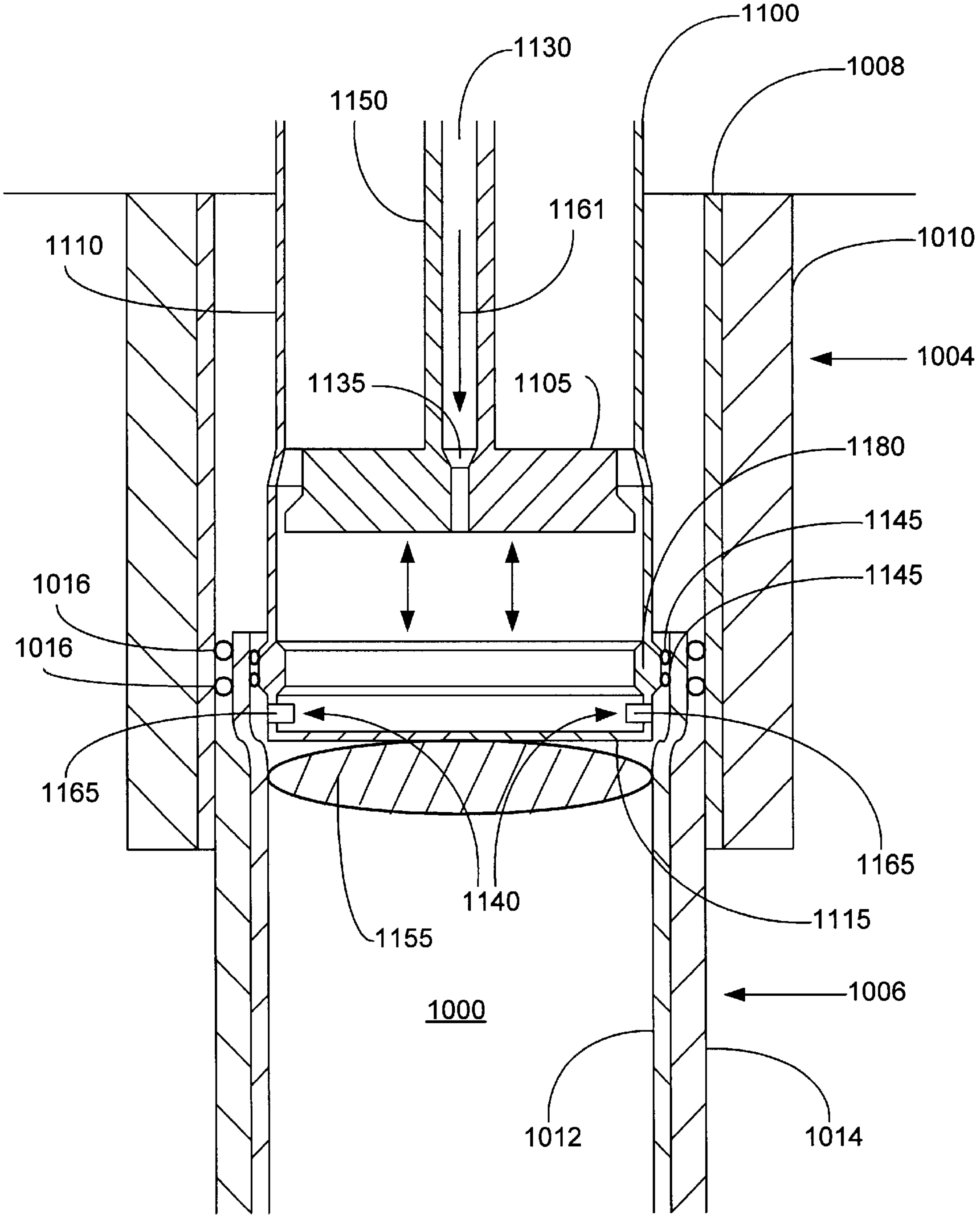
FIG. 10*e* is a cross-sectional illustration of the extrusion of the tubular member off of the mandrel.
Figure 10F:
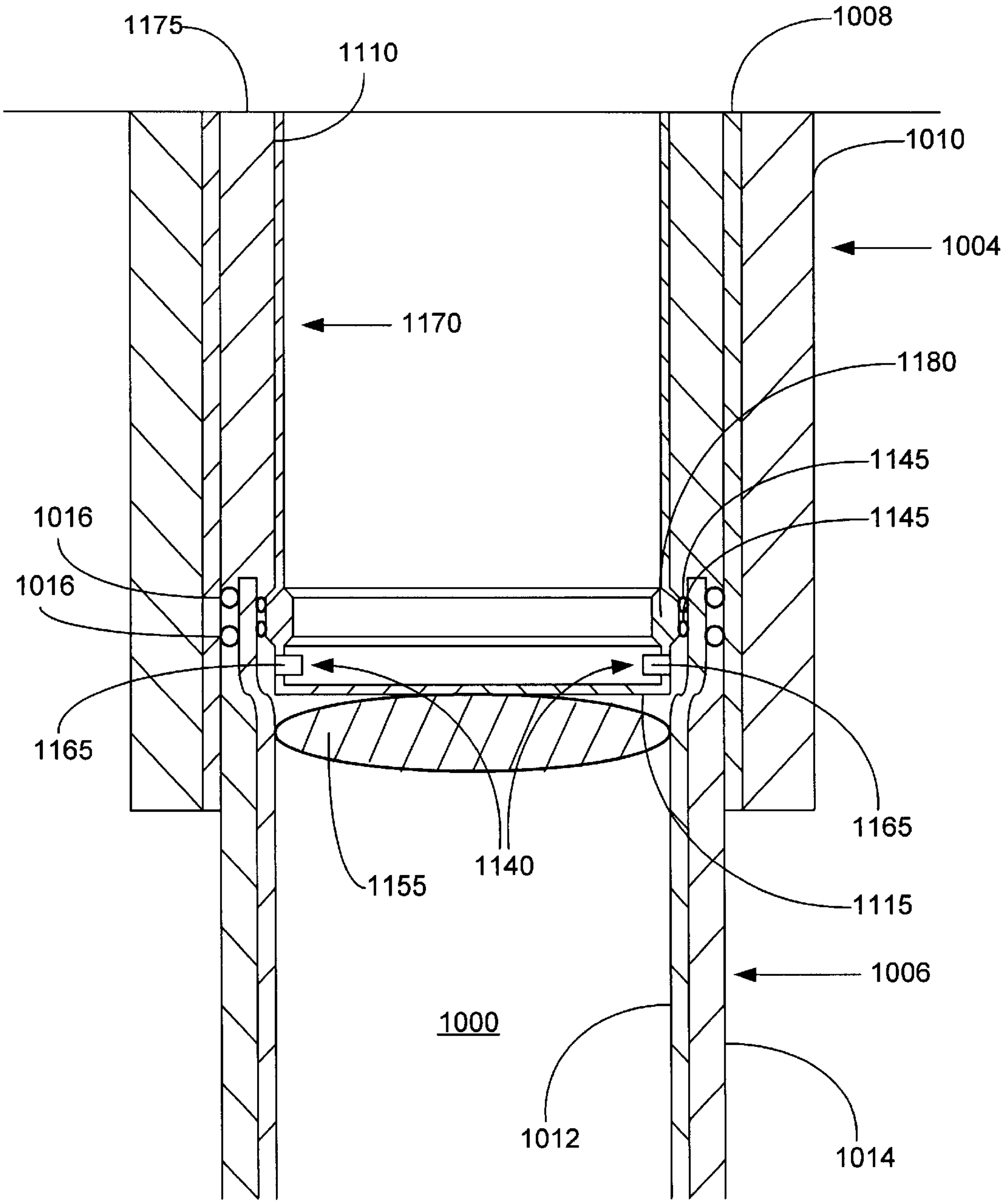
FIG. 10*f* is a cross-sectional illustration of the tie-back liner before drilling out the shoe and packer.
Figure 10G:
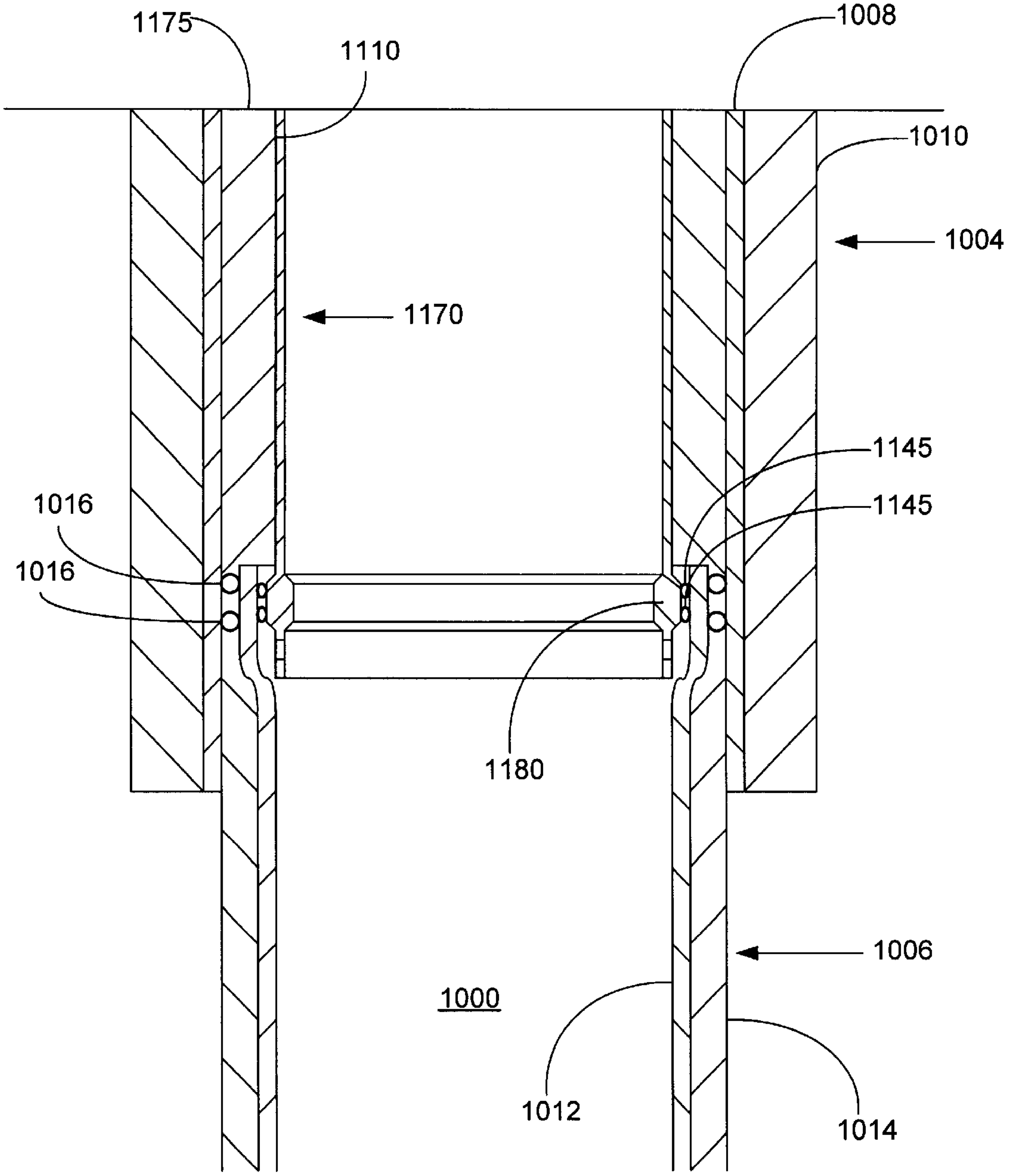
FIG. 10*g* is a cross-sectional illustration of the completed tie-back liner created using an expandible tubular member.

As illustrated in FIG. 10*e*, once the interior region becomes sufficiently pressurized, the tubular member 1110 is extruded off of the expandable mandrel 1105. During the extrusion process, the expandable mandrel 1105 is raised out of the expanded portion of the tubular member 1110.

The plugs 1165 are preferably placed into the fluid passages 1140 by introducing the plugs 1165 into the fluid passage 1130 at a surface location in a conventional manner. The plugs 1165 may comprise any number of conventional commercially available devices from plugging a fluid passage such as, for example, brass balls, plugs, rubber balls, or darts modified in accordance with the teachings of the present disclosure.

In a preferred embodiment, the plugs 1165 comprise low density rubber balls. In an alternative embodiment, for a shoe 1105 having a common central inlet passage, the plugs 1165 comprise a single latch down dart.

After placement of the plugs 1165 in the fluid passages 1140, the non hardenable fluidic material 1161 is preferably pumped into the interior region of the tubular member 1110 below the mandrel 1105 at pressures and flow rates ranging from approximately 500 to 9,000 psi and 40 to 3,000 gallons/min. In a preferred embodiment, after placement of the plugs 1165 in the fluid passages 1140, the non hardenable fluidic material 1161 is preferably pumped into the interior region of the tubular member 1110 below the mandrel 1105 at pressures and flow rates ranging from approximately 1200 to 8500 psi and 40 to 1250 gallons/min in order to optimally provide extrusion of typical tubulars.

For typical tubular members 1110, the extrusion of the tubular member 1110 off of the expandable mandrel 1105 will begin when the pressure of the interior region of the tubular member 1110 below the mandrel 1105 reaches, for example, approximately 1200 to 8500 psi. In a preferred embodiment, the extrusion of the tubular member 1110 off of the expandable mandrel 1105 begins when the pressure of the interior region of the tubular member 1110 below the mandrel 1105 reaches approximately 1200 to 8500 psi.

During the extrusion process, the expandable mandrel 1105 may be raised out of the expanded portion of the tubular member 1110 at rates ranging, for example, from about 0 to 5 ft/sec. In a preferred embodiment, during the extrusion process, the expandable mandrel 1105 is raised out of the expanded portion of the tubular member 1110 at rates ranging from about 0 to 2 ft/sec in order to optimally provide permit adjustment of operational parameters, and optimally ensure that the extrusion process will be completed before the material 1160 cures.

In a preferred embodiment, at least a portion 1180 of the tubular member 1110 has an internal diameter less than the outside diameter of the mandrel 1105. In this manner, when the mandrel 1105 expands the section 1180 of the tubular member 1110, at least a portion of the expanded section 1180 effects a seal with at least the wellbore casing 1012. In a particularly preferred embodiment, the seal is effected by compressing the seals 1016 between the expanded section 1180 and the wellbore casing 1012. In a preferred embodiment, the contact pressure of the joint between the expanded section 1180 of the tubular member 1110 and the casing 1012 ranges from about 500 to 10,000 psi in order to optimally provide pressure to activate the sealing members 1145 and provide optimal resistance to ensure that the joint will withstand typical extremes of tensile and compressive loads.

In an alternative preferred embodiment, substantially all of the entire length of the tubular member 1110 has an internal diameter less than the outside diameter of the mandrel 1105. In this manner, extrusion of the tubular member 1110 by the mandrel 1105 results in contact between substantially all of the expanded tubular member 1110 and the existing casing 1008. In a preferred embodiment, the contact pressure of the joint between the expanded tubular member 1110 and the casings 1008 and 1012 ranges from about 500 to 10,000 psi in order to optimally provide pressure to activate the sealing members 1145 and provide optimal resistance to ensure that the joint will withstand typical extremes of tensile and compressive loads.

In a preferred embodiment, the operating pressure and flow rate of the material 1161 is controllably ramped down when the expandable mandrel 1105 reaches the upper end portion of the tubular member 1110. In this manner, the sudden release of pressure caused by the complete extrusion of the tubular member 1110 off of the expandable mandrel 1105 can be minimized. In a preferred embodiment, the operating pressure of the fluidic material 1161 is reduced in a substantially linear fashion from 100% to about 10% during the end of the extrusion process beginning when the mandrel 1105 has completed approximately all but about 5 feet of the extrusion process.

Alternatively, or in combination, a shock absorber is provided in the support member 1150 in order to absorb the shock caused by the sudden release of pressure.

Alternatively, or in combination, a mandrel catching structure is provided in the upper end portion of the tubular member 1110 in order to catch or at least decelerate the mandrel 1105.

Referring to FIG. **10*f*, once the extrusion process is completed, the expandable mandrel 1105 is removed from the wellbore 1000. In a preferred embodiment, either before or after the removal of the expandable mandrel 1105, the integrity of the fluidic seal of the joint between the upper portion of the tubular member 1110 and the upper portion of the tubular liner 1108 is tested using conventional methods. If the fluidic seal of the joint between the upper portion of the tubular member 1110 and the upper portion of the tubular liner 1008 is satisfactory, then the uncured portion of the material 1160 within the expanded tubular member 1110 is then removed in a conventional manner. The material 1160 within the annular region between the tubular member 1110 and the tubular liner 1008** is then allowed to cure.

As illustrated in FIG. **10*f*, preferably any remaining cured material 1160 within the interior of the expanded tubular member 1110 is then removed in a conventional manner using a conventional drill string. The resulting tie-back liner of casing 1170 includes the expanded tubular member 1110 and an outer annular layer 1175 of cured material 1160**.

As illustrated in FIG. **10*g*, the remaining bottom portion of the apparatus 1100 comprising the shoe 1115 and packer 1155 is then preferably removed by drilling out the shoe 1115 and packer 1155** using conventional drilling methods.

In a particularly preferred embodiment, the apparatus 1100 incorporates the apparatus 900.

Figure 11A:
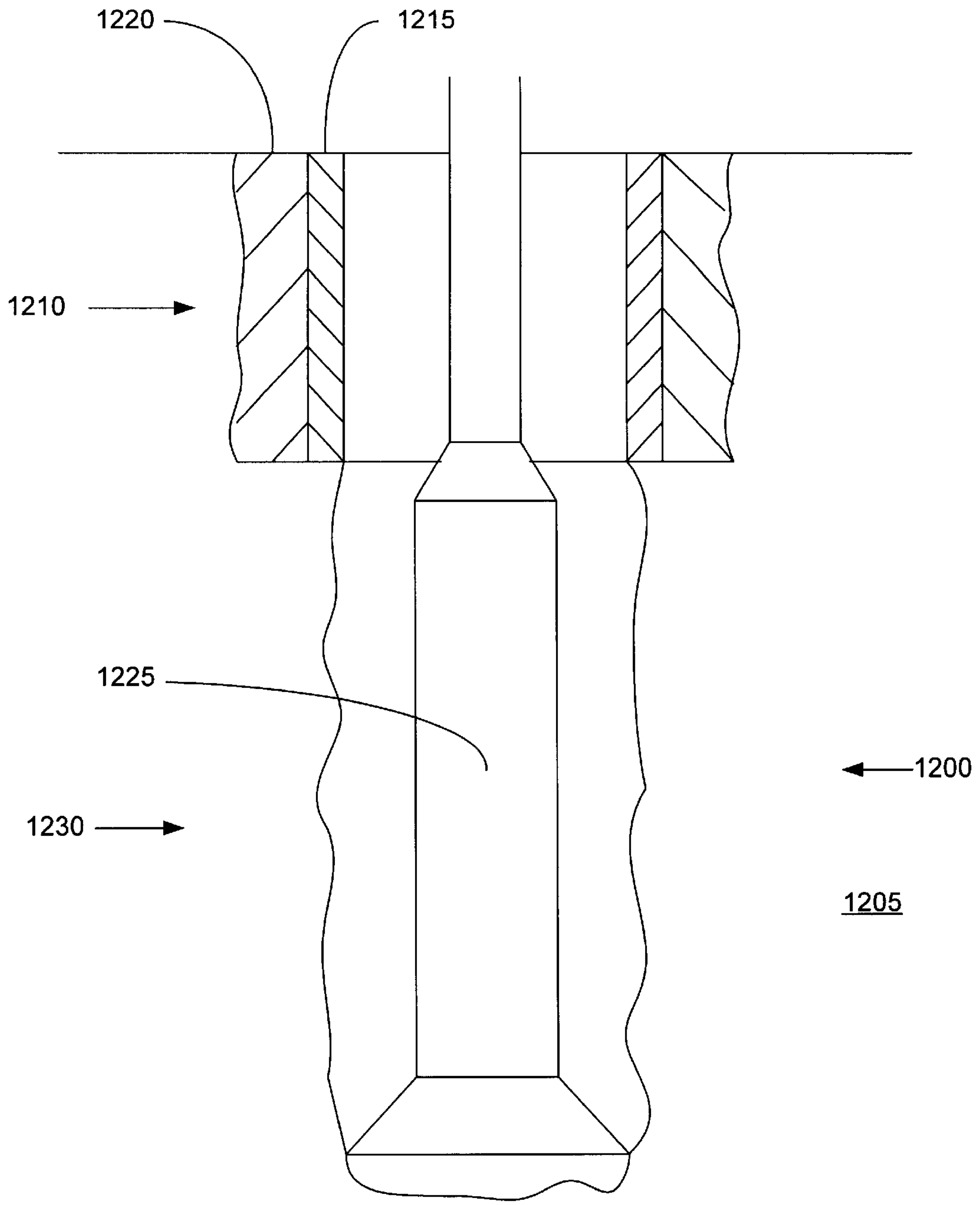
FIG. 11*a* is a fragmentary cross-sectional view illustrating the drilling of a new section of a well borehole.
Figure 11B:
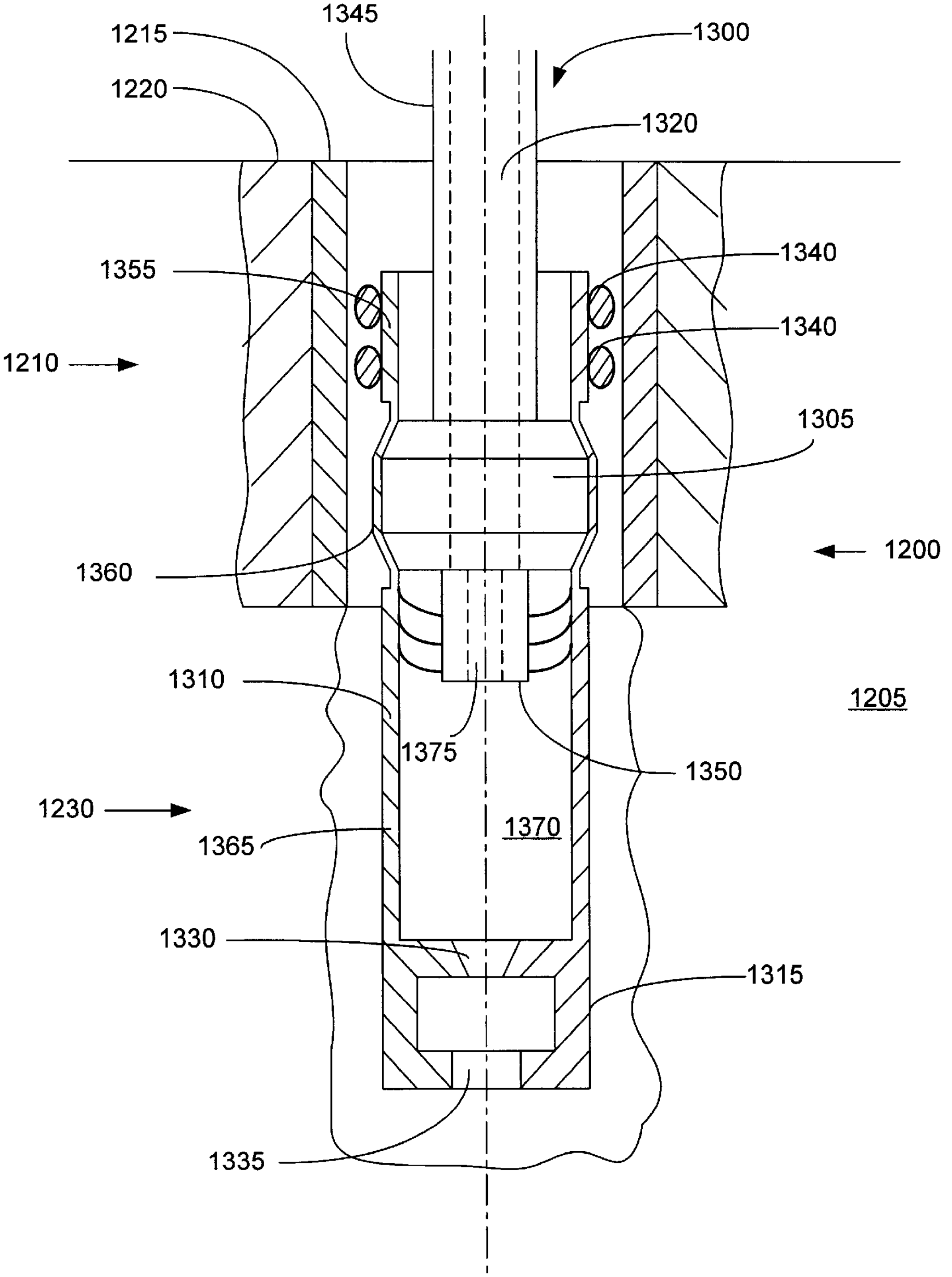
FIG. 11*b* is a fragmentary cross-sectional view illustrating the placement of an embodiment of an apparatus for hanging a tubular liner within the new section of the well borehole.

Referring now to FIGS. **11*a*–11*f*, an embodiment of an apparatus and method for hanging a tubular liner off of an existing wellbore casing will now be described. As illustrated in FIG. 11*a*, a wellbore 1200 is positioned in a subterranean formation 1205. The wellbore 1200 includes an existing cased section 1210 having a tubular casing 1215 and an annular outer layer of cement 1220**.

In order to extend the wellbore 1200 into the subterranean formation 1205, a drill string 1225 is used in a well known manner to drill out material from the subterranean formation 1205 to form a new section 1230.

As illustrated in FIG. **11*b*, an apparatus 1300 for forming a wellbore casing in a subterranean formation is then positioned in the new section 1230 of the wellbore 100. The apparatus 1300 preferably includes an expandable mandrel or pig 1305, a tubular member 1310, a shoe 1315, a fluid passage 1320, a fluid passage 1330, a fluid passage 1335, seals 1340, a support member 1345, and a wiper plug 1350**.

The expandable mandrel 1305 is coupled to and supported by the support member 1345. The expandable mandrel 1305 is preferably adapted to controllably expand in a radial direction. The expandable mandrel 1305 may comprise any number of conventional commercially available expandable mandrels modified in accordance with the teachings of the present disclosure. In a preferred embodiment, the expandable mandrel 1305 comprises a hydraulic expansion tool substantially as disclosed in U.S. Pat. No. 5,348,095, the disclosure of which is incorporated herein by reference, modified in accordance with the teachings of the present disclosure.

The tubular member 1310 is coupled to and supported by the expandable mandrel 1305. The tubular member 1310 is preferably expanded in the radial direction and extruded off of the expandable mandrel 1305. The tubular member 1310 may be fabricated from any number of materials such as, for example, Oilfield Country Tubular Goods (OCTG), 13 chromium steel tubing/casing or plastic casing. In a preferred embodiment, the tubular member 1310 is fabricated from OCTG. The inner and outer diameters of the tubular member 1310 may range, for example, from approximately 0.75 to 47 inches and 1.05 to 48 inches, respectively. In a preferred embodiment, the inner and outer diameters of the tubular member 1310 range from about 3 to 15.5 inches and 3.5 to 16 inches, respectively in order to optimally provide minimal telescoping effect in the most commonly encountered wellbore sizes.

In a preferred embodiment, the tubular member 1310 includes an upper portion 1355, an intermediate portion 1360, and a lower portion 1365. In a preferred embodiment, the wall thickness and outer diameter of the upper portion 1355 of the tubular member 1310 range from about ⅜ to 1½ inches and 3½ to 16 inches, respectively. In a preferred embodiment, the wall thickness and outer diameter of the intermediate portion 1360 of the tubular member 1310 range from about 0.625 to 0.75 inches and 3 to 19 inches, respectively. In a preferred embodiment, the wall thickness and outer diameter of the lower portion 1365 of the tubular member 1310 range from about ⅜ to 1.5 inches and 3.5 to 16 inches, respectively.

In a particularly preferred embodiment, the outer diameter of the lower portion 1365 of the tubular member 1310 is significantly less than the outer diameters of the upper and intermediate portions, 1355 and 1360, of the tubular member 1310 in order to optimize the formation of a concentric and overlapping arrangement of wellbore casings. In this manner, as will be described below with reference to FIGS. 12 and 13, a wellhead system is optimally provided. In a preferred embodiment, the formation of a wellhead system does not include the use of a hardenable fluidic material.

In a particularly preferred embodiment, the wall thickness of the intermediate section 1360 of the tubular member 1310 is less than or equal to the wall thickness of the upper and lower sections, 1355 and 1365, of the tubular member 1310 in order to optimally facilitate the initiation of the extrusion process and optimally permit the placement of the apparatus in areas of the wellbore having tight clearances.

The tubular member 1310 preferably comprises a solid member. In a preferred embodiment, the upper end portion 1355 of the tubular member 1310 is slotted, perforated, or otherwise modified to catch or slow down the mandrel 1305 when it completes the extrusion of tubular member 1310. In a preferred embodiment, the length of the tubular member 1310 is limited to minimize the possibility of buckling. For typical tubular member 1310 materials, the length of the tubular member 1310 is preferably limited to between about 40 to 20,000 feet in length.

The shoe 1315 is coupled to the tubular member 1310. The shoe 1315 preferably includes fluid passages 1330 and 1335. The shoe 1315 may comprise any number of conventional commercially available shoes such as, for example, Super Seal II float shoe, Super Seal II Down-Jet float shoe or guide shoe with a sealing sleeve for a latch-down plug modified in accordance with the teachings of the present disclosure. In a preferred embodiment, the shoe 1315 comprises an aluminum down-jet guide shoe with a sealing sleeve for a latch-down plug available from Halliburton Energy Services in Dallas, Tex., modified in accordance with the teachings of the present disclosure, in order to optimally guide the tubular member 1310 into the wellbore 1200, optimally fluidicly isolate the interior of the tubular member 1310, and optimally permit the complete drill out of the shoe 1315 upon the completion of the extrusion and cementing operations.

In a preferred embodiment, the shoe 1315 further includes one or more side outlet ports in fluidic communication with the fluid passage 1330. In this manner, the shoe 1315 preferably injects hardenable fluidic sealing material into the region outside the shoe 1315 and tubular member 1310. In a preferred embodiment, the shoe 1315 includes the fluid passage 1330 having an inlet geometry that can receive a fluidic sealing member. In this manner, the fluid passage 1330 can be sealed off by introducing a plug, dart and/or ball sealing elements into the fluid passage 1330.

The fluid passage 1320 permits fluidic materials to be transported to and from the interior region of the tubular member 1310 below the expandable mandrel 1305. The fluid passage 1320 is coupled to and positioned within the support member 1345 and the expandable mandrel 1305. The fluid passage 1320 preferably extends from a position adjacent to the surface to the bottom of the expandable mandrel 1305. The fluid passage 1320 is preferably positioned along a centerline of the apparatus 1300. The fluid passage 1320 is preferably selected to transport materials such as cement, drilling mud, or epoxies at flow rates and pressures ranging from about 0 to 3,000 gallons/minute and 0 to 9,000 psi in order to optimally provide sufficient operating pressures to circulate fluids at operationally efficient rates.

The fluid passage 1330 permits fluidic materials to be transported to and from the region exterior to the tubular member 1310 and shoe 1315. The fluid passage 1330 is coupled to and positioned within the shoe 1315 in fluidic communication with the interior region 1370 of the tubular member 1310 below the expandable mandrel 1305. The fluid passage 1330 preferably has a cross-sectional shape that permits a plug, or other similar device, to be placed in fluid passage 1330 to thereby block further passage of fluidic materials. In this manner, the interior region 1370 of the tubular member 1310 below the expandable mandrel 1305 can be fluidicly isolated from the region exterior to the tubular member 1310. This permits the interior region 1370 of the tubular member 1310 below the expandable mandrel 1305 to be pressurized. The fluid passage 1330 is preferably positioned substantially along the centerline of the apparatus 1300.

The fluid passage 1330 is preferably selected to convey materials such as cement, drilling mud or epoxies at flow rates and pressures ranging from about 0 to 3,000 gallons/minute and 0 to 9,000 psi in order to optimally fill the annular region between the tubular member 1310 and the new section 1230 of the wellbore 1200 with fluidic materials. In a preferred embodiment, the fluid passage 1330 includes an inlet geometry that can receive a dart and/or a ball sealing member. In this manner, the fluid passage 1330 can be sealed off by introducing a plug, dart and/or ball sealing elements into the fluid passage 1320.

The fluid passage 1335 permits fluidic materials to be transported to and from the region exterior to the tubular member 1310 and shoe 1315. The fluid passage 1335 is coupled to and positioned within the shoe 1315 in fluidic communication with the fluid passage 1330. The fluid passage 1335 is preferably positioned substantially along the centerline of the apparatus 1300. The fluid passage 1335 is preferably selected to convey materials such as cement, drilling mud or epoxies at flow rates and pressures ranging from about 0 to 3,000 gallons/minute and 0 to 9,000 psi in order to optimally fill the annular region between the tubular member 1310 and the new section 1230 of the wellbore 1200 with fluidic materials.

The seals 1340 are coupled to and supported by the upper end portion 1355 of the tubular member 1310. The seals 1340 are further positioned on an outer surface of the upper end portion 1355 of the tubular member 1310. The seals 1340 permit the overlapping joint between the lower end portion of the casing 1215 and the upper portion 1355 of the tubular member 1310 to be fluidicly sealed. The seals 1340 may comprise any number of conventional commercially available seals such as, for example, lead, rubber, Teflon, or epoxy seals modified in accordance with the teachings of the present disclosure. In a preferred embodiment, the seals 1340 comprise seals molded from Stratalock epoxy available from Halliburton Energy Services in Dallas, Tex. in order to optimally provide a hydraulic seal in the annulus of the overlapping joint while also creating optimal load bearing capability to withstand typical tensile and compressive loads.

In a preferred embodiment, the seals 1340 are selected to optimally provide a sufficient frictional force to support the expanded tubular member 1310 from the existing casing 1215. In a preferred embodiment, the frictional force provided by the seals 1340 ranges from about 1,000 to 1,000,000 lbf in order to optimally support the expanded tubular member 1310.

The support member 1345 is coupled to the expandable mandrel 1305, tubular member 1310, shoe 1315, and seals 1340. The support member 1345 preferably comprises an annular member having sufficient strength to carry the apparatus 1300 into the new section 1230 of the wellbore 1200. In a preferred embodiment, the support member 1345 further includes one or more conventional centralizers (not illustrated) to help stabilize the tubular member 1310.

In a preferred embodiment, the support member 1345 is thoroughly cleaned prior to assembly to the remaining portions of the apparatus 1300. In this manner, the introduction of foreign material into the apparatus 1300 is minimized. This minimizes the possibility of foreign material clogging the various flow passages and valves of the apparatus 1300 and to ensure that no foreign material interferes with the expansion process.

The wiper plug 1350 is coupled to the mandrel 1305 within the interior region 1370 of the tubular member 1310. The wiper plug 1350 includes a fluid passage 1375 that is coupled to the fluid passage 1320. The wiper plug 1350 may comprise one or more conventional commercially available wiper plugs such as, for example, Multiple Stage Cementer latch-down plugs, Omega latch-down plugs or three-wiper latch-down plug modified in accordance with the teachings of the present disclosure. In a preferred embodiment, the wiper plug 1350 comprises a Multiple Stage Cementer latch-down plug available from Halliburton Energy Services in Dallas, Tex. modified in a conventional manner for releasable attachment to the expansion mandrel 1305.

In a preferred embodiment, before or after positioning the apparatus 1300 within the new section 1230 of the wellbore 1200, a couple of wellbore volumes are circulated in order to ensure that no foreign materials are located within the wellbore 1200 that might clog up the various flow passages and valves of the apparatus 1300 and to ensure that no foreign material interferes with the extrusion process.

Figure 11C:
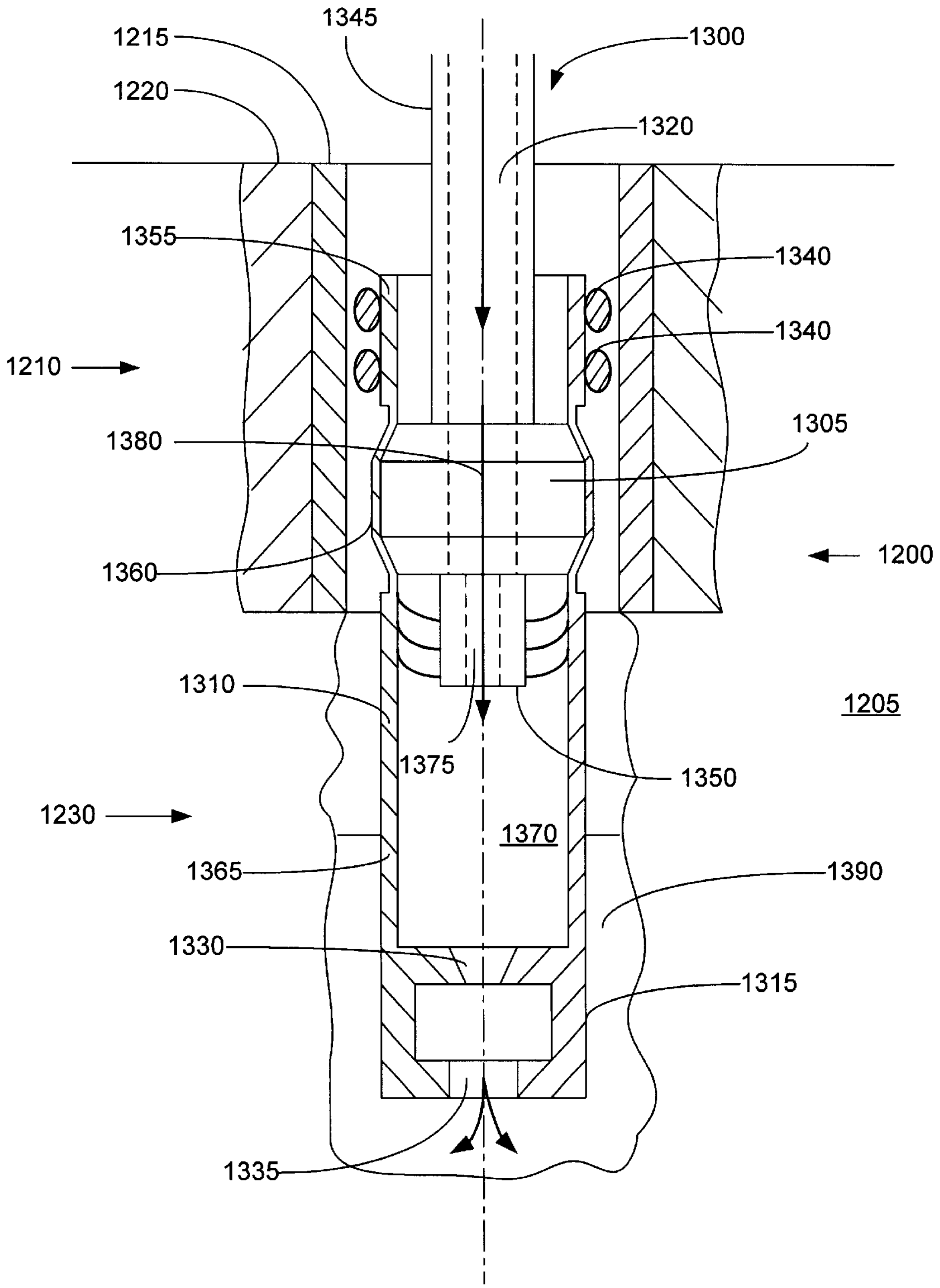
FIG. 11*c* is a fragmentary cross-sectional view illustrating the injection of a first quantity of a hardenable fluidic sealing material into the new section of the well borehole.

As illustrated in FIG. 11*c*, a hardenable fluidic sealing material 1380 is then pumped from a surface location into the fluid passage 1320. The material 1380 then passes from the fluid passage 1320, through the fluid passage 1375, and into the interior region 1370 of the tubular member 1310 below the expandable mandrel 1305. The material 1380 then passes from the interior region 1370 into the fluid passage 1330. The material 1380 then exits the apparatus 1300 via the fluid passage 1335 and fills the annular region 1390 between the exterior of the tubular member 1310 and the interior wall of the new section 1230 of the wellbore 1200. Continued pumping of the material 1380 causes the material 1380 to fill up at least a portion of the annular region 1390.

The material 1380 may be pumped into the annular region 1390 at pressures and flow rates ranging, for example, from about 0 to 5000 psi and 0 to 1,500 gallons/min, respectively. In a preferred embodiment, the material 1380 is pumped into the annular region 1390 at pressures and flow rates ranging from about 0 to 5000 psi and 0 to 1,500 gallons/min, respectively, in order to optimally fill the annular region between the tubular member 1310 and the new section 1230 of the wellbore 1200 with the hardenable fluidic sealing material 1380.

The hardenable fluidic sealing material 1380 may comprise any number of conventional commercially available hardenable fluidic sealing materials such as, for example, slag mix, cement or epoxy. In a preferred embodiment, the hardenable fluidic sealing material 1380 comprises blended cements designed specifically for the well section being drilled and available from Halliburton Energy Services in order to optimally provide support for the tubular member 1310 during displacement of the material 1380 in the annular region 1390. The optimum blend of the cement is preferably determined using conventional empirical methods.

The annular region 1390 preferably is filled with the material 1380 in sufficient quantities to ensure that, upon radial expansion of the tubular member 1310, the annular region 1390 of the new section 1230 of the wellbore 1200 will be filled with material 1380.

Figure 11D:
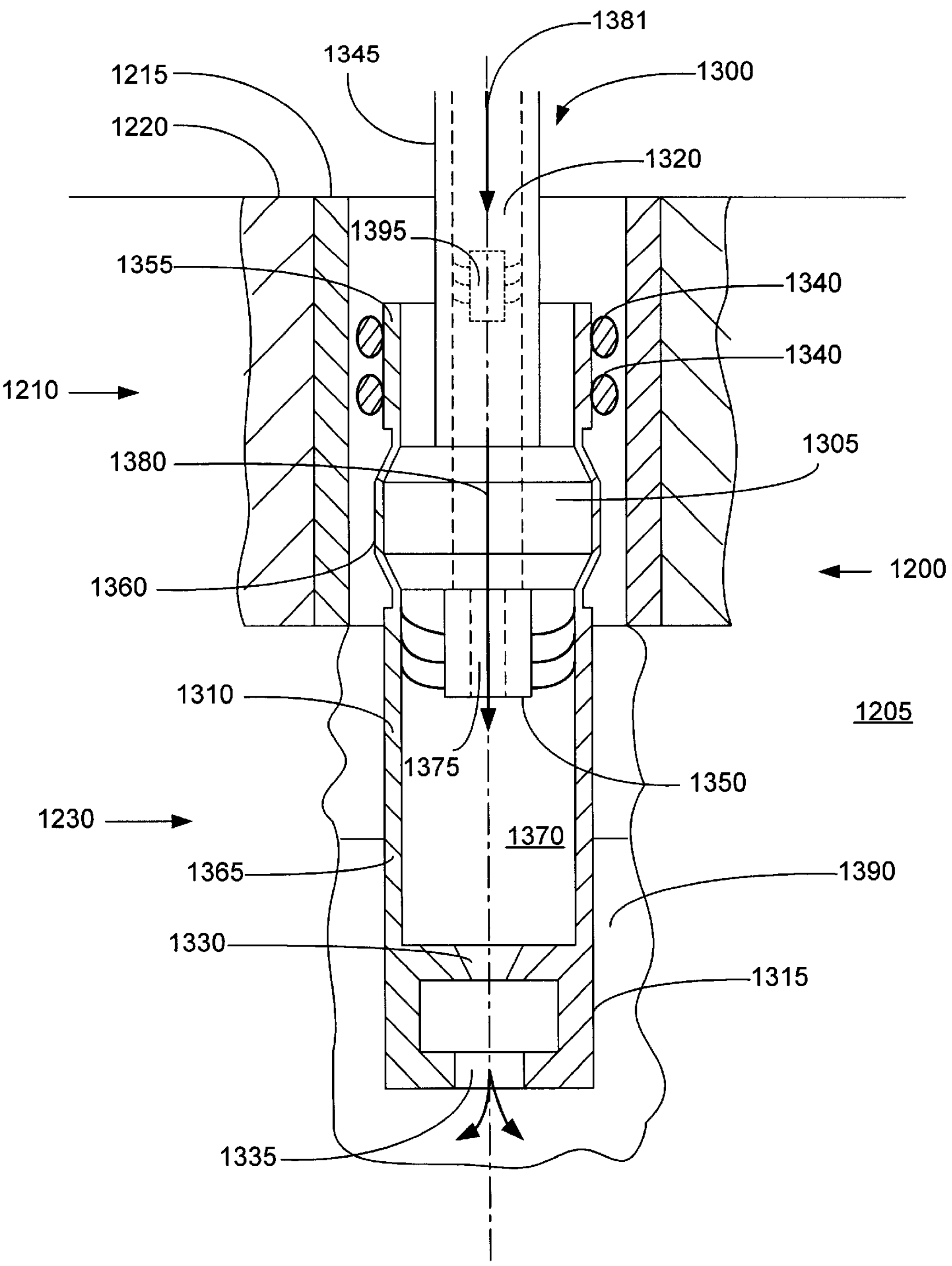
FIG. 11*d* is a fragmentary cross-sectional view illustrating the introduction of a wiper dart into the new section of the well borehole.

As illustrated in FIG. 11*d*, once the annular region 1390 has been adequately filled with material 1380, a wiper dart 1395, or other similar device, is introduced into the fluid passage 1320. The wiper dart 1395 is preferably pumped through the fluid passage 1320 by a non hardenable fluidic material 1381. The wiper dart 1395 then preferably engages the wiper plug 1350.

Figure 11E:
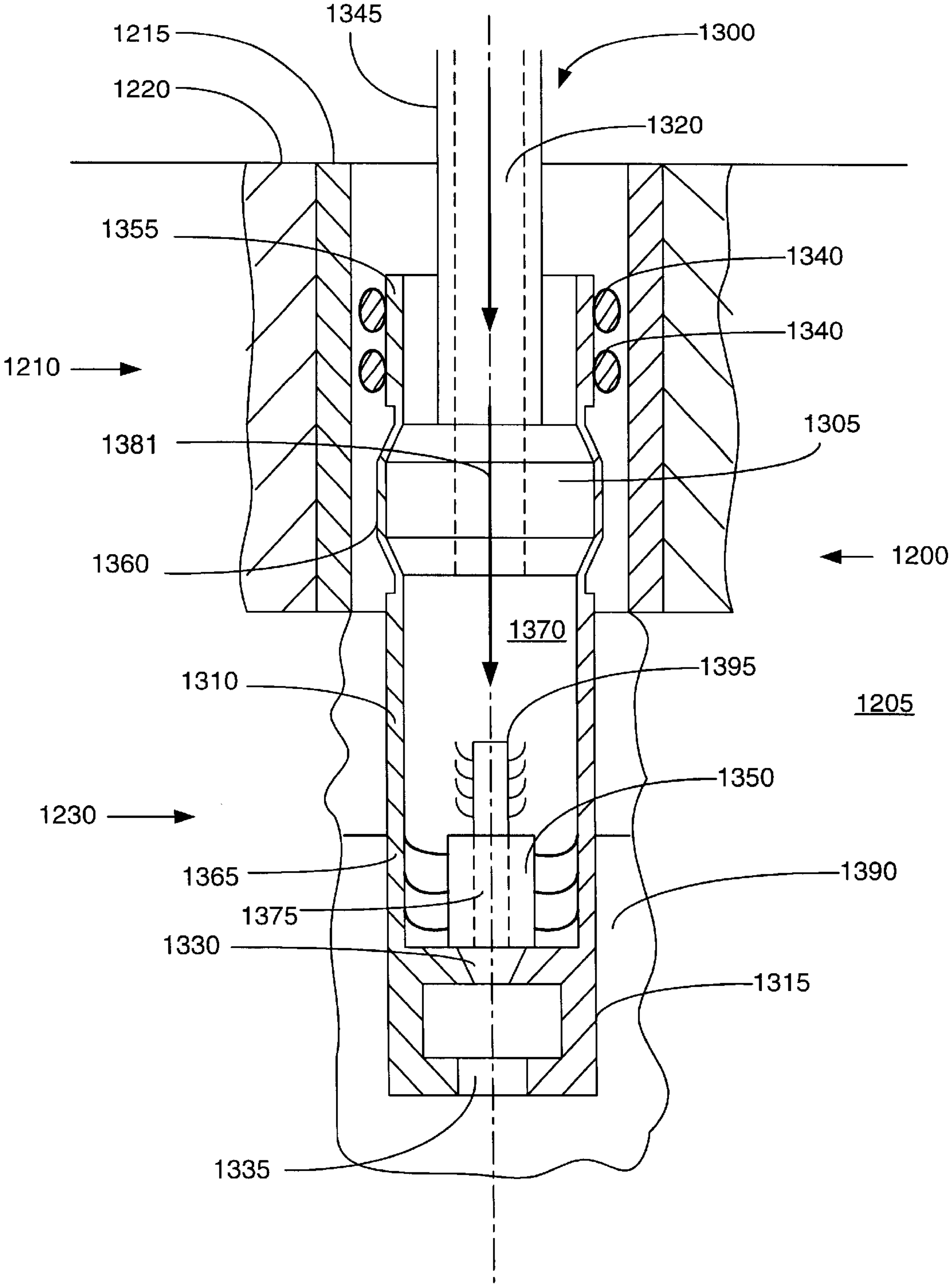
FIG. 11*e* is a fragmentary cross-sectional view illustrating the injection of a second quantity of a hardenable fluidic sealing material into the new section of the well borehole.

As illustrated in FIG. 11*e*, in a preferred embodiment, engagement of the wiper dart 1395 with the wiper plug 1350 causes the wiper plug 1350 to decouple from the mandrel 1305. The wiper dart 1395 and wiper plug 1350 then preferably will lodge in the fluid passage 1330, thereby blocking fluid flow through the fluid passage 1330, and fluidicly isolating the interior region 1370 of the tubular member 1310 from the annular region 1390. In a preferred embodiment, the non hardenable fluidic material 1381 is then pumped into the interior region 1370 causing the interior region 1370 to pressurize. Once the interior region 1370 becomes sufficiently pressurized, the tubular member 1310 is extruded off of the expandable mandrel 1305. During the extrusion process, the expandable mandrel 1305 is raised out of the expanded portion of the tubular member 1310 by the support member 1345.

The wiper dart 1395 is preferably placed into the fluid passage 1320 by introducing the wiper dart 1395 into the fluid passage 1320 at a surface location in a conventional manner. The wiper dart 1395 may comprise any number of conventional commercially available devices from plugging a fluid passage such as, for example, Multiple Stage Cementer latch-down plugs, Omega latch-down plugs or three wiper latch-down plug/dart modified in accordance with the teachings of the present disclosure. In a preferred embodiment, the wiper dart 1395 comprises a three wiper latch-down plug modified to latch and seal in the Multiple Stage Cementer latch down plug 1350. The three wiper latch-down plug is available from Halliburton Energy Services in Dallas, Tex.

After blocking the fluid passage 1330 using the wiper plug 1330 and wiper dart 1395, the non hardenable fluidic material 1381 may be pumped into the interior region 1370 at pressures and flow rates ranging, for example, from approximately 0 to 5000 psi and 0 to 1,500 gallons/min in order to optimally extrude the tubular member 1310 off of the mandrel 1305. In this manner, the amount of hardenable fluidic material within the interior of the tubular member 1310 is minimized.

In a preferred embodiment, after blocking the fluid passage 1330, the non hardenable fluidic material 1381 is preferably pumped into the interior region 1370 at pressures and flow rates ranging from approximately 500 to 9,000 psi and 40 to 3,000 gallons/min in order to optimally provide operating pressures to maintain the expansion process at rates sufficient to permit adjustments to be made in operating parameters during the extrusion process.

For typical tubular members 1310, the extrusion of the tubular member 1310 off of the expandable mandrel 1305 will begin when the pressure of the interior region 1370 reaches, for example, approximately 500 to 9,000 psi. In a preferred embodiment, the extrusion of the tubular member 1310 off of the expandable mandrel 1305 is a function of the tubular member diameter, wall thickness of the tubular member, geometry of the mandrel, the type of lubricant, the composition of the shoe and tubular member, and the yield strength of the tubular member. The optimum flow rate and operating pressures are preferably determined using conventional empirical methods.

During the extrusion process, the expandable mandrel 1305 may be raised out of the expanded portion of the tubular member 1310 at rates ranging, for example, from about 0 to 5 ft/sec. In a preferred embodiment, during the extrusion process, the expandable mandrel 1305 may be raised out of the expanded portion of the tubular member 1310 at rates ranging from about 0 to 2 ft/sec in order to optimally provide an efficient process, optimally permit operator adjustment of operation parameters, and ensure optimal completion of the extrusion process before curing of the material 1380.

When the upper end portion 1355 of the tubular member 1310 is extruded off of the expandable mandrel 1305, the outer surface of the upper end portion 1355 of the tubular member 1310 will preferably contact the interior surface of the lower end portion of the casing 1215 to form an fluid tight overlapping joint. The contact pressure of the overlapping joint may range, for example, from approximately 50 to 20,000 psi. In a preferred embodiment, the contact pressure of the overlapping joint ranges from approximately 400 to 10,000 psi in order to optimally provide contact pressure sufficient to ensure annular sealing and provide enough resistance to withstand typical tensile and compressive loads. In a particularly preferred embodiment, the sealing members 1340 will ensure an adequate fluidic and gaseous seal in the overlapping joint.

In a preferred embodiment, the operating pressure and flow rate of the non hardenable fluidic material 1381 is controllably ramped down when the expandable mandrel 1305 reaches the upper end portion 1355 of the tubular member 1310. In this manner, the sudden release of pressure caused by the complete extrusion of the tubular member 1310 off of the expandable mandrel 1305 can be minimized. In a preferred embodiment, the operating pressure is reduced in a substantially linear fashion from 100% to about 10% during the end of the extrusion process beginning when the mandrel 1305 has completed approximately all but about 5 feet of the extrusion process.

Alternatively, or in combination, a shock absorber is provided in the support member 1345 in order to absorb the shock caused by the sudden release of pressure.

Alternatively, or in combination, a mandrel catching structure is provided in the upper end portion 1355 of the tubular member 1310 in order to catch or at least decelerate the mandrel 1305.

Once the extrusion process is completed, the expandable mandrel 1305 is removed from the wellbore 1200. In a preferred embodiment, either before or after the removal of the expandable mandrel 1305, the integrity of the fluidic seal of the overlapping joint between the upper portion 1355 of the tubular member 1310 and the lower portion of the casing 1215 is tested using conventional methods. If the fluidic seal of the overlapping joint between the upper portion 1355 of the tubular member 1310 and the lower portion of the casing 1215 is satisfactory, then the uncured portion of the material 1380 within the expanded tubular member 1310 is then removed in a conventional manner. The material 1380 within the annular region 1390 is then allowed to cure.

Figure 11F:
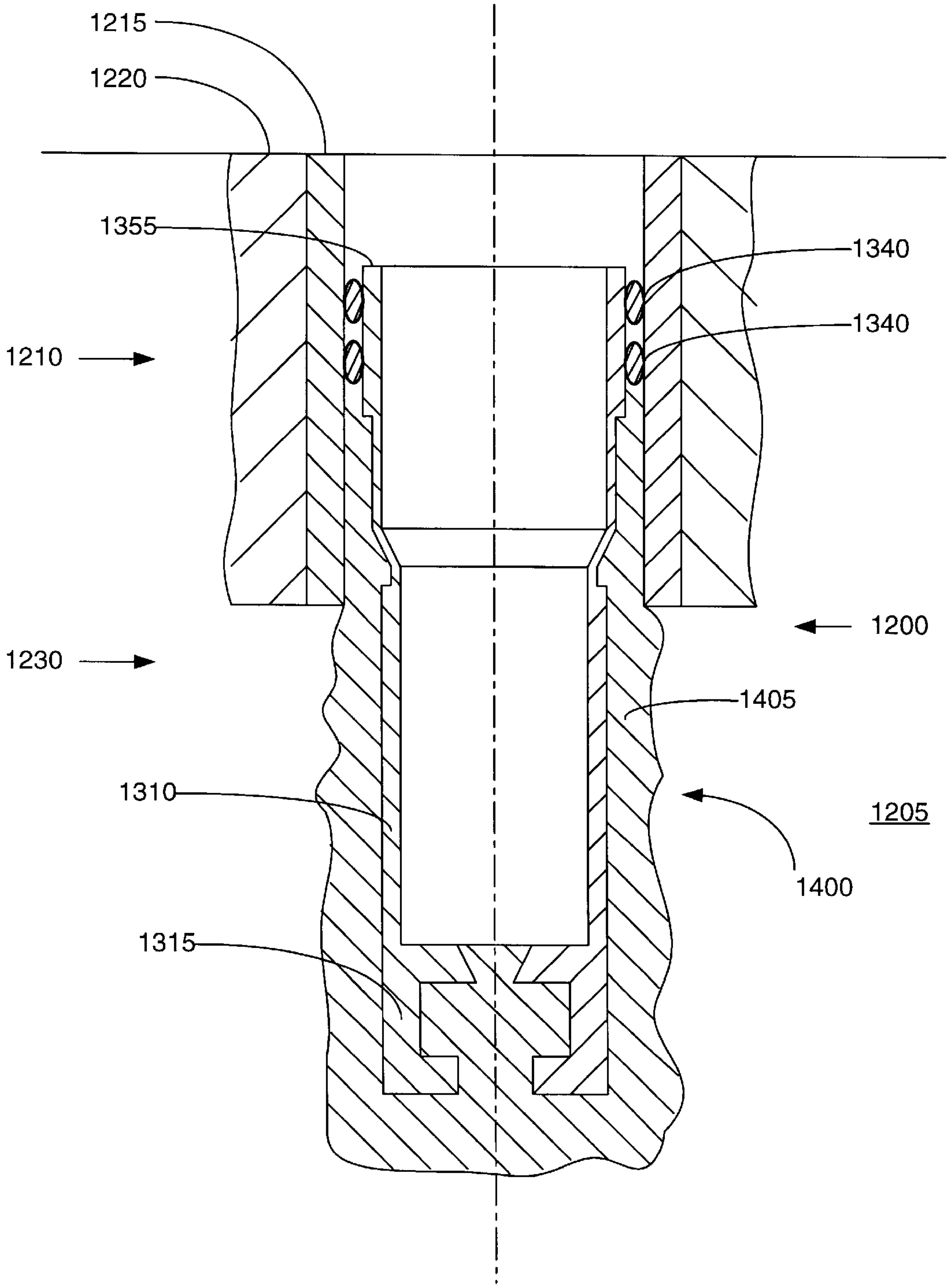
FIG. 11*f* is a fragmentary cross-sectional view illustrating the completion of the tubular liner.

As illustrated in FIG. 11*f*, preferably any remaining cured material 1380 within the interior of the expanded tubular member 1310 is then removed in a conventional manner using a conventional drill string. The resulting new section of casing 1400 includes the expanded tubular member 1310 and an outer annular layer 1405 of cured material 305. The bottom portion of the apparatus 1300 comprising the shoe 1315 may then be removed by drilling out the shoe 1315 using conventional drilling methods.

Figure 12:
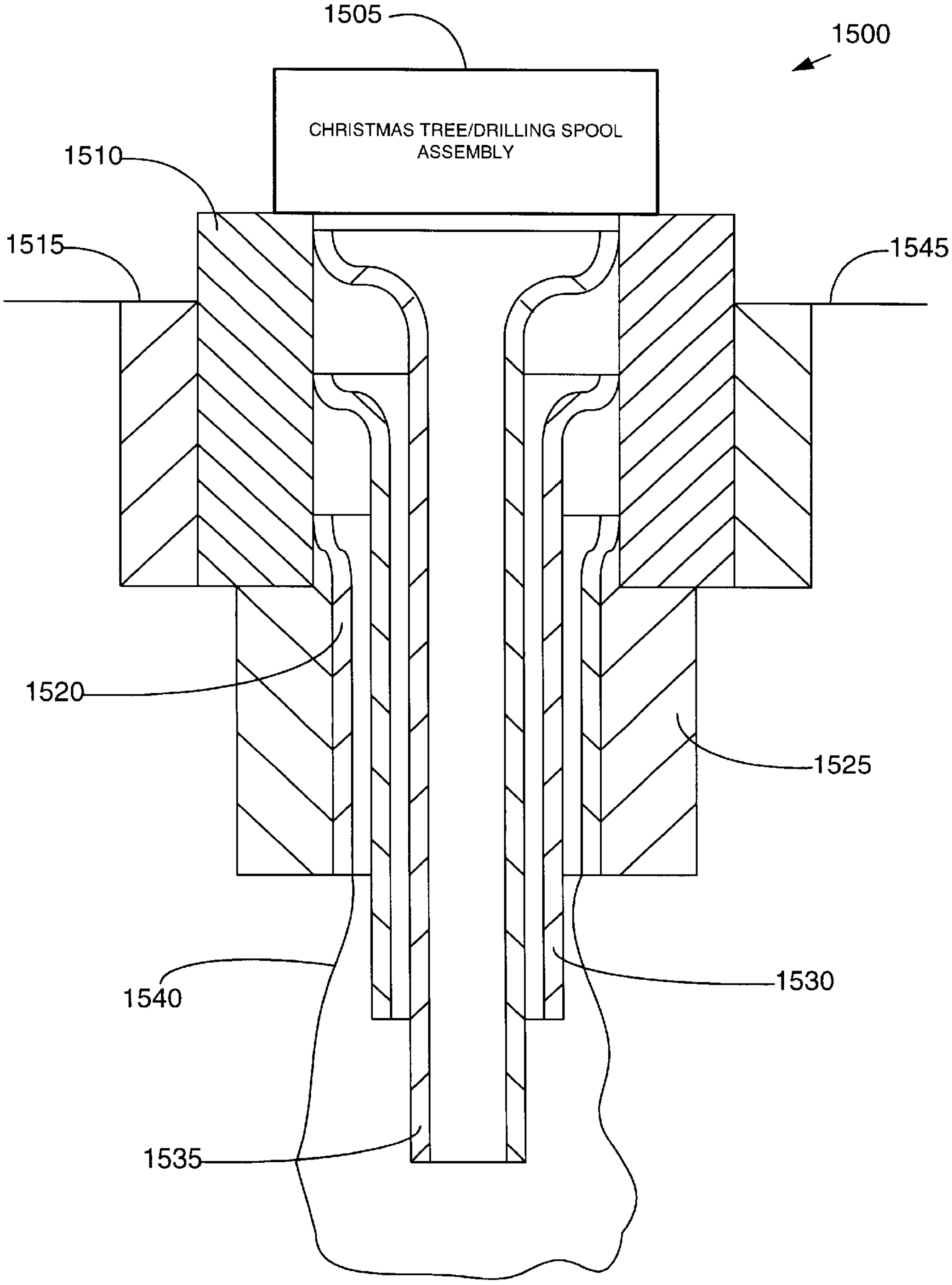
FIG. 12 is a cross-sectional illustration of a preferred embodiment of a wellhead system utilizing expandable tubular members.
Figure 13:
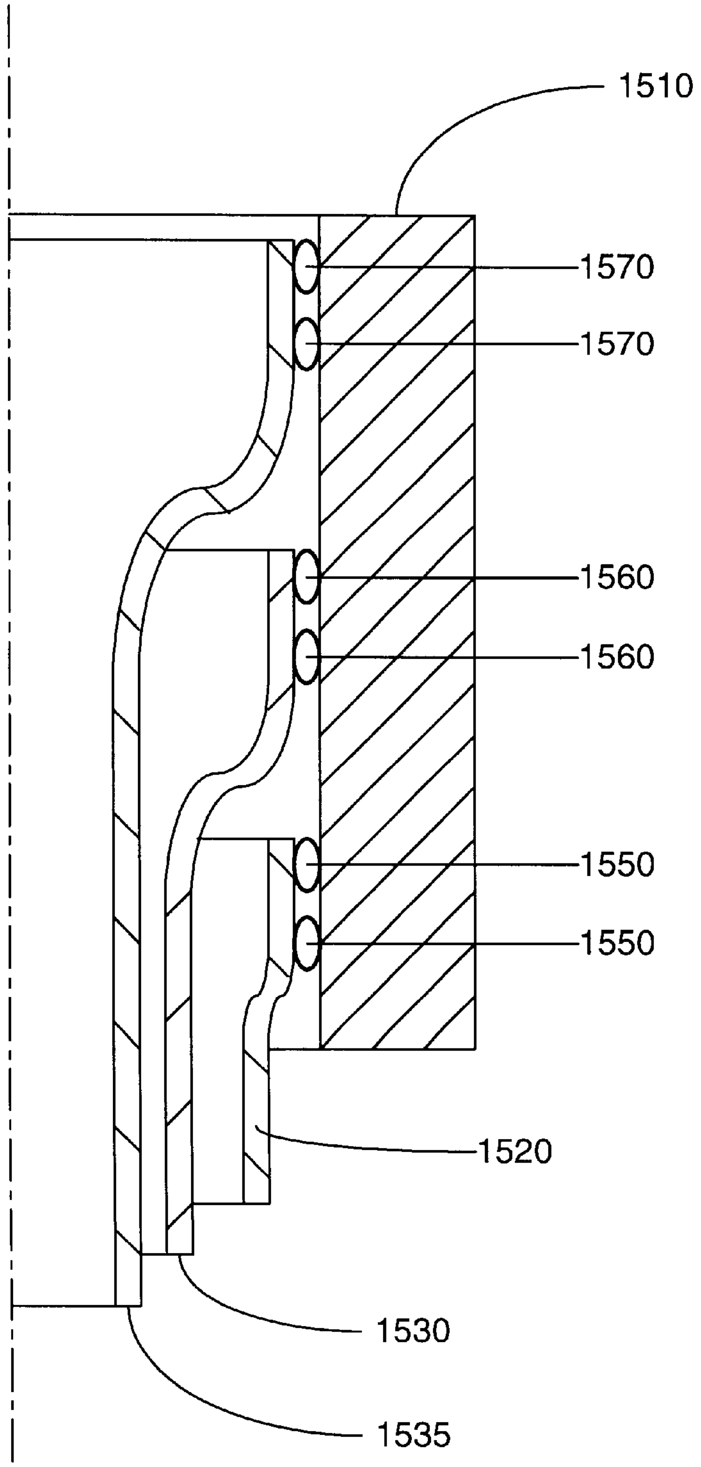
FIG. 13 is a partial cross-sectional illustration of a preferred embodiment of the wellhead system of FIG. 12.

Referring now to FIGS. 12 and 13, a preferred embodiment of a wellhead system 1500 formed using one or more of the apparatus and processes described above with reference to FIGS. 1–11*f* will be described. The wellhead system 1500 preferably includes a conventional Christmas tree/drilling spool assembly 1505, a thick wall casing 1510, an annular body of cement 1515, an outer casing 1520, an annular body of cement 1525, an intermediate casing 1530, and an inner casing 1535.

The Christmas tree/drilling spool assembly 1505 may comprise any number of conventional Christmas tree/drilling spool assemblies such as, for example, the SS-15 Subsea Wellhead System, Spool Tree Subsea Production System or the Compact Wellhead System available from suppliers such as Dril-Quip, Cameron or Breda, modified in accordance with the teachings of the present disclosure. The drilling spool assembly 1505 is preferably operably coupled to the thick wall casing 1510 and/or the outer casing 1520. The assembly 1505 may be coupled to the thick wall casing 1510 and/or outer casing 1520, for example, by welding, a threaded connection or made from single stock. In a preferred embodiment, the assembly 1505 is coupled to the thick wall casing 1510 and/or outer casing 1520 by welding.

The thick wall casing 1510 is positioned in the upper end of a wellbore 1540. In a preferred embodiment, at least a portion of the thick wall casing 1510 extends above the surface 1545 in order to optimally provide easy access and attachment to the Christmas tree/drilling spool assembly 1505. The thick wall casing 1510 is preferably coupled to the Christmas tree/drilling spool assembly 1505, the annular body of cement 1515, and the outer casing 1520.

The thick wall casing 1510 may comprise any number of conventional commercially available high strength wellbore casings such as, for example, Oilfield Country Tubular Goods, titanium tubing or stainless steel tubing. In a preferred embodiment, the thick wall casing 1510 comprises Oilfield Country Tubular Goods available from various foreign and domestic steel mills. In a preferred embodiment, the thick wall casing 1510 has a yield strength of about 400,000 to 135,000 psi in order to optimally provide maximum burst, collapse, and tensile strengths. In a preferred embodiment, the thick wall casing 1510 has a failure strength in excess of about 5,000 to 20,000 psi in order to optimally provide maximum operating capacity and resistance to degradation of capacity after being drilled through for an extended time period.

The annular body of cement 1515 provides support for the thick wall casing 1510. The annular body of cement 1515 may be provided using any number of conventional processes for forming an annular body of cement in a wellbore. The annular body of cement 1515 may comprise any number of conventional cement mixtures.

The outer casing 1520 is coupled to the thick wall casing 1510. The outer casing 1520 may be fabricated from any number of conventional commercially available tubular members modified in accordance with the teachings of the present disclosure. In a preferred embodiment, the outer casing 1520 comprises any one of the expandable tubular members described above with reference to FIGS. 1–11*f.*

In a preferred embodiment, the outer casing 1520 is coupled to the thick wall casing 1510 by expanding the outer casing 1520 into contact with at least a portion of the interior surface of the thick wall casing 1510 using any one of the embodiments of the processes and apparatus described above with reference to FIGS. 1–11*f.* In an alternative embodiment, substantially all of the overlap of the outer casing 1520 with the thick wall casing 1510 contacts with the interior surface of the thick wall casing 1510.

The contact pressure of the interface between the outer casing 1520 and the thick wall casing 1510 may range, for example, from about 500 to 10,000 psi. In a preferred embodiment, the contact pressure between the outer casing 1520 and the thick wall casing 1510 ranges from about 500 to 10,000 psi in order to optimally activate the pressure activated sealing members and to ensure that the overlapping joint will optimally withstand typical extremes of tensile and compressive loads that are experienced during drilling and production operations.

As illustrated in FIG. 13, in a particularly preferred embodiment, the upper end of the outer casing 1520 includes one or more sealing members 1550 that provide a gaseous and fluidic seal between the expanded outer casing 1520 and the interior wall of the thick wall casing 1510. The sealing members 1550 may comprise any number of conventional commercially available seals such as, for example, lead, plastic, rubber, Teflon or epoxy, modified in accordance with the teachings of the present disclosure. In a preferred embodiment, the sealing members 1550 comprise seals molded from StrataLock epoxy available from Halliburton Energy Services in order to optimally provide an hydraulic seal and a load bearing interference fit between the tubular members. In a preferred embodiment, the contact pressure of the interface between the thick wall casing 1510 and the outer casing 1520 ranges from about 500 to 10,000 psi in order to optimally activate the sealing members 1550 and also optimally ensure that the joint will withstand the typical operating extremes of tensile and compressive loads during drilling and production operations.

In an alternative preferred embodiment, the outer casing 1520 and the thick walled casing 1510 are combined in one unitary member.

The annular body of cement 1525 provides support for the outer casing 1520. In a preferred embodiment, the annular body of cement 1525 is provided using any one of the embodiments of the apparatus and processes described above with reference to FIGS. 1–11*f.*

The intermediate casing 1530 may be coupled to the outer casing 1520 or the thick wall casing 1510. In a preferred embodiment, the intermediate casing 1530 is coupled to the thick wall casing 1510. The intermediate casing 1530 may be fabricated from any number of conventional commercially available tubular members modified in accordance with the teachings of the present disclosure. In a preferred embodiment, the intermediate casing 1530 comprises any one of the expandable tubular members described above with reference to FIGS. 1–11*f.*

In a preferred embodiment, the intermediate casing 1530 is coupled to the thick wall casing 1510 by expanding at least a portion of the intermediate casing 1530 into contact with the interior surface of the thick wall casing 1510 using any one of the processes and apparatus described above with reference to FIGS. 1–11*f.* In an alternative preferred embodiment, the entire length of the overlap of the intermediate casing 1530 with the thick wall casing 1510 contacts the inner surface of the thick wall casing 1510. The contact pressure of the interface between the intermediate casing 1530 and the thick wall casing 1510 may range, for example from about 500 to 10,000 psi. In a preferred embodiment, the contact pressure between the intermediate casing 1530 and the thick wall casing 1510 ranges from about 500 to 10,000 psi in order to optimally activate the pressure activated sealing members and to optimally ensure that the joint will withstand typical operating extremes of tensile and compressive loads experienced during drilling and production operations.

As illustrated in FIG. 13, in a particularly preferred embodiment, the upper end of the intermediate casing 1530 includes one or more sealing members 1560 that provide a gaseous and fluidic seal between the expanded end of the intermediate casing 1530 and the interior wall of the thick wall casing 1510. The sealing members 1560 may comprise any number of conventional commercially available seals such as, for example, plastic, lead, rubber, Teflon or epoxy, modified in accordance with the teachings of the present disclosure. In a preferred embodiment, the sealing members 1560 comprise seals molded from StrataLock epoxy available from Halliburton Energy Services in order to optimally provide a hydraulic seal and a load bearing interference fit between the tubular members.

In a preferred embodiment, the contact pressure of the interface between the expanded end of the intermediate casing 1530 and the thick wall casing 1510 ranges from about 500 to 10,000 psi in order to optimally activate the sealing members 1560 and also optimally ensure that the joint will withstand typical operating extremes of tensile and compressive loads that are experienced during drilling and production operations.

The inner casing 1535 may be coupled to the outer casing 1520 or the thick wall casing 1510. In a preferred embodiment, the inner casing 1535 is coupled to the thick wall casing 1510. The inner casing 1535 may be fabricated from any number of conventional commercially available tubular members modified in accordance with the teachings of the present disclosure. In a preferred embodiment, the inner casing 1535 comprises any one of the expandable tubular members described above with reference to FIGS. 1–11*f.*

In a preferred embodiment, the inner casing 1535 is coupled to the outer casing 1520 by expanding at least a portion of the inner casing 1535 into contact with the interior surface of the thick wall casing 1510 using any one of the processes and apparatus described above with reference to FIGS. 1–11*f.* In an alternative preferred embodiment, the entire length of the overlap of the inner casing 1535 with the thick wall casing 1510 and intermediate casing 1530 contacts the inner surfaces of the thick wall casing 1510 and intermediate casing 1530. The contact pressure of the interface between the inner casing 1535 and the thick wall casing 1510 may range, for example from about 500 to 10,000 psi. In a preferred embodiment, the contact pressure between the inner casing 1535 and the thick wall casing 1510 ranges from about 500 to 10,000 psi in order to optimally activate the pressure activated sealing members and to ensure that the joint will withstand typical extremes of tensile and compressive loads that are commonly experienced during drilling and production operations.

As illustrated in FIG. 13, in a particularly preferred embodiment, the upper end of the inner casing 1535 includes one or more sealing members 1570 that provide a gaseous and fluidic seal between the expanded end of the inner casing 1535 and the interior wall of the thick wall casing 1510. The sealing members 1570 may comprise any number of conventional commercially available seals such as, for example, lead, plastic, rubber, Teflon or epoxy, modified in accordance with the teachings of the present disclosure. In a preferred embodiment, the sealing members 1570 comprise seals molded from StrataLock epoxy available from Halliburton Energy Services in order to optimally provide an hydraulic seal and a load bearing interference fit. In a preferred embodiment, the contact pressure of the interface between the expanded end of the inner casing 1535 and the thick wall casing 1510 ranges from about 500 to 10,000 psi in order to optimally activate the sealing members 1570 and also to optimally ensure that the joint will withstand typical operating extremes of tensile and compressive loads that are experienced during drilling and production operations.

In an alternative embodiment, the inner casings, 1520, 1530 and 1535, may be coupled to a previously positioned tubular member that is in turn coupled to the outer casing 1510. More generally, the present preferred embodiments may be used to form a concentric arrangement of tubular members.

Referring now to FIGS. 14*a*, 14*b*, 14*c*, 14*d*, 14*e* and 14*f*, a preferred embodiment of a method and apparatus for forming a mono-diameter well casing within a subterranean formation will now be described.

Figure 14A:
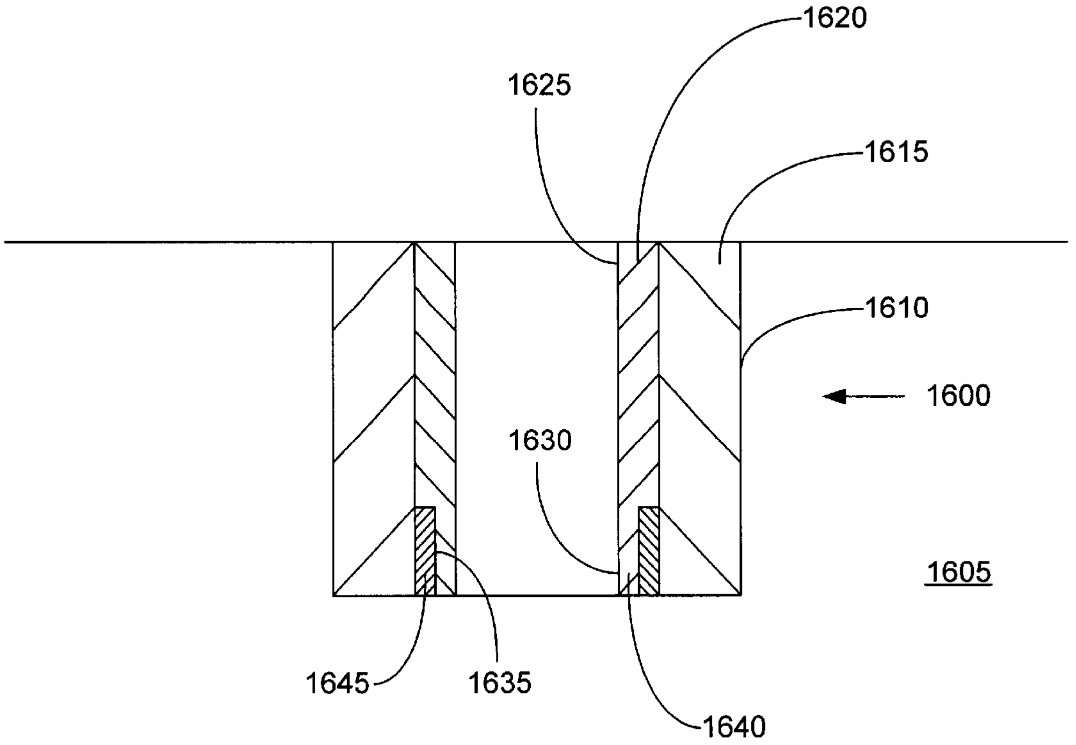
FIG. 14*a* is an illustration of the formation of an embodiment of a mono-diameter wellbore casing.

As illustrated in FIG. 14*a*, a wellbore 1600 is positioned in a subterranean formation 1605. A first section of casing 1610 is formed in the wellbore 1600. The first section of casing 1610 includes an annular outer body of cement 1615 and a tubular section of casing 1620. The first section of casing 1610 may be formed in the wellbore 1600 using conventional methods and apparatus. In a preferred embodiment, the first section of casing 1610 is formed using one or more of the methods and apparatus described above with reference to FIGS. 1–13 or below with reference to FIGS. 14*b*–17*b*.

The annular body of cement 1615 may comprise any number of conventional commercially available cement, or other load bearing, compositions. Alternatively, the body of cement 1615 may be omitted or replaced with an epoxy mixture.

The tubular section of casing 1620 preferably includes an upper end 1625 and a lower end 1630. Preferably, the lower end 1625 of the tubular section of casing 1620 includes an outer annular recess 1635 extending from the lower end 1630 of the tubular section of casing 1620. In this manner, the lower end 1625 of the tubular section of casing 1620 includes a thin walled section 1640. In a preferred embodiment, an annular body 1645 of a compressible material is coupled to and at least partially positioned within the outer annular recess 1635. In this manner, the body of compressible material 1645 surrounds at least a portion of the thin walled section 1640.

The tubular section of casing 1620 may be fabricated from any number of conventional commercially available materials such as, for example, oilfield country tubular goods, stainless steel, automotive grade steel, carbon steel, low alloy steel, fiberglass or plastics. In a preferred embodiment, the tubular section of casing 1620 is fabricated from oilfield country tubular goods available from various foreign and domestic steel mills. The wall thickness of the thin walled section 1640 may range from about 0.125 to 1.5 inches. In a preferred embodiment, the wall thickness of the thin walled section 1640 ranges from 0.25 to 1.0 inches in order to optimally provide burst strength for typical operational conditions while also minimizing resistance to radial expansion. The axial length of the thin walled section 1640 may range from about 120 to 2400 inches. In a preferred embodiment, the axial length of the thin walled section 1640 ranges from about 240 to 480 inches.

The annular body of compressible material 1645 helps to minimize the radial force required to expand the tubular casing 1620 in the overlap with the tubular member 1715, helps to create a fluidic seal in the overlap with the tubular member 1715, and helps to create an interference fit sufficient to permit the tubular member 1715 to be supported by the tubular casing 1620. The annular body of compressible material 1645 may comprise any number of commercially available compressible materials such as, for example, epoxy, rubber, Teflon, plastics or lead tubes. In a preferred embodiment, the annular body of compressible material 1645 comprises StrataLock epoxy available from Halliburton Energy Services in order to optimally provide an hydraulic seal in the overlapped joint while also having compliance to thereby minimize the radial force required to expand the tubular casing. The wall thickness of the annular body of compressible material 1645 may range from about 0.05 to 0.75 inches. In a preferred embodiment, the wall thickness of the annular body of compressible material 1645 ranges from about 0.1 to 0.5 inches in order to optimally provide a large compressible zone, minimize the radial forces required to expand the tubular casing, provide thickness for casing strings to provide contact with the inner surface of the wellbore upon radial expansion, and provide an hydraulic seal.

Figure 14B:
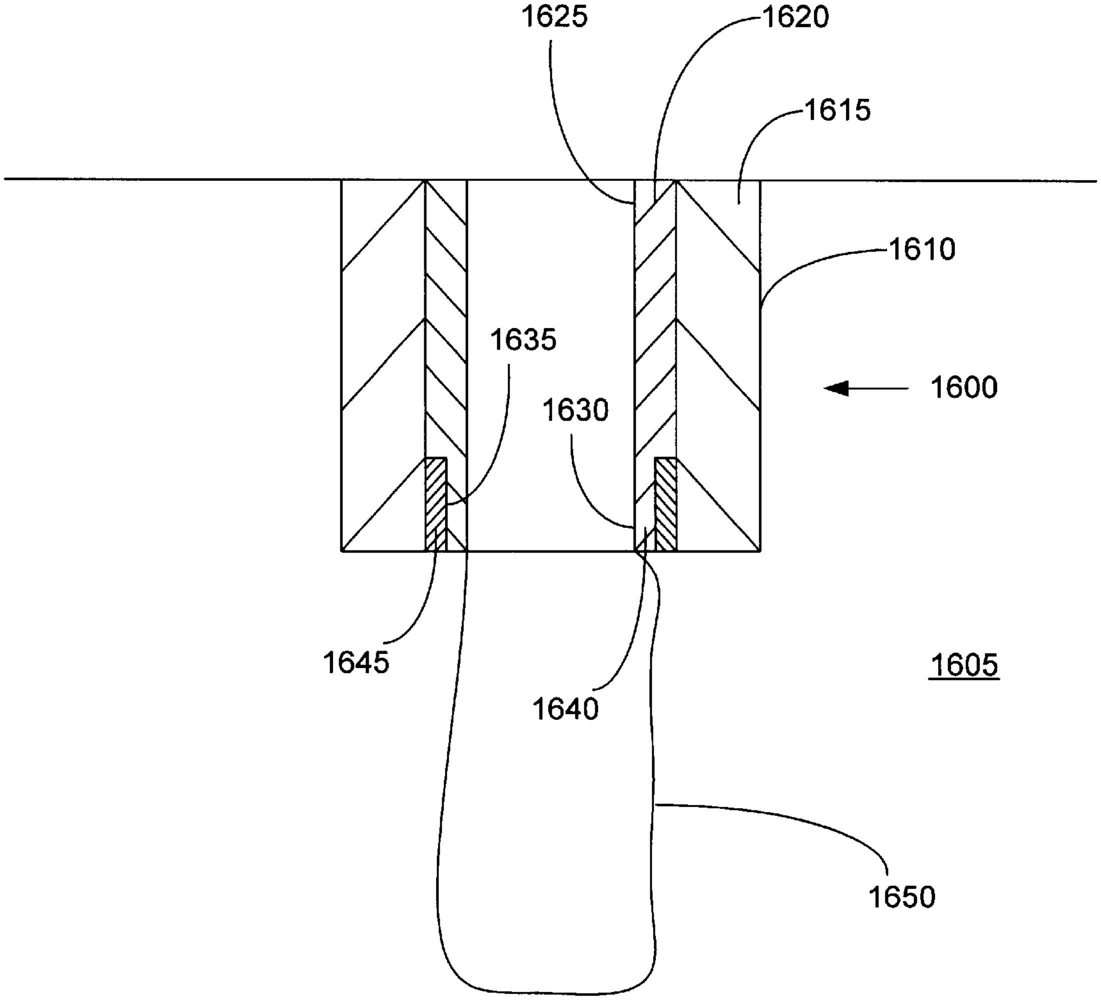
FIG. 14*b* is another illustration of the formation of the mono-diameter wellbore casing.

As illustrated in FIG. 14*b*, in order to extend the wellbore 1600 into the subterranean formation 1605, a drill string is used in a well known manner to drill out material from the subterranean formation 1605 to form a new wellbore section 1650. The diameter of the new section 1650 is preferably equal to or greater than the inner diameter of the tubular section of casing 1620.

Figure 14C:
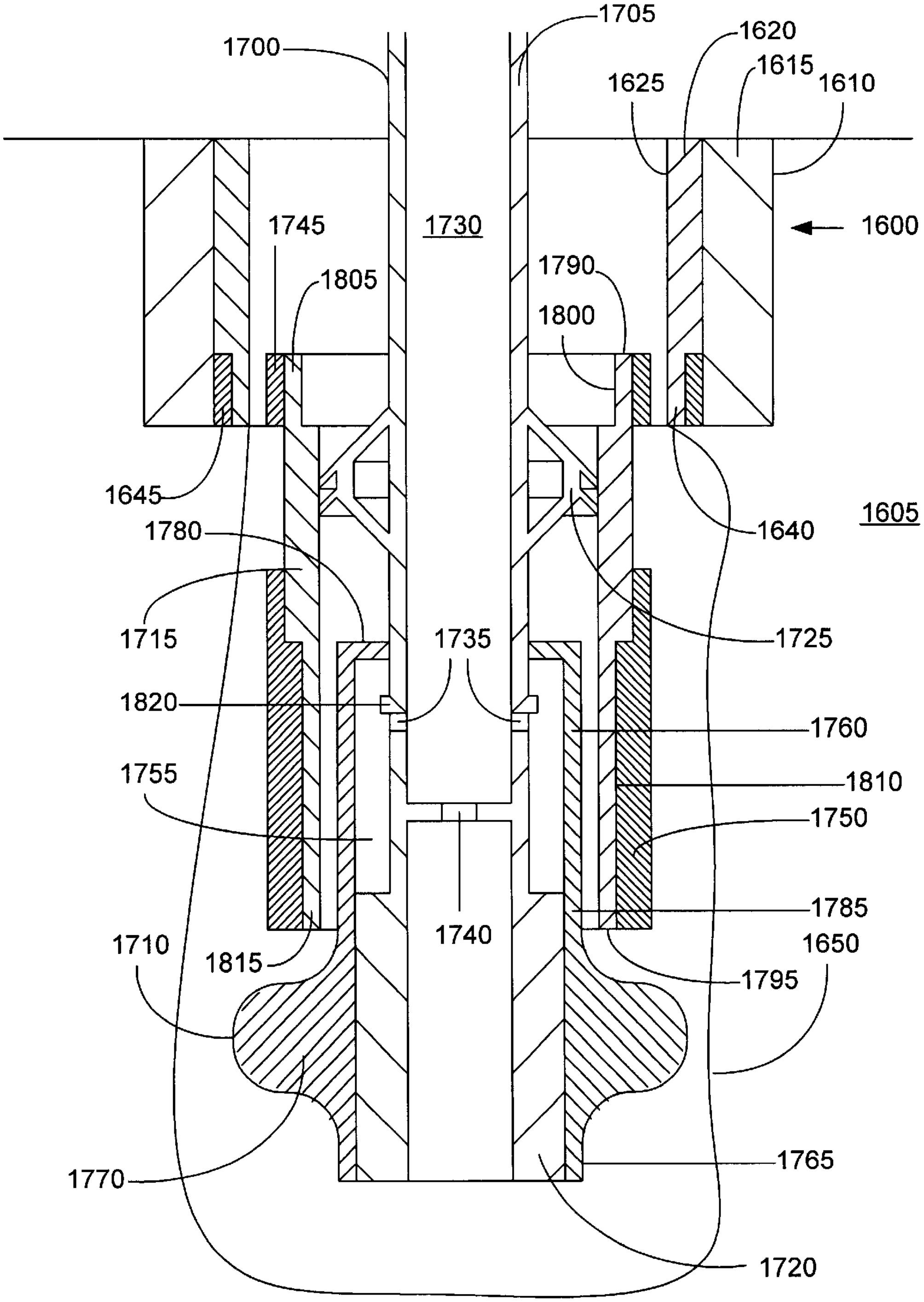
FIG. 14*c* is another illustration of the formation of the mono-diameter wellbore casing.

As illustrated in FIG. 14*c*, a preferred embodiment of an apparatus 1700 for forming a mono-diameter wellbore casing in a subterranean formation is then positioned in the new section 1650 of the wellbore 1600. The apparatus 1700 preferably includes a support member 1705, an expandable mandrel or pig 1710, a tubular member 1715, a shoe 1720, slips 1725, a fluid passage 1730, one or more fluid passages 1735, a fluid passage 1740, a first compressible annular body 1745, a second compressible annular body 1750, and a pressure chamber 1755.

The support member 1705 supports the apparatus 1700 within the wellbore 1600. The support member 1705 is coupled to the mandrel 1710, the tubular member 1715, the shoe 1720, and the slips 1725. The support member 1075 preferably comprises a substantially hollow tubular member. The fluid passage 1730 is positioned within the support member 1705. The fluid passages 1735 fluidicly couple the fluid passage 1730 with the pressure chamber 1755. The fluid passage 1740 fluidicly couples the fluid passage 1730 with the region outside of the apparatus 1700.

The support member 1705 may be fabricated from any number of conventional commercially available materials such as, for example, oilfield country tubular goods, stainless steel, low alloy steel, carbon steel, 13 chromium steel, fiberglass, or other high strength materials. In a preferred embodiment, the support member 1705 is fabricated from oilfield country tubular goods available from various foreign and domestic steel mills in order to optimally provide operational strength and facilitate the use of other standard oil exploration handling equipment. In a preferred embodiment, at least a portion of the support member 1705 comprises coiled tubing or a drill pipe. In a particularly preferred embodiment, the support member 1705 includes a load shoulder 1820 for supporting the mandrel 1710 when the pressure chamber 1755 is unpressurized.

The mandrel 1710 is supported by and slidingly coupled to the support member 1705 and the shoe 1720. The mandrel 1710 preferably includes an upper portion 1760 and a lower portion 1765. Preferably, the upper portion 1760 of the mandrel 1710 and the support member 1705 together define the pressure chamber 1755. Preferably, the lower portion 1765 of the mandrel 1710 includes an expansion member 1770 for radially expanding the tubular member 1715.

In a preferred embodiment, the upper portion 1760 of the mandrel 1710 includes a tubular member 1775 having an inner diameter greater than an outer diameter of the support member 1705. In this manner, an annular pressure chamber 1755 is defined by and positioned between the tubular member 1775 and the support member 1705. The top 1780 of the tubular member 1775 preferably includes a bearing and a seal for sealing and supporting the top 1780 of the tubular member 1775 against the outer surface of the support member 1705. The bottom 1785 of the tubular member 1775 preferably includes a bearing and seal for sealing and supporting the bottom 1785 of the tubular member 1775 against the outer surface of the support member 1705 or shoe 1720. In this manner, the mandrel 1710 moves in an axial direction upon the pressurization of the pressure chamber 1755.

The lower portion 1765 of the mandrel 1710 preferably includes an expansion member 1770 for radially expanding the tubular member 1715 during the pressurization of the pressure chamber 1755. In a preferred embodiment, the expansion member is expandible in the radial direction. In a preferred embodiment, the inner surface of the lower portion 1765 of the mandrel 1710 mates with and slides with respect to the outer surface of the shoe 1720. The outer diameter of the expansion member 1770 may range from about 90 to 100% of the inner diameter of the tubular casing 1620. In a preferred embodiment, the outer diameter of the expansion member 1770 ranges from about 95 to 99% of the inner diameter of the tubular casing 1620. The expansion member 1770 may be fabricated from any number of conventional commercially available materials such as, for example, machine tool steel, ceramics, tungsten carbide, titanium or other high strength alloys.

In a preferred embodiment, the expansion member 1770 is fabricated from D2 machine tool steel in order to optimally provide high strength and abrasion resistance.

The tubular member 1715 is coupled to and supported by the support member 1705 and slips 1725. The tubular member 1715 includes an upper portion 1790 and a lower portion 1795.

The upper portion 1790 of the tubular member 1715 preferably includes an inner annular recess 1800 that extends from the upper portion 1790 of the tubular member 1715. In this manner, at least a portion of the upper portion 1790 of the tubular member 1715 includes a thin walled section 1805. The first compressible annular member 1745 is preferably coupled to and supported by the outer surface of the upper portion 1790 of the tubular member 1715 in opposing relation to the thin wall section 1805.

The lower portion 1795 of the tubular member 1715 preferably includes an outer annular recess 1810 that extends from the lower portion 1790 of the tubular member 1715. In this manner, at least a portion of the lower portion 1795 of the tubular member 1715 includes a thin walled section 1815. The second compressible annular member 1750 is coupled to and at least partially supported within the outer annular recess 1810 of the upper portion 1790 of the tubular member 1715 in opposing relation to the thin wall section 1815.

The tubular member 1715 may be fabricated from any number of conventional commercially available materials such as, for example, oilfield country tubular goods, stainless steel, low alloy steel, carbon steel, automotive grade steel, fiberglass, 13 chrome steel, other high strength material, or high strength plastics. In a preferred embodiment, the tubular member 1715 is fabricated from oilfield country tubular goods available from various foreign and domestic steel mills in order to optimally provide operational strength.

The shoe 1720 is supported by and coupled to the support member 1705. The shoe 1720 preferably comprises a substantially hollow tubular member. In a preferred embodiment, the wall thickness of the shoe 1720 is greater than the wall thickness of the support member 1705 in order to optimally provide increased radial support to the mandrel 1710. The shoe 1720 may be fabricated from any number of conventional commercially available materials such as, for example, oilfield country tubular goods, stainless steel, automotive grade steel, low alloy steel, carbon steel, or high strength plastics. In a preferred embodiment, the shoe 1720 is fabricated from oilfield country tubular goods available from various foreign and domestic steel mills in order to optimally provide matching operational strength throughout the apparatus.

The slips 1725 are coupled to and supported by the support member 1705. The slips 1725 removably support the tubular member 1715. In this manner, during the radial expansion of the tubular member 1715, the slips 1725 help to maintain the tubular member 1715 in a substantially stationary position by preventing upward movement of the tubular member 1715.

The slips 1725 may comprise any number of conventional commercially available slips such as, for example, RTTS packer tungsten carbide mechanical slips, RTTS packer wicker type mechanical slips, or Model 3L retrievable bridge plug tungsten carbide upper mechanical slips. In a preferred embodiment, the slips 1725 comprise RTTS packer tungsten carbide mechanical slips available from Halliburton Energy Services. In a preferred embodiment, the slips 1725 are adapted to support axial forces ranging from about 0 to 750,000 lbf.

The fluid passage 1730 conveys fluidic materials from a surface location into the interior of the support member 1705, the pressure chamber 1755, and the region exterior of the apparatus 1700. The fluid passage 1730 is fludicly coupled to the pressure chamber 1755 by the fluid passages 1735. The fluid passage 1730 is fluidicly coupled to the region exterior to the apparatus 1700 by the fluid passage 1740.

In a preferred embodiment, the fluid passage 1730 is adapted to convey fluidic materials such as, for example, cement, epoxy, drilling muds, slag mix, water or drilling gasses. In a preferred embodiment, the fluid passage 1730 is adapted to convey fluidic materials at flow rate and pressures ranging from about 0 to 3,000 gallons/minute and 0 to 9,000 psi. in order to optimally provide flow rates and operational pressures for the radial expansion processes.

The fluid passages 1735 convey fluidic material from the fluid passage 1730 to the pressure chamber 1755. In a preferred embodiment, the fluid passage 1735 is adapted to convey fluidic materials such as, for example, cement, epoxy, drilling muds, water or drilling gasses. In a preferred embodiment, the fluid passage 1735 is adapted to convey fluidic materials at flow rate and pressures ranging from about 0 to 500 gallons/minute and 0 to 9,000 psi. in order to optimally provide operating pressures and flow rates for the various expansion processes.

The fluid passage 1740 conveys fluidic materials from the fluid passage 1730 to the region exterior to the apparatus 1700. In a preferred embodiment, the fluid passage 1740 is adapted to convey fluidic materials such as, for example, cement, epoxy, drilling muds, water or drilling gasses. In a preferred embodiment, the fluid passage 1740 is adapted to convey fluidic materials at flow rate and pressures ranging from about 0 to 3,000 gallons/minute and 0 to 9,000 psi. in order to optimally provide operating pressures and flow rates for the various radial expansion processes.

In a preferred embodiment, the fluid passage 1740 is adapted to receive a plug or other similar device for sealing the fluid passage 1740. In this manner, the pressure chamber 1755 may be pressurized.

The first compressible annular body 1745 is coupled to and supported by an exterior surface of the upper portion 1790 of the tubular member 1715. In a preferred embodiment, the first compressible annular body 1745 is positioned in opposing relation to the thin walled section 1805 of the tubular member 1715.

The first compressible annular body 1745 helps to minimize the radial force required to expand the tubular member 1715 in the overlap with the tubular casing 1620, helps to create a fluidic seal in the overlap with the tubular casing 1620, and helps to create an interference fit sufficient to permit the tubular member 1715 to be supported by the tubular casing 1620. The first compressible annular body 1745 may comprise any number of commercially available compressible materials such as, for example, epoxy, rubber, Teflon, plastics, or hollow lead tubes. In a preferred embodiment, the first compressible annular body 1745 comprises StrataLock epoxy available from Halliburton Energy Services in order to optimally provide an hydraulic seal, and compressibility to minimize the radial expansion force.

The wall thickness of the first compressible annular body 1745 may range from about 0.05 to 0.75 inches. In a preferred embodiment, the wall thickness of the first compressible annular body 1745 ranges from about 0.1 to 0.5 inches in order to optimally (1) provide a large compressible zone, (2) minimize the required radial expansion force, (3) transfer the radial force to the tubular casings. As a result, in a preferred embodiment, overall the outer diameter of the tubular member 1715 is approximately equal to the overall inner diameter of the tubular member 1620.

The second compressible annular body 1750 is coupled to and at least partially supported within the outer annular recess 1810 of the tubular member 1715. In a preferred embodiment, the second compressible annular body 1750 is positioned in opposing relation to the thin walled section 1815 of the tubular member 1715.

The second compressible annular body 1750 helps to minimize the radial force required to expand the tubular member 1715 in the overlap with another tubular member, helps to create a fluidic seal in the overlap of the tubular member 1715 with another tubular member, and helps to create an interference fit sufficient to permit another tubular member to be supported by the tubular member 1715. The second compressible annular body 1750 may comprise any number of commercially available compressible materials such as, for example, epoxy, rubber, Teflon, plastics or hollow lead tubing. In a preferred embodiment, the first compressible annular body 1750 comprises StrataLock epoxy available from Halliburton Energy Services in order to optimally provide an hydraulic seal in the overlapped joint, and compressibility that minimizes the radial expansion force.

The wall thickness of the second compressible annular body 1750 may range from about 0.05 to 0.75 inches. In a preferred embodiment, the wall thickness of the second compressible annular body 1750 ranges from about 0.1 to 0.5 inches in order to optimally provide a large compressible zone, and minimize the radial force required to expand the tubular member 1715 during subsequent radial expansion operations.

In an alternative embodiment, the outside diameter of the second compressible annular body 1750 is adapted to provide a seal against the surrounding formation thereby eliminating the need for an outer annular body of cement.

The pressure chamber 1755 is fludicly coupled to the fluid passage 1730 by the fluid passages 1735. The pressure chamber 1755 is preferably adapted to receive fluidic materials such as, for example, drilling muds, water or drilling gases. In a preferred embodiment, the pressure chamber 1755 is adapted to receive fluidic materials at flow rate and pressures ranging from about 0 to 500 gallons/minute and 0 to 9,000 psi. in order to optimally provide expansion pressure. In a preferred embodiment, during pressurization of the pressure chamber 1755, the operating pressure of the pressure chamber ranges from about 0 to 5,000 psi in order to optimally provide expansion pressure while minimizing the possibility of a catastrophic failure due to over pressurization.

Figure 14D:
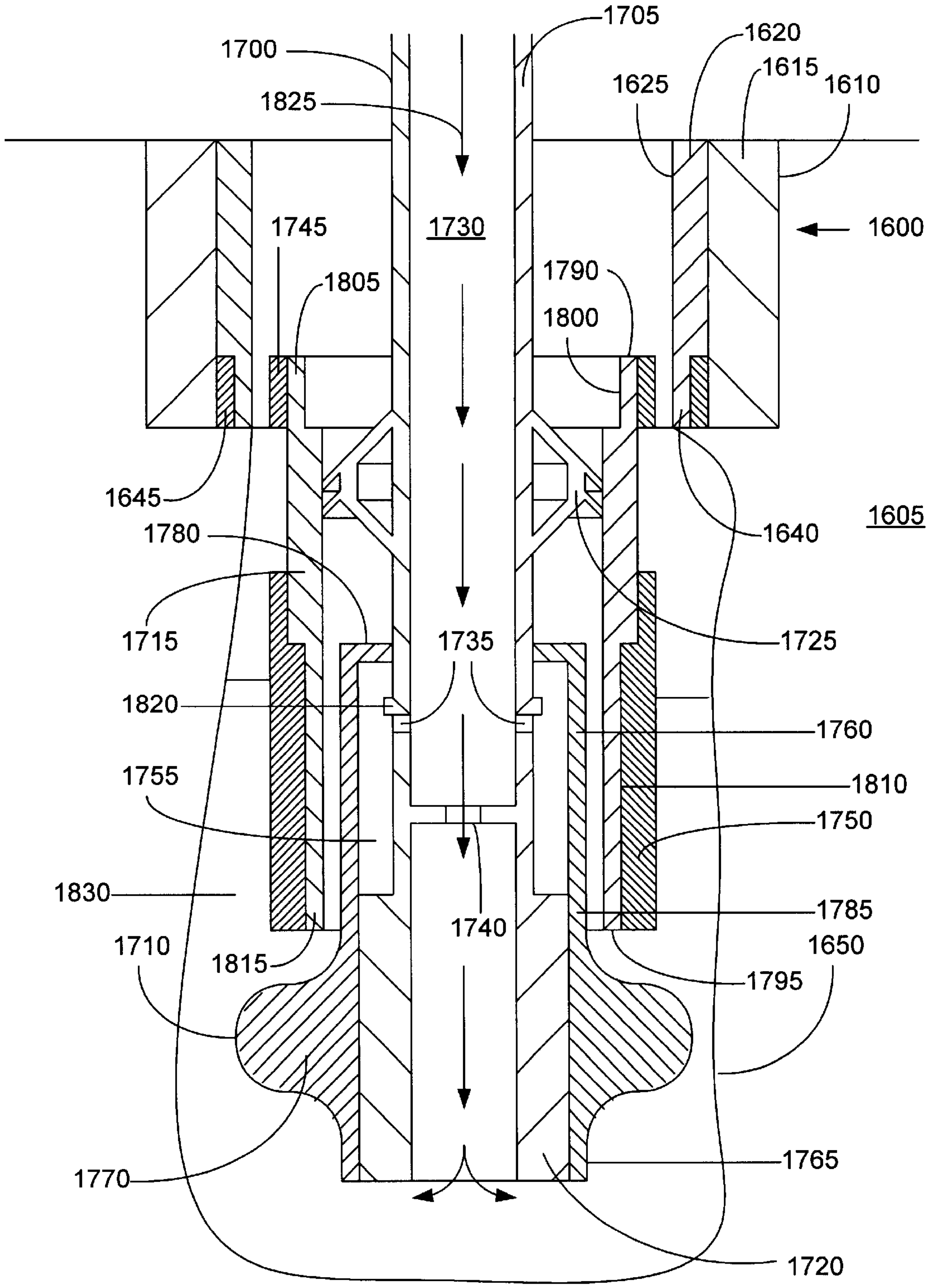
FIG. 14*d* is another illustration of the formation of the mono-diameter wellbore casing.

As illustrated in FIG. 14*d*, the apparatus 1700 is preferably positioned in the wellbore 1600 with the tubular member 1715 positioned in an overlapping relationship with the tubular casing 1620. In a particularly preferred embodiment, the thin wall sections, 1640 and 1805, of the tubular casing 1620 and tubular member 1725 are positioned in opposing overlapping relation. In this manner, the radial expansion of the tubular member 1725 will compress the thin wall sections, 1640 and 1805, and annular compressible members, 1645 and 1745, into intimate contact.

After positioning of the apparatus 1700, a fluidic material 1825 is then pumped into the fluid passage 1730. The fluidic material 1825 may comprise any number of conventional commercially available materials such as, for example, water, drilling mud, drilling gases, cement or epoxy. In a preferred embodiment, the fluidic material 1825 comprises a hardenable fluidic sealing material such as, for example, cement in order to provide an outer annular body around the expanded tubular member 1715.

The fluidic material 1825 may be pumped into the fluid passage 1730 at operating pressures and flow rates, for example, ranging from about 0 to 9,000 psi and 0 to 3,000 gallons/minute.

The fluidic material 1825 pumped into the fluid passage 1730 passes through the fluid passage 1740 and outside of the apparatus 1700. The fluidic material 1825 fills the annular region 1830 between the outside of the apparatus 1700 and the interior walls of the wellbore 1600.

Figure 14E:
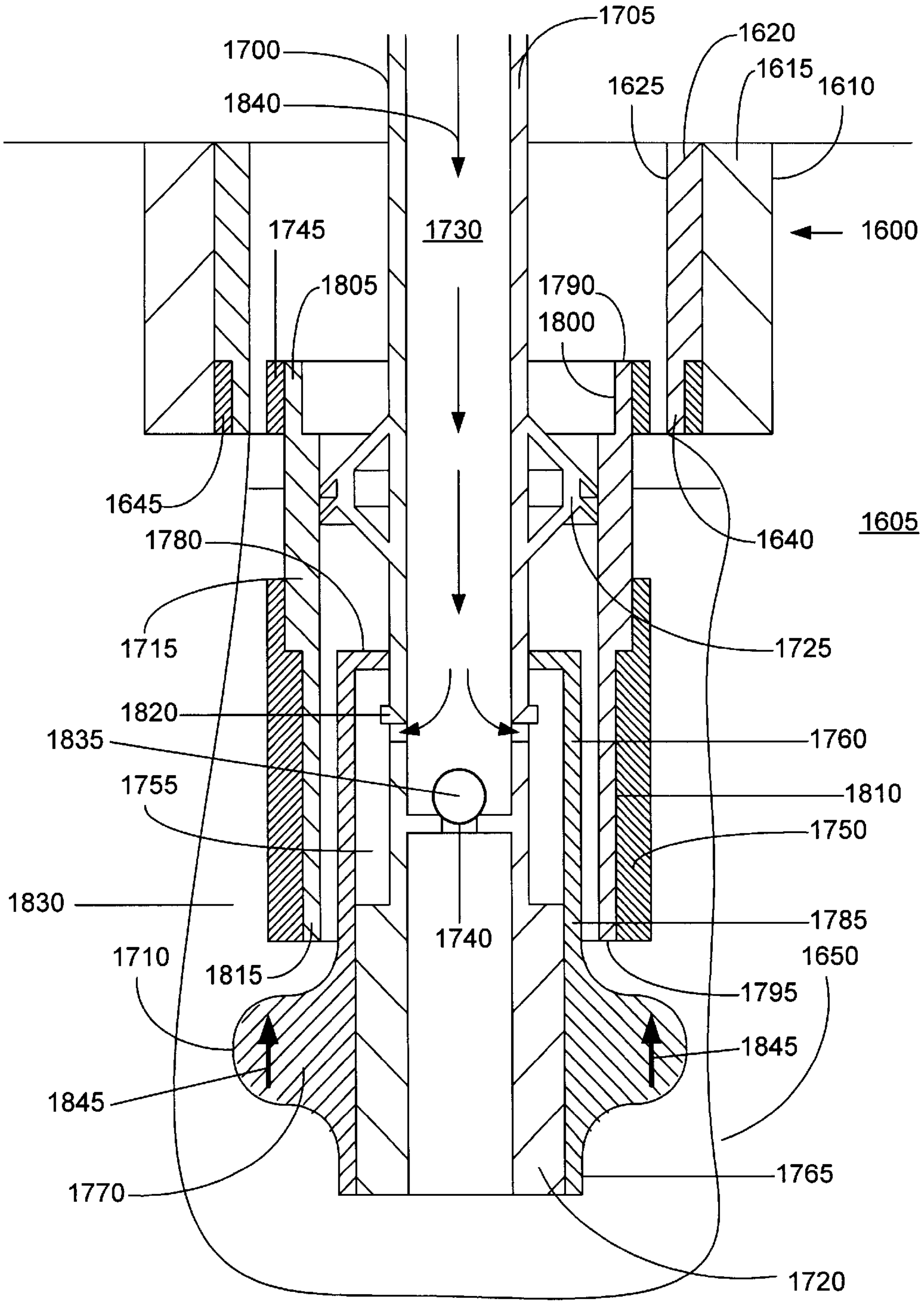
FIG. 14*e* is another illustration of the formation of the mono-diameter wellbore casing.

As illustrated in FIG. 14*e*, a plug 1835 is then introduced into the fluid passage 1730. The plug 1835 lodges in the inlet to the fluid passage 1740 fluidicly isolating and blocking off the fluid passage 1730.

A fluidic material 1840 is then pumped into the fluid passage 1730. The fluidic material 1840 may comprise any number of conventional commercially available materials such as, for example, water, drilling mud or drilling gases. In a preferred embodiment, the fluidic material 1825 comprises a non-hardenable fluidic material such as, for example, drilling mud or drilling gases in order to optimally provide pressurization of the pressure chamber 1755.

The fluidic material 1840 may be pumped into the fluid passage 1730 at operating pressures and flow rates ranging, for example, from about 0 to 9,000 psi and 0 to 500 gallons/minute. In a preferred embodiment, the fluidic material 1840 is pumped into the fluid passage 1730 at operating pressures and flow rates ranging from about 500 to 5,000 psi and 0 to 500 gallons/minute in order to optimally provide operating pressures and flow rates for radial expansion.

The fluidic material 1840 pumped into the fluid passage 1730 passes through the fluid passages 1735 and into the pressure chamber 1755. Continued pumping of the fluidic material 1840 pressurizes the pressure chamber 1755. The pressurization of the pressure chamber 1755 causes the mandrel 1710 to move relative to the support member 1705 in the direction indicated by the arrows 1845. In this manner, the mandrel 1710 will cause the tubular member 1715 to expand in the radial direction.

During the radial expansion process, the tubular member 1715 is prevented from moving in an upward direction by the slips 1725. A length of the tubular member 1715 is then expanded in the radial direction through the pressurization of the pressure chamber 1755. The length of the tubular member 1715 that is expanded during the expansion process will be proportional to the stroke length of the mandrel 1710. Upon the completion of a stroke, the operating pressure of the pressure chamber 1755 is then reduced and the mandrel 1710 drops to it rest position with the tubular member 1715 supported by the mandrel 1715. The position of the support member 1705 may be adjusted throughout the radial expansion process in order to maintain the overlapping relationship between the thin walled sections, 1640 and 1805, of the tubular casing 1620 and tubular member 1715. The stroking of the mandrel 1710 is then repeated, as necessary, until the thin walled section 1805 of the tubular member 1715 is expanded into the thin walled section 1640 of the tubular casing 1620.

In a preferred embodiment, during the final stroke of the mandrel 1710, the slips 1725 are positioned as close as possible to the thin walled section 1805 of the tubular member 1715 in order minimize slippage between the tubular member 1715 and tubular casing 1620 at the end of the radial expansion process. Alternatively, or in addition, the outside diameter of the first compressive annular member 1745 is selected to ensure sufficient interference fit with the tubular casing 1620 to prevent axial displacement of the tubular member 1715 during the final stroke. Alternatively, or in addition, the outside diameter of the second compressive annular body 1750 is large enough to provide an interference fit with the inside walls of the wellbore 1600 at an earlier point in the radial expansion process so as to prevent further axial displacement of the tubular member 1715. In this final alternative, the interference fit is preferably selected to permit expansion of the tubular member 1715 by pulling the mandrel 1710 out of the wellbore 1600, without having to pressurize the pressure chamber 1755.

During the radial expansion process, the pressurized areas of the apparatus 1700 are limited to the fluid passages 1730 within the support member 1705 and the pressure chamber 1755 within the mandrel 1710. No fluid pressure acts directly on the tubular member 1715. This permits the use of operating pressures higher than the tubular member 1715 could normally withstand.

Once the tubular member 1715 has been completely expanded off of the mandrel 1710, the support member 1705 and mandrel 1710 are removed from the wellbore 1600. In a preferred embodiment, the contact pressure between the deformed thin wall sections, 1640 and 1805, and compressible annular members, 1645 and 1745, ranges from about 400 to 10,000 psi in order to optimally support the tubular member 1715 using the tubular casing 1620.

In this manner, the tubular member 1715 is radially expanded into contact with the tubular casing 1620 by pressurizing the interior of the fluid passage 1730 and the pressure chamber 1755.

Figure 14F:
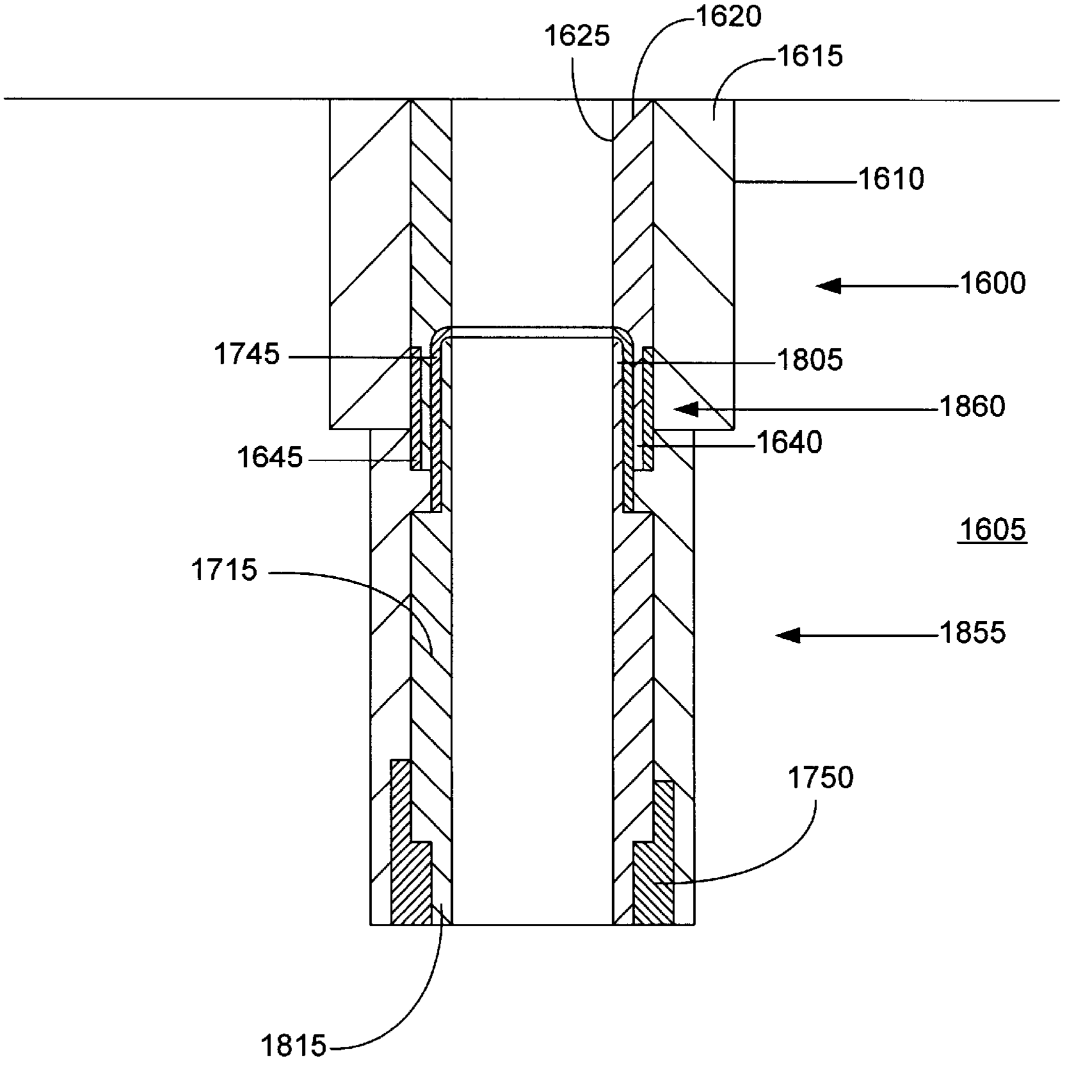
FIG. 14*f* is another illustration of the formation of the mono-diameter wellbore casing.

As illustrated in FIG. 14*f*, in a preferred embodiment, once the tubular member 1715 is completely expanded in the radial direction by the mandrel 1710, the support member 1705 and mandrel 1710 are removed from the wellbore 1600. In a preferred embodiment, the annular body of hardenable fluidic material is then allowed to cure to form a rigid outer annular body 1850. In the case where the tubular member 1715 is slotted, the hardenable fluidic material will preferably permeate and envelop the expanded tubular member 1715.

The resulting new section of wellbore casing 1855 includes the expanded tubular member 1715 and the rigid outer annular body 1850. The overlapping joint 1860 between the tubular casing 1620 and the expanded tubular member 1715 includes the deformed thin wall sections, 1640 and 1805, and the compressible annular bodies, 1645 and 1745. The inner diameter of the resulting combined wellbore casings is substantially constant. In this manner, a mono-diameter wellbore casing is formed. This process of expanding overlapping tubular members having thin wall end portions with compressible annular bodies into contact can be repeated for the entire length of a wellbore. In this manner, a mono-diameter wellbore casing can be provided for thousands of feet in a subterranean formation.

Figure 15:
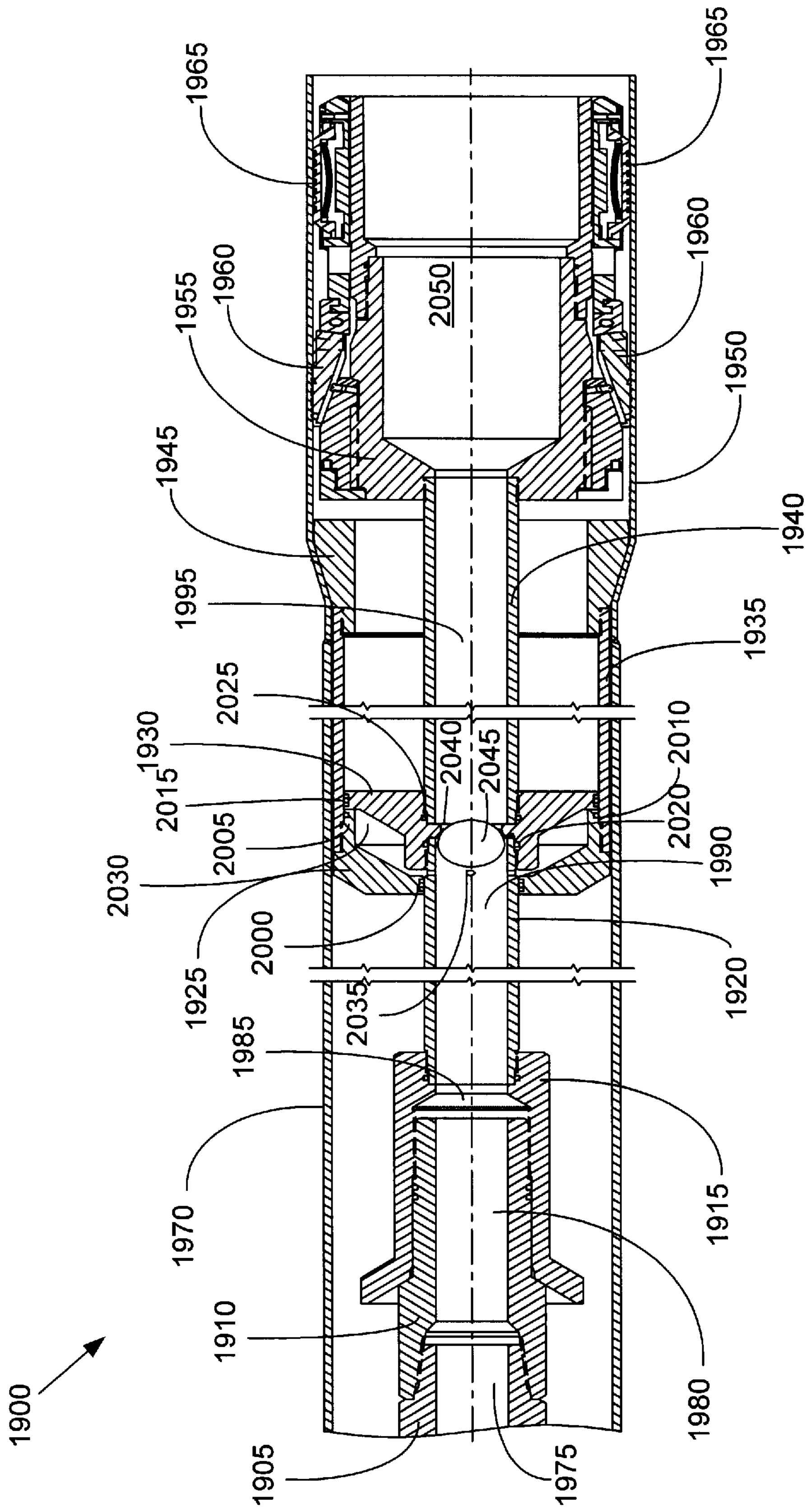
FIG. 15 is an illustration of an embodiment of an apparatus for expanding a tubular member.
Figure 15A:
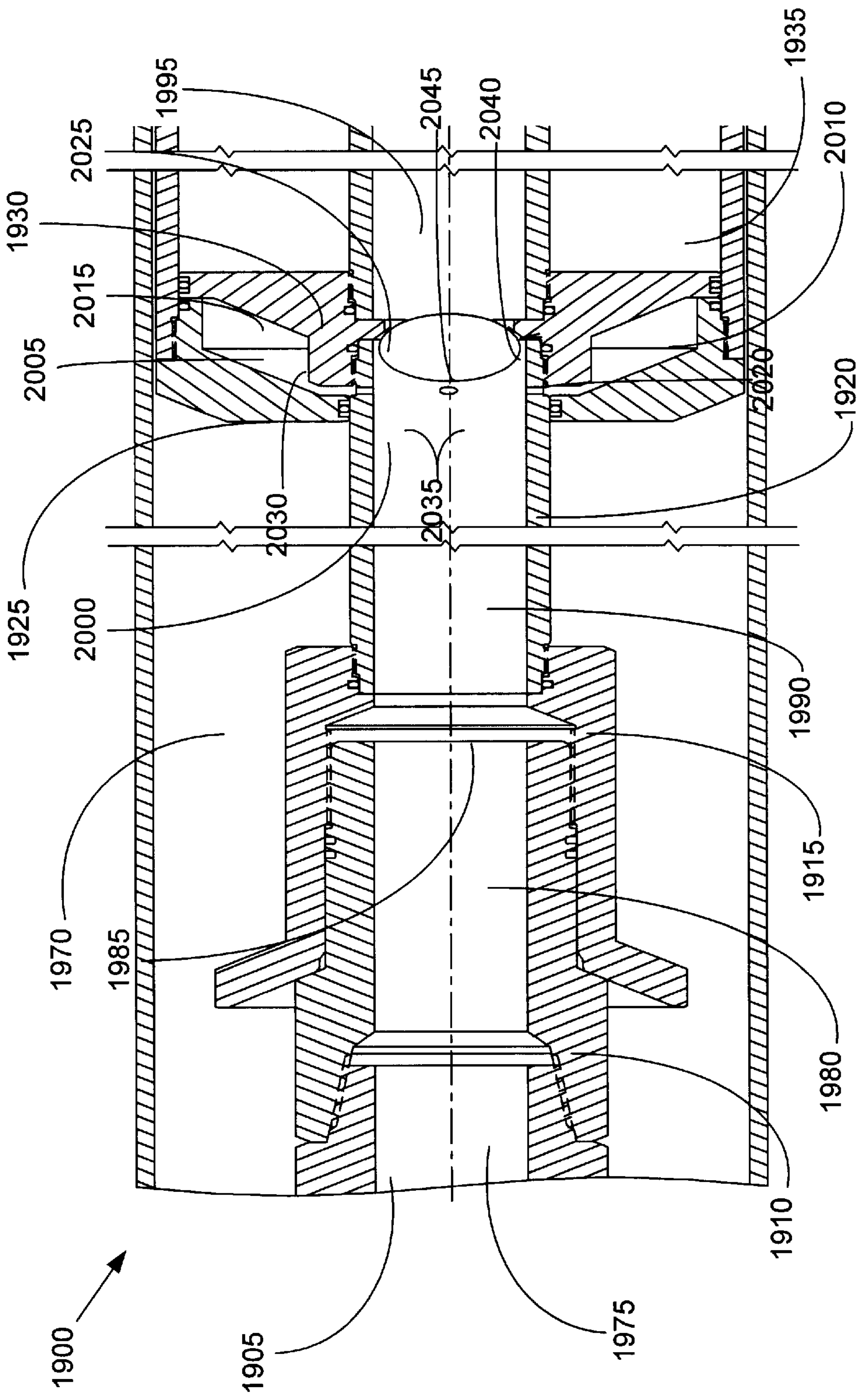
FIG. 15*a* is another illustration of the apparatus of FIG. 15.
Figure 15B:
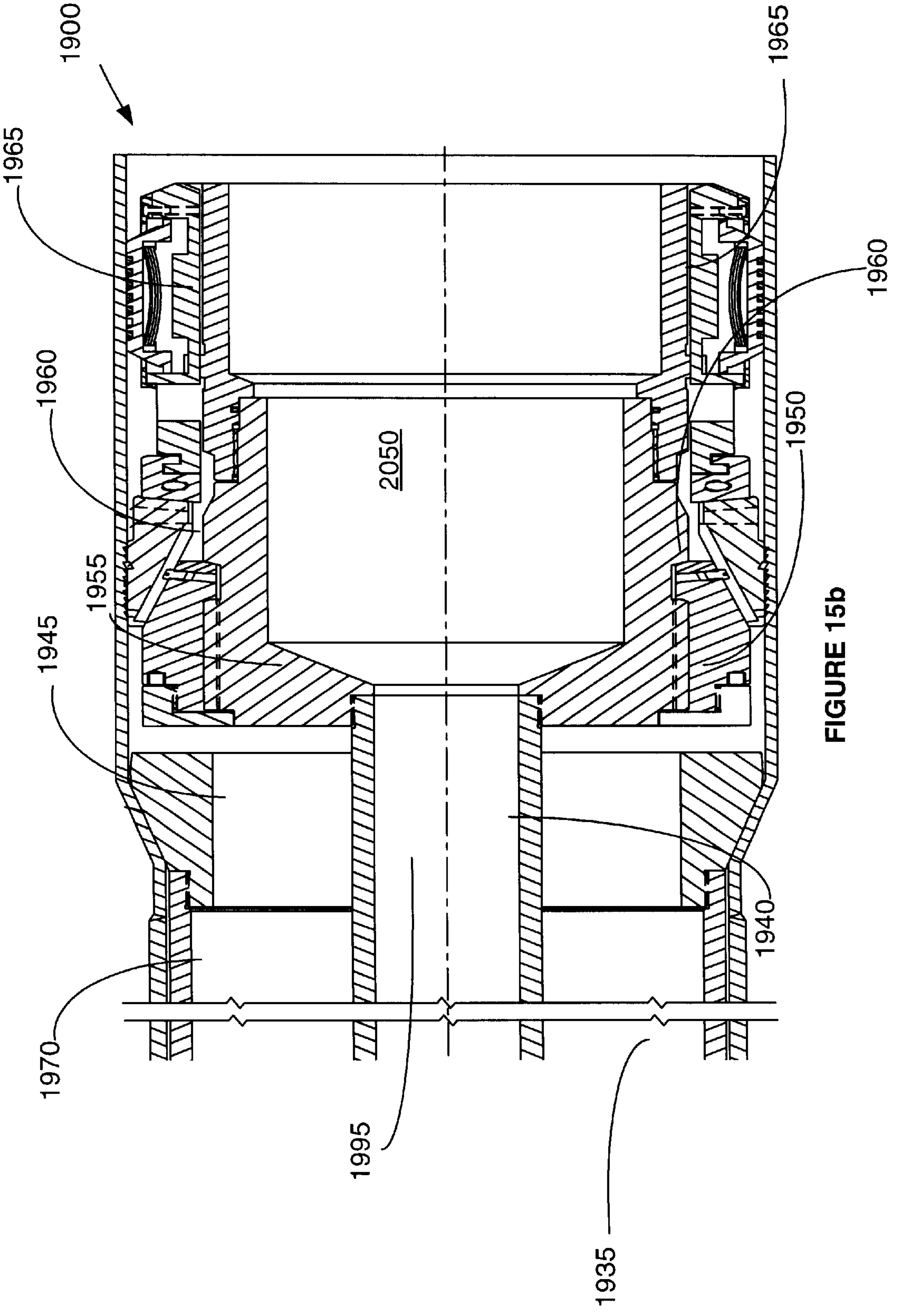
FIG. 15*b* is another illustration of the apparatus of FIG. 15.

Referring now to FIGS. 15, 15*a* and 15*b*, an embodiment of an apparatus 1900 for expanding a tubular member will be described. The apparatus 1900 preferably includes a drillpipe 1905, an innerstring adapter 1910, a sealing sleeve 1915, an inner sealing mandrel 1920, an upper sealing head 1925, a lower sealing head 1930, an outer sealing mandrel 1935, a load mandrel 1940, an expansion cone 1945, a mandrel launcher 1950, a mechanical slip body 1955, mechanical slips 1960, drag blocks 1965, casing 1970, and fluid passages 1975, 1980, 1985, and 1990.

The drillpipe 1905 is coupled to the innerstring adapter 1910. During operation of the apparatus 1900, the drillpipe 1905 supports the apparatus 1900. The drillpipe 1905 preferably comprises a substantially hollow tubular member or members. The drillpipe 1905 may be fabricated from any number of conventional commercially available materials such as, for example, oilfield country tubular drillpipe, fiberglass or coiled tubing. In a preferred embodiment, the drillpipe 1905 is fabricated from coiled tubing in order to faciliate the placement of the apparatus 1900 in non-vertical wellbores. The drillpipe 1905 may be coupled to the innerstring adapter 1910 using any number of conventional commercially available mechanical couplings such as, for example, drillpipe connectors, OCTG specialty type box and pin connectors, a ratchet-latch type connector or a standard box by pin connector. In a preferred embodiment, the drillpipe 1905 is removably coupled to the innerstring adapter 1910 by a drillpipe connection.

The drillpipe 1905 preferably includes a fluid passage 1975 that is adapted to convey fluidic materials from a surface location into the fluid passage 1980. In a preferred embodiment, the fluid passage 1975 is adapted to convey fluidic materials such as, for example, cement, drilling mud, epoxy or lubricants at operating pressures and flow rates ranging from about 0 to 9,000 psi and 0 to 3,000 gallons/minute.

The innerstring adapter 1910 is coupled to the drill string 1905 and the sealing sleeve 1915. The innerstring adapter 1910 preferably comprises a substantially hollow tubular member or members. The innerstring adapter 1910 may be fabricated from any number of conventional commercially available materials such as, for example, oil country tubular goods, low alloy steel, carbon steel, stainless steel or other high strength materials. In a preferred embodiment, the innerstring adapter 1910 is fabricated from oilfield country tubular goods in order to optimally provide mechanical properties that closely match those of the drill string 1905.

The innerstring adapter 1910 may be coupled to the drill string 1905 using any number of conventional commercially available mechanical couplings such as, for example, drillpipe connectors, oilfield country tubular goods specialty type threaded connectors, ratchet-latch type stab in connector, or a standard threaded connection. In a preferred embodiment, the innerstring adapter 1910 is removably coupled to the drill pipe 1905 by a drillpipe connection. The innerstring adapter 1910 may be coupled to the sealing sleeve 1915 using any number of conventional commercially available mechanical couplings such as, for example, drillpipe connection, oilfield country tubular goods specialty type threaded connector, ratchet-latch type stab in connectors, or a standard threaded connection. In a preferred embodiment, the innerstring adapter 1910 is removably coupled to the sealing sleeve 1915 by a standard threaded connection.

The innerstring adapter 1910 preferably includes a fluid passage 1980 that is adapted to convey fluidic materials from the fluid passage 1975 into the fluid passage 1985. In a preferred embodiment, the fluid passage 1980 is adapted to convey fluidic materials such as, for example, cement, drilling mud, epoxy, or lubricants at operating pressures and flow rates ranging from about 0 to 9,000 psi and 0 to 3,000 gallons/minute.

The sealing sleeve 1915 is coupled to the innerstring adapter 1910 and the inner sealing mandrel 1920. The sealing sleeve 1915 preferably comprises a substantially hollow tubular member or members. The sealing sleeve 1915 may be fabricated from any number of conventional commercially available materials such as, for example, oilfield country tubular goods, carbon steel, low alloy steel, stainless steel or other high strength materials. In a preferred embodiment, the sealing sleeve 1915 is fabricated from oilfield country tubular goods in order to optimally provide mechanical properties that substantially match the remaining components of the apparatus 1900.

The sealing sleeve 1915 may be coupled to the innerstring adapter 1910 using any number of conventional commercially available mechanical couplings such as, for example, drillpipe connection, oilfield country tubular goods specialty type threaded connection, ratchet-latch type stab in connection, or a standard threaded connection. In a preferred embodiment, the sealing sleeve 1915 is removably coupled to the innerstring adapter 1910 by a standard threaded connection. The sealing sleeve 1915 may be coupled to the inner sealing mandrel 1920 using any number of conventional commercially available mechanical couplings such as, for example, drillpipe connection, oilfield country tubular goods specialty type threaded connection, or a standard threaded connection. In a preferred embodiment, the sealing sleeve 1915 is removably coupled to the inner sealing mandrel 1920 by a standard threaded connection.

The sealing sleeve 1915 preferably includes a fluid passage 1985 that is adapted to convey fluidic materials from the fluid passage 1980 into the fluid passage 1990. In a preferred embodiment, the fluid passage 1985 is adapted to convey fluidic materials such as, for example, cement, drilling mud, epoxy or lubricants at operating pressures and flow rates ranging from about 0 to 9,000 psi and 0 to 3,000 gallons/minute.

The inner sealing mandrel 1920 is coupled to the sealing sleeve 1915 and the lower sealing head 1930. The inner sealing mandrel 1920 preferably comprises a substantially hollow tubular member or members. The inner sealing mandrel 1920 may be fabricated from any number of conventional commercially available materials such as, for example, oilfield country tubular goods, stainless steel, low alloy steel, carbon steel or other similar high strength materials. In a preferred embodiment, the inner sealing mandrel 1920 is fabricated from stainless steel in order to optimally provide mechanical properties similar to the other components of the apparatus 1900 while also providing a smooth outer surface to support seals and other moving parts that can operate with minimal wear, corrosion and pitting.

The inner sealing mandrel 1920 may be coupled to the sealing sleeve 1915 using any number of conventional commercially available mechanical couplings such as, for example, drillpipe connection, oilfield country tubular goods specialty type threaded connection, or a standard threaded connection. In a preferred embodiment, the inner sealing mandrel 1920 is removably coupled to the sealing sleeve 1915 by a standard threaded connections. The inner sealing mandrel 1920 may be coupled to the lower sealing head 1930 using any number of conventional commercially available mechanical couplings such as, for example, drillpipe connection, oilfield country tubular goods specialty type threaded connection, ratchet latch type stab in connectors or standard threaded connections. In a preferred embodiment, the inner sealing mandrel 1920 is removably coupled to the lower sealing head 1930 by a standard threaded connections connection.

The inner sealing mandrel 1920 preferably includes a fluid passage 1990 that is adapted to convey fluidic materials from the fluid passage 1985 into the fluid passage 1995. In a preferred embodiment, the fluid passage 1990 is adapted to convey fluidic materials such as, for example, cement, drilling mud, epoxy or lubricants at operating pressures and flow rates ranging from about 0 to 9,000 psi and 0 to 3,000 gallons/minute.

The upper sealing head 1925 is coupled to the outer sealing mandrel 1935 and the expansion cone 1945. The upper sealing head 1925 is also movably coupled to the outer surface of the inner sealing mandrel 1920 and the inner surface of the casing 1970. In this manner, the upper sealing head 1925, outer sealing mandrel 1935, and the expansion cone 1945 reciprocate in the axial direction. The radial clearance between the inner cylindrical surface of the upper sealing head 1925 and the outer surface of the inner sealing mandrel 1920 may range, for example, from about 0.025 to 0.05 inches. In a preferred embodiment, the radial clearance between the inner cylindrical surface of the upper sealing head 1925 and the outer surface of the inner sealing mandrel 1920 ranges from about 0.005 to 0.01 inches in order to optimally provide clearance for pressure seal placement. The radial clearance between the outer cylindrical surface of the upper sealing head 1925 and the inner surface of the casing 1970 may range, for example, from about 0.025 to 0.375 inches. In a preferred embodiment, the radial clearance between the outer cylindrical surface of the upper sealing head 1925 and the inner surface of the casing 1970 ranges from about 0.025 to 0.125 inches in order to optimally provide stabilization for the expansion cone 1945 as the expansion cone 1945 is upwardly moved inside the casing 1970.

The upper sealing head 1925 preferably comprises an annular member having substantially cylindrical inner and outer surfaces. The upper sealing head 1925 may be fabricated from any number of conventional commercially available materials such as, for example, oilfield country tubular goods, stainless steel, machine tool steel, or similar high strength materials. In a preferred embodiment, the upper sealing head 1925 is fabricated from stainless steel in order to optimally provide high strength and smooth outer surfaces that are resistant to wear, galling, corrosion and pitting.

The inner surface of the upper sealing head 1925 preferably includes one or more annular sealing members 2000 for sealing the interface between the upper sealing head 1925 and the inner sealing mandrel 1920. The sealing members 2000 may comprise any number of conventional commercially available annular sealing members such as, for example, o-rings, polypak seals or metal spring energized seals. In a preferred embodiment, the sealing members 2000 comprise polypak seals available from Parker Seals in order to optimally provide sealing for a long axial motion.

In a preferred embodiment, the upper sealing head 1925 includes a shoulder 2005 for supporting the upper sealing head 1925 on the lower sealing head 1930.

The upper sealing head 1925 may be coupled to the outer sealing mandrel 1935 using any number of conventional commercially available mechanical couplings such as, for example, drillpipe connection, oilfield country tubular goods specialty type threaded connection, or a standard threaded connections. In a preferred embodiment, the upper sealing head 1925 is removably coupled to the outer sealing mandrel 1935 by a standard threaded connections. In a preferred embodiment, the mechanical coupling between the upper sealing head 1925 and the outer sealing mandrel 1935 includes one or more sealing members 2010 for fluidicly sealing the interface between the upper sealing head 1925 and the outer sealing mandrel 1935. The sealing members 2010 may comprise any number of conventional commercially available sealing members such as, for example, o-rings, polypak seals or metal spring energized seals. In a preferred embodiment, the sealing members 2010 comprise polypak seals available from Parker Seals in order to optimally provide sealing for a long axial stroking motion.

The lower sealing head 1930 is coupled to the inner sealing mandrel 1920 and the load mandrel 1940. The lower sealing head 1930 is also movably coupled to the inner surface of the outer sealing mandrel 1935. In this manner, the upper sealing head 1925 and outer sealing mandrel 1935 reciprocate in the axial direction. The radial clearance between the outer surface of the lower sealing head 1930 and the inner surface of the outer sealing mandrel 1935 may range, for example, from about 0.025 to 0.05 inches. In a preferred embodiment, the radial clearance between the outer surface of the lower sealing head 1930 and the inner surface of the outer sealing mandrel 1935 ranges from about 0.005 to 0.010 inches in order to optimally provide a close tolerance having room for the installation of pressure seal rings.

The lower sealing head 1930 preferably comprises an annular member having substantially cylindrical inner and outer surfaces. The lower sealing head 1930 may be fabricated from any number of conventional commercially available materials such as, for example, oilfield country tubular goods, stainless steel, machine tool steel or other similar high strength materials. In a preferred embodiment, the lower sealing head 1930 is fabricated from stainless steel in order to optimally provide high strength and resistance to wear, galling, corrosion, and pitting.

The outer surface of the lower sealing head 1930 preferably includes one or more annular sealing members 2015 for sealing the interface between the lower sealing head 1930 and the outer sealing mandrel 1935. The sealing members 2015 may comprise any number of conventional commercially available annular sealing members such as, for example, o-rings, polypak seals, or metal spring energized seals. In a preferred embodiment, the sealing members 2015 comprise polypak seals available from Parker Seals in order to optimally provide sealing for a long axial stroke.

The lower sealing head 1930 may be coupled to the inner sealing mandrel 1920 using any number of conventional commercially available mechanical couplings such as, for example, drillpipe connection, oilfield country tubular goods specialty type threaded connection, welding, amorphous bonding or a standard threaded connection. In a preferred embodiment, the lower sealing head 1930 is removably coupled to the inner sealing mandrel 1920 by a standard threaded connection.

In a preferred embodiment, the mechanical coupling between the lower sealing head 1930 and the inner sealing mandrel 1920 includes one or more sealing members 2020 for fluidicly sealing the interface between the lower sealing head 1930 and the inner sealing mandrel 1920. The sealing members 2020 may comprise any number of conventional commercially available sealing members such as, for example, o-rings, polypak seals, or metal spring energized seals. In a preferred embodiment, the sealing members 2020 comprise polypak seals available from Parker Seals in order to optimally provide sealing for a long axial motion.

The lower sealing head 1930 may be coupled to the load mandrel 1940 using any number of conventional commercially available mechanical couplings such as, for example, drillpipe connection, oilfield country tubular goods specialty type threaded connections, welding, amorphous bonding or a standard threaded connection. In a preferred embodiment, the lower sealing head 1930 is removably coupled to the load mandrel 1940 by a standard threaded connection. In a preferred embodiment, the mechanical coupling between the lower sealing head 1930 and the load mandrel 1940 includes one or more sealing members 2025 for fluidicly sealing the interface between the lower sealing head 1930 and the load mandrel 1940. The sealing members 2025 may comprise any number of conventional commercially available sealing members such as, for example, o-rings, polypak seals, or metal spring energized seals. In a preferred embodiment, the sealing members 2025 comprise polypak seals available from Parker Seals in order to optimally provide sealing for a long axial stroke.

In a preferred embodiment, the lower sealing head 1930 includes a throat passage 2040 fluidicly coupled between the fluid passages 1990 and 1995. The throat passage 2040 is preferably of reduced size and is adapted to receive and engage with a plug 2045, or other similar device. In this manner, the fluid passage 1990 is fluidicly isolated from the fluid passage 1995. In this manner, the pressure chamber 2030 is pressurized.

The outer sealing mandrel 1935 is coupled to the upper sealing head 1925 and the expansion cone 1945. The outer sealing mandrel 1935 is also movably coupled to the inner surface of the casing 1970 and the outer surface of the lower sealing head 1930. In this manner, the upper sealing head 1925, outer sealing mandrel 1935, and the expansion cone 1945 reciprocate in the axial direction. The radial clearance between the outer surface of the outer sealing mandrel 1935 and the inner surface of the casing 1970 may range, for example, from about 0.025 to 0.375 inches. In a preferred embodiment, the radial clearance between the outer surface of the outer sealing mandrel 1935 and the inner surface of the casing 1970 ranges from about 0.025 to 0.125 inches in order to optimally provide maximum piston surface area to maximize the radial expansion force. The radial clearance between the inner surface of the outer sealing mandrel 1935 and the outer surface of the lower sealing head 1930 may range, for example, from about 0.025 to 0.05 inches. In a preferred embodiment, the radial clearance between the inner surface of the outer sealing mandrel 1935 and the outer surface of the lower sealing head 1930 ranges from about 0.005 to 0.010 inches in order to optimally provide a minimum gap for the sealing elements to bridge and seal.

The outer sealing mandrel 1935 preferably comprises an annular member having substantially cylindrical inner and outer surfaces. The outer sealing mandrel 1935 may be fabricated from any number of conventional commercially available materials such as, for example, low alloy steel, carbon steel, 13 chromium steel or stainless steel. In a preferred embodiment, the outer sealing mandrel 1935 is fabricated from stainless steel in order to optimally provide maximum strength and minimum wall thickness while also providing resistance to corrosion, galling and pitting.

The outer sealing mandrel 1935 may be coupled to the upper sealing head 1925 using any number of conventional commercially available mechanical couplings such as, for example, drillpipe connection, oilfield country tubular goods specialty type threaded connection, standard threaded connections, or welding. In a preferred embodiment, the outer sealing mandrel 1935 is removably coupled to the upper sealing head 1925 by a standard threaded connections connection. The outer sealing mandrel 1935 may be coupled to the expansion cone 1945 using any number of conventional commercially available mechanical couplings such as, for example, drillpipe connection, oilfield country tubular goods specialty type threaded connection, or a standard threaded connections connection, or welding. In a preferred embodiment, the outer sealing mandrel 1935 is removably coupled to the expansion cone 1945 by a standard threaded connections connection.

The upper sealing head 1925, the lower sealing head 1930, the inner sealing mandrel 1920, and the outer sealing mandrel 1935 together define a pressure chamber 2030. The pressure chamber 2030 is fluidicly coupled to the passage 1990 via one or more passages 2035. During operation of the apparatus 1900, the plug 2045 engages with the throat passage 2040 to fluidicly isolate the fluid passage 1990 from the fluid passage 1995. The pressure chamber 2030 is then pressurized which in turn causes the upper sealing head 1925, outer sealing mandrel 1935, and expansion cone 1945 to reciprocate in the axial direction. The axial motion of the expansion cone 1945 in turn expands the casing 1970 in the radial direction.

The load mandrel 1940 is coupled to the lower sealing head 1930 and the mechanical slip body 1955. The load mandrel 1940 preferably comprises an annular member having substantially cylindrical inner and outer surfaces. The load mandrel 1940 may be fabricated from any number of conventional commercially available materials such as, for example, oilfield country tubular goods, low alloy steel, carbon steel, stainless steel or other similar high strength materials. In a preferred embodiment, the load mandrel 1940 is fabricated from oilfield country tubular goods in order to optimally provide high strength.

The load mandrel 1940 may be coupled to the lower sealing head 1930 using any number of conventional commercially available mechanical couplings such as, for example, drillpipe connection, oilfield country tubular goods specialty type threaded connection, welding, amorphous bonding or a standard threaded connection. In a preferred embodiment, the load mandrel 1940 is removably coupled to the lower sealing head 1930 by a standard threaded connection. The load mandrel 1940 may be coupled to the mechanical slip body 1955 using any number of conventional commercially available mechanical couplings such as, for example, a drillpipe connection, oilfield country tubular goods specialty type threaded connections, welding, amorphous bonding, or a standard threaded connections connection. In a preferred embodiment, the load mandrel 1940 is removably coupled to the mechanical slip body 1955 by a standard threaded connections connection.

The load mandrel 1940 preferably includes a fluid passage 1995 that is adapted to convey fluidic materials from the fluid passage 1990 to the region outside of the apparatus 1900. In a preferred embodiment, the fluid passage 1995 is adapted to convey fluidic materials such as, for example, cement, epoxy, water, drilling mud, or lubricants at operating pressures and flow rates ranging from about 0 to 9,000 psi and 0 to 3,000 gallons/minute.

The expansion cone 1945 is coupled to the outer sealing mandrel 1935. The expansion cone 1945 is also movably coupled to the inner surface of the casing 1970. In this manner, the upper sealing head 1925, outer sealing mandrel 1935, and the expansion cone 1945 reciprocate in the axial direction. The reciprocation of the expansion cone 1945 causes the casing 1970 to expand in the radial direction.

The expansion cone 1945 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 inches in order to optimally provide cone dimensions for the typical range of tubular members.

The axial length of the expansion cone 1945 may range, for example, from about 2 to 8 times the largest outer diameter of the expansion cone 1945. In a preferred embodiment, the axial length of the expansion cone 1945 ranges from about 3 to 5 times the largest outer diameter of the expansion cone 1945 in order to optimally provide stability and centralization of the expansion cone 1945 during the expansion process. In a preferred embodiment, the angle of attack of the expansion cone 1945 ranges from about 5 to 30 degrees in order to optimally balance friction forces with the desired amount of radial expansion. The expansion cone 1945 angle of attack will vary as a function of the operating parameters of the particular expansion operation.

The expansion cone 1945 may be fabricated from any number of conventional commercially available materials such as, for example, machine tool steel, ceramics, tungsten carbide, nitride steel, or other similar high strength materials. In a preferred embodiment, the expansion cone 1945 is fabricated from D2 machine tool steel in order to optimally provide high strength and resistance to corrosion, wear, galling, and pitting. In a particularly preferred embodiment, the outside surface of the expansion cone 1945 has a surface hardness ranging from about 58 to 62 Rockwell C in order to optimally provide high strength and resist wear and galling.

The expansion cone 1945 may be coupled to the outside sealing mandrel 1935 using any number of conventional commercially available mechanical couplings such as, for example, drillpipe connection, oilfield tubular country goods specialty type threaded connection, welding, amorphous bonding, or a standard threaded connections connection. In a preferred embodiment, the expansion cone 1945 is coupled to the outside sealing mandrel 1935 using a standard threaded connections connection in order to optimally provide connector strength for the typical operating loading conditions while also permitting easy replacement of the expansion cone 1945.

The mandrel launcher 1950 is coupled to the casing 1970. The mandrel launcher 1950 comprises a tubular section of casing having a reduced wall thickness compared to the casing 1970. In a preferred embodiment, the wall thickness of the mandrel launcher is about 50 to 100% of the wall thickness of the casing 1970. In this manner, the initiation of the radial expansion of the casing 1970 is facilitated, and the insertion of the larger outside diameter mandrel launcher 1950 into the wellbore and/or casing is facilitated.

The mandrel launcher 1950 may be coupled to the casing 1970 using any number of conventional mechanical couplings. The mandrel launcher 1950 may have a wall thickness ranging, for example, from about 0.15 to 1.5 inches. In a preferred embodiment, the wall thickness of the mandrel launcher 1950 ranges from about 0.25 to 0.75 inches in order to optimally provide high strength with a small overall profile. The mandrel launcher 1950 may be fabricated from any number of conventional commercially available materials such as, for example, oil field tubular goods, low alloy steel, carbon steel, stainless steel or other similar high strength materials. In a preferred embodiment, the mandrel launcher 1950 is fabricated from oil field tubular goods of higher strength but lower wall thickness than the casing 1970 in order to optimally provide a thin walled container with approximately the same burst strength as the casing 1970.

The mechanical slip body 1955 is coupled to the load mandrel 1970, the mechanical slips 1960, and the drag blocks 1965. The mechanical slip body 1955 preferably comprises a tubular member having an inner passage 2050 fluidicly coupled to the passage 1995. In this manner, fluidic materials may be conveyed from the passage 2050 to a region outside of the apparatus 1900.

The mechanical slip body 1955 may be coupled to the load mandrel 1940 using any number of conventional mechanical couplings. In a preferred embodiment, the mechanical slip body 1955 is removably coupled to the load mandrel 1940 using a standard threaded connection in order to optimally provide high strength and permit the mechanical slip body 1955 to be easily replaced. The mechanical slip body 1955 may be coupled to the mechanical slips 1955 using any number of conventional mechanical couplings. In a preferred embodiment, the mechanical slip body 1955 is removably coupled to the mechanical slips 1955 using threads and sliding steel retainer rings in order to optimally provide high strength coupling and also permit easy replacement of the mechanical slips 1955. The mechanical slip body 1955 may be coupled to the drag blocks 1965 using any number of conventional mechanical couplings. In a preferred embodiment, the mechanical slip body 1955 is removably coupled to the drag blocks 1965 using threaded connections and sliding steel retainer rings in order to optimally provide high strength and also permit easy replacement of the drag blocks 1965.

The mechanical slips 1960 are coupled to the outside surface of the mechanical slip body 1955. During operation of the apparatus 1900, the mechanical slips 1960 prevent upward movement of the casing 1970 and mandrel launcher 1950. In this manner, during the axial reciprocation of the expansion cone 1945, the casing 1970 and mandrel launcher 1950 are maintained in a substantially stationary position. In this manner, the mandrel launcher 1950 and casing 1970 are expanded in the radial direction by the axial movement of the expansion cone 1945.

The mechanical slips 1960 may comprise any number of conventional commercially available mechanical slips such as, for example, RTTS packer tungsten carbide mechanical slips, RTTS packer wicker type mechanical slips or Model 3L retrievable bridge plug tungsten carbide upper mechanical slips. In a preferred embodiment, the mechanical slips 1960 comprise RTTS packer tungsten carbide mechanical slips available from Halliburton Energy Services in order to optimally provide resistance to axial movement of the casing 1970 during the expansion process.

The drag blocks 1965 are coupled to the outside surface of the mechanical slip body 1955. During operation of the apparatus 1900, the drag blocks 1965 prevent upward movement of the casing 1970 and mandrel launcher 1950. In this manner, during the axial reciprocation of the expansion cone 1945, the casing 1970 and mandrel launcher 1950 are maintained in a substantially stationary position. In this manner, the mandrel launcher 1950 and casing 1970 are expanded in the radial direction by the axial movement of the expansion cone 1945.

The drag blocks 1965 may comprise any number of conventional commercially available mechanical slips such as, for example, RTTS packer tungsten carbide mechanical slips, RTTS packer wicker type mechanical slips or Model 3L retrievable bridge plug tungsten carbide upper mechanical slips. In a preferred embodiment, the drag blocks 1965 comprise RTTS packer tungsten carbide mechanical slips available from Halliburton Energy Services in order to optimally provide resistance to axial movement of the casing 1970 during the expansion process.

The casing 1970 is coupled to the mandrel launcher 1950. The casing 1970 is further removably coupled to the mechanical slips 1960 and drag blocks 1965. The casing 1970 preferably comprises a tubular member. The casing 1970 may be fabricated from any number of conventional commercially available materials such as, for example, slotted tubulars, oil field country tubular goods, low alloy steel, carbon steel, stainless steel or other similar high strength materials. In a preferred embodiment, the casing 1970 is fabricated from oilfield country tubular goods available from various foreign and domestic steel mills in order to optimally provide high strength. In a preferred embodiment, the upper end of the casing 1970 includes one or more sealing members positioned about the exterior of the casing 1970.

During operation, the apparatus 1900 is positioned in a wellbore with the upper end of the casing 1970 positioned in an overlapping relationship within an existing wellbore casing. In order minimize surge pressures within the borehole during placement of the apparatus 1900, the fluid passage 1975 is preferably provided with one or more pressure relief passages. During the placement of the apparatus 1900 in the wellbore, the casing 1970 is supported by the expansion cone 1945.

After positioning of the apparatus 1900 within the bore hole in an overlapping relationship with an existing section of wellbore casing, a first fluidic material is pumped into the fluid passage 1975 from a surface location. The first fluidic material is conveyed from the fluid passage 1975 to the fluid passages 1980, 1985, 1990, 1995, and 2050. The first fluidic material will then exit the apparatus and fill the annular region between the outside of the apparatus 1900 and the interior walls of the bore hole.

The first fluidic material may comprise any number of conventional commercially available materials such as, for example, drilling mud, water, epoxy or cement. In a preferred embodiment, the first fluidic material comprises a hardenable fluidic sealing material such as, for example, cement or epoxy. In this manner, a wellbore casing having an outer annular layer of a hardenable material may be formed.

The first fluidic material may be pumped into the apparatus 1900 at operating pressures and flow rates ranging, for example, from about 0 to 4,500 psi, and 0 to 3,000 gallons/minute. In a preferred embodiment, the first fluidic material is pumped into the apparatus 1900 at operating pressures and flow rates ranging from about 0 to 4,500 psi and 0 to 3,000 gallons/minute in order to optimally provide operating pressures and flow rates for typical operating conditions.

At a predetermined point in the injection of the first fluidic material such as, for example, after the annular region outside of the apparatus 1900 has been filled to a predetermined level, a plug 2045, dart, or other similar device is introduced into the first fluidic material. The plug 2045 lodges in the throat passage 2040 thereby fluidicly isolating the fluid passage 1990 from the fluid passage 1995.

After placement of the plug 2045 in the throat passage 2040, a second fluidic material is pumped into the fluid passage 1975 in order to pressurize the pressure chamber 2030. The second fluidic material may comprise any number of conventional commercially available materials such as, for example, water, drilling gases, drilling mud or lubricant. In a preferred embodiment, the second fluidic material comprises a non-hardenable fluidic material such as, for example, water, drilling mud or lubricant in order minimize frictional forces.

The second fluidic material may be pumped into the apparatus 1900 at operating pressures and flow rates ranging, for example, from about 0 to 4,500 psi and 0 to 4,500 gallons/minute. In a preferred embodiment, the second fluidic material is pumped into the apparatus 1900 at operating pressures and flow rates ranging from about 0 to 3,500 psi, and 0 to 1,200 gallons/minute in order to optimally provide expansion of the casing 1970.

The pressurization of the pressure chamber 2030 causes the upper sealing head 1925, outer sealing mandrel 1935, and expansion cone 1945 to move in an axial direction. As the expansion cone 1945 moves in the axial direction, the expansion cone 1945 pulls the mandrel launcher 1950 and drag blocks 1965 along, which sets the mechanical slips 1960 and stops further axial movement of the mandrel launcher 1950 and casing 1970. In this manner, the axial movement of the expansion cone 1945 radially expands the mandrel launcher 1950 and casing 1970.

Once the upper sealing head 1925, outer sealing mandrel 1935, and expansion cone 1945 complete an axial stroke, the operating pressure of the second fluidic material is reduced and the drill string 1905 is raised. This causes the inner sealing mandrel 1920, lower sealing head 1930, load mandrel 1940, and mechanical slip body 1955 to move upward. This unsets the mechanical Blips 1960 and permits the mechanical slips 1960 and drag blocks 1965 to be moved upward within the mandrel launcher and casing 1970. When the lower sealing head 1930 contacts the upper sealing head 1925, the second fluidic material is again pressurized and the radial expansion process continues. In this manner, the mandrel launcher 1950 and casing 1970 are radial expanded through repeated axial strokes of the upper sealing head 1925, outer sealing mandrel 1935 and expansion cone 1945. Throughput the radial expansion process, the upper end of the casing 1970 is preferably maintained in an overlapping relation with an existing section of wellbore casing.

At the end of the radial expansion process, the upper end of the casing 1970 is expanded into intimate contact with the inside surface of the lower end of the existing wellbore casing. In a preferred embodiment, the sealing members provided at the upper end of the casing 1970 provide a fluidic seal between the outside surface of the upper end of the casing 1970 and the inside surface of the lower end of the existing wellbore casing. In a preferred embodiment, the contact pressure between the casing 1970 and the existing section of wellbore casing ranges from about 400 to 10,000 psi in order to optimally provide contact pressure for activating sealing members, provide optimal resistance to axial movement of the expanded casing 1970, and optimally support typical tensile and compressive loads.

In a preferred embodiment, as the expansion cone 1945 nears the end of the casing 1970, the operating flow rate of the second fluidic material is reduced in order to minimize shock to the apparatus 1900. In an alternative embodiment, the apparatus 1900 includes a shock absorber for absorbing the shock created by the completion of the radial expansion of the casing 1970.

In a preferred embodiment, the reduced operating pressure of the second fluidic material ranges from about 100 to 1,000 psi as the expansion cone 1945 nears the end of the casing 1970 in order to optimally provide reduced axial movement and velocity of the expansion cone 1945. In a preferred embodiment, the operating pressure of the second fluidic material is reduced during the return stroke of the apparatus 1900 to the range of about 0 to 500 psi in order minimize the resistance to the movement of the expansion cone 1945. In a preferred embodiment, the stroke length of the apparatus 1900 ranges from about 10 to 45 feet in order to optimally provide equipment lengths that can be handled by typical oil well rigging equipment while also minimizing the frequency at which the expansion cone 1945 must be stopped so the apparatus 1900 can be re-stroked for further expansion operations.

In an alternative embodiment, at least a portion of the upper sealing head 1925 includes an expansion cone for radially expanding the mandrel launcher 1950 and casing 1970 during operation of the apparatus 1900 in order to increase the surface area of the casing 1970 acted upon during the radial expansion process. In this manner, the operating pressures can be reduced.

In an alternative embodiment, mechanical slips are positioned in an axial location between the sealing sleeve 1915 and the inner sealing mandrel 1920 in order to simplify the operation and assembly of the apparatus 1900.

Upon the complete radial expansion of the casing 1970, if applicable, the first fluidic material is permitted to cure within the annular region between the outside of the expanded casing 1970 and the interior walls of the wellbore. In the case where the expanded casing 1970 is slotted, the cured fluidic material will preferably permeate and envelop the expanded casing. In this manner, a new section of wellbore casing is formed within a wellbore. Alternatively, the apparatus 1900 may be used to join a first section of pipeline to an existing section of pipeline. Alternatively, the apparatus 1900 may be used to directly line the interior of a wellbore with a casing, without the use of an outer annular layer of a hardenable material. Alternatively, the apparatus 1900 may be used to expand a tubular support member in a hole.

During the radial expansion process, the pressurized areas of the apparatus 1900 are limited to the fluid passages 1975, 1980, 1985, and 1990, and the pressure chamber 2030. No fluid pressure acts directly on the mandrel launcher 1950 and casing 1970. This permits the use of operating pressures higher than the mandrel launcher 1950 and casing 1970 could normally withstand.

Figure 16:
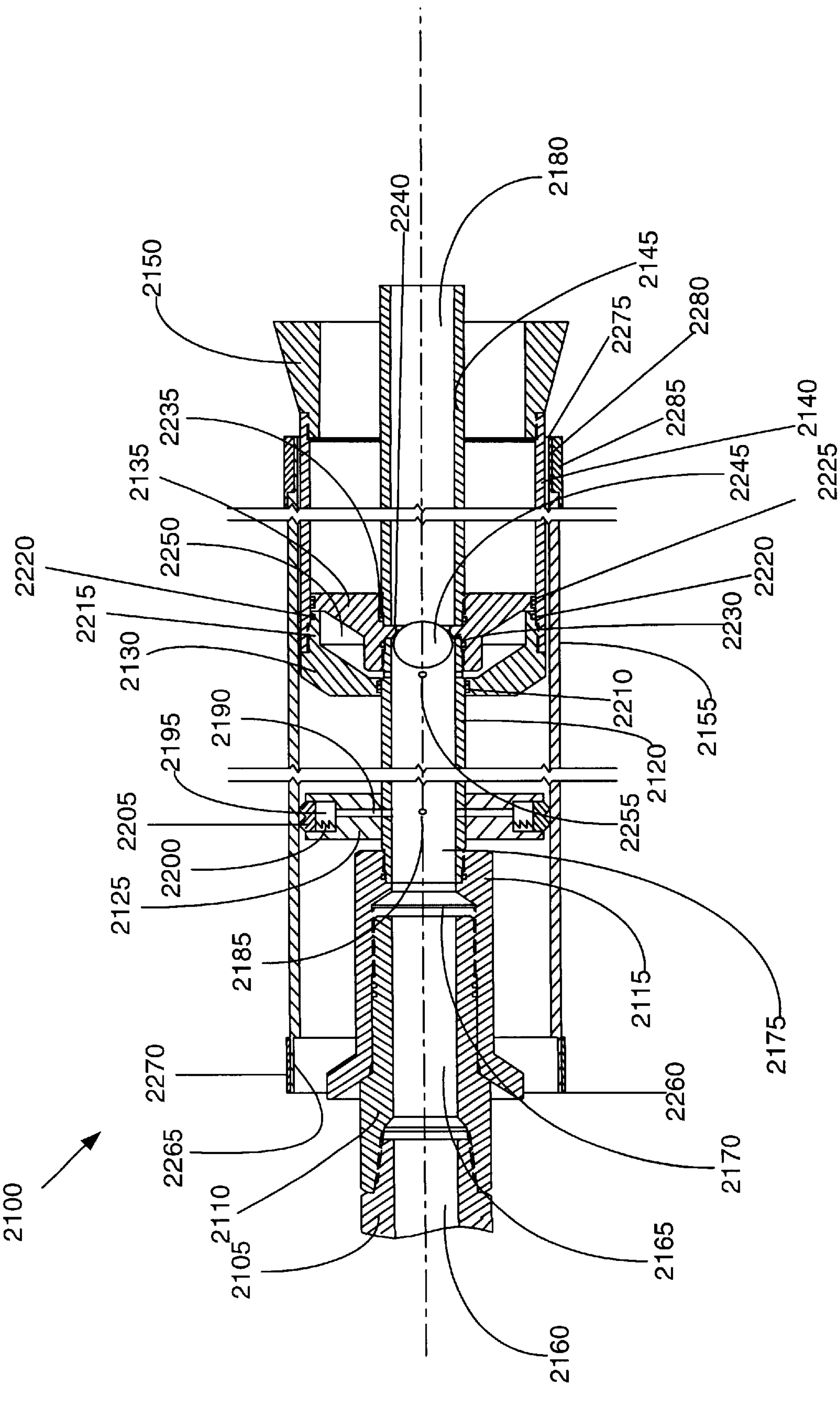
FIG. 16 is an illustration of an embodiment of an apparatus for forming a mono-diameter wellbore casing.

Referring now to FIG. 16, a preferred embodiment of an apparatus 2100 for forming a mono-diameter wellbore casing will be described. The apparatus 2100 preferably includes a drillpipe 2105, an innerstring adapter 2110, a sealing sleeve 2115, an inner sealing mandrel 2120, slips 2125, upper sealing head 2130, lower sealing head 2135, outer sealing mandrel 2140, load mandrel 2145, expansion cone 2150, and casing 2155.

The drillpipe 2105 is coupled to the innerstring adapter 2110. During operation of the apparatus 2100, the drillpipe 2105 supports the apparatus 2100. The drillpipe 2105 preferably comprises a substantially hollow tubular member or members. The drillpipe 2105 may be fabricated from any number of conventional commercially available materials such as, for example, oilfield country tubular goods, low alloy steel, carbon steel, stainless steel or other similar high strength material. In a preferred embodiment, the drillpipe 2105 is fabricated from coiled tubing in order to faciliate the placement of the apparatus 1900 in non-vertical wellbores. The drillpipe 2105 may be coupled to the innerstring adapter 2110 using any number of conventional commercially available mechanical couplings such as, for example, drillpipe connection, oilfield country tubular goods specialty type threaded connection, ratchet-latch type connection, or a standard threaded connection. In a preferred embodiment, the drillpipe 2105 is removably coupled to the innerstring adapter 2110 by a drill pipe connection.

The drillpipe 2105 preferably includes a fluid passage 2160 that is adapted to convey fluidic materials from a surface location into the fluid passage 2165. In a preferred embodiment, the fluid passage 2160 is adapted to convey fluidic materials such as, for example, cement, epoxy, water, drilling mud or lubricants at operating pressures and flow rates ranging from about 0 to 9,000 psi and 0 to 3,000 gallons/minute.

The innerstring adapter 2110 is coupled to the drill string 2105 and the sealing sleeve 2115. The innerstring adapter 2110 preferably comprises a substantially hollow tubular member or members. The innerstring adapter 2110 may be fabricated from any number of conventional commercially available materials such as, for example, oilfield country tubular goods, low alloy steel, carbon steel, stainless steel or other similar high strength materials. In a preferred embodiment, the innerstring adapter 2110 is fabricated from stainless steel in order to optimally provide high strength, low friction, and resistance to corrosion and wear.

The innerstring adapter 2110 may be coupled to the drill string 2105 using any number of conventional commercially available mechanical couplings such as, for example, drillpipe connection, oilfield country tubular goods specialty type threaded connection, ratchet-latch type connection or a standard threaded connection. In a preferred embodiment, the innerstring adapter 2110 is removably coupled to the drill pipe 2105 by a drillpipe connection. The innerstring adapter 2110 may be coupled to the sealing sleeve 2115 using any number of conventional commercially available mechanical couplings such as, for example, drillpipe connection, oilfield country tubular goods specialty type threaded connection, ratchet-latch type threaded connection, or a standard threaded connection. In a preferred embodiment, the innerstring adapter 2110 is removably coupled to the sealing sleeve 2115 by a standard threaded connection.

The innerstring adapter 2110 preferably includes a fluid passage 2165 that is adapted to convey fluidic materials from the fluid passage 2160 into the fluid passage 2170. In a preferred embodiment, the fluid passage 2165 is adapted to convey fluidic materials such as, for example, cement, epoxy, water drilling muds, or lubricants at operating pressures and flow rates ranging from about 0 to 9,000 psi and 0 to 3,000 gallons/minute.

The sealing sleeve 2115 is coupled to the innerstring adapter 2110 and the inner sealing mandrel 2120. The sealing sleeve 2115 preferably comprises a substantially hollow tubular member or members. The sealing sleeve 2115 may be fabricated from any number of conventional commercially available materials such as, for example, oil field tubular goods, low alloy steel, carbon steel, stainless steel or other similar high strength materials. In a preferred embodiment, the sealing sleeve 2115 is fabricated from stainless steel in order to optimally provide high strength, low friction surfaces, and resistance to corrosion, wear, galling, and pitting.

The sealing sleeve 2115 may be coupled to the innerstring adapter 2110 using any number of conventional commercially available mechanical couplings such as, for example, a standard threaded connection, oilfield country tubular goods specialty type threaded connections, welding, amorphous bonding, or a standard threaded connection. In a preferred embodiment, the sealing sleeve 2115 is removably coupled to the innerstring adapter 2110 by a standard threaded connection. The sealing sleeve 2115 may be coupled to the inner sealing mandrel 2120 using any number of conventional commercially available mechanical couplings such as, for example, a standard threaded connection, oilfield country tubular goods specialty type threaded connections, welding, amorphous bonding, or a standard threaded connection. In a preferred embodiment, the sealing sleeve 2115 is removably coupled to the inner sealing mandrel 2120 by a standard threaded connection.

The sealing sleeve 2115 preferably includes a fluid passage 2170 that is adapted to convey fluidic materials from the fluid passage 2165 into the fluid passage 2175. In a preferred embodiment, the fluid passage 2170 is adapted to convey fluidic materials such as, for example, cement, epoxy, water, drilling mud, or lubricants at operating pressures and flow rates ranging from about 0 to 9,000 psi and 0 to 3,000 gallons/minute.

The inner sealing mandrel 2120 is coupled to the sealing sleeve 2115, slips 2125, and the lower sealing head 2135. The inner sealing mandrel 2120 preferably comprises a substantially hollow tubular member or members. The inner sealing mandrel 2120 may be fabricated from any number of conventional commercially available materials such as, for example, oilfield country tubular goods, low alloy steel, carbon steel, stainless steel or other similar high strength materials. In a preferred embodiment, the inner sealing mandrel 2120 is fabricated from stainless steel in order to optimally provide high strength, low friction surfaces, and corrosion and wear resistance.

The inner sealing mandrel 2120 may be coupled to the sealing sleeve 2115 using any number of conventional commercially available mechanical couplings such as, for example, drillpipe connection, oilfield country tubular goods specialty type threaded connection, or a standard threaded connection. In a preferred embodiment, the inner sealing mandrel 2120 is removably coupled to the sealing sleeve 2115 by a standard threaded connection. The standard threaded connection provides high strength and permits easy replacement of components. The inner sealing mandrel 2120 may be coupled to the slips 2125 using any number of conventional commercially available mechanical couplings such as, for example, welding, amorphous bonding, or a standard threaded connection. In a preferred embodiment, the inner sealing mandrel 2120 is removably coupled to the slips 2125 by a standard threaded connection. The inner sealing mandrel 2120 may be coupled to the lower sealing head 2135 using any number of conventional commercially available mechanical couplings such as, for example, drillpipe connection, oilfield country tubular goods specialty type threaded connection, welding, amorphous bonding or a standard threaded connection. In a preferred embodiment, the inner sealing mandrel 2120 is removably coupled to the lower sealing head 2135 by a standard threaded connection.

The inner sealing mandrel 2120 preferably includes a fluid passage 2175 that is adapted to convey fluidic materials from the fluid passage 2170 into the fluid passage 2180. In a preferred embodiment, the fluid passage 2175 is adapted to convey fluidic materials such as, for example, cement, epoxy, water, drilling mud or lubricants at operating pressures and flow rates ranging from about 0 to 9,000 psi and 0 to 3,000 gallons/minute.

The slips 2125 are coupled to the outer surface of the inner sealing mandrel 2120. During operation of the apparatus 2100, the slips 2125 preferably maintain the casing 2155 in a substantially stationary position during the radial expansion of the casing 2155. In a preferred embodiment, the slips 2125 are activated using the fluid passages 2185 to convey pressurized fluid material into the slips 2125.

The slips 2125 may comprise any number of commercially available hydraulic slips such as, for example, RTTS packer tungsten carbide hydraulic slips or Model 3L retrievable bridge plug hydraulic slips. In a preferred embodiment, the slips 2125 comprise RTTS packer tungsten carbide hydraulic slips available from Halliburton Energy Services in order to optimally provide resistance to axial movement of the casing 2155 during the expansion process. In a particularly preferred embodiment, the slips include a fluid passage 2190, pressure chamber 2195, spring return 2200, and slip member 2205.

The slips 2125 may be coupled to the inner sealing mandrel 2120 using any number of conventional mechanical couplings. In a preferred embodiment, the slips 2125 are removably coupled to the outer surface of the inner sealing mandrel 2120 by a thread connection in order to optimally provide interchangeability of parts.

The upper sealing head 2130 is coupled to the outer sealing mandrel 2140 and expansion cone 2150. The upper sealing head 2130 is also movably coupled to the outer surface of the inner sealing mandrel 2120 and the inner surface of the casing 2155. In this manner, the upper sealing head 2130 reciprocates in the axial direction. The radial clearance between the inner cylindrical surface of the upper sealing head 2130 and the outer surface of the inner sealing mandrel 2120 may range, for example, from about 0.025 to 0.05 inches. In a preferred embodiment, the radial clearance between the inner cylindrical surface of the upper sealing head 2130 and the outer surface of the inner sealing mandrel 2120 ranges from about 0.005 to 0.010 inches in order to optimally provide a pressure seal. The radial clearance between the outer cylindrical surface of the upper sealing head 2130 and the inner surface of the casing 2156 may range, for example, from about 0.025 to 0.375 inches. In a preferred embodiment, the radial clearance between the outer cylindrical surface of the upper sealing head 2130 and the inner surface of the casing 2155 ranges from about 0.025 to 0.125 inches in order to optimally provide stabilization for the expansion cone 2130 during axial movement of the expansion cone 2130.

The upper sealing head 2130 preferably comprises an annular member having substantially cylindrical inner and outer surfaces. The upper sealing head 2130 may be fabricated from any number of conventional commercially available materials such as, for example, low alloy steel, carbon steel, stainless steel or other similar high strength materials. In a preferred embodiment, the upper sealing head 2130 is fabricated from stainless steel in order to optimally provide high strength, corrosion resistance, and low friction surfaces. The inner surface of the upper sealing head 2130 preferably includes one or more annular sealing members 2210 for sealing the interface between the upper sealing head 2130 and the inner sealing mandrel 2120. The sealing members 2210 may comprise any number of conventional commercially available annular sealing members such as, for example, o-rings, polypak seals, or metal spring energized seals. In a preferred embodiment, the sealing members 2210 comprise polypak seals available from Parker Seals in order to optimally provide sealing for a long axial stroke.

In a preferred embodiment, the upper sealing head 2130 includes a shoulder 2215 for supporting the upper sealing head 2130 on the lower sealing head 2135.

The upper sealing head 2130 may be coupled to the outer sealing mandrel 2140 using any number of conventional commercially available mechanical couplings such as, for example, drillpipe connection, oilfield country tubular goods specialty threaded connection, welding, amorphous bonding or a standard threaded connection. In a preferred embodiment, the upper sealing head 2130 is removably coupled to the outer sealing mandrel 2140 by a standard threaded connection. In a preferred embodiment, the mechanical coupling between the upper sealing head 2130 and the outer sealing mandrel 2140 includes one or more sealing members 2220 for fluidicly sealing the interface between the upper sealing head 2130 and the outer sealing mandrel 2140. The sealing members 2220 may comprise any number of conventional commercially available sealing members such as, for example, o-rings, polypak seals, or metal spring energized seals. In a preferred embodiment, the sealing members 2220 comprise polypak seals available from Parker Seals in order to optimally provide sealing for a long axial stroke.

The lower sealing head 2135 is coupled to the inner sealing mandrel 2120 and the load mandrel 2145. The lower sealing head 2135 is also movably coupled to the inner surface of the outer sealing mandrel 2140. In this manner, the upper sealing head 2130, outer sealing mandrel 2140, and expansion cone 2150 reciprocate in the axial direction. The radial clearance between the outer surface of the lower sealing head 2135 and the inner surface of the outer sealing mandrel 2140 may range, for example, from about 0.0025 to 0.05 inches. In a preferred embodiment, the radial clearance between the outer surface of the lower sealing head 2135 and the inner surface of the outer sealing mandrel 2140 ranges from about 0.0025 to 0.05 inches in order to optimally provide minimal radial clearance.

The lower sealing head 2135 preferably comprises an annular member having substantially cylindrical inner and outer surfaces. The lower sealing head 2135 may be fabricated from any number of conventional commercially available materials such as, for example, oilfield country tubular goods, low alloy steel, carbon steel, stainless steel or other similar high strength materials. In a preferred embodiment, the lower sealing head 2135 is fabricated from stainless steel in order to optimally provide high strength, corrosion resistance, and low friction surfaces. The outer surface of the lower sealing head 2135 preferably includes one or more annular sealing members 2225 for sealing the interface between the lower sealing head 2135 and the outer sealing mandrel 2140. The sealing members 2225 may comprise any number of conventional commercially available annular sealing members such as, for example, o-rings, polypak seals or metal spring energized seals. In a preferred embodiment, the sealing members 2225 comprise polypak seals available from Parker Seals in order to optimally provide sealing for a long axial stroke.

The lower sealing head 2135 may be coupled to the inner sealing mandrel 2120 using any number of conventional commercially available mechanical couplings such as, for example, drillpipe connection, oilfield country tubular goods specialty type threaded connection, welding, amorphous bonding, or a standard threaded connection. In a preferred embodiment, the lower sealing head 2135 is removably coupled to the inner sealing mandrel 2120 by a standard threaded connection. In a preferred embodiment, the mechanical coupling between the lower sealing head 2135 and the inner sealing mandrel 2120 includes one or more sealing members 2230 for fluidicly sealing the interface between the lower sealing head 2135 and the inner sealing mandrel 2120. The sealing members 2230 may comprise any number of conventional commercially available sealing members such as, for example, o-rings, polypak seals, or metal spring energized seals. In a preferred embodiment, the sealing members 2230 comprise polypak seals available from Parker Seals in order to optimally provide sealing for a long axial stroke.

The lower sealing head 2135 may be coupled to the load mandrel 2145 using any number of conventional commercially available mechanical couplings such as, for example, drillpipe connection, oilfield country tubular goods specialty threaded connection, welding, amorphous bonding, or a standard threaded connection. In a preferred embodiment, the lower sealing head 2135 is removably coupled to the load mandrel 2145 by a standard threaded connection. In a preferred embodiment, the mechanical coupling between the lower sealing head 2135 and the load mandrel 2145 includes one or more sealing members 2235 for fluidicly sealing the interface between the lower sealing head 1930 and the load mandrel 2145. The sealing members 2235 may comprise any number of conventional commercially available sealing members such as; for example, o-rings, polypak seals, or metal spring energized seals. In a preferred embodiment, the sealing members 2235 comprise polypak seals available from Parker Seals in order to optimally provide sealing for a long axial stroke.

In a preferred embodiment, the lower sealing head 2135 includes a throat passage 2240 fluidicly coupled between the fluid passages 2175 and 2180. The throat passage 2240 is preferably of reduced size and is adapted to receive and engage with a plug 2245, or other similar device. In this manner, the fluid passage 2175 is fluidicly isolated from the fluid passage 2180. In this manner, the pressure chamber 2250 is pressurized.

The outer sealing mandrel 2140 is coupled to the upper sealing head 2130 and the expansion cone 2150. The outer sealing mandrel 2140 is also movably coupled to the inner surface of the casing 2155 and the outer surface of the lower sealing head 2135. In this manner, the upper sealing head 2130, outer sealing mandrel 2140, and the expansion cone 2150 reciprocate in the axial direction. The radial clearance between the outer surface of the outer sealing mandrel 2140 and the inner surface of the casing 2155 may range, for example, from about 0.025 to 0.375 inches. In a preferred embodiment, the radial clearance between the outer surface of the outer sealing mandrel 2140 and the inner surface of the casing 2155 ranges from about 0.025 to 0.125 inches in order to optimally provide stabilization for the expansion cone 2130 during the expansion process. The radial clearance between the inner surface of the outer sealing mandrel 2140 and the outer surface of the lower sealing head 2135 may range, for example, from about 0.005 to 0.125 inches. In a preferred embodiment, the radial clearance between the inner surface of the outer sealing mandrel 2140 and the outer surface of the lower sealing head 2135 ranges from about 0.005 to 0.010 inches in order to optimally provide minimal radial clearance.

The outer sealing mandrel 2140 preferably comprises an annular member having substantially cylindrical inner and outer surfaces. The outer sealing mandrel 2140 may be fabricated from any number of conventional commercially available materials such as, for example, oilfield country tubular goods, low alloy steel, carbon steel, stainless steel, or other similar high strength materials. In a preferred embodiment, the outer sealing mandrel 2140 is fabricated from stainless steel in order to optimally provide high strength, corrosion resistance, and low friction surfaces.

The outer sealing mandrel 2140 may be coupled to the upper sealing head 2130 using any number of conventional commercially available mechanical couplings such as, for example, drillpipe connection, oilfield country tubular goods specialty threaded connection, welding, amorphous bonding or a standard threaded connection. In a preferred embodiment, the outer sealing mandrel 2140 is removably coupled to the upper sealing head 2130 by a standard threaded connection. The outer sealing mandrel 2140 may be coupled to the expansion cone 2150 using any number of conventional commercially available mechanical couplings such as, for example, drillpipe connection, oilfield country tubular goods specialty threaded connection, welding, amorphous bonding, or a standard threaded connection. In a preferred embodiment, the outer sealing mandrel 2140 is removably coupled to the expansion cone 2150 by a standard threaded connection.

The upper sealing head 2130, the lower sealing head 2135, inner sealing mandrel 2120, and the outer sealing mandrel 2140 together define a pressure chamber 2250. The pressure chamber 2250 is fluidicly coupled to the passage 2175 via one or more passages 2255. During operation of the apparatus 2100, the plug 2245 engages with the throat passage 2240 to fluidicly isolate the fluid passage 2175 from the fluid passage 2180. The pressure chamber 2250 is then pressurized which in turn causes the upper sealing head 2130, outer sealing mandrel 2140, and expansion cone 2150 to reciprocate in the axial direction. The axial motion of the expansion cone 2150 in turn expands the casing 2155 in the radial direction.

The load mandrel 2145 is coupled to the lower sealing head 2135. The load mandrel 2145 preferably comprises an annular member having substantially cylindrical inner and outer surfaces. The load mandrel 2145 may be fabricated from any number of conventional commercially available materials such as, for example, oilfield country tubular goods, low alloy steel, carbon steel, stainless steel or other similar high strength materials. In a preferred embodiment, the load mandrel 2145 is fabricated from stainless steel in order to optimally provide high strength, corrosion resistance, and low friction bearing surfaces.

The load mandrel 2145 may be coupled to the lower sealing head 2135 using any number of conventional commercially available mechanical couplings such as, for example, drillpipe connection, oilfield country tubular goods specialty threaded connection, welding, amorphous bonding or a standard threaded connection. In a preferred embodiment, the load mandrel 2145 is removably coupled to the lower sealing head 2135 by a standard threaded connection in order to optimally provide high strength and permit easy replacement of the load mandrel 2145.

The load mandrel 2145 preferably includes a fluid passage 2180 that is adapted to convey fluidic materials from the fluid passage 2180 to the region outside of the apparatus 2100. In a preferred embodiment, the fluid passage 2180 is adapted to convey fluidic materials such as, for example, cement, epoxy, water, drilling mud, or lubricants at operating pressures and flow rates ranging from about 0 to 9,000 psi and 0 to 3,000 gallons/minute.

The expansion cone 2150 is coupled to the outer sealing mandrel 2140. The expansion cone 2150 is also movably coupled to the inner surface of the casing 2155. In this manner, the upper sealing head 2130, outer sealing mandrel 2140, and the expansion cone 2150 reciprocate in the axial direction. The reciprocation of the expansion cone 2150 causes the casing 2155 to expand in the radial direction.

The expansion cone 2150 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 inches in order to optimally provide cone dimensions that are optimal for typical casings. The axial length of the expansion cone 2150 may range, for example, from about 2 to 6 times the largest outside diameter of the expansion cone 2150. In a preferred embodiment, the axial length of the expansion cone 2150 ranges from about 3 to 5 times the largest outside diameter of the expansion cone 2150 in order to optimally provide stability and centralization of the expansion cone 2150 during the expansion process. In a particularly preferred embodiment, the maximum outside diameter of the expansion cone 2150 is between about 90 to 100% of the inside diameter of the existing wellbore that the casing 2156 will be joined with. In a preferred embodiment, the angle of attack of the expansion cone 2150 ranges from about 5 to 30 degrees in order to optimally balance friction forces and radial expansion forces. The optimal expansion cone 2150 angle of attack will vary as a function of the particular operating conditions of the expansion operation.

The expansion cone 2150 may be fabricated from any number of conventional commercially available materials such as, for example, machine tool steel, nitride steel, titanium, tungsten carbide, ceramics, or other similar high strength materials. In a preferred embodiment, the expansion cone 2150 is fabricated from D2 machine tool steel in order to optimally provide high strength and resistance to wear and galling. In a particularly preferred embodiment, the outside surface of the expansion cone 2150 has a surface hardness ranging from about 58 to 62 Rockwell C in order to optimally provide resistance to wear.

The expansion cone 2150 may be coupled to-the outside sealing mandrel 2140 using any number of conventional commercially available mechanical couplings such as, for example, drillpipe connection, oilfield country tubular goods specialty type threaded connection, welding, amorphous bonding or a standard threaded connection. In a preferred embodiment, the expansion cone 2150 is coupled to the a outside sealing mandrel 2140 using a standard threaded connection in order to optimally provide high strength and permit the expansion cone 2150 to be easily replaced.

The casing 2155 is removably coupled to the slips 2125 and expansion cone 2150. The casing 2155 preferably comprises a tubular member. The casing 2155 may be fabricated from any number of conventional commercially available materials such as, for example, slotted tubulars, oilfield country tubular goods, low alloy steel, carbon steel, stainless steel or other similar high strength material. In a preferred embodiment, the casing 2155 is fabricated from oilfield country tubular goods available from various foreign and domestic steel mills in order to optimally provide high strength.

In a preferred embodiment, the upper end 2260 of the casing 2155 includes a thin wall section 2265 and an outer annular sealing member 2270. In a preferred embodiment, the wall thickness of the thin wall section 2265 is about 50 to 100% of the regular wall thickness of the casing 2155. In this manner, the upper end 2260 of the casing 2155 may be easily expanded and deformed into intimate contact with the lower end of an existing section of wellbore casing. In a preferred embodiment, the lower end of the existing section of casing also includes a thin wall section. In this manner, the radial expansion of the thin walled section 2265 of casing 2155 into the thin walled section of the existing wellbore casing results in a wellbore casing having a substantially constant inside diameter.

The annular sealing member 2270 may be fabricated from any number of conventional commercially available sealing materials such as, for example, epoxy, A rubber, metal or plastic. In a preferred embodiment, the annular sealing member 2270 is fabricated from StrataLock epoxy in order to optimally provide compressibility and resistance to wear. The outside diameter of the annular sealing member 2270 preferably ranges from about 70 to 95% of the inside diameter of the lower section of the wellbore casing that the casing 2155 is joined to. In this manner, after expansion, the annular sealing member 2270 preferably provides a fluidic seal and also preferably provides sufficient frictional force with the inside surface of the A existing section of wellbore casing during the radial expansion of the casing 2155 to support the casing 2155.

In a preferred embodiment, the lower end 2275 of the casing 2155 includes a thin wall section 2280 and an outer annular sealing member 2285. In a preferred embodiment, the wall thickness of the thin wall section 2280 is about 50 to 100% of the regular wall thickness of the casing 2155. In this manner, the lower end 2275 of the casing 2155 may be easily expanded and deformed. Furthermore, in this manner, an other section of casing may be easily joined with the lower end 2275 of the casing 2155 using a radial expansion process. In a preferred embodiment, the upper end of the other section of casing also includes a thin wall section. In this manner, the radial expansion of the thin walled section of the upper end of the other casing into the thin walled section 2280 of the lower end of the casing 2155 results in a wellbore casing having a substantially constant inside diameter.

The annular sealing member 2285 may be fabricated from any number of conventional commercially available sealing materials such as, for example, epoxy, rubber, metal or plastic. In a preferred embodiment, the annular sealing member 2285 is fabricated from StrataLock epoxy in order to optimally provide compressibility and wear resistance. The outside diameter of the annular sealing member 2285 preferably ranges from about 70 to 95% of the inside diameter of the lower section of the existing wellbore casing that the casing 2155 is joined to. In this manner, the annular sealing member 2285 preferably provides a fluidic seal and also preferably provides sufficient frictional force with the inside wall of the wellbore during the radial expansion of the casing 2155 to support the casing 2155.

During operation, the apparatus 2100 is preferably positioned in a wellbore with the upper end 2260 of the casing 2155 positioned in an overlapping relationship with the lower end of an existing wellbore casing. In a particularly preferred embodiment, the thin wall section 2265 of the casing 2155 is positioned in opposing overlapping relation with the thin wall section and outer annular sealing member of the lower end of the existing section of wellbore casing. In this manner, the radial expansion of the casing 2155 will compress the thin wall sections and annular compressible members of the upper end 2260 of the casing 2155 and the lower end of the existing wellbore casing into intimate contact. During the positioning of the apparatus 2100 in the wellbore, the casing 2155 is supported by the expansion cone 2150.

After positioning of the apparatus 2100, a first fluidic material is then pumped into the fluid passage 2160. The first fluidic material may comprise any number of conventional commercially available materials such as, for example, drilling mud, water, epoxy, or cement. In a preferred embodiment, the first fluidic material comprises a hardenable fluidic sealing material such as, for example, cement or epoxy in order to provide a hardenable outer annular body around the expanded casing 2155.

The first fluidic material may be pumped into the fluid passage 2160 at operating pressures and flow rates ranging, for example, from about 0 to 4,500 psi and 0 to 3,000 gallons/minute. In a preferred embodiment, the first fluidic material is pumped into the fluid passage 2160 at operating pressures and flow rates ranging from about 0 to 3,500 psi and 0 to 1,200 gallons/minute in order to optimally provide operational efficiency.

The first fluidic material pumped into the fluid passage 2160 passes through the fluid passages 2165, 2170, 2175, 2180 and then outside of the apparatus 2100. The first fluidic material then fills the annular region between the outside of the apparatus 2100 and the interior walls of the wellbore.

The plug 2245 is then introduced into the fluid passage 2160. The plug 2245 lodges in the throat passage 2240 and fluidicly isolates and blocks off the fluid passage 2175. In a preferred embodiment, a couple of volumes of a non-hardenable fluidic material are then pumped into the fluid passage 2160 in order to remove any hardenable fluidic material contained within and to ensure that none of the fluid passages are blocked.

A second fluidic material is then pumped into the fluid passage 2160. The second fluidic material may comprise any number of conventional commercially available materials such as, for example, drilling mud, water, drilling gases, or lubricants. In a preferred embodiment, the second fluidic material comprises a non-hardenable fluidic material such as, for example, water, drilling mud or lubricant in order to optimally provide pressurization of the pressure chamber 2250 and minimize frictional forces.

The second fluidic material may be pumped into the fluid passage 2160 at operating pressures and flow rates ranging, for example, from about 0 to 4,500 psi and 0 to 4,500 gallons/minute. In a preferred embodiment, the second fluidic material is pumped into the fluid passage 2160 at operating pressures and flow rates ranging from about 0 to 3,500 psi and 0 to 1,200 gallons/minute in order to optimally provide operational efficiency.

The second fluidic material pumped into the fluid passage 2160 passes through the fluid passages 2165, 2170, and 2175 into the pressure chambers 2195 of the slips 2125, and into the pressure chamber 2250. Continued pumping of the second fluidic material pressurizes the pressure chambers 2195 and 2250.

The pressurization of the pressure chambers 2195 causes the slip members 2205 to expand in the radial direction and grip the interior surface of the casing 2155. The casing 2155 is then preferably maintained in a substantially stationary position.

The pressurization of the pressure chamber 2250 causes the upper sealing head 2130, outer sealing mandrel 2140 and expansion cone 2150 to move in an axial direction relative to the casing 2155. In this manner, the expansion cone 2150 will cause the casing 2155 to expand in the radial direction.

During the radial expansion process, the casing 2155 is prevented from moving in an upward direction by the slips 2125. A length of the casing 2155 is then expanded in the radial direction through the pressurization of the pressure chamber 2250. The length of the casing 2155 that is expanded during the expansion process will be proportional to the stroke length of the upper sealing head 2130, outer sealing mandrel 2140, and expansion cone 2150.

Upon the completion of a stroke, the operating pressure of the second fluidic material is reduced and the upper sealing head 2130, outer sealing mandrel 2140, and expansion cone 2150 drop to their rest positions with the casing 2155 supported by the expansion cone 2150. The position of the drillpipe 2105 is preferably adjusted throughout the radial expansion process in order to maintain the overlapping relationship between the thin walled sections of the lower end of the existing wellbore casing and the upper end of the casing 2155. In a preferred embodiment, the stroking of the expansion cone 2150 is then repeated, as necessary, until the thin walled section 2265 of the upper end 2260 of the casing 2155 is expanded into the thin walled section of the lower end of the existing wellbore casing. In this manner, a wellbore casing is formed including two adjacent sections of casing having a substantially constant inside diameter. This process may then be repeated for the entirety of the wellbore to provide a wellbore casing thousands of feet in length having a substantially constant inside diameter.

In a preferred embodiment, during the final stroke of the expansion cone 2150, the slips 2125 are positioned as close as possible to the thin walled section 2265 of the upper end of the casing 2155 in order minimize slippage between the casing 2155 and the existing wellbore casing at the end of the radial expansion process. Alternatively, or in addition, the outside diameter of the annular sealing member 2270 is selected to ensure sufficient interference fit with the inside diameter of the lower end of the existing casing to prevent axial displacement of the casing 2155 during the final stroke. Alternatively, or in addition, the outside diameter of the annular sealing member 2285 is selected to provide an interference fit with the inside walls of the wellbore at an earlier point in the radial expansion process so as to prevent further axial displacement of the casing 2155. In this final alternative, the interference fit is preferably selected to permit expansion of the casing 2155 by pulling the expansion cone 2150 out of the wellbore, without having to pressurize the pressure chamber 2250.

During the radial expansion process, the pressurized areas of the apparatus 2100 are limited to the fluid passages 2160, 2165, 2170, and 2175, the pressure chambers 2195 within the slips 2125, and the pressure chamber 2250. No fluid pressure acts directly on the casing 2155. This permits the use of operating pressures higher than the casing 2155 could normally withstand.

Once the casing 2155 has been completely expanded off of the expansion cone 2150, remaining portions of the apparatus 2100 are removed from the wellbore. In a preferred embodiment, the contact pressure between the deformed thin wall sections and compressible annular members of the lower end of the existing casing and the upper end 2260 of the casing 2155 ranges from about 500 to 40,000 psi in order to optimally support the casing 2155 using the existing wellbore casing.

In this manner, the casing 2155 is radially expanded into contact with an existing section of casing by pressurizing the interior fluid passages 2160, 2165, 2170, and 2175 and the pressure chamber 2250 of the apparatus 2100.

In a preferred embodiment, as required, the annular body of hardenable fluidic material is then allowed to cure to form a rigid outer annular body about the expanded casing 2155. In the case where the casing 2155 is slotted, the cured fluidic material preferably permeates and envelops the expanded casing 2155. The resulting new section of wellbore casing includes the expanded casing 2155 and the rigid outer annular body. The overlapping joint between the pre-existing wellbore casing and the expanded casing 2155 includes the deformed thin wall sections and the compressible outer annular bodies. The inner diameter of the resulting combined wellbore casings is substantially constant. In this manner, a mono-diameter wellbore casing is formed. This process of expanding overlapping tubular members having thin wall end portions with compressible annular bodies into contact can be repeated for the entire length of a wellbore. In this manner, a mono-diameter wellbore casing can be provided for thousands of feet in a subterranean formation.

In a preferred embodiment, as the expansion cone 2150 nears the upper end of the casing 2155, the operating flow rate of the second fluidic material is reduced in order to minimize shock to the apparatus 2100. In an alternative embodiment, the apparatus 2100 includes a shock absorber for absorbing the shock created by the completion of the radial expansion of the casing 2155.

In a preferred embodiment, the reduced operating pressure of the second fluidic material ranges from about 100 to 1,000 psi as the expansion cone 2130 nears the end of the casing 2155 in order to optimally provide reduced axial movement and velocity of the expansion cone 2130. In a preferred embodiment, the operating pressure of the second fluidic material is reduced during the return stroke of the apparatus 2100 to the range of about 0 to 500 psi in order minimize the resistance to the movement of the expansion cone 2130 during the return stroke. In a preferred embodiment, the stroke length of the apparatus 2100 ranges from about 10 to 45 feet in order to optimally provide equipment lengths that can be handled by conventional oil well rigging equipment while also minimizing the frequency at which the expansion cone 2130 must be stopped so that the apparatus 2100 can be re-stroked.

In an alternative embodiment, at least a portion of the upper sealing head 2130 includes an expansion cone for radially expanding the casing 2155 during operation of the apparatus 2100 in order to increase the surface area of the casing 2155 acted upon during the radial expansion process. In this manner, the operating pressures can be reduced.

Alternatively, the apparatus 2100 may be used to join a first section of pipeline to an existing section of pipeline. Alternatively, the apparatus 2100 may be used to directly line the interior of a wellbore with a casing, without the use of an outer annular layer of a hardenable material. Alternatively, the apparatus 2100 may be used to expand a tubular support member in a hole.

Figure 17:
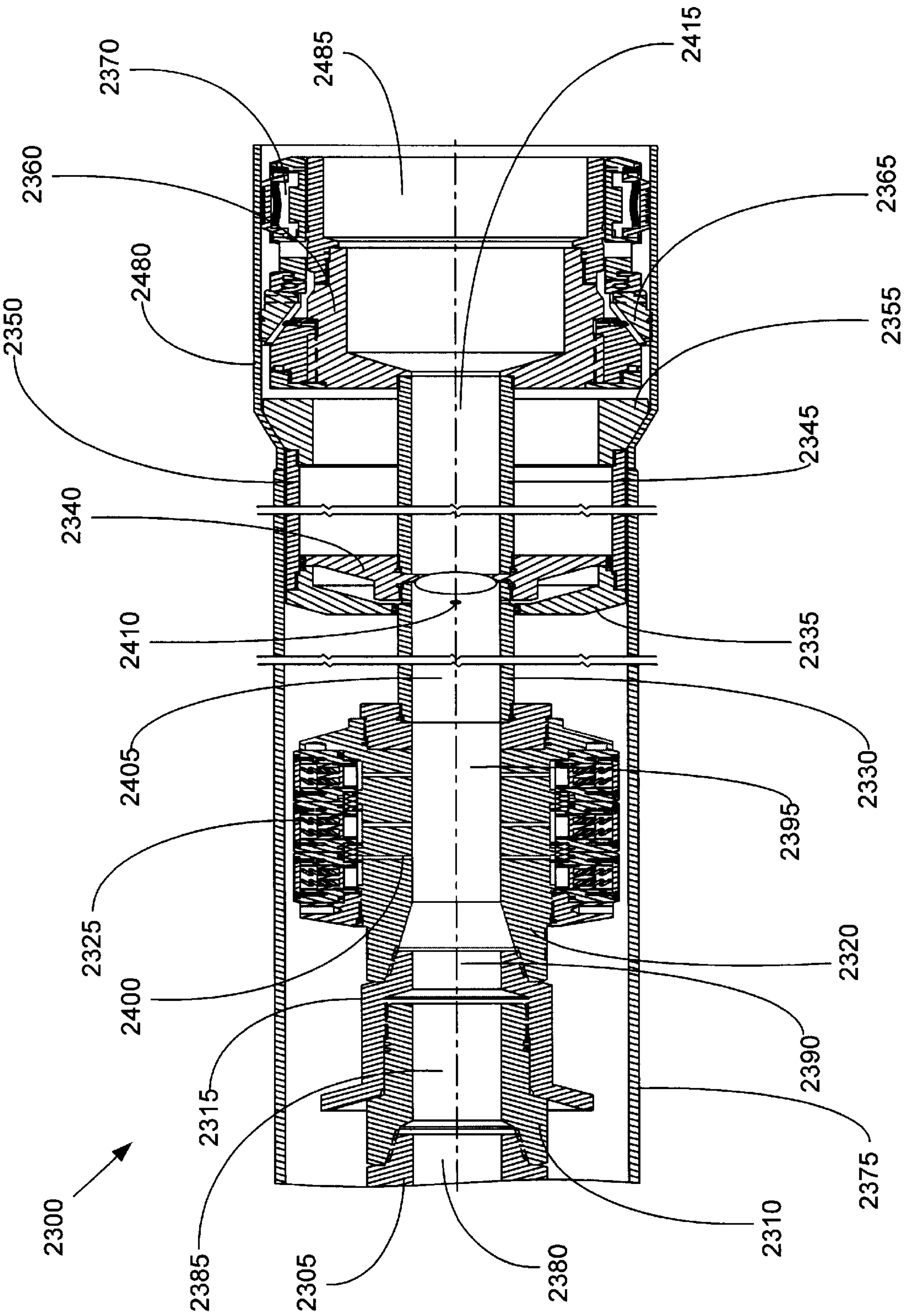
FIG. 17 is an illustration of an embodiment of an apparatus for expanding a tubular member.
Figure 17A:
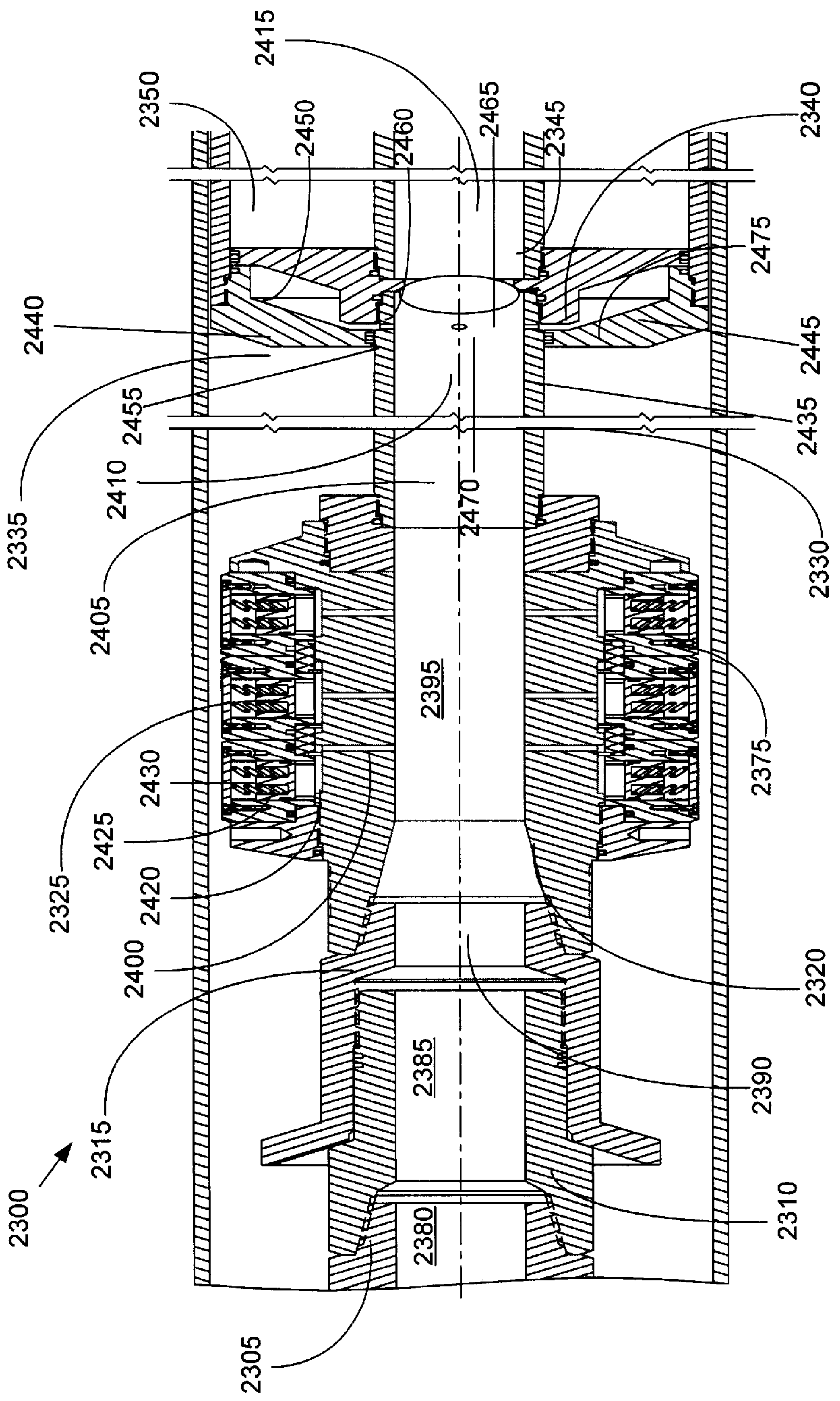
FIG. 17*a* is another illustration of the apparatus of FIG. 16.
Figure 17B:
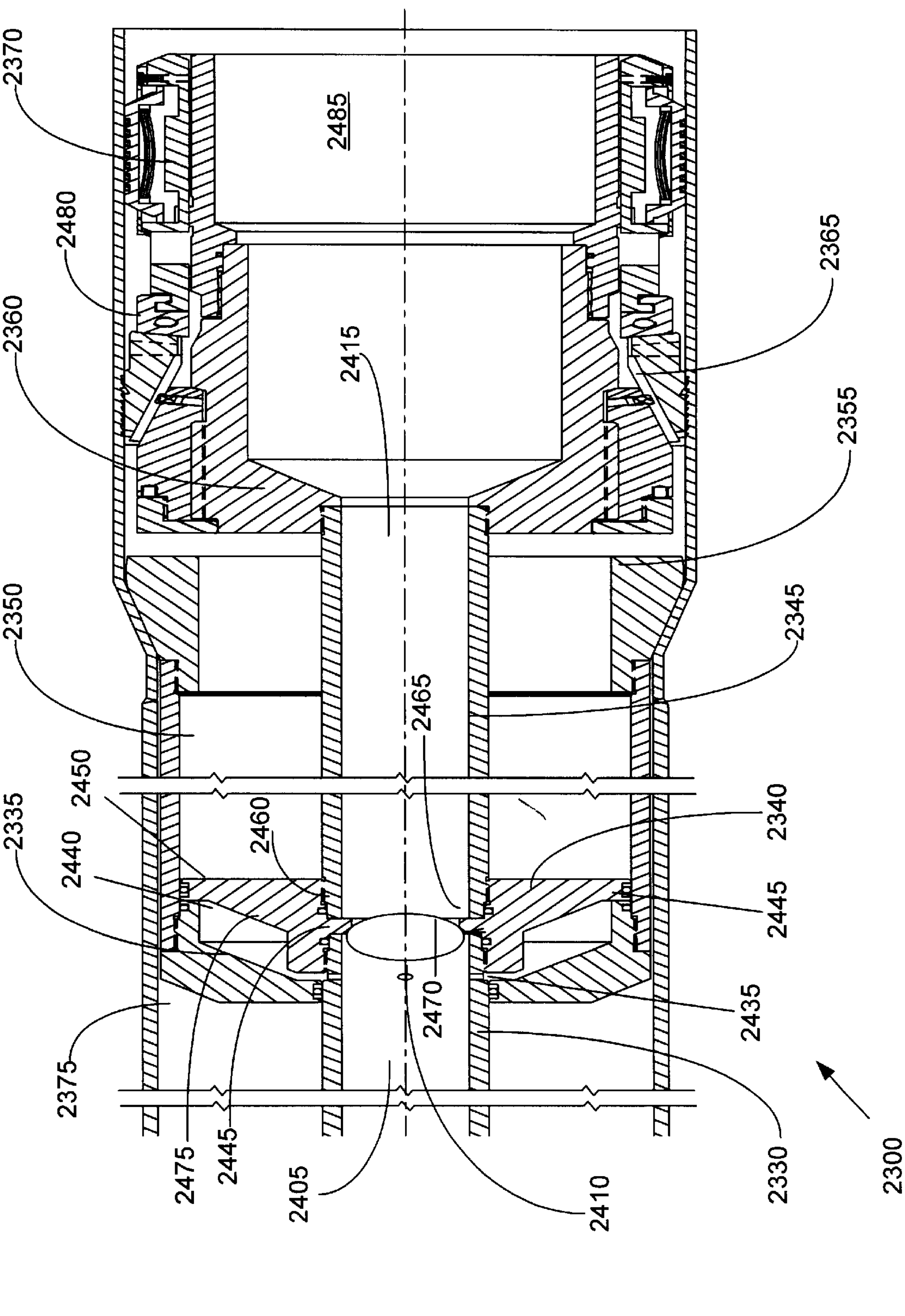
FIG. 17*b* is another illustration of the apparatus of FIG. 16.

Referring now to FIGS. 17, 17*a* and 17*b*, another embodiment of an apparatus 2300 for expanding a tubular member will be described. The apparatus 2300 preferably includes a drillpipe 2305, an innerstring adapter 2310, a sealing sleeve 2315, a hydraulic slip body 2320, hydraulic slips 2325, an inner sealing mandrel 2330, an upper sealing head 2335, a lower sealing head 2340, a load mandrel 2345, an outer sealing mandrel 2350, an expansion cone 2355, a mechanical slip body 2360, mechanical slips 2365, drag blocks 2370, casing 2375, fluid passages 2380, 2385, 2390, 2395, 2400, 2405, 2410, 2415, and 2485, and mandrel launcher 2480.

The drillpipe 2305 is coupled to the innerstring adapter 2310. During operation of the apparatus 2300, the drillpipe 2305 supports the apparatus 2300. The drillpipe 2305 preferably comprises a substantially hollow tubular member or members. The drillpipe 2305 may be fabricated from any number of conventional commercially available materials such as, for example, oilfield country tubular goods, low alloy steel, carbon steel, stainless steel or other similar high strength materials. In a preferred embodiment, the drillpipe 2305 is fabricated from coiled tubing in order to faciliate the placement of the apparatus 2300 in non-vertical wellbores. The drillpipe 2306 may be coupled to the innerstring adapter 2310 using any number of conventional commercially available mechanical couplings such as, for example, drillpipe connection, oilfield country tubular goods specialty threaded connection, or a standard threaded connection. In a preferred embodiment, the drillpipe 2305 is removably coupled to the innerstring adapter 2310 by a drillpipe connection.

The drillpipe 2305 preferably includes a fluid passage 2380 that is adapted to convey fluidic materials from a surface location into the fluid passage 2385. In a preferred embodiment, the fluid passage 2380 is adapted to convey fluidic materials such as, for example, cement, water, epoxy, drilling muds, or lubricants at operating pressures and flow rates ranging from about 0 to 9,000 psi and 0 to 5,000 gallons/minute in order to optimally provide operational efficiency.

The innerstring adapter 2310 is coupled to the drill string 2305 and the sealing sleeve 2315. The innerstring adapter 2310 preferably comprises a substantially hollow tubular member or members. The innerstring adapter 2310 may be fabricated from any number of conventional commercially available materials such as, for example, oilfield country tubular goods, low alloy steel, carbon steel, stainless steel or other similar high strength materials. In a preferred embodiment, the innerstring adapter 2310 is fabricated from stainless steel in order to optimally provide high strength, corrosion resistance, and low friction surfaces.

The innerstring adapter 2310 may be coupled to the drill string 2305 using any number of conventional commercially available mechanical couplings such as, for example, drillpipe connection, oilfield country tubular goods specialty threaded connection, or a standard threaded connection. In a preferred embodiment, the innerstring adapter 2310 is removably coupled to the drill pipe 2305 by a drillpipe connection. The innerstring adapter 2310 may be coupled to the sealing sleeve 2315 using any number of conventional commercially available mechanical couplings such as, for example, a drillpipe connection, oilfield country tubular goods specialty threaded connection, or a standard threaded connection. In a preferred embodiment, the innerstring adapter 2310 is removably coupled to the sealing sleeve 2315 by a standard threaded connection.

The innerstring adapter 2310 preferably includes a fluid passage 2385 that is adapted to convey fluidic materials from the fluid passage 2380 into the fluid passage 2390. In a preferred embodiment, the fluid passage 2385 is adapted to convey fluidic materials such as, for example, cement, epoxy, water, drilling mud, drilling gases or lubricants at operating pressures and flow rates ranging from about 0 to 9,000 psi and 0 to 3,000 gallons/minute.

The sealing sleeve 2315 is coupled to the innerstring adapter 2310 and the hydraulic slip body 2320. The sealing sleeve 2315 preferably comprises a substantially hollow tubular member or members. The sealing sleeve 2315 may be fabricated from any number of conventional commercially available materials such as, for example, oilfield country tubular goods, low alloy steel, carbon steel, stainless steel or other similar high strength materials. In a preferred embodiment, the sealing sleeve 2315 is fabricated from stainless steel in order to optimally provide high strength, corrosion resistance, and low-friction surfaces.

The sealing sleeve 2315 may be coupled to the innerstring adapter 2310 using any number of conventional commercially available mechanical couplings such as, for example, drillpipe connections, oilfield country tubular goods specialty threaded connections, or a standard threaded connection. In a preferred embodiment, the sealing sleeve 2315 is removably coupled to the innerstring adapter 2310 by a standard threaded connection. The sealing-sleeve 2315 may be coupled to the hydraulic slip body 2320 using any number of conventional commercially available mechanical couplings such as, for example, drillpipe connection, oilfield country tubular goods specialty threaded connection, or a standard threaded connection. In a preferred embodiment, the sealing sleeve 2315 is removably coupled to the hydraulic slip body 2320 by a standard threaded connection.

The sealing sleeve 2315 preferably includes a fluid passage 2390 that is adapted to convey fluidic materials from the fluid passage 2385 into the fluid passage 2395. In a preferred embodiment, the fluid passage 2315 is adapted to convey fluidic materials such as, for example, cement, epoxy, water, drilling mud or lubricants at operating pressures and flow rates ranging from about 0 to 9,000 psi and 0 to 3,000 gallons/minute.

The hydraulic slip body 2320 is coupled to the sealing sleeve 2315, the hydraulic slips 2325, and the inner sealing mandrel 2330. The hydraulic slip body 2320 preferably comprises a substantially hollow tubular member or members. The hydraulic slip body 2320 may be fabricated from any number of conventional commercially available materials such as, for example, oilfield country tubular goods, low alloy steel, carbon steel, stainless steel or other high strength material. In a preferred embodiment, the hydraulic slip body 2320 is fabricated from carbon steel in order to optimally provide high strength at low cost.

The hydraulic slip body 2320 may be coupled to the sealing sleeve 2315 using any number of conventional commercially available mechanical couplings such as, for example, drillpipe connection, oilfield country tubular goods specialty threaded connection, or a standard threaded connection. In a preferred embodiment, the hydraulic slip body 2320 is removably coupled to the sealing sleeve 2315 by a standard threaded connection. The hydraulic slip body 2320 may be coupled to the slips 2325 using any number of conventional commercially available mechanical couplings such as, for example, drillpipe connection, oilfield country tubular goods specialty threaded connection, welding, amorphous bonding or a standard threaded connection. In a preferred embodiment, the hydraulic slip body 2320 is removably coupled to the slips 2326 by a standard threaded connection. The hydraulic slip body 2320 may be coupled to the inner sealing mandrel 2330 using any number of conventional commercially available mechanical couplings such as, for example, drillpipe connection, oilfield country tubular goods specialty threaded connection, welding, amorphous bonding or a standard threaded connection. In a preferred embodiment, the hydraulic slip body 2320 is removably coupled to the inner sealing mandrel 2330 by a standard threaded connection.

The hydraulic slips body 2320 preferably includes a fluid passage 2395 that is adapted to convey fluidic materials from the fluid passage 2390 into the fluid passage 2405. In a preferred embodiment, the fluid passage 2395 is adapted to convey fluidic materials such as, for example, cement, epoxy, water, drilling mud or lubricants at operating pressures and flow rates ranging from about 0 to 9,000 psi and 0 to 3,000 gallons/minute.

The hydraulic slips body 2320 preferably includes fluid passage 2400 that are adapted to convey fluidic materials from the fluid passage 2395 into the pressure chambers 2420 of the hydraulic slips 2325. In this manner, the slips 2325 are activated upon the pressurization of the fluid passage 2395 into contact with the inside surface of the casing 2375. In a preferred embodiment, the fluid passages 2400 are adapted to convey fluidic materials such as, for example, water, drilling mud or lubricants at operating pressures and flow rates ranging from about 0 to 9,000 psi and 0 to 3,000 gallons/minute.

The slips 2325 are coupled to the outside surface of the hydraulic slip body 2320. During operation of the apparatus 2300, the slips 2325 are activated upon the pressurization of the fluid passage 2395 into contact with the inside surface of the casing 2375. In this manner, the slips 2325 maintain the casing 2375 in a substantially stationary position.

The slips 2325 preferably include the fluid passages 2400, the pressure chambers 2420, spring bias 2426, and slip members 2430. The slips 2325 may comprise any number of conventional commercially available hydraulic slips such as, for example, RTTS packer tungsten carbide hydraulic slips or Model 3L retrievable bridge plug with hydraulic slips. In a preferred embodiment, the slips 2325 comprise RTTS packer tungsten carbide hydraulic slips available from Halliburton Energy Services in order to optimally provide resistance to axial movement of the casing 2375 during the radial expansion process.

The inner sealing mandrel 2330 is coupled to the hydraulic slip body 2320 and the lower sealing head 2340. The inner sealing mandrel 2330 preferably comprises a substantially hollow tubular member or members. The inner sealing mandrel 2330 may be fabricated from any number of conventional commercially available materials such as, for example, oilfield country tubular goods, low alloy steel, carbon steel, stainless steel or other similar high strength materials. In a preferred embodiment, the inner sealing mandrel 2330 is fabricated from stainless steel in order to optimally provide high strength, corrosion resistance, and low friction surfaces.

The inner sealing mandrel 2330 may be coupled to the hydraulic slip body 2320 using any number of conventional commercially available mechanical couplings such as, for example, drillpipe connection, oilfield country tubular goods specialty threaded connection, welding, amorphous bonding, or a standard threaded connection. In a preferred embodiment, the inner sealing mandrel 2330 is removably coupled to the hydraulic slip body 2320 by a standard threaded connection. The inner sealing mandrel 2330 may be coupled to the lower sealing head 2340 using any number of conventional commercially available mechanical couplings such as, for example, drillpipe connection, oilfield country tubular goods specialty threaded connection, welding, amorphous bonding, or a standard threaded connection. In a preferred embodiment, the inner sealing mandrel 2330 is removably coupled to the lower sealing head 2340 by a standard threaded connection.

The inner sealing mandrel 2330 preferably includes a fluid passage 2405 that is adapted to convey fluidic materials from the fluid passage 2395 into the fluid passage 2415. In a preferred embodiment, the fluid passage 2405 is adapted to convey fluidic materials such as, for example, cement, epoxy, water, drilling mud, or lubricants at operating pressures and flow rates ranging from about 0 to 9,000 psi and 0 to 3,000 gallons/minute.

The upper sealing head 2335 is coupled to the outer sealing mandrel 2345 and expansion cone 2355. The upper sealing head 2335 is also movably coupled to the outer surface of the inner sealing mandrel 2330 and the inner surface of the casing 2375. In this manner, the upper sealing head 2335 reciprocates in the axial direction. The radial clearance between the inner cylindrical surface of the upper sealing head 2335 and the outer surface of the inner sealing mandrel 2330 may range, for example, from about 0.0025 to 0.05 inches. In a preferred embodiment, the radial clearance between the inner cylindrical surface of the upper sealing head 2335 and the outer surface of the inner sealing mandrel 2380 ranges from about 0.005 to 0.01 inches in order to optimally provide minimal clearance. The radial clearance between the outer cylindrical surface of the upper sealing head 2335 and the inner surface of the casing 2375 may range, for example, from about 0.025 to 0.375 inches. In a preferred embodiment, the radial clearance between the outer cylindrical surface of the upper sealing head 2335 and the inner surface of the casing 2375 ranges from about 0.025 to 0.125 inches in order to optimally provide stabilization for the expansion cone 2355 during the expansion process.

The upper sealing head 2335 preferably comprises an annular member having substantially cylindrical inner and outer surfaces. The upper sealing head 2335 may be fabricated from any number of conventional commercially available materials such as, for example, oilfield country tubular goods, low alloy steel, carbon steel, stainless steel or other similar high strength materials. In a preferred embodiment, the upper sealing head 2335 is fabricated from stainless steel in order to optimally provide high strength, corrosion resistance, and low friction surfaces. The inner surface of the upper sealing head 2335 preferably includes one or more annular sealing members 2435 for sealing the interface between the upper sealing head 2335 and the inner sealing mandrel 2330. The sealing members 2435 may comprise any number of conventional commercially available annular sealing members such as, for example, o-rings, polypak seals or metal spring energized seals. In a preferred embodiment, the sealing members 2435 comprise polypak seals available from Parker Seals in order to optimally provide sealing for a long axial stroke.

In a preferred embodiment, the upper sealing head 2335 includes a shoulder 2440 for supporting the upper sealing head on the lower sealing head 1930.

The upper sealing head 2335 may be coupled to the outer sealing mandrel 2350 using any number of conventional commercially available mechanical couplings such as, for example, drillpipe connection, oilfield country tubular goods specialty threaded connection, welding, amorphous bonding, or a standard threaded connection. In a preferred embodiment, the upper sealing head 2335 is removably coupled to the outer sealing mandrel 2350 by a standard threaded connection. In a preferred embodiment, the mechanical coupling between the upper sealing head 2335 and the outer sealing mandrel 2350 includes one or more sealing members 2445 for fluidicly sealing the interface between the upper sealing head 2335 and the outer sealing mandrel 2350. The sealing members 2445 may comprise any number of conventional commercially available sealing members such as, for example, o-rings, polypak seals or metal spring energized seals. In a preferred embodiment, the sealing members 2445 comprise polypak seals available from Parker Seals in order to optimally provide sealing for long axial strokes.

The lower sealing head 2340 is coupled to the inner sealing mandrel 2330 and the load mandrel 2345. The lower sealing head 2340 is also movably coupled to the inner surface of the outer sealing mandrel 2350. In this manner, the upper sealing head 2335 and outer sealing mandrel 2350 reciprocate in the axial direction. The radial clearance between the outer surface of the lower sealing head 2340 and the inner surface of the outer sealing mandrel 2350 may range, for example, from about 0.0025 to 0.05 inches. In a preferred embodiment, the radial clearance between the outer surface of the lower sealing head 2340 and the inner surface of the outer sealing mandrel 2350 ranges from about 0.005 to 0.010 inches in order to optimally provide minimal radial clearance.

The lower sealing head 2340 preferably comprises an annular member having substantially cylindrical inner and outer surfaces. The lower sealing head 2340 may be fabricated from any number of conventional commercially available materials such as, for example, oilfield tubular members, low alloy steel, carbon steel, stainless steel or other similar high strength materials. In a preferred embodiment, the lower sealing head 2340 is fabricated from stainless steel in order to optimally provide high strength, corrosion resistance, and low friction surfaces. The outer surface of the lower sealing head 2340 preferably includes one or more annular sealing members 2450 for sealing the interface between the lower sealing head 2340 and the outer sealing mandrel 2350. The sealing members 2450 may comprise any number of conventional commercially available annular sealing members such as, for example, o-rings, polypak seals or metal spring energized seals. In a preferred embodiment, the sealing members 2450 comprise polypak seals available from Parker Seals in order to optimally provide sealing for a long axial stroke.

The lower sealing head 2340 may be coupled to the inner sealing mandrel 2330 using any number of conventional commercially available mechanical couplings such as, for example, drillpipe connection, oilfield country tubular specialty threaded connection, welding, amorphous bonding, or standard threaded connection. In a preferred embodiment, the lower sealing head 2340 is removably coupled to the inner sealing mandrel 2330 by a standard threaded connection. In a preferred embodiment, the mechanical coupling between the lower sealing head 2340 and the inner sealing mandrel 2330 includes one or more sealing members 2455 for fluidicly sealing the interface between the lower sealing head 2340 and the inner sealing mandrel 2330. The sealing members 2455 may comprise any number of conventional commercially available sealing members such as, for example, o-rings, polypak or metal spring energized seals. In a preferred embodiment, the sealing members 2455 comprise polypak seals available from Parker Seals in order to optimally provide sealing for a long axial stroke length.

The lower sealing head 2340 may be coupled to the load mandrel 2345 using any number of conventional commercially available mechanical couplings such as, for example, drillpipe connection, oilfield country tubular goods specialty threaded connection, welding, amorphous bonding or a standard threaded connection. In a preferred embodiment, the lower sealing head 2340 is removably coupled to the load mandrel 2345 by a standard threaded connection. In a preferred embodiment, the mechanical coupling between the lower sealing head 2340 and the load mandrel 2345 includes one or more sealing members 2460 for fluidicly sealing the interface between the lower sealing head 2340 and the load mandrel 2345. The sealing members 2460 may comprise any number of conventional commercially available sealing members such as, for example, o-rings, polypak seals or metal spring energized seals. In a preferred embodiment, the sealing members 2460 comprise polypak seals available from Parker Seals in order to optimally provide sealing for a long axial stroke length.

In a preferred embodiment, the lower sealing head 2340 includes a throat passage 2465 fluidicly coupled between the fluid passages 2405 and 2415. The throat passage 2465 is preferably of reduced size and is adapted to receive and engage with a plug 2470, or other similar device. In this manner, the fluid passage 2405 is fluidicly isolated from the fluid passage 2415. In this manner, the pressure chamber 2475 is pressurized.

The outer sealing mandrel 2350 is coupled to the upper sealing head 2335 and the expansion cone 2355. The outer sealing mandrel 2350 is also movably coupled to the inner surface of the casing 2375 and the outer surface of the lower sealing head 2340. In this manner, the upper sealing head 2335, outer sealing mandrel 2350, and the expansion cone 2355 reciprocate in the axial direction. The radial clearance between the outer surface of the outer sealing mandrel 2350 and the inner surface of the casing 2375 may range, for example, from about 0.025 to 0.375 inches. In a preferred embodiment, the radial clearance between the outer surface of the outer sealing mandrel 2350 and the inner surface of the casing 2375 ranges from about 0.025 to 0.125 inches in order to optimally provide stabilization for the expansion cone 2355 during the expansion process. The radial clearance between the inner surface of the outer sealing mandrel 2350 and the outer surface of the lower sealing head 2340 may range, for example, from about 0.0025 to 0.375 inches. In a preferred embodiment, the radial clearance between the inner surface of the outer sealing mandrel 2350 and the outer surface of the lower sealing head 2340 ranges from about 0.005 to 0.010 inches in order to optimally provide minimal clearance.

The outer sealing mandrel 2350 preferably comprises an annular member having substantially cylindrical inner and outer surfaces. The outer sealing mandrel 2350 may be fabricated from any number of conventional commercially available materials such as, for example, low alloy steel, carbon steel, stainless steel or other similar high strength materials. In a preferred embodiment, the outer sealing mandrel 2350 is fabricated from stainless steel in order to optimally provide high strength, corrosion resistance, and low friction surfaces.

The outer sealing mandrel 2350 may be coupled to the upper sealing head 2335 using any number of conventional commercially available mechanical couplings such as, for example, drillpipe connections, oilfield country tubular goods specialty threaded connections, welding, amorphous bonding, or a standard threaded connection. In a preferred embodiment, the outer sealing mandrel 2350 is removably coupled to the upper sealing head 2335 by a standard threaded connection. The outer sealing mandrel 2350 may be coupled to the expansion cone 2355 using any number of conventional commercially available mechanical couplings such as, for example, drillpipe connection, oilfield country tubular goods specialty threaded connection, welding, amorphous bonding, or a standard threaded connection. In a preferred embodiment, the outer sealing mandrel 2350 is removably coupled to the expansion cone 2355 by a standard threaded connection.

The upper sealing head 2335, the lower sealing head 2340, the inner sealing mandrel 2330, and the outer sealing mandrel 2350 together define a pressure chamber 2475. The pressure chamber 2475 is fluidicly coupled to the passage 2405 via one or more passages 2410. During operation of the apparatus 2300, the plug 2470 engages with the throat passage 2465 to fluidicly isolate the fluid passage 2415 from the fluid passage 2405. The pressure chamber 2475 is then pressurized which in turn causes the upper sealing head 2335, outer sealing mandrel 2350, and expansion cone 2355 to reciprocate in the axial direction. The axial motion of the expansion cone 2355 in turn expands the casing 2375 in the radial direction.

The load mandrel 2345 is coupled to the lower sealing head 2340 and the mechanical slip body 2360. The load mandrel 2345 preferably comprises an annular member having substantially cylindrical inner and outer surfaces.

The load mandrel 2345 may be fabricated from any number of conventional commercially available materials such as, for example, oilfield country tubular goods, low alloy steel, carbon steel, stainless steel or other similar high strength materials. In a preferred embodiment, the load mandrel 2345 is fabricated from stainless steel in order to optimally provide high strength, corrosion resistance, and low friction surfaces.

The load mandrel 2345 may be coupled to the lower sealing head 2340 using any number of conventional commercially available mechanical couplings such as, for example, drillpipe connection, oilfield country tubular goods specialty threaded connection, welding, amorphous bonding or a standard threaded connection. In a preferred embodiment, the load mandrel 2345 is removably coupled to the lower sealing head 2340 by a standard threaded connection. The load mandrel 2345 may be coupled to the mechanical slip body 2360 using any number of conventional commercially available mechanical couplings such as, for example, drillpipe connection, oilfield country tubular goods specialty threaded connection, welding, amorphous bonding, or a standard threaded connection. In a preferred embodiment, the load mandrel 2345 is removably coupled to the mechanical slip body 2360 by a standard threaded connection.

The load mandrel 2345 preferably includes a fluid passage 2415 that is adapted to convey fluidic materials from the fluid passage 2405 to the region outside of the apparatus 2300. In a preferred embodiment, the fluid passage 2415 is adapted to convey fluidic materials such as, for example, cement, epoxy, water, drilling mud or lubricants at operating pressures and flow rates ranging from about 0 to 9,000 psi and 0 to 3,000 gallons/minute.

The expansion cone 2355 is coupled to the outer sealing mandrel 2350. The expansion cone 2355 is also movably coupled to the inner surface of the casing 2375. In this manner, the upper sealing head 2335, outer sealing mandrel 2350, and the expansion cone 2355 reciprocate in the axial direction. The reciprocation of the expansion cone 2355 causes the casing 2375 to expand in the radial direction.

The expansion cone 2355 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 inches in order to optimally provide radial expansion of the typical casings. The axial length of the expansion cone 2355 may range, for example, from about 2 to 8 times the largest outside diameter of the expansion cone 2355. In a preferred embodiment, the axial length of the expansion cone 2355 ranges from about 3 to 5 times the largest outside diameter of the expansion cone 2355 in order to optimally provide stability and centralization of the expansion cone 2355 during the expansion process. In a preferred embodiment, the angle of attack of the expansion cone 2355 ranges from about 5 to 3 degrees in order to optimally frictional forces with radial expansion forces. The optimum angle of attack of the expansion cone 2355 will vary as a function of the operating parameters of the particular expansion operation.

The expansion cone 2355 may be fabricated from any number of conventional commercially available materials such as, for example, machine tool steel, nitride steel, titanium, tungsten carbide, ceramics or other similar high strength materials. In a preferred embodiment, the expansion cone 2355 is fabricated from D2 machine tool steel in order to optimally provide high strength, abrasion resistance, and galling resistance. In a particularly preferred embodiment, the outside surface of the expansion cone 2355 has a surface hardness ranging from about 58 to 62 Rockwell C in order to optimally provide high strength, abrasion resistance, resistance to galling.

The expansion cone 2355 may be coupled to the outside sealing mandrel 2350 using any number of conventional commercially available mechanical couplings such as, for example, drillpipe connection, oilfield country tubular goods specialty threaded connection, welding, amorphous bonding, or a standard threaded connection. In a preferred embodiment, the expansion cone 2355 is coupled to the outside sealing mandrel 2350 using a standard threaded connection in order to optimally provide high strength and permit the expansion cone 2355 to be easily replaced.

The mandrel launcher 2480 is coupled to the casing 2375. The mandrel launcher 2480 comprises a tubular section of casing having a reduced wall thickness compared to the casing 2375. In a preferred embodiment, the wall thickness of the mandrel launcher 2480 is about 50 to 100% of the wall thickness of the casing 2375. In this manner, the initiation of the radial expansion of the casing 2375 is facilitated, and the placement of the apparatus 2300 into a wellbore casing and wellbore is facilitated.

The mandrel launcher 2480 may be coupled to the casing 2375 using any number of conventional mechanical couplings. The mandrel launcher 2480 may have a wall thickness ranging, for example, from about 0.15 to 1.5 inches. In a preferred embodiment, the wall thickness of the mandrel launcher 2480 ranges from about 0.25 to 0.75 inches in order to optimally provide high strength in a minimal profile. The mandrel launcher 2480 may be fabricated from any number of conventional commercially available materials such as, for example, oilfield tubular goods, low alloy steel, carbon steel, stainless steel or other similar high strength materials. In a preferred embodiment, the mandrel launcher 2480 is fabricated from oilfield tubular goods having a higher strength than that of the casing 2375 but with a smaller wall thickness than the casing 2375 in order to optimally provide a thin walled container having approximately the same burst strength as that of the casing 2375.

The mechanical slip body 2460 is coupled to the load mandrel 2345, the mechanical slips 2365, and the drag blocks 2370. The mechanical slip body 2460 preferably comprises a tubular member having an inner passage 2485 fluidicly coupled to the passage 2415. In this manner, fluidic materials may be conveyed from the passage 2484 to a region outside of the apparatus 2300.

The mechanical slip body 2360 may be coupled to the load mandrel 2345 using any number of conventional mechanical couplings. In a preferred embodiment, the mechanical slip body 2360 is removably coupled to the load mandrel 2345 using threads and sliding steel retaining rings in order to optimally provide a high strength attachment. The mechanical slip body 2360 may be coupled to the mechanical slips 2365 using any number of conventional mechanical couplings. In a preferred embodiment, the mechanical slip body 2360 is removably coupled to the mechanical slips 2365 using threads and sliding steel retaining rings in order to optimally provide a high strength attachment. The mechanical slip body 2360 may be coupled to the drag blocks 2370 using any number of conventional mechanical couplings. In a preferred embodiment, the mechanical slip body 2360 is removably coupled to the drag blocks 2365 using threads and sliding steel retaining rings in order to optimally provide a high strength attachment.

The mechanical slips 2365 are coupled to the outside surface of the mechanical slip body 2360. During operation of the apparatus 2300, the mechanical slips 2365 prevent upward movement of the casing 2375 and mandrel launcher 2480. In this manner, during the axial reciprocation of the expansion cone 2355, the casing 2375 and mandrel launcher 2480 are maintained in a substantially stationary position. In this manner, the mandrel launcher 2480 and casing 2375 are expanded in the radial direction by the axial movement of the expansion cone 2355.

The mechanical slips 2365 may comprise any number of conventional commercially available mechanical slips such as, for example, RTTS packer tungsten carbide mechanical slips, RTTS packer wicker type mechanical slips or Model 3L retrievable bridge plug tungsten carbide upper mechanical slips. In a preferred embodiment, the mechanical slips 2365 comprise RTTS packer tungsten carbide mechanical slips available from Halliburton Energy Services in order to optimally provide resistance to axial movement of the casing 2375 during the expansion process.

The drag blocks 2370 are coupled to the outside surface of the mechanical slip body 2360. During operation of the apparatus 2300, the drag blocks 2370 prevent upward movement of the casing 2375 and mandrel launcher 2480. In this manner, during the axial reciprocation of the expansion cone 2355, the casing 2375 and mandrel launcher 2480 are maintained in a substantially stationary position. In this manner, the mandrel launcher 2480 and casing 2375 are expanded in the radial direction by the axial movement of the expansion cone 2355.

The drag blocks 2370 may comprise any number of conventional commercially available mechanical slips such as, for example, RTTS packer mechanical drag blocks or Model 3L retrievable bridge plug drag blocks. In a preferred embodiment, the drag blocks 2370 comprise RTTS packer mechanical drag blocks available from Halliburton Energy Services in order to optimally provide resistance to axial movement of the casing 2375 during the expansion process.

The casing 2375 is coupled to the mandrel launcher 2480. The casing 2375 is further removably coupled to the mechanical slips 2365 and drag blocks 2370. The casing 2375 preferably comprises a tubular member. The casing 2375 may be fabricated from any number of conventional commercially available materials such as, for example, slotted tubulars, oil country tubular goods, carbon steel, low alloy steel, stainless steel or other similar high strength materials. In a preferred embodiment, the casing 2375 is fabricated from oilfield country tubular goods available from various foreign and domestic steel mills in order to optimally provide high strength. In a preferred embodiment, the upper end of the casing 2375 includes one or more sealing members positioned about the exterior of the casing 2375.

During operation, the apparatus 2300 is positioned in a wellbore with the upper end of the casing 2375 positioned in an overlapping relationship within an existing wellbore casing. In order minimize surge pressures within the borehole during placement of the apparatus 2300, the fluid passage 2380 is preferably provided with one or more pressure relief passages. During the placement of the apparatus 2300 in the wellbore, the casing 2375 is supported by the expansion cone 2355.

After positioning of the apparatus 2300 within the bore hole in an overlapping relationship with an existing section of wellbore casing, a first fluidic material is pumped into the fluid passage 2380 from a surface location. The first fluidic material is conveyed from the fluid passage 2380 to the fluid passages 2385, 2390, 2395, 2405, 2415, and 2485. The first fluidic material will then exit the apparatus 2300 and fill the annular region between the outside of the apparatus 2300 and the interior walls of the bore hole.

The first fluidic material may comprise any number of conventional commercially available materials such as, for example, epoxy, drilling mud, slag mix, cement, or water. In a preferred embodiment, the first fluidic material comprises a hardenable fluidic sealing material such as, for example, slag mix, epoxy, or cement. In this manner, a wellbore casing having an outer annular layer of a hardenable material may be formed.

The first fluidic material may be pumped into the apparatus 2300 at operating pressures and flow rates ranging, for example, from about 0 to 4,500 psi, and 0 to 3,000 gallons/minute. In a preferred embodiment, the first fluidic material is pumped into the apparatus 2300 at operating pressures and flow rates ranging from about 0 to 3,500 psi and 0 to 1,200 gallons/minute in order to optimally provide operational efficiency.

At a predetermined point in the injection of the first fluidic material such as, for example, after the annular region outside of the apparatus 2300 has been filled to a predetermined level, a plug 2470, dart, or other similar device is introduced into the first fluidic material. The plug 2470 lodges in the throat passage 2465 thereby fluidicly isolating the fluid passage 2405 from the fluid passage 2415.

After placement of the plug 2470 in the throat passage 2465, a second fluidic material is pumped into the fluid passage 2380 in order to pressurize the pressure chamber 2475. The second fluidic material may comprise any number of conventional commercially available materials such as, for example, water, drilling gases, drilling mud or lubricants. In a preferred embodiment, the second fluidic material comprises a non-hardenable fluidic material such as, for example, water, drilling mud or lubricant.

The second fluidic material may be pumped into the apparatus 2300 at operating pressures and flow rates ranging, for example, from about 0 to 4,500 psi and 0 to 4,500 gallons/minute. In a preferred embodiment, the second fluidic material is pumped into the apparatus 2300 at operating pressures and flow rates ranging from about 0 to 3,500 psi and 0 to 1,200 gallons/minute in order to optimally provide operational efficiency.

The pressurization of the pressure chamber 2475 causes the upper sealing head 2335, outer sealing mandrel 2350, and expansion cone 2355 to move in an axial direction. The pressurization of the pressure chamber 2475 also causes the hydraulic slips 2325 to expand in the radial direction and hold the casing 2375 in a substantially stationary position. Furthermore, as the expansion cone 2355 moves in the axial direction, the expansion cone 2355 pulls the mandrel launcher 2480 and drag blocks 2370 along, which sets the mechanical slips 2365 and stops further axial movement of the mandrel launcher 2480 and casing 2375. In this manner, the axial movement of the expansion cone 2355 radially expands the mandrel launcher 2480 and casing 2375.

Once the upper sealing head 2335, outer sealing mandrel 2350, and expansion cone 2355 complete an axial stroke, the operating pressure of the second fluidic material is reduced. The reduction in the operating pressure of the second fluidic material releases the hydraulic slips 2325. The drill string 2305 is then raised. This causes the inner sealing mandrel 2330, lower sealing head 2340, load mandrel 2345, and mechanical slip body 2360 to move upward. This unsets the mechanical slips 2365 and permits the mechanical slips 2365 and drag blocks 2370 to be moved within the mandrel launcher 2480 and casing 2375. When the lower sealing head 2340 contacts the upper sealing head 2335, the second fluidic material is again pressurized and the radial expansion process continues. In this manner, the mandrel launcher 2480 and casing 2375 are radial expanded through repeated axial strokes of the upper sealing head 2335, outer sealing mandrel 2350 and expansion cone 2355. Throughput the radial expansion process, the upper end of the casing 2375 is preferably maintained in an overlapping relation with an existing section of wellbore casing.

At the end of the radial expansion process, the upper end of the casing 2375 is expanded into intimate contact with the inside surface of the lower end of the existing wellbore casing. In a preferred embodiment, the sealing members provided at the upper end of the casing 2375 provide a fluidic seal between the outside surface of the upper end of the casing 2375 and the inside surface of the lower end of the existing wellbore casing. In a preferred embodiment, the contact pressure between the casing 2375 and the existing section of wellbore casing ranges from about 400 to 10,000 psi in order to optimally provide contact pressure, activate the sealing members, and withstand typical tensile and compressive loading conditions.

In a preferred embodiment, as the expansion cone 2355 nears the upper end of the casing 2375, the operating pressure of the second fluidic material is reduced in order to minimize shock to the apparatus 2300. In an alternative embodiment, the apparatus 2300 includes a shock absorber for absorbing the shock created by the completion of the radial expansion of the casing 2375.

In a preferred embodiment, the reduced operating pressure of the second fluidic material ranges from about 100 to 1,000 psi as the expansion cone 2355 nears the end of the casing 2375 in order to optimally provide reduced axial movement and velocity of the expansion cone 2355. In a preferred embodiment, the operating pressure of the second fluidic material is reduced during the return stroke of the apparatus 2300 to the range of about 0 to 500 psi in order minimize the resistance to the movement of the expansion cone 2355 during the return stroke. In a preferred embodiment, the stroke length of the apparatus 2300 ranges from about 10 to 45 feet in order to optimally provide equipment that can be handled by typical oil well rigging equipment and minimize the frequency at which the expansion cone 2355 must be stopped to permit the apparatus 2300 to be re-stroked.

In an alternative embodiment, at least a portion of the upper sealing head 2335 includes an expansion cone for radially expanding the mandrel launcher 2480 and casing 2375 during operation of the apparatus 2300 in order to increase the surface area of the casing 2375 acted upon during the radial expansion process. In this manner, the operating pressures can be reduced.

In an alternative embodiment, mechanical slips 2365 are positioned in an axial location between the sealing sleeve 2315 and the inner sealing mandrel 2330 in order to optimally the construction and operation of the apparatus 2300.

Upon the complete radial expansion of the casing 2375, if applicable, the first fluidic material is permitted to cure within the annular region between the outside of the expanded casing 2375 and the interior walls of the wellbore. In the case where the casing 2375 is slotted, the cured fluidic material preferably permeates and envelops the expanded casing 2375. In this manner, a new section of wellbore casing is formed within a wellbore. Alternatively, the apparatus 2300 may be used to join a first section of pipeline to an existing section of pipeline. Alternatively, the apparatus 2300 may be used to directly line the interior of a wellbore with a casing, without the use of an outer annular layer of a hardenable material. Alternatively, the apparatus 2300 may be used to expand a tubular support member in a hole.

During the radial expansion process, the pressurized areas of the apparatus 2300 are limited to the fluid passages 2380, 2385, 2390, 2395, 2400, 2405, and 2410, and the pressure chamber 2475. No fluid pressure acts directly on the mandrel launcher 2480 and casing 2375. This permits the use of operating pressures higher than the mandrel launcher 2480 and casing 2375 could normally withstand.

Figure 18:
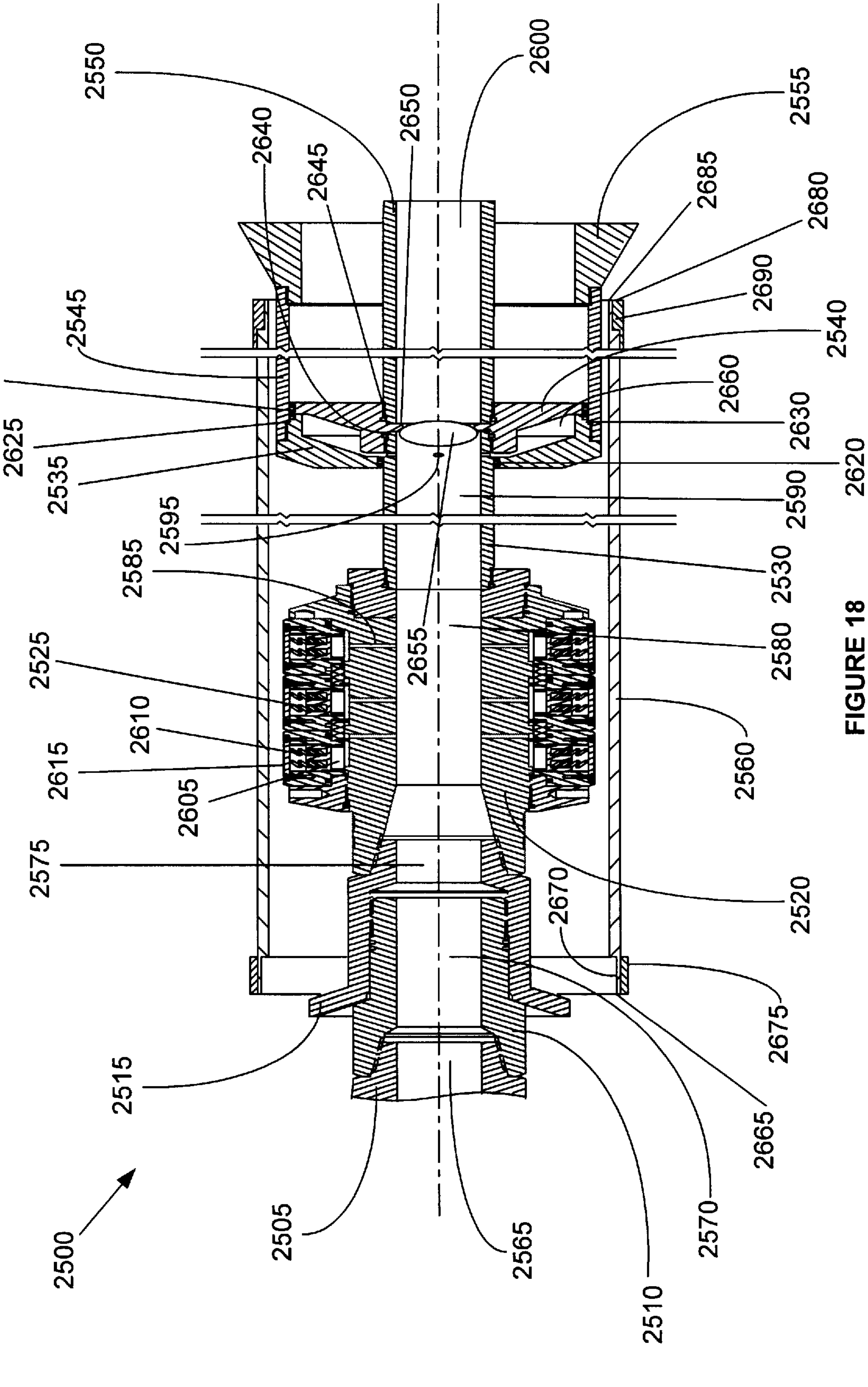
FIG. 18 is an illustration of an embodiment of an apparatus for forming a mono-diameter wellbore casing.

Referring now to FIG. 18, a preferred embodiment of an apparatus 2500 for forming a mono-diameter wellbore casing will be described. The apparatus 2500 preferably includes a drillpipe 2505, an innerstring adapter 2510, a sealing sleeve 2515, a hydraulic slip body 2520, hydraulic slips 2525, an inner sealing mandrel 2530, upper sealing head 2535, lower sealing head 2540, outer sealing mandrel 2545, load mandrel 2550, expansion cone 2555, casing 2560, and fluid passages 2565, 2570, 2575, 2580, 2585, 2590, 2595, and 2600.

The drillpipe 2505 is coupled to the innerstring adapter 2510. During operation of the apparatus 2500, the drillpipe 2505 supports the apparatus 2500. The drillpipe 2505 preferably comprises, a substantially hollow tubular member or members. The drillpipe 2505 may be fabricated from any number of conventional commercially available materials such as, for example, oilfield country tubular goods, low alloy steel, carbon steel, stainless steel or other similar high strength materials. In a preferred embodiment, the drillpipe 2505 is fabricated from coiled tubing in order to faciliate the placement of the apparatus 2500 in non-vertical wellbores. The drillpipe 2505 may be coupled to the innerstring adapter 2510 using any number of conventional commercially available mechanical couplings such as, for example, drillpipe connection, oilfield country tubular goods specialty threaded connection, or a standard threaded connection. In a preferred embodiment, the drillpipe 2505 is removably coupled to the innerstring adapter 2510 by a drillpipe connection. a drillpipe connection provides the advantages of high strength and easy disassembly.

The drillpipe 2505 preferably includes a fluid passage 2565 that is adapted to convey fluidic materials from a surface location into the fluid passage 2570. In a preferred embodiment, the fluid passage 2565 is adapted to convey fluidic materials such as, for example, cement, epoxy, water, drilling mud, or lubricants at operating pressures and flow rates ranging from about 0 to 9,000 psi and 0 to 3,000 gallons/minute.

The innerstring adapter 2510 is coupled to the drill string 2505 and the sealing sleeve 2515. The innerstring adapter 2510 preferably comprises a substantially hollow tubular member or members. The innerstring adapter 2510 may be fabricated from any number of conventional commercially available materials such as, for example, oilfield country tubular goods, low alloy steel, carbon steel, stainless steel or other similar high strength materials. In a preferred embodiment, the innerstring adapter 2510 is fabricated from stainless steel in order to optimally provide high strength, corrosion resistance, and low friction surfaces.

The innerstring adapter 2510 may be coupled to the drill string 2505 using any number of conventional commercially available mechanical couplings such as, for example, drillpipe connection, oilfield country tubular goods specialty type threaded connection, or a standard threaded connection. In a preferred embodiment, the innerstring adapter 2510 is removably coupled to the drill pipe 2505 by a drillpipe connection. The innerstring adapter 2510 may be coupled to the sealing sleeve 2515 using any number of conventional commercially available mechanical couplings such as, for example, drillpipe connection, oilfield country tubular goods specialty type threaded connection, ratchet-latch type threaded connection or a standard threaded connection. In a preferred embodiment, the innerstring adapter 2510 is removably coupled to the sealing sleeve 2515 by a standard threaded connection.

The innerstring adapter 2510 preferably includes a fluid passage 2570 that is adapted to convey fluidic materials from the fluid passage 2565 into the fluid passage 2575. In a preferred embodiment, the fluid passage 2570 is adapted to convey fluidic materials such as, for example, cement, epoxy, water, drilling mud or lubricants at operating pressures and flow rates ranging from about 0 to 9,000 psi and 0 to 3,000 gallons/minute.

The sealing sleeve 2515 is coupled to the innerstring adapter 2510 and the hydraulic slip body 2520. The sealing sleeve 2515 preferably comprises a substantially hollow tubular member or members. The sealing sleeve 2515 may be fabricated from any number of conventional commercially available materials such as, for example, oilfield country tubular goods, low alloy steel, carbon steel, stainless steel or other similar high strength materials. In a preferred embodiment, the sealing sleeve 2515 is fabricated from stainless steel in order to optimally provide high strength, corrosion resistance, and low-friction surfaces.

The sealing sleeve 2515 may be coupled to the innerstring adapter 2510 using any number of conventional commercially available mechanical couplings such as, for example, drillpipe connections, oilfield country tubular goods specialty type threaded connection, ratchet-latch type threaded connection, or a standard threaded connection. In a preferred embodiment, the sealing sleeve 2515 is removably coupled to the innerstring adapter 2510 by a standard threaded connection. The sealing sleeve 2515 may be coupled to the hydraulic slip body 2520 using any number of conventional commercially available mechanical couplings such as, for example, drillpipe connection, oilfield country tubular goods specialty type threaded connection, ratchet-latch type threaded connection, or a standard threaded connection. In a preferred embodiment, the sealing sleeve 2515 is removably coupled to the hydraulic slip body 2520 by a standard threaded connection.

The sealing sleeve 2515 preferably includes a fluid passage 2575 that is adapted to convey fluidic materials from the fluid passage 2570 into the fluid passage 2580. In a preferred embodiment, the fluid passage 2575 is adapted to convey fluidic materials such as, for example, cement, epoxy, water, drilling mud or lubricants at operating pressures and flow rates ranging from about 0 to 9,000 psi and 0 to 3,000 gallons/minute.

The hydraulic slip body 2520 is coupled to the sealing sleeve 2515, the hydraulic slips 2525, and the inner sealing mandrel 2530. The hydraulic slip body 2520 preferably comprises a substantially hollow tubular member or members. The hydraulic slip body 2520 may be fabricated from any number of conventional commercially available materials such as, for example, oilfield country tubular goods, low alloy steel, carbon steel, stainless steel or other similar high strength materials. In a preferred embodiment, the hydraulic slip body 2520 is fabricated from carbon steel in order to optimally provide high strength.

The hydraulic slip body 2520 may be coupled to the sealing sleeve 2515 using any number of conventional commercially available mechanical couplings such as, for example, drillpipe connection, oilfield country tubular goods specialty type threaded connection, ratchet-latch type threaded connection or a standard threaded connection. In a preferred embodiment, the hydraulic slip body 2520 is removably coupled to the sealing sleeve 2515 by a standard threaded connection. The hydraulic slip body 2520 may be coupled to the slips 2525 using any number of conventional commercially available mechanical couplings such as, for example, threaded connection or welding. In a preferred embodiment, the hydraulic slip body 2520 is removably coupled to the slips 2525 by a threaded connection. The hydraulic slip body 2520 may be coupled to the inner sealing mandrel 2580 using any number of conventional commercially available mechanical couplings such as, for example, drillpipe connection, oilfield country tubular goods specialty type threaded connection, welding, amorphous bonding or a standard threaded connection. In a preferred embodiment, the hydraulic slip body 2520 is removably coupled to the inner sealing mandrel 2530 by a standard threaded connection.

The hydraulic slips body 2520 preferably includes a fluid passage 2580 that is adapted to convey fluidic materials from the fluid passage 2575 into the fluid passage 2590. In a preferred embodiment, the fluid passage 2580 is adapted to convey fluidic materials such as, for example, cement, epoxy, water, drilling mud or lubricants at operating pressures and flow rates ranging from about 0 to 9,000 psi and 0 to 3,000 gallons/minute.

The hydraulic slips body 2520 preferably includes fluid passages 2585 that are adapted to convey fluidic materials from the fluid passage 2580 into the pressure chambers of the hydraulic slips 2525. In this manner, the slips 2525 are activated upon the pressurization of the fluid passage 2580 into contact with the inside surface of the casing 2560. In a preferred embodiment, the fluid passages 2585 are adapted to convey fluidic materials such as, for example, water, drilling mud or lubricants at operating pressures and flow rates ranging from about 0 to 9,000 psi and 0 to 3,000 gallons/minute.

The slips 2525 are coupled to the outside surface of the hydraulic slip body 2520. During operation of the apparatus 2500, the slips 2525 are activated upon the pressurization of the fluid passage 2580 into contact with the inside surface of the casing 2560. In this manner, the slips 2525 maintain the casing 2560 in a substantially stationary position.

The slips 2525 preferably include the fluid passages 2585, the pressure chambers 2605, spring bias 2610, and slip members 2615. The slips 2525 may comprise any number of conventional commercially available hydraulic slips such as, for example, RTTS packer tungsten carbide hydraulic slips or Model 3L retrievable bridge plug with hydraulic slips. In a preferred embodiment, the slips 2525 comprise RTTS packer tungsten carbide hydraulic slips available from Halliburton Energy Services in order to optimally provide resistance to axial movement of the casing 2560 during the expansion process.

The inner sealing mandrel 2530 is coupled to the hydraulic slip body 2520 and the lower sealing head 2540. The inner sealing mandrel 2530 preferably comprises a substantially hollow tubular member or members. The inner sealing mandrel 2530 may be fabricated from any number of conventional commercially available materials such as, for example, oilfield country tubular goods, low alloy steel, carbon steel, stainless steel or other similar high strength materials. In a preferred embodiment, the inner sealing mandrel 2530 is fabricated from stainless steel in order to optimally provide high strength, corrosion resistance, and low friction surfaces.

The inner sealing mandrel 2530 may be coupled to the hydraulic slip body 2520 using any number of conventional commercially available mechanical couplings such as, for example, drillpipe connection, oilfield country tubular goods specialty type threaded connection, welding, amorphous bonding, or a standard threaded connection. In a preferred embodiment, the inner sealing mandrel 2530 is removably coupled to the hydraulic slip body 2520 by a standard threaded connection. The inner sealing mandrel 2530 may be coupled to the lower sealing head 2540 using any number of conventional commercially available mechanical couplings such as, for example, oilfield country tubular goods specialty type threaded connection, drillpipe connection, welding, amorphous bonding, or a standard threaded connection. In a preferred embodiment, the inner sealing mandrel 2530 is removably coupled to the lower sealing head 2540 by a standard threaded connection.

The inner sealing mandrel 2530 preferably includes a fluid passage 2590 that is adapted to convey fluidic materials from the fluid passage 2580 into the fluid passage 2600. In a preferred embodiment, the fluid passage 2590 is adapted to convey fluidic materials such as, for example, cement, epoxy, water, drilling mud or lubricants at operating pressures and flow rates ranging from about 0 to 9,000 psi and 0 to 3,000 gallons/minute.

The upper sealing head 2535 is coupled to the outer sealing mandrel 2545 and expansion cone 2555. The upper sealing head 2535 is also movably coupled to the outer surface of the inner sealing mandrel 2530 and the inner surface of the casing 2560. In this manner, the upper sealing head 2535 reciprocates in the axial direction. The radial clearance between the inner cylindrical surface of the upper sealing head 2535 and the outer surface of the inner sealing mandrel 2530 may range, for example, from about 0.0025 to 0.05 inches. In a preferred embodiment, the radial clearance between the inner cylindrical surface of the upper sealing head 2535 and the outer surface of the inner sealing mandrel 2530 ranges from about 0.005 to 0.01 inches in order to optimally provide minimal radial clearance. The radial clearance between the outer cylindrical surface of the upper sealing head 2535 and the inner surface of the casing 2560 may range, for example, from about 0.025 to 0.375 inches. In a preferred embodiment, the radial clearance between the outer cylindrical surface of the upper sealing head 2535 and the inner surface of the casing 2560 ranges from about 0.025 to 0.125 inches in order to optimally provide stabilization for the expansion cone 2535 during the expansion process.

The upper sealing head 2535 preferably comprises an annular member having substantially cylindrical inner and outer surfaces. The upper sealing head 2535 may be fabricated from any number of conventional commercially available materials such as, for example, oilfield country tubular goods, ow alloy steel, carbon steel, stainless steel or other similar high strength materials. In a preferred embodiment, the upper sealing head 2535 is fabricated from stainless steel in order to optimally provide high strength, corrosion resistance, and low friction surfaces. The inner surface of the upper sealing head 2535 preferably includes one or more annular sealing members 2620 for sealing the interface between the upper sealing head 2535 and the inner sealing mandrel 2530. The sealing members 2620 may comprise any number of conventional commercially available annular sealing members such as, for example, o-rings, polypak seals, or metal spring energized seals. In a preferred embodiment, the sealing members 2620 comprise polypak seals available from Parker Seals in order to optimally provide sealing for a long axial stroke.

In a preferred embodiment, the upper sealing head 2535 includes a shoulder 2625 for supporting the upper sealing head 2535, outer sealing mandrel 2545, and expansion cone 2555 on the lower sealing head 2540.

The upper sealing head 2535 may be coupled to the outer sealing mandrel 2545 using any number of conventional commercially available mechanical couplings such as, for example, oilfield country tubular goods specialty threaded connection, pipeline connection, welding, amorphous bonding, or a standard threaded connection. In a preferred embodiment, the upper sealing head 2535 is removably coupled to the outer sealing mandrel 2545 by a standard threaded connection. In a preferred embodiment, the mechanical coupling between the upper sealing head 2535 and the outer sealing mandrel 2545 includes one or more sealing members 2630 for fluidicly sealing the interface between the upper sealing head 2535 and the outer sealing mandrel 2545. The sealing members 2630 may comprise any number of conventional commercially available sealing members such as, for example, o-rings, polypak seals or metal spring energized seals. In a preferred embodiment, the sealing members 2630 comprise polypak seals available from Parker Seals in order to optimally provide sealing for a long axial stroke.

The lower sealing head 2540 is coupled to the inner sealing mandrel 2530 and the load mandrel 2550. The lower sealing head 2540 is also movably coupled to the inner surface of the outer sealing mandrel 2545. In this manner, the upper sealing head 2535, outer sealing mandrel 2545, and expansion cone 2555 reciprocate in the axial direction.

The radial clearance between the outer surface of the lower sealing head 2540 and the inner surface of the outer sealing mandrel 2545 may range, for example, from about 0.0025 to 0.05 inches. In a preferred embodiment, the radial clearance between the outer surface of the lower sealing head 2540 and the inner surface of the outer sealing mandrel 2545 ranges from about 0.005 to 0.01 inches in order to optimally provide minimal radial clearance.

The lower sealing head 2540 preferably comprises an annular member having substantially cylindrical inner and outer surfaces. The lower sealing head 2540 may be fabricated from any number of conventional commercially available materials such as, for example, oilfield country tubular goods, low alloy steel, carbon steel, stainless steel or other similar high strength materials. In a preferred embodiment, the lower sealing head 2540 is fabricated from stainless steel in order to optimally provide high strength, corrosion resistance, and low friction surfaces. The outer surface of the lower sealing head 2540 preferably includes one or more annular sealing members 2635 for sealing the interface between the lower sealing head 2540 and the outer sealing mandrel 2545. The sealing members 2635 may comprise any number of conventional commercially available annular sealing members such as, for example, o-rings, polypak seals, or metal spring energized seals. In a preferred embodiment, the sealing members 2635 comprise polypak seals available from Parker Seals in order to optimally provide sealing for a long axial stroke.

The lower sealing head 2540 may be coupled to the inner sealing mandrel 2530 using any number of conventional commercially available mechanical couplings such as, for example, drillpipe connections, oilfield country tubular goods specialty threaded connection, or a standard threaded connection. In a preferred embodiment, the lower sealing head 2540 is removably coupled to the inner sealing mandrel 2530 by a standard threaded connection. In a preferred embodiment, the mechanical coupling between the lower sealing head 2540 and the inner sealing mandrel 2530 includes one or more sealing members 2640 for fluidicly sealing the interface between the lower sealing head 2540 and the inner sealing mandrel 2530. The sealing members 2640 may comprise any number of conventional commercially available sealing members such as, for example, o-rings, polypak seals or metal spring energized seals. In a preferred embodiment, the sealing members 2640 comprise polypak seals available from Parker Seals in order to optimally provide sealing for a long axial stroke.

The lower sealing head 2540 may be coupled to the load mandrel 2550 using any number of conventional commercially available mechanical couplings such as, for example, drillpipe connection, oilfield country tubular goods specialty type threaded connection, welding, amorphous bonding or a standard threaded connection. In a preferred embodiment, the lower sealing head 2540 is removably coupled to the load mandrel 2550 by a standard threaded connection. In a preferred embodiment, the mechanical coupling between the lower sealing head 2540 and the load mandrel 2550 includes one or more sealing members 2645 for fluidicly sealing the interface between the lower sealing head 2540 and the load mandrel 2550. The sealing members 2645 may comprise any number of conventional commercially available sealing members such as, for example, o-rings, polypak seals or metal spring energized seals. In a preferred embodiment, the sealing members 2645 comprise polypak seals available from Parker Seals in order to optimally provide sealing for a long axial stroke.

In a preferred embodiment, the lower sealing head 2540 includes a throat passage 2650 fluidicly coupled between the fluid passages 2590 and 2600. The throat passage 2650 is preferably of reduced size and is adapted to receive and engage with a plug 2655, or other similar device. In this manner, the fluid passage 2590 is fluidicly isolated from the fluid passage 2600. In this manner, the pressure chamber 2660 is pressurized.

The outer sealing mandrel 2545 is coupled to the upper sealing head 2535 and the expansion cone 2555. The outer sealing mandrel 2545 is also movably coupled to the inner surface of the casing 2560 and the outer surface of the lower sealing head 2540. In this manner, the upper sealing head 2535, outer sealing mandrel 2545, and the expansion cone 2555 reciprocate in the axial direction. The radial clearance between the outer surface of the outer sealing mandrel 2545 and the inner surface of the casing 2560 may range, for example, from about 0.025 to 0.375 inches. In a preferred embodiment, the radial clearance between the outer surface of the outer sealing mandrel 2545 and the inner surface of the casing 2560 ranges from about 0.025 to 0.125 inches in order to optimally provide stabilization for the expansion cone 2535 during the expansion process. The radial clearance between the inner surface of the outer sealing mandrel 2545 and the outer surface of the lower sealing head 2540 may range, for example, from about 0.005 to 0.01 inches. In a preferred embodiment, the radial clearance between the inner surface of the outer sealing mandrel 2545 and the outer surface of the lower sealing head 2540 ranges from about 0.005 to 0.01 inches in order to optimally provide minimal radial clearance.

The outer sealing mandrel 2545 preferably comprises an annular member having substantially cylindrical inner and outer surfaces. The outer sealing mandrel 2545 may be fabricated from any number of conventional commercially available materials such as, for example, oilfield country tubular goods, low alloy steel, carbon steel, stainless steel or other similar high strength materials. In a preferred embodiment, the outer sealing mandrel 2545 is fabricated from stainless steel in order to optimally provide high strength, corrosion resistance, and low friction surfaces.

The outer sealing mandrel 2545 may be coupled to the upper sealing head 2535 using any number of conventional commercially available mechanical couplings such as, for example, drillpipe connection, oilfield country tubular goods specialty type threaded connection, welding, amorphous bonding, or a standard threaded connection. In a preferred embodiment, the outer sealing mandrel 2545 is removably coupled to the upper sealing head 2535 by a standard threaded connection. The outer sealing mandrel 2545 may be coupled to the expansion cone 2555 using any number of conventional commercially available mechanical couplings such as, for example, drillpipe connection, oilfield country tubular goods specialty type threaded connection, welding, amorphous bonding, or a standard threaded connection. In a preferred embodiment, the outer sealing mandrel 2545 is removably coupled to the expansion cone 2555 by a standard threaded connection.

The upper sealing head 2535, the lower sealing head 2540, the inner sealing mandrel 2530, and the outer sealing mandrel 2545 together define a pressure chamber 2660. The pressure chamber 2660 is fluidicly coupled to the passage 2590 via one or more passages 2595. During operation of the apparatus 2500, the plug 2655 engages with the throat passage 2650 to fluidicly isolate the fluid passage 2590 from the fluid passage 2600. The pressure chamber 2660 is then pressurized which in turn causes the upper sealing head 2535, outer sealing mandrel 2545, and expansion cone 2555 to reciprocate in the axial direction. The axial motion of the expansion cone 2555 in turn expands the casing 2560 in the radial direction.

The load mandrel 2550 is coupled to the lower sealing head 2540. The load mandrel 2550 preferably comprises an annular member having substantially cylindrical inner and outer surfaces. The load mandrel 2550 may be fabricated from any number of conventional commercially available materials such as, for example, oilfield country tubular goods, low alloy steel, carbon steel, stainless steel or other similar high strength materials. In a preferred embodiment, the load mandrel 2550 is fabricated from stainless steel in order to optimally provide high strength, corrosion resistance, and low friction surfaces.

The load mandrel 2550 may be coupled to the lower sealing head 2540 using any number of conventional commercially available mechanical couplings such as, for example, oilfield country tubular goods, drillpipe connection, welding, amorphous bonding, or a standard threaded connection. In a preferred embodiment, the load mandrel 2550 is removably coupled to the lower sealing head 2540 by a standard threaded connection.

The load mandrel 2550 preferably includes a fluid passage 2600 that is adapted to convey fluidic materials from the fluid passage 2590 to the region outside of the apparatus 2500. In a preferred embodiment, the fluid passage 2600 is adapted to convey fluidic materials such as, for example, cement, epoxy, water, drilling mud, or lubricants at operating pressures and flow rates ranging, for example, from about 0 to 9,000 psi and 0 to 3,000 gallons/minute.

The expansion cone 2555 is coupled to the outer sealing mandrel 2545. The expansion cone 2555 is also movably coupled to the inner surface of the casing 2560. In this manner, the upper sealing head 2535, outer sealing mandrel 2545, and the expansion cone 2555 reciprocate in the axial direction. The reciprocation of the expansion cone 2555 causes the casing 2560 to expand in the radial direction.

The expansion cone 2555 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 in order to optimally provide radial expansion for the widest variety of tubular casings. The axial length of the expansion cone 2555 may range, for example, from about 2 to 8 times the largest outside diameter of the expansion cone 2535. In a preferred embodiment, the axial length of the expansion cone 2535 ranges from about 3 to 5 times the largest outside diameter of the expansion cone 2535 in order to optimally provide stabilization and centralization of the expansion cone 2635 during the expansion process. In a particularly preferred embodiment, the maximum outside diameter of the expansion cone 2555 is between about 95 to 99% of the inside diameter of the existing wellbore that the casing 2560 will be joined with. In a preferred embodiment, the angle of attack of the expansion cone 2555 ranges from about 5 to 30 degrees in order to optimally balance frictional forces and radial expansion forces. The optimum angle of attack of the expansion cone 2535 will vary as a function of the particular operational features of the expansion operation.

The expansion cone 2555 may be fabricated from any number of conventional commercially available materials such as, for example, machine tool steel, nitride steel, titanium, tungsten carbide, ceramics or other similar high strength materials. In a preferred embodiment, the expansion cone 2555 is fabricated from D2 machine tool steel in order to optimally provide high strength, and resistance to wear and galling. In a particularly preferred embodiment, the outside surface of the expansion cone 2555 has a surface hardness ranging from about 58 to 62 Rockwell C in order to optimally provide high strength and wear resistance.

The expansion cone 2555 may be coupled to the outside sealing mandrel 2545 using any number of conventional commercially available mechanical couplings such as, for example, drillpipe connection, oilfield country tubular goods specialty threaded connection, welding, amorphous bonding or a standard threaded connection. In a preferred embodiment, the expansion cone 2555 is coupled to the outside sealing mandrel 2545 using a standard threaded connection in order to optimally provide high strength and easy replacement of the expansion cone 2555.

The casing 2560 is removably coupled to the slips 2525 and expansion cone 2555. The casing 2560 preferably comprises a tubular member. The casing 2560 may be fabricated from any number of conventional commercially available materials such as, for example, slotted tubulars, oilfield country tubular goods, low alloy steel, carbon steel, stainless steel or other similar high strength materials. In a preferred embodiment, the casing 2560 is fabricated from oilfield country tubular goods available from various foreign and domestic steel mills in order to optimally provide high strength using standardized materials.

In a preferred embodiment, the upper end 2665 of the casing 2560 includes a thin wall section 2670 and an outer annular sealing member 2675. In a preferred embodiment, the wall thickness of the thin wall section 2670 is about 50 to 100% of the regular wall thickness of the casing 2560. In this manner, the upper end 2665 of the casing 2560 may be easily radially expanded and deformed into intimate contact with the lower end of an existing section of wellbore casing. In a preferred embodiment, the lower end of the existing section of casing also includes a thin wall section. In this manner, the radial expansion of the thin walled section 2670 of casing 2560 into the thin walled section of the existing wellbore casing results in a wellbore casing having a substantially constant inside diameter.

The annular sealing member 2675 may be fabricated from any number of conventional commercially available sealing materials such as, for example, epoxy, rubber, metal, or plastic. In a preferred embodiment, the annular sealing member 2675 is fabricated from StrataLock epoxy in order to optimally provide compressibility and resistance to wear. The outside diameter of the annular sealing member 2675 preferably ranges from about 70 to 95% of the inside diameter of the lower section of the wellbore casing that the casing 2560 is joined to. In this manner, after radial expansion, the annular sealing member 2670 optimally provides a fluidic seal and also preferably optimally provides sufficient frictional force with the inside surface of the existing section of wellbore casing during the radial expansion of the casing 2560 to support the casing 2560.

In a preferred embodiment, the lower end 2680 of the casing 2560 includes a thin wall section 2685 and an outer annular sealing member 2690. In a preferred embodiment, the wall thickness of the thin wall section 2685 is about 50 to 100% of the regular wall thickness of the casing 2560. In this manner, the lower end 2680 of the casing 2560 may be easily expanded and deformed. Furthermore, in this manner, an other section of casing may be easily joined with the lower end 2680 of the casing 2560 using a radial expansion process. In a preferred embodiment, the upper end of the other section of casing also includes a thin wall section. In this manner, the radial expansion of the thin walled section of the upper end of the other casing into the thin walled section 2685 of the lower end 2680 of the casing 2560 results in a wellbore casing having a substantially constant inside diameter.

The annular sealing member 2690 may be fabricated from any number of conventional commercially available sealing materials such as, for example, rubber, metal, plastic or epoxy. In a preferred embodiment, the annular sealing member 2690 is fabricated from StrataLock epoxy in order to optimally provide compressibility and resistance to wear. The outside diameter of the annular sealing member 2690 preferably ranges from about 70 to 95% of the inside diameter of the lower section of the existing wellbore casing that the casing 2560 is joined to. In this manner, after radial expansion, the annular sealing member 2690 preferably provides a fluidic seal and also preferably provides sufficient frictional force with the inside wall of the wellbore during the radial expansion of the casing 2560 to support the casing 2560.

During operation, the apparatus 2500 is preferably positioned in a wellbore with the upper end 2665 of the casing 2560 positioned in an overlapping relationship with the lower end of an existing wellbore casing. In a particularly preferred embodiment, the thin wall section 2670 of the casing 2560 is positioned in opposing overlapping relation with the thin wall section and outer annular sealing member of the lower end of the existing section of wellbore casing. In this manner, the radial expansion of the casing 2560 will compress the thin wall sections and annular compressible members of the upper end 2665 of the casing 2560 and the lower end of the existing wellbore casing into intimate contact. During the positioning of the apparatus 2500 in the wellbore, the casing 2560 is supported by the expansion cone 2555.

After positioning of the apparatus 2500, a first fluidic material is then pumped into the fluid passage 2565. The first fluidic material may comprise any number of conventional commercially available materials such as, for example, cement, water, slag-mix, epoxy or drilling mud. In a preferred embodiment, the first fluidic material comprises a hardenable fluidic sealing material such as, for example, cement, epoxy, or slag-mix in order to optimally provide a hardenable outer annular body around the expanded casing 2560.

The first fluidic material may be pumped into the fluid passage 2565 at operating pressures and flow rates ranging, for example, from about 0 to 4,500 psi and 0 to 3,000 gallons/minute. In a preferred embodiment, the first fluidic material is pumped into the fluid passage 2565 at operating pressures and flow rates ranging from about 0 to 3,500 psi and 0 to 1,200 gallons/minute in order to optimally provide operational efficiency.

The first fluidic material pumped into the fluid passage 2565 passes through the fluid passages 2570, 2575, 2580, 2590, 2600 and then outside of the apparatus 2500. The first fluidic material then preferably fills the annular region between the outside of the apparatus 2500 and the interior walls of the wellbore.

The plug 2655 is then introduced into the fluid passage 2565. The plug 2655 lodges in the throat passage 2650 and fluidicly isolates and blocks off the fluid passage 2590. In a preferred embodiment, a couple of volumes of a non-hardenable fluidic material are then pumped into the fluid passage 2565 in order to remove any hardenable fluidic material contained within and to ensure that none of the fluid passages are blocked.

A second fluidic material is then pumped into the fluid passage 2565. The second fluidic material may comprise any number of conventional commercially available materials such as, for example, water, drilling gases, drilling mud or lubricant. In a preferred embodiment, the second fluidic material comprises a non-hardenable fluidic material such as, for example, water, drilling mud, or lubricant in order to optimally provide pressurization of the pressure chamber 2660 and minimize friction.

The second fluidic material may be pumped into the fluid passage 2565 at operating pressures and flow rates ranging, for example, from about 0 to 4,500 psi and 0 to 4,500 gallons/minute. In a preferred embodiment, the second fluidic material is pumped into the fluid passage 2565 at operating pressures and flow rates ranging from about 0 to 3,500 psi and 0 to 1,200 gallons/minute in order to optimally provide operational efficiency.

The second fluidic material pumped into the fluid passage 2565 passes through the fluid passages 2570, 2575, 2580, 2590 and into the pressure chambers 2605 of the slips 2525, and into the pressure chamber 2660. Continued pumping of the second fluidic material pressurizes the pressure chambers 2605 and 2660.

The pressurization of the pressure chambers 2605 causes the slip members 2525 to expand in the radial direction and grip the interior surface of the casing 2560. The casing 2560 is then preferably maintained in a substantially stationary position.

The pressurization of the pressure chamber 2660 causes the upper sealing head 2535, outer sealing mandrel 2545 and expansion cone 2555 to move in an axial direction relative to the casing 2560. In this manner, the expansion cone 2555 will cause the casing 2560 to expand in the radial direction, beginning with the lower end 2685 of the casing 2560.

During the radial expansion process, the casing 2560 is prevented from moving in an upward direction by the slips 2525. A length of the casing 2560 is then expanded in the radial direction through the pressurization of the pressure chamber 2660. The length of the casing 2560 that is expanded during the expansion process will be proportional to the stroke length of the upper sealing head 2535, outer sealing mandrel 2545, and expansion cone 2555.

Upon the completion of a stroke, the operating pressure of the second fluidic material is reduced and the upper sealing head 2535, outer sealing mandrel 2545, and expansion cone 2555 drop to their rest positions with the casing 2560 supported by the expansion cone 2555. The position of the drillpipe 2505 is preferably adjusted throughout the radial expansion process in order to maintain the overlapping relationship between the thin walled sections of the lower end of the existing wellbore casing and the upper end of the casing 2560. In a preferred embodiment, the stroking of the expansion cone 2555 is then repeated, as necessary, until the thin walled section 2670 of the upper end 2665 of the casing 2560 is expanded into the thin walled section of the lower end of the existing wellbore casing. In this manner, a wellbore casing is formed including two adjacent sections of casing having a substantially constant inside diameter. This process may then be repeated for the entirety of the wellbore to provide a wellbore casing thousands of feet in length having a substantially constant inside diameter.

In a preferred embodiment, during the final stroke of the expansion cone 2555, the slips 2525 are positioned as close as possible to the thin walled section 2670 of the upper end 2665 of the casing 2560 in order minimize slippage between the casing 2560 and the existing wellbore casing at the end of the radial expansion process. Alternatively, or in addition, the outside diameter of the annular sealing member 2675 is selected to ensure sufficient interference fit with the inside diameter of the lower end of the existing casing to prevent axial displacement of the casing 2560 during the final stroke. Alternatively, or in addition, the outside diameter of the annular sealing member 2690 is selected to provide an interference fit with the inside walls of the wellbore at an earlier point in the radial expansion process so as to prevent further axial displacement of the casing 2560. In this final alternative, the interference fit is preferably selected to permit expansion of the casing 2560 by pulling the expansion cone 2555 out of the wellbore, without having to pressurize the pressure chamber 2660.

During the radial expansion process, the pressurized areas of the apparatus 2500 are preferably limited to the fluid passages 2565, 2570, 2575, 2580, and 2590, the pressure chambers 2605 within the slips 2525, and the pressure chamber 2660. No fluid pressure acts directly on the casing 2560. This permits the use of operating pressures higher than the casing 2560 could normally withstand.

Once the casing 2560 has been completely expanded off of the expansion cone 2555, the remaining portions of the apparatus 2500 are removed from the wellbore. In a preferred embodiment, the contact pressure between the deformed thin wall sections and compressible annular members of the lower end of the existing casing and the upper end 2665 of the casing 2560 ranges from about 400 to 10,000 psi in order to optimally support the casing 2560 using the existing wellbore casing.

In this manner, the casing 2560 is radially expanded into contact with an existing section of casing by pressurizing the interior fluid passages 2565, 2570, 2575, 2580, and 2590, the pressure chambers of the slips 2605 and the pressure chamber 2660 of the apparatus 2500.

In a preferred embodiment, as required, the annular body of hardenable fluidic material is then allowed to cure to form a rigid outer annular body about the expanded casing 2560. In the case where the casing 2560 is slotted, the cured fluidic material preferably permeates and envelops the expanded casing 2560. The resulting new section of wellbore casing includes the expanded casing 2560 and the rigid outer annular body. The overlapping joint between the preexisting wellbore casing and the expanded casing 2560 includes the deformed thin wall sections and the compressible outer annular bodies. The inner diameter of the resulting combined wellbore casings is substantially constant. In this manner, a mono-diameter wellbore casing is formed. This process of expanding overlapping tubular members having thin wall end portions with compressible annular bodies into contact can be repeated for the entire length of a wellbore. In this manner, a mono-diameter wellbore casing can be provided for thousands of feet in a subterranean formation.

In a preferred embodiment, as the expansion cone 2555 nears the upper end 2665 of the casing 2560, the operating pressure of the second fluidic material is reduced in order to minimize shock to the apparatus 2500. In an alternative embodiment, the apparatus 2500 includes a shock absorber for absorbing the shock created by the completion of the radial expansion of the casing 2560.

In a preferred embodiment, the reduced operating pressure of the second fluidic material ranges from about 100 to 1,000 psi as the expansion cone 2555 nears the end of the casing 2560 in order to optimally provide reduced axial movement and velocity of the expansion cone 2555. In a preferred embodiment, the operating pressure of the second fluidic material is reduced during the return stroke of the apparatus 2500 to the range of about 0 to 500 psi in order minimize the resistance to the movement of the expansion cone 2555 during the return stroke. In a preferred embodiment, the stroke length of the apparatus 2500 ranges from about 10 to 45 feet in order to optimally provide equipments lengths that can be easily handled using typical oil well rigging equipment and also minimize the frequency at which apparatus 2500 must be re-stroked.

In an alternative embodiment, at least a portion of the upper sealing head 2535 includes an expansion cone for radially expanding the casing 2560 during operation of the apparatus 2500 in order to increase the surface area of the casing 2560 acted upon during the radial expansion process. In this manner, the operating pressures can be reduced.

Alternatively, the apparatus 2500 may be used to join a first section of pipeline to an existing section of pipeline. Alternatively, the apparatus 2500 may be used to directly line the interior of a wellbore with a casing, without the use of an outer annular layer of a hardenable material. Alternatively, the apparatus 2500 may be used to expand a tubular support member in a hole.

Figure 19:
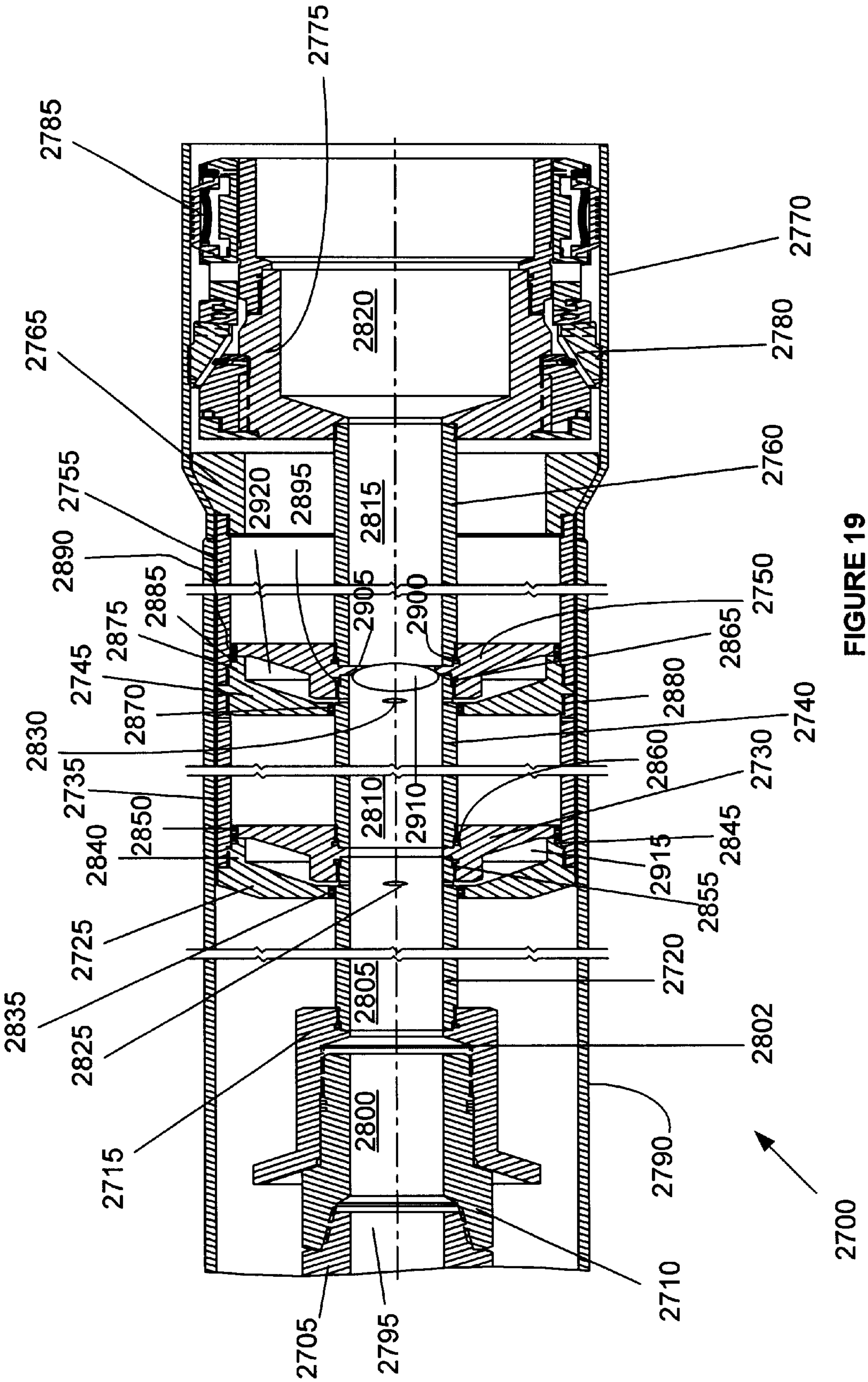
FIG. 19 is an illustration of another embodiment of an apparatus for expanding a tubular member.
Figure 19A:
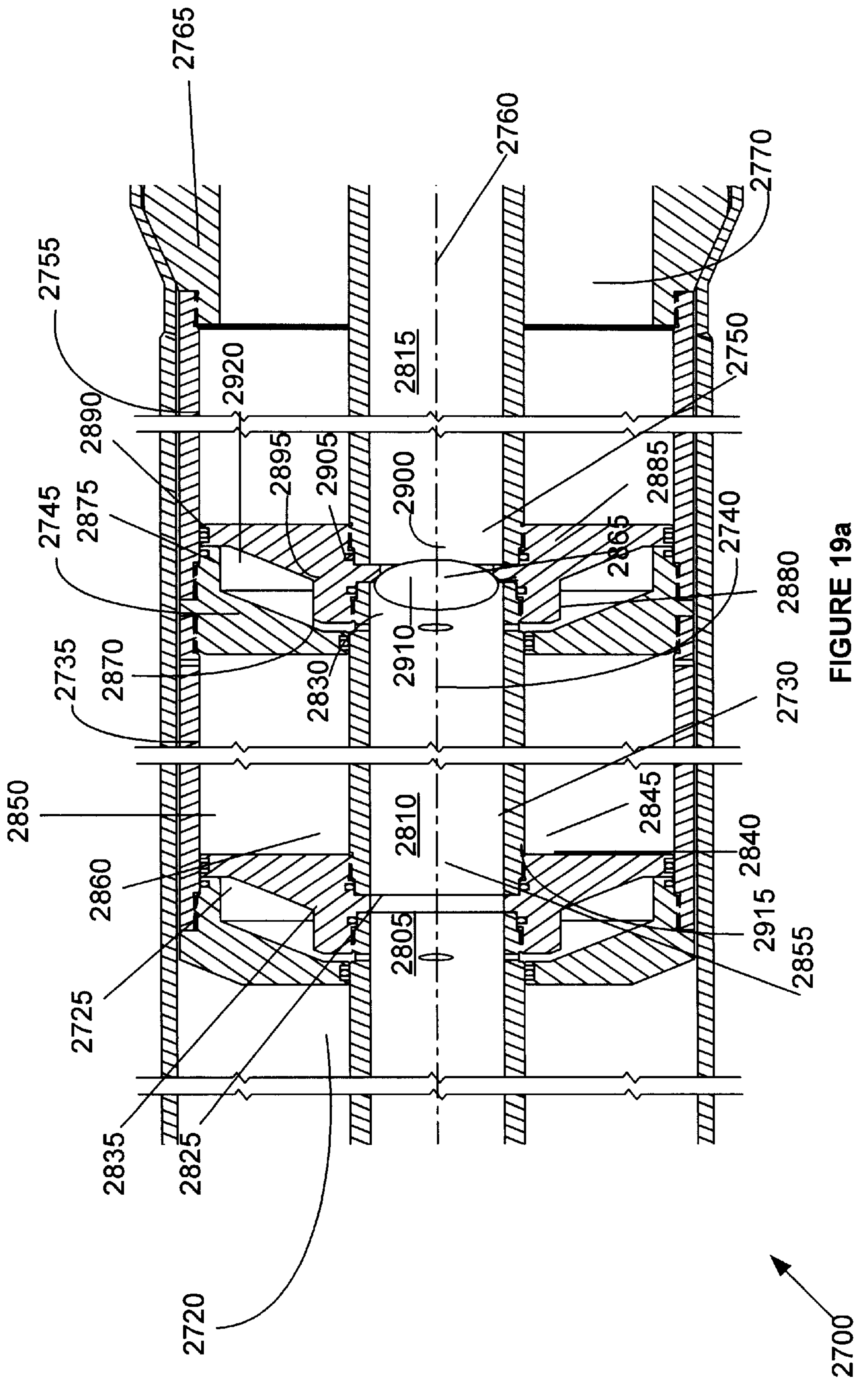
FIG. 19*a* is another illustration of the apparatus of FIG. 17.
Figure 19B:
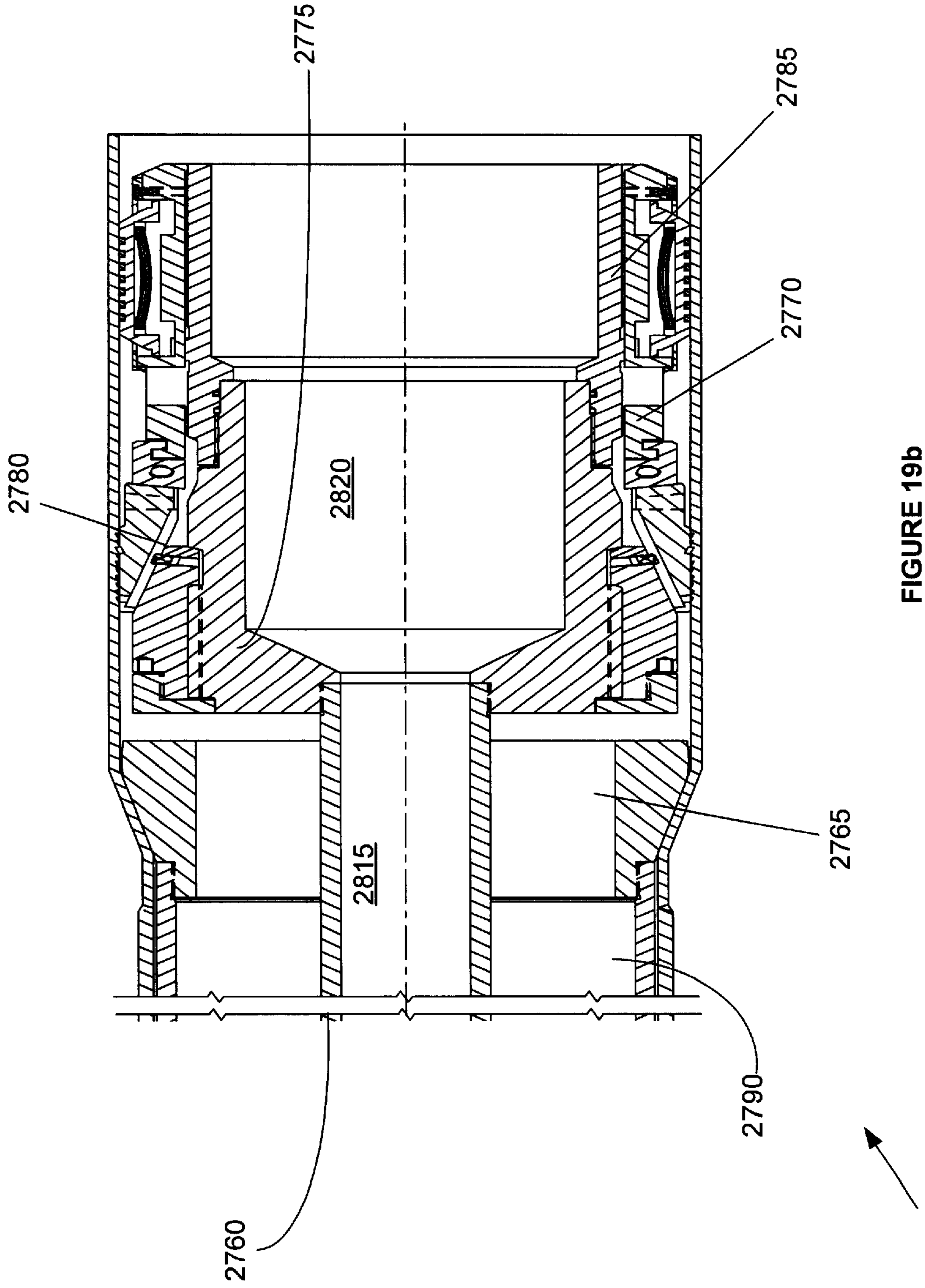
FIG. 19*b* is another illustration of the apparatus of FIG. 17.

Referring now to FIGS. 19, 19*a* and 19*b*, another embodiment of an apparatus 2700 for expanding a tubular member will be described. The apparatus 2700 preferably includes a drillpipe 2705, an innerstring adapter 2710, a sealing sleeve 2715, a first inner sealing mandrel 2720, a first upper sealing head 2725, a first lower sealing head 2730, a first outer sealing mandrel 2735, a second inner sealing mandrel 2740, a second upper sealing head 2745, a second lower sealing head 2750, a second outer sealing mandrel 2755, a load mandrel 2760, an expansion cone 2765, a mandrel launcher 2770, a mechanical slip body 2775, mechanical slips 2780, drag blocks 2785, casing 2790, and fluid passages 2795, 2800, 2805, 2810, 2815, 2820, 2825, and 2830.

The drillpipe 2705 is coupled to the innerstring adapter 2710. During operation of the apparatus 2700, the drillpipe 2705 supports the apparatus 2700. The drillpipe 2705 preferably comprises a substantially hollow tubular member or members. The drillpipe 2705 may be fabricated from any number of conventional commercially available materials such as, for example, oilfield country tubular goods, low alloy steel, carbon steel, stainless steel, or other similar high strength materials. In a preferred embodiment, the drillpipe 2705 is fabricated from coiled tubing in order to facilitate the placement of the apparatus 2700 in non-vertical wellbores. The drillpipe 2705 may be coupled to the innerstring adapter 2710 using any number of conventional commercially available mechanical couplings such as, for example, drillpipe connection, oilfield country tubular goods specialty threaded connection, or a standard threaded connection. In a preferred embodiment, the drillpipe 2705 is removably coupled to the innerstring adapter 2710 by a drillpipe connection in order to optimally provide high strength and easy disassembly.

The drillpipe 2705 preferably includes a fluid passage 2795 that is adapted to convey fluidic materials from a surface location into the fluid passage 2800. In a preferred embodiment, the fluid passage 2795 is adapted to convey fluidic materials such as, for example, cement, epoxy, water, drilling mud or lubricants at operating pressures and flow rates ranging from about 0 to 9,000 psi and 0 to 3,000 gallons/minute.

The innerstring adapter 2710 is coupled to the drill string 2705 and the sealing sleeve 2715. The innerstring adapter 2710 preferably comprises a substantially hollow tubular member or members. The innerstring adapter 2710 may be fabricated from any number of conventional commercially available materials such as, for example, oilfield country tubular goods, low alloy steel, carbon steel, stainless steel or other similar high strength materials. In a preferred embodiment, the innerstring adapter 2710 is fabricated from stainless steel in order to optimally provide high strength, corrosion resistance, and low friction surfaces.

The innerstring adapter 2710 may be coupled to the drill string 2705 using any number of conventional commercially available mechanical couplings such as, for example, drillpipe connection, oilfield country tubular goods specialty threaded connection, or a standard threaded connection. In a preferred embodiment, the innerstring adapter 2710 is removably coupled to the drill pipe 2705 by a standard threaded connection in order to optimally provide high strength and easy disassembly. The innerstring adapter 2710 may be coupled to the sealing sleeve 2715 using any number of conventional commercially available mechanical couplings such as, for example, drillpipe connection, oilfield country tubular goods specialty type threaded connection, ratchet-latch type threaded connection or a standard threaded connection. In a preferred embodiment, the innerstring adapter 2710 is removably coupled to the sealing sleeve 2715 by a standard threaded connection.

The innerstring adapter 2710 preferably includes a fluid passage 2800 that is adapted to convey fluidic materials from the fluid passage 2795 into the fluid passage 2805. In a preferred embodiment, the fluid passage 2800 is adapted to convey fluidic materials such as, for example, cement, epoxy, water, drilling mud or lubricants at operating pressures and flow rates ranging from about 0 to 9,000 psi and 0 to 3,000 gallons/minute.

The sealing sleeve 2716 is coupled to the innerstring adapter 2710 and the first inner sealing mandrel 2720. The sealing sleeve 2715 preferably comprises a substantially hollow tubular member or members. The sealing sleeve 2715 may be fabricated from any number of conventional commercially available materials such as, for example, oilfield country tubular goods, low alloy steel, carbon steel, stainless steel or other similar high strength materials. In a preferred embodiment, the sealing sleeve 2715 is fabricated from stainless steel in order to optimally provide high strength, corrosion resistance, and low friction surfaces.

The sealing sleeve 2715 may be coupled to the innerstring adapter 2710 using any number of conventional commercially available mechanical couplings such as, for example, drillpipe connection, oilfield country tubular goods specialty type threaded connection, welding, amorphous bonding, or a standard threaded connection. In a preferred embodiment, the sealing sleeve 2715 is removably coupled to the innerstring adapter 2710 by a standard threaded connector. The sealing sleeve 2715 may be coupled to the first inner sealing mandrel 2720 using any number of conventional commercially available mechanical couplings such as, for example, drillpipe connection, oilfield country tubular goods specialty type threaded connection, welding, amorphous bonding or a standard threaded connection. In a preferred embodiment, the sealing sleeve 2715 is removably coupled to the inner sealing mandrel 2720 by a standard threaded connection.

The sealing sleeve 2715 preferably includes a fluid passage 2802 that is adapted to convey fluidic materials from the fluid passage 2800 into the fluid passage 2805. In a preferred embodiment, the fluid passage 2802 is adapted to convey fluidic materials such as, for example, cement, epoxy, water, drilling mud or lubricants at operating pressures and flow rates ranging from about 0 to 9,000 psi and 0 to 3,000 gallons/minute.

The first inner sealing mandrel 2720 is coupled to the sealing sleeve 2715 and the first lower sealing head 2730. The first inner sealing mandrel 2720 preferably comprises a substantially hollow tubular member or members. The first inner sealing mandrel 2720 may be fabricated from any number of conventional commercially available materials such as, for example, oilfield country tubular goods, low alloy steel, carbon steel, stainless steel or other similar high strength materials. In a preferred embodiment, the first inner sealing mandrel 2720 is fabricated from stainless steel in order to optimally provide high strength, corrosion resistance, and low friction surfaces.

The first inner sealing mandrel 2720 may be coupled to the sealing sleeve 2715 using any number of conventional commercially available mechanical couplings such as, for example, drillpipe connection oilfield country tubular goods specialty threaded connection, welding, amorphous bonding, or a standard threaded connection. In a preferred embodiment, the first inner sealing mandrel 2720 is removably coupled to the sealing sleeve 2715 by a standard threaded connection. The first inner sealing mandrel 2720 may be coupled to the first lower sealing head 2730 using any number of conventional commercially available mechanical couplings such as, for example, drillpipe connection, oilfield country tubular goods specialty type threaded connection, welding, amorphous bonding, or a standard threaded connection. In a preferred embodiment, the first inner sealing mandrel 2720 is removably coupled to the first lower sealing head 2730 by a standard threaded connection.

The first inner sealing mandrel 2720 preferably includes a fluid passage 2805 that is adapted to convey fluidic materials from the fluid passage 2802 into the fluid passage 2810. In a preferred embodiment, the fluid passage 2805 is adapted to convey fluidic materials such as, for example, cement, epoxy, water, drilling mud or lubricants at operating pressures and flow rates ranging from about 0 to 9,000 psi and 0 to 3,000 gallons/minute.

The first upper sealing head 2725 is coupled to the first outer sealing mandrel 2735, the second upper sealing head 2745, the second outer sealing mandrel 2755, and the expansion cone 2765. The first upper sealing head 2725 is also movably coupled to the outer surface of the first inner sealing mandrel 2720 and the inner surface of the casing 2790. In this manner, the first upper sealing head 2725 reciprocates in the axial direction. The radial clearance between the inner cylindrical surface of the first upper sealing head 2725 and the outer surface of the first inner sealing mandrel 2720 may range, for example, from about 0.0025 to 0.05 inches. In a preferred embodiment, the radial clearance between the inner cylindrical surface of the first upper sealing head 2725 and the outer surface of the first inner sealing mandrel 2720 ranges from about 0.005 to 0.125 inches in order to optimally provide minimal radial clearance. The radial clearance between the outer cylindrical surface of the first upper sealing head 2725 and the inner surface of the casing 2790 may range, for example, from about 0.025 to 0.375 inches. In a preferred embodiment, the radial clearance between the outer cylindrical surface of the first upper sealing head 2725 and the inner surface of the casing 2790 ranges from about 0.025 to 0.125 inches in order to optimally provide stabilization for the expansion cone 2765 during the expansion process.

The first upper sealing head 2725 preferably comprises an annular member having substantially cylindrical inner and outer surfaces. The first upper sealing head 2725 may be fabricated from any number of conventional commercially available materials such as, for example, oilfield country tubular goods, low alloy steel, carbon steel, stainless steel or other similar high strength materials. In a preferred embodiment, the first upper sealing head 2725 is fabricated from stainless steel in order to optimally provide high strength, corrosion resistance and low friction surfaces. The inner surface of the first upper sealing head 2725 preferably includes one or more annular sealing members 2835 for sealing the interface between the first upper sealing head 2725 and the first inner sealing mandrel 2720. The sealing members 2835 may comprise any number of conventional commercially available annular sealing members such as, for example, o-rings, polypak seals or metal spring energized seals. In a preferred embodiment, the sealing members 2835 comprise polypak seals available from Parker Seals in order to optimally provide sealing for long axial strokes.

In a preferred embodiment, the first upper sealing head 2725 includes a shoulder 2840 for supporting the first upper sealing head 2725 on the first lower sealing head 2730.

The first upper sealing head 2725 may be coupled to the first outer sealing mandrel 2735 using any number of conventional commercially available mechanical couplings such as, for example, drillpipe connection, oilfield country tubular goods specialty threaded connection, welding, amorphous bonding or a standard threaded connection. In a preferred embodiment, the first upper sealing head 2725 is removably coupled to the first outer sealing mandrel 2735 by a standard threaded connection. In a preferred embodiment, the mechanical coupling between the first upper sealing head 2725 and the first outer sealing mandrel 2735 includes one or more sealing members 2845 for fluidicly sealing the interface between the first upper sealing head 2725 and the first outer sealing mandrel 2735. The sealing members 2845 may comprise any number of conventional commercially available sealing members such as, for example, o-rings, polypak seals or metal spring energized seals. In a preferred embodiment, the sealing members 2845 comprise polypak seals available from Parker Seals in order to optimally provide sealing for long axial strokes.

The first lower sealing head 2730 is coupled to the first inner sealing mandrel 2720 and the second inner sealing mandrel 2740. The first lower sealing head 2730 is also movably coupled to the inner surface of the first outer sealing mandrel 2735. In this manner, the first upper sealing head 2725 and first outer sealing mandrel 2735 reciprocate in the axial direction. The radial clearance between the outer surface of the first lower sealing head 2730 and the inner surface of the first outer sealing mandrel 2735 may range, for example, from about 0.0025 to 0.05 inches. In a preferred embodiment, the radial clearance between the outer surface of the first lower sealing head 2730 and the inner surface of the first outer sealing mandrel 2735 ranges from about 0.005 to 0.01 inches in order to optimally provide minimal radial clearance.

The first lower sealing head 2730 preferably comprises an annular member having substantially cylindrical inner and outer surfaces. The first lower sealing head 2730 may be fabricated from any number of conventional commercially available materials such as, for example, oilfield country tubular goods, low alloy steel, carbon steel, stainless steel or other similar high strength materials. In a preferred embodiment, the first lower sealing head 2730 is fabricated from stainless steel in order to optimally provide high strength, corrosion resistance, and low friction surfaces. The outer surface of the first lower sealing head 2730 preferably includes one or more annular sealing members 2850 for sealing the interface between the first lower sealing head 2730 and the first outer sealing mandrel 2735. The sealing members 2850 may comprise any number of conventional commercially available annular sealing members such as, for example, o-rings, polypak seals or metal spring energized seals. In a preferred embodiment, the sealing members 2850 comprise polypak seals available from Parker Seals in order to optimally provide sealing for long axial strokes.

The first lower sealing head 2730 may be coupled to the first inner sealing mandrel 2720 using any number of conventional commercially available mechanical couplings such as, for example, oilfield country tubular goods specialty threaded connections, welding, amorphous bonding, or standard threaded connection. In a preferred embodiment, the first lower sealing head 2730 is removably coupled to the first inner sealing mandrel 2720 by a standard threaded connection. In a preferred embodiment, the mechanical coupling between the first lower sealing head 2730 and the first inner sealing mandrel 2720 includes one or more sealing members 2855 for fluidicly sealing the interface between the first lower sealing head 2730 and the first inner sealing mandrel 2720. The sealing members 2855 may comprise any number of conventional commercially available sealing members such as, for example, o-rings, polypak seals or metal spring energized seals. In a preferred embodiment, the sealing members 2855 comprise polypak seals available from Parker Seals in order to optimally provide sealing for long axial strokes.

The first lower sealing head 2730 may be coupled to the second inner sealing mandrel 2740 using any number of conventional commercially available mechanical couplings such as, for example, oilfield country tubular goods specialty threaded connection, welding, amorphous bonding, or a standard threaded connection. In a preferred embodiment, the lower sealing head 2730 is removably coupled to the second inner sealing mandrel 2740 by a standard threaded connection. In a preferred embodiment, the mechanical coupling between the first lower sealing head 2730 and the second inner sealing mandrel 2740 includes one or more sealing members 2860 for fluidicly sealing the interface between the first lower sealing head 2730 and the second inner sealing mandrel 2740. The sealing members 2860 may comprise any number of conventional commercially available sealing members such as, for example, o-rings, polypak seals or metal spring energized seals. In a preferred embodiment, the sealing members 2860 comprise polypak seals available from Parker Seals in order to optimally provide sealing for long axial strokes.

The first outer sealing mandrel 2735 is coupled to the first upper sealing head 2725, the second upper sealing head 2745, the second outer sealing mandrel 2755, and the expansion cone 2765. The first outer sealing mandrel 2735 is also movably coupled to the inner surface of the casing 2790 and the outer surface of the first lower sealing head 2730. In this manner, the first upper sealing head 2725, first outer sealing mandrel 2735, second upper sealing head 2745, second outer sealing mandrel 2755, and the expansion cone 2765 reciprocate in the axial direction. The radial clearance between the outer surface of the first outer sealing mandrel 2735 and the inner surface of the casing 2790 may range, for example, from about 0.025 to 0.375 inches. In a preferred embodiment, the radial clearance between the outer surface of the first outer sealing mandrel 2735 and the inner surface of the casing 2790 ranges from about 0.025 to 0.125 inches in order to optimally provide stabilization for the expansion cone 2765 during the expansion process. The radial clearance between the inner surface of the first outer sealing mandrel 2735 and the outer surface of the first lower sealing head 2730 may range, for example, from about 0.0025 to 0.05 inches. In a preferred embodiment, the radial clearance between the inner surface of the first outer sealing mandrel 2735 and the outer surface of the first lower sealing head 2730 ranges from about 0.005 to 0.01 inches in order to optimally provide minimal radial clearance.

The outer sealing mandrel 1935 preferably comprises an annular member having substantially cylindrical inner and outer surfaces. The first outer sealing mandrel 2735 may be fabricated from any number of conventional commercially available materials such as, for example, oilfield country tubular goods, low alloy steel, carbon steel, stainless steel or other similar high strength materials. In a preferred embodiment, the first outer sealing mandrel 2735 is fabricated from stainless steel in order to optimally provide high strength, corrosion resistance, and low friction surfaces.

The first outer sealing mandrel 2735 may be coupled to the first upper sealing head 2725 using any number of conventional commercially available mechanical couplings such as, for example, oilfield country tubular goods, welding, amorphous bonding, or a standard threaded connection. In a preferred embodiment, the first outer sealing mandrel 2735 is removably coupled to the first upper sealing head 2725 by a standard threaded connection. The first outer sealing mandrel 2735 may be coupled to the second upper sealing head 2745 using any number of conventional commercially available mechanical couplings such as, for example, oilfield country tubular goods specialty threaded connection, welding, amorphous bonding, or a standard threaded connection. In a preferred embodiment, the first outer sealing mandrel 2735 is removably coupled to the second upper sealing head 2745 by a standard threaded connection.

The second inner sealing mandrel 2740 is coupled to the first lower sealing head 2730 and the second lower sealing head 2750. The second inner sealing mandrel 2740 preferably comprises a substantially hollow tubular member or members. The second inner sealing mandrel 2740 may be fabricated from any number of conventional commercially available materials such as, for example, oilfield country tubular goods, low alloy steel, carbon steel, stainless steel or other similar high strength materials. In a preferred embodiment, the second inner sealing mandrel 2740 is fabricated from stainless steel in order to optimally provide high strength, corrosion resistance, and low friction surfaces.

The second inner sealing mandrel 2740 may be coupled to the first lower sealing head 2730 using any number of conventional commercially available mechanical couplings such as, for example, oilfield country tubular goods specialty threaded connection, welding, amorphous bonding, or a standard threaded connection. In a preferred embodiment, the second inner sealing mandrel 2740 is removably coupled to the first lower sealing head 2740 by a standard threaded connection. The mechanical coupling between the second inner sealing mandrel 2740 and the first lower sealing head 2730 preferably includes sealing members 2860.

The second inner sealing mandrel 2740 may be coupled to the second lower sealing head 2750 using any number of conventional commercially available mechanical couplings such as, for example, oilfield country tubular goods specialty threaded connection, welding, amorphous bonding, or a standard threaded connection. In a preferred embodiment, the second inner sealing mandrel 2720 is removably coupled to the second lower sealing head 2750 by a standard threaded connection. In a preferred embodiment, the mechanical coupling between the second inner sealing mandrel 2740 and the second lower sealing head 2750 includes one or more sealing members 2865. The sealing members 2865 may comprise any number of conventional commercially available seals such as, for example, o-rings, polypak seals or metal spring energized seals. In a preferred embodiment, the sealing members 2865 comprise polypak seals available from Parker Seals.

The second inner sealing mandrel 2740 preferably includes a fluid passage 2810 that is adapted to convey fluidic materials from the fluid passage 2805 into the fluid passage 2815. In a preferred embodiment, the fluid passage 2810 is adapted to convey fluidic materials such as, for example, cement, epoxy, water, drilling mud or lubricants at operating pressures and flow rates ranging from about 0 to 9,000 psi and 0 to 3,000 gallons/minute.

The second upper sealing head 2745 is coupled to the first upper sealing head 2725, the first outer sealing mandrel 2735, the second outer sealing mandrel 2755, and the expansion cone 2765. The second upper sealing head 2745 is also movably coupled to the outer surface of the second inner sealing mandrel 2740 and the inner surface of the casing 2790. In this manner, the second upper sealing head 2745 reciprocates in the axial direction. The radial clearance between the inner cylindrical surface of the second upper sealing head 2745 and the outer surface of the second inner sealing mandrel 2740 may range, for example, from about 0.0025 to 0.05 inches. In a preferred embodiment, the radial clearance between the inner cylindrical surface of the second upper sealing head 2745 and the outer surface of the second inner sealing mandrel 2740 ranges from about 0.005 to 0.01 inches in order to optimally provide minimal radial clearance. The radial clearance between the outer cylindrical surface of the second upper sealing head 2745 and the inner surface of the casing 2790 may range, for example, from about 0.025 to 0.375 inches. In a preferred embodiment, the radial clearance between the outer cylindrical surface of the second upper sealing head 2745 and the inner surface of the casing 2790 ranges from about 0.025 to 0.125 inches in order to optimally provide stabilization for the expansion cone 2765 during the expansion process.

The second upper sealing head 2745 preferably comprises an annular member having substantially cylindrical inner and outer surfaces. The second upper sealing head 2745 may be fabricated from any number of conventional commercially available materials such as, for example, oilfield country tubular goods, low alloy steel, carbon steel, stainless steel or other similar high strength materials. In a preferred embodiment, the second upper sealing head 2745 is fabricated from stainless steel in order to optimally provide high strength, corrosion resistance, and low friction surfaces. The inner surface of the second upper sealing head 2745 preferably includes one or more annular sealing members 2870 for sealing the interface between the second upper sealing head 2745 and the second inner sealing mandrel 2740. The sealing members 2870 may comprise any number of conventional commercially available annular sealing members such as, for example, o-rings, polypak seals, or metal spring energized seals. In a preferred embodiment, the sealing members 2870 comprise polypak seals available from Parker Seals in order to optimally provide sealing for long axial strokes.

In a preferred embodiment, the second upper sealing head 2745 includes a shoulder 2875 for supporting the second upper sealing head 2745 on the second lower sealing head 2750.

The second upper sealing head 2745 may be coupled to the first outer sealing mandrel 2735 using any number of conventional commercially available mechanical couplings such as, for example, drillpipe connection, oilfield country tubular goods specialty threaded connection, ratchet-latch type threaded connection, or a standard threaded connection. In a preferred embodiment, the second upper sealing head 2745 is removably coupled to the first outer sealing mandrel 2735 by a standard threaded connection. In a preferred embodiment, the mechanical coupling between the second upper sealing head 2745 and the first outer sealing mandrel 2735 includes one or more sealing members 2880 for fluidicly sealing the interface between the second upper sealing head 2745 and the first outer sealing mandrel 2735. The sealing members 2880 may comprise any number of conventional commercially available sealing members such as, for example, o-rings, polypak seals or metal spring energized seals. In a preferred embodiment, the sealing members 2880 comprise polypak seals available from Parker Seals in order to optimally provide sealing for a long axial stroke.

The second upper sealing head 2745 may be coupled to the second outer sealing mandrel 2755 using any number of conventional commercially available mechanical couplings such as, for example, drillpipe connection, oilfield country tubular goods specialty type threaded connection, or a standard threaded connection. In a preferred embodiment, the second upper sealing head 2745 is removably coupled to the second outer sealing mandrel 2755 by a standard threaded connection. In a preferred embodiment, the mechanical coupling between the second upper sealing head 2745 and the second outer sealing mandrel 2755 includes one or more sealing members 2885 for fluidicly sealing the interface between the second upper sealing head 2745 and the second outer sealing mandrel 2755. The sealing members 2885 may comprise any number of conventional commercially available sealing members such as, for example, o-rings, polypak seals or metal spring energized seals. In a preferred embodiment, the sealing members 2885 comprise polypak seals available from Parker Seals in order to optimally provide sealing for long axial strokes.

The second lower sealing head 2750 is coupled to the second inner sealing mandrel 2740 and the load mandrel 2760. The second lower sealing head 2750 is also movably coupled to the inner surface of the second outer sealing mandrel 2755. In this manner, the first upper sealing head 2725, the first outer sealing mandrel 2735, second upper sealing head 2745, second outer sealing mandrel 2755, and the expansion cone 2765 reciprocate in the axial direction. The radial clearance between the outer surface of the second lower sealing head 2750 and the inner surface of the second outer sealing mandrel 2755 may range, for example, from about 0.0025 to 0.05 inches. In a preferred embodiment, the radial clearance between the outer surface of the second lower sealing head 2750 and the inner surface of the second outer sealing mandrel 2755 ranges from about 0.005 to 0.01 inches in order to optimally provide minimal radial clearance.

The second lower sealing head 2750 preferably comprises an annular member having substantially cylindrical inner and outer surfaces. The second lower sealing head 2750 may be fabricated from any number of conventional commercially available materials such as, for example, oilfield country tubular goods, low alloy steel, carbon steel, stainless steel or other similar high strength materials. In a preferred embodiment, the second lower sealing head 2750 is fabricated from stainless steel in order to optimally provide high strength, corrosion resistance, and low friction surfaces. The outer surface of the second lower sealing head 2750 preferably includes one or more annular sealing members 2890 for sealing the interface between the second lower sealing head 2750 and the second outer sealing mandrel 2755. The sealing members 2890 may comprise any number of conventional commercially available annular sealing members such as, for example, o-rings, polypak seals or metal spring energized seals. In a preferred embodiment, the sealing members 2890 comprise polypak seals available from Parker Seals in order to optimally provide sealing for long axial strokes.

The second lower sealing head 2750 may be coupled to the second inner sealing mandrel 2740 using any number of conventional commercially available mechanical couplings such as, for example, drillpipe connection, oilfield country tubular goods specialty threaded connection, ratchet-latch type threaded connection, or a standard threaded connection. In a preferred embodiment, the second lower sealing head 2750 is removably coupled to the second inner sealing mandrel 2740 by a standard threaded connection. In a preferred embodiment, the mechanical coupling between the second lower sealing head 2750 and the second inner sealing mandrel 2740 includes one or more sealing members 2895 for fluidicly sealing the interface between the second sealing head 2750 and the second sealing mandrel 2740. The sealing members 2895 may comprise any number of conventional commercially available sealing members such as, for example, o-rings, polypak seals or metal spring energized seals. In a preferred embodiment, the sealing members 2895 comprise polypak seals available from Parker Seals in order to optimally provide sealing for a long axial stroke.

The second lower sealing head 2750 may be coupled to the load mandrel 2760 using any number of conventional commercially available mechanical couplings such as, for example, drillpipe connection, oilfield tubular goods specialty threaded connection, ratchet-latch type threaded connection, or a standard threaded connection. In a preferred embodiment, the second lower sealing head 2750 is removably coupled to the load mandrel 2760 by a standard threaded connection. In a preferred embodiment, the mechanical coupling between the second lower sealing head 2750 and the load mandrel 2760 includes one or more sealing members 2900 for fluidicly sealing the interface between the second lower sealing head 2750 and the load mandrel 2760. The sealing members 2900 may comprise any number of conventional commercially available sealing members such as, for example, o-rings, polypak seals or metal spring energized seals. In a preferred embodiment, the sealing members 2900 comprise polypak seals available from Parker Seals in order to optimally provide sealing for long axial strokes.

In a preferred embodiment, the second lower sealing head 2750 includes a throat passage 2905 fluidicly coupled between the fluid passages 2810 and 2815. The throat passage 2905 is preferably of reduced size and is adapted to receive and engage with a plug 2910, or other similar device. In this manner, the fluid passage 2810 is fluidicly isolated from the fluid passage 2815. In this manner, the pressure chambers 2915 and 2920 are pressurized. The use of a plurality of pressure chambers in the apparatus 2700 permits the effective driving force to be multiplied. While illustrated using a pair of pressure chambers, 2915 and 2920, the apparatus 2700 may be further modified to employ additional pressure chambers.

The second outer sealing mandrel 2755 is coupled to the first upper sealing head 2725, the first outer sealing mandrel 2735, the second upper sealing head 2745, and the expansion cone 2765. The second outer sealing mandrel 2755 is also movably coupled to the inner surface of the casing 2790 and the outer surface of the second lower sealing head 2750. In this manner, the first upper sealing head 2725, first outer sealing mandrel 2735, second upper sealing head 2745, second outer sealing mandrel 2755, and the expansion cone 2765 reciprocate in the axial direction.

The radial clearance between the outer surface of the second outer sealing mandrel 2755 and the inner surface of the casing 2790 may range, for example, from about 0.025 to 0.375 inches. In a preferred embodiment, the radial clearance between the outer surface of the second outer sealing mandrel 2755 and the inner surface of the casing 2790 ranges from about 0.025 to 0.125 inches in order to optimally provide stabilization for the expansion cone 2765 during the expansion process. The radial clearance between the inner surface of the second outer sealing mandrel 2755 and the outer surface of the second lower sealing head 2750 may range, for example, from about 0.0025 to 0.05 inches. In a preferred embodiment, the radial clearance between the inner surface of the second outer sealing mandrel 2755 and the outer surface of the second lower sealing head 2750 ranges from about 0.005 to 0.01 inches in order to optimally provide minimal radial clearance.

The second outer sealing mandrel 2755 preferably comprises an annular member having substantially cylindrical inner and outer surfaces. The second outer sealing mandrel 2755 may be fabricated from any number of conventional commercially available materials such as, for example, oilfield country tubular goods, low alloy steel, carbon steel, stainless steel or other similar high strength materials. In a preferred embodiment, the second outer sealing mandrel 2755 is fabricated from stainless steel in order to optimally provide high strength, corrosion resistance, and low friction surfaces.

The second outer sealing mandrel 2755 may be coupled to the second upper sealing head 2745 using any number of conventional commercially available mechanical couplings such as, for example, drillpipe connection, oilfield country tubular goods specialty threaded connection, ratchet-latch type threaded connection or a standard threaded connection. In a preferred embodiment, the second outer sealing mandrel 2755 is removably coupled to the second upper sealing head 2745 by a standard threaded connection. The second outer sealing mandrel 2755 may be coupled to the expansion cone 2765 using any number of conventional commercially available mechanical couplings such as, for example, drillpipe connection, oilfield country tubular goods specialty type threaded connection, ratchet-latch type threaded connection, or a standard threaded connection. In a preferred embodiment, the second outer sealing mandrel 2755 is removably coupled to the expansion cone 2765 by a standard threaded connection.

The load mandrel 2760 is coupled to the second lower sealing head 2750 and the mechanical slip body 2755. The load mandrel 2760 preferably comprises an annular member having substantially cylindrical inner and outer surfaces. The load mandrel 2760 may be fabricated from any number of conventional commercially available materials such as, for example, oilfield country tubular goods, low alloy steel, carbon steel, stainless steel or other similar high strength materials. In a preferred embodiment, the load mandrel 2760 is fabricated from stainless steel in order to optimally provide high strength, corrosion resistance, and low friction surfaces.

The load mandrel 2760 may be coupled to the second lower sealing head 2750 using any number of conventional commercially available mechanical couplings such as, for example, drillpipe connection, oilfield country tubular goods specialty type threaded connection, ratchet-latch type threaded connection, or a standard threaded connection. In a preferred embodiment, the load mandrel 2760 is removably coupled to the second lower sealing head 2750 by a standard threaded connection. The load mandrel 2760 may be coupled to the mechanical slip body 2775 using any number of conventional commercially available mechanical couplings such as, for example, drillpipe connection, oilfield country tubular goods specialty type threaded connection, ratchet-latch type threaded connection or a standard threaded connection. In a preferred embodiment, the load mandrel 2760 is removably coupled to the mechanical slip body 2775 by a standard threaded connection.

The load mandrel 2760 preferably includes a fluid passage 2815 that is adapted to convey fluidic materials from the fluid passage 2810 to the fluid passage 2820. In a preferred embodiment, the fluid passage 2815 is adapted to convey fluidic materials such as, for example, cement, epoxy, water, drilling mud or lubricants at operating pressures and flow rates ranging from about 0 to 9,000 psi and 0 to 3,000 gallons/minute.

The expansion cone 2765 is coupled to the second outer sealing mandrel 2755. The expansion cone 2765 is also movably coupled to the inner surface of the casing 2790. In this manner, the first upper sealing head 2725, first outer sealing mandrel 2735, second upper sealing head 2745, second outer sealing mandrel 2755, and the expansion cone 2765 reciprocate in the axial direction. The reciprocation of the expansion cone 2765 causes the casing 2790 to expand in the radial direction.

The expansion cone 2765 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 inches in order to optimally provide expansion cone dimensions that accommodate the typical range of casings. The axial length of the expansion cone 2765 may range, for example, from about 2 to 8 times the largest outer diameter of the expansion cone 2765. In a preferred embodiment, the axial length of the expansion cone 2765 ranges from about 3 to 5 times the largest outer diameter of the expansion cone 2765 in order to optimally provide stabilization and centralization of the expansion cone 2765. In a preferred embodiment, the angle of attack of the expansion cone 2765 ranges from about 5 to 30 degrees in order to optimally balance frictional forces and radial expansion forces.

The expansion cone 2765 may be fabricated from any number of conventional commercially available materials such as, for example, machine tool steel, nitride steel, titanium, tungsten carbide, ceramics or other similar high strength materials. In a preferred embodiment, the expansion cone 2765 is fabricated from D2 machine tool steel in order to optimally provide high strength and resistance to corrosion and galling. In a particularly preferred embodiment, the outside surface of the expansion cone 2765 has a surface hardness ranging from about 58 to 62 Rockwell C in order to optimally provide high strength and resistance to wear and galling.

The expansion cone 2765 may be coupled to the second outside sealing mandrel 2765 using any number of conventional commercially available mechanical couplings such as, for example, drillpipe connection, oilfield country tubular goods specialty type threaded connection, ratchet-latch type threaded connection or a standard threaded connection. In a preferred embodiment, the expansion cone 2765 is coupled to the second outside sealing mandrel 2765 using a standard threaded connection in order to optimally provide high strength and easy replacement of the expansion cone 2765.

The mandrel launcher 2770 is coupled to the casing 2790. The mandrel launcher 2770 comprises a tubular section of casing having a reduced wall thickness compared to the casing 2790. In a preferred embodiment, the wall thickness of the mandrel launcher 2770 is about 50 to 100% of the wall thickness of the casing 2790. The wall thickness of the mandrel launcher 2770 may range, for example, from about 0.15 to 1.5 inches. In a preferred embodiment, the wall thickness of the mandrel launcher 2770 ranges from about 0.25 to 0.75 inches. In this manner, the initiation of the radial expansion of the casing 2790 is facilitated, the placement of the apparatus 2700 within a wellbore casing and wellbore is facilitated, and the mandrel launcher 2770 has a burst strength approximately equal to that of the casing 2790.

The mandrel launcher 2770 may be coupled to the casing 2790 using any number of conventional mechanical couplings such as, for example, a standard threaded connection. The mandrel launcher 2770 may be fabricated from any number of conventional commercially available materials such as, for example, oilfield country tubular goods, low alloy steel, carbon steel, stainless steel, or other similar high strength materials. In a preferred embodiment, the mandrel launcher 2770 is fabricated from oilfield country tubular goods of higher strength than that of the casing 2790 but with a reduced wall thickness in order to optimally provide a small compact tubular container having a burst strength approximately equal to that of the casing 2790.

The mechanical slip body 2775 is coupled to the load mandrel 2760, the mechanical slips 2780, and the drag blocks 2785. The mechanical slip body 2775 preferably comprises a tubular member having an inner passage 2820 fluidicly coupled to the passage 2815. In this manner, fluidic materials may be conveyed from the passage 2820 to a region outside of the apparatus 2700.

The mechanical slip body 2775 may be coupled to the load mandrel 2760 using any number of conventional mechanical couplings. In a preferred embodiment, the mechanical slip body 2775 is removably coupled to the load mandrel 2760 using a standard threaded connection in order to optimally provide high strength and easy disassembly. The mechanical slip body 2775 may be coupled to the mechanical slips 2780 using any number of conventional mechanical couplings. In a preferred embodiment, the mechanical slip body 2755 is removably coupled to the mechanical slips 2780 using threaded connections and sliding steel retainer rings in order to optimally provide a high strength attachment. The mechanical slip body 2755 may be coupled to the drag blocks 2785 using any number of conventional mechanical couplings. In a preferred embodiment, the mechanical slip body 2775 is removably coupled to the drag blocks 2785 using threaded connections and sliding steel retainer rings in order to optimally provide a high strength attachment.

The mechanical slip body 2775 preferably includes a fluid passage 2820 that is adapted to convey fluidic materials from the fluid passage 2815 to the region outside of the apparatus 2700. In a preferred embodiment, the fluid passage 2820 is adapted to convey fluidic materials such as, for example, cement, epoxy, water, drilling mud or lubricants at operating pressures and flow rates ranging from about 0 to 9,000 psi and 0 to 3,000 gallons/minute.

The mechanical slips 2780 are coupled to the outside surface of the mechanical slip body 2775. During operation of the apparatus 2700, the mechanical slips 2780 prevent upward movement of the casing 2790 and mandrel launcher 2770. In this manner, during the axial reciprocation of the expansion cone 2765, the casing 2790 and mandrel launcher 2770 are maintained in a substantially stationary position. In this manner, the mandrel launcher 2765 and casing 2790 and mandrel launcher 2770 are expanded in the radial direction by the axial movement of the expansion cone 2765.

The mechanical slips 2780 may comprise any number of conventional commercially available mechanical slips such as, for example, RTTS packer tungsten carbide mechanical slips, RTTS packer wicker type mechanical slips or Model 3L retrievable bridge plug tungsten carbide upper mechanical slips. In a preferred embodiment, the mechanical slips 2780 comprise RTTS packer tungsten carbide mechanical slips available from Halliburton Energy Services in order to optimally provide resistance to axial movement of the casing 2790 and mandrel launcher 2770 during the expansion process.

The drag blocks 2785 are coupled to the outside surface of the mechanical slip body 2775. During operation of the apparatus 2700, the drag blocks 2785 prevent upward movement of the casing 2790 and mandrel launcher 2770. In this manner, during the axial reciprocation of the expansion cone 2765, the casing 2790 and mandrel launcher 2770 are maintained in a substantially stationary position. In this manner, the mandrel launcher 2770 and casing 2790 are expanded in the radial direction by the axial movement of the expansion cone 2765.

The drag blocks 2785 may comprise any number of conventional commercially available mechanical slips such as, for example, RTTS packer mechanical drag blocks or Model 3L retrievable bridge plug drag blocks. In a preferred embodiment, the drag blocks 2785 comprise RTTS packer mechanical drag blocks available from Halliburton Energy Services in order to optimally provide resistance to axial movement of the casing 2790 and mandrel launcher 2770 during the expansion process.

The casing 2790 is coupled to the mandrel launcher 2770. The casing 2790 is further removably coupled to the mechanical slips 2780 and drag blocks 2785. The casing 2790 preferably comprises a tubular member. The casing 2790 may be fabricated from any number of conventional commercially available materials such as, for example, slotted tubulars, oilfield country tubular goods, low alloy steel, carbon steel, stainless steel or other similar high strength materials. In a preferred embodiment, the casing 2790 is fabricated from oilfield country tubular goods available from various foreign and domestic steel mills in order to optimally provide high strength using standardized materials. In a preferred embodiment, the upper end of the casing 2790 includes one or more sealing members positioned about the exterior of the casing 2790.

During operation, the apparatus 2700 is positioned in a wellbore with the upper end of the casing 2790 positioned in an overlapping relationship within an existing wellbore casing. In order minimize surge pressures within the borehole during placement of the apparatus 2700, the fluid passage 2795 is preferably provided with one or more pressure relief passages. During the placement of the apparatus 2700 in the wellbore, the casing 2790 is supported by the expansion cone 2765.

After positioning of the apparatus 2700 within the bore hole in an overlapping relationship with an existing section of wellbore casing, a first fluidic material is pumped into the fluid passage 2795 from a surface location. The first fluidic material is conveyed from the fluid passage 2795 to the fluid passages 2800, 2802, 2805, 2810, 2815, and 2820. The first fluidic material will then exit the apparatus 2700 and fill the annular region between the outside of the apparatus 2700 and the interior walls of the bore hole.

The first fluidic material may comprise any number of conventional commercially available materials such as, for example, epoxy, drilling mud, slag mix, water or cement. In a preferred embodiment, the first fluidic material comprises a hardenable fluidic sealing material such as, for example, slag mix, epoxy, or cement. In this manner, a wellbore casing having an outer annular layer of a hardenable material may be formed.

The first fluidic material may be pumped into the apparatus 2700 at operating pressures and flow rates ranging, for example, from about 0 to 4,500 psi and 0 to 3,000 gallons/minute. In a preferred embodiment, the first fluidic material is pumped into the apparatus 2700 at operating pressures and flow rates ranging from about 0 to 3,500 psi and 0 to 1,200 gallons/minute in order to optimally provide operational efficiency.

At a predetermined point in the injection of the first fluidic material such as, for example, after the annular region outside of the apparatus 2700 has been filled to a predetermined level, a plug 2910, dart, or other similar device is introduced into the first fluidic material. The plug 2910 lodges in the throat passage 2905 thereby fluidicly isolating the fluid passage 2810 from the fluid passage 2815.

After placement of the plug 2910 in the throat passage 2905, a second fluidic material is pumped into the fluid passage 2795 in order to pressurize the pressure chambers 2915 and 2920. The second fluidic material may comprise any number of conventional commercially available materials such as, for example, water, drilling gases, drilling mud or lubricants. In a preferred embodiment, the second fluidic material comprises a non-hardenable fluidic material such as, for example, water, drilling mud or lubricant. The use of lubricant optimally provides lubrication of the moving parts of the apparatus 2700.

The second fluidic material may be pumped into the apparatus 2700 at operating pressures and flow rates ranging, for example, from about 0 to 4,500 psi and 0 to 4,500 gallons/minute. In a preferred embodiment, the second fluidic material is pumped into the apparatus 2700 at operating pressures and flow rates ranging from about 0 to 3,500 psi and 0 to 1,200 gallons/minute in order to optimally provide operational efficiency.

The pressurization of the pressure chambers 2915 and 2920 cause the upper sealing heads, 2725 and 2745, outer sealing mandrels, 2735 and 2755, and expansion cone 2765 to move in an axial direction. As the expansion cone 2765 moves in the axial direction, the expansion cone 2765 pulls the mandrel launcher 2770, casing 2790, and drag blocks 2785 along, which sets the mechanical slips 2780 and stops further axial movement of the mandrel launcher 2770 and casing 2790. In this manner, the axial movement of the expansion cone 2765 radially expands the mandrel launcher 2770 and casing 2790.

Once the upper sealing heads, 2725 and 2745, outer sealing mandrels, 2735 and 2755, and expansion cone 2765 complete an axial stroke, the operating pressure of the second fluidic material is reduced and the drill string 2705 is raised. This causes the inner sealing mandrels, 2720 and 2740, lower sealing heads, 2730 and 2750, load mandrel 2760, and mechanical slip body 2755 to move upward. This unsets the mechanical slips 2780 and permits the mechanical slips 2780 and drag 2785 to be moved upward within the mandrel launcher 2770 and casing 2790. When the lower sealing heads, 2730 and 2750, contact the upper sealing heads, 2725 and 2745, the second fluidic material is again pressurized and the radial expansion process continues. In this manner, the mandrel launcher 2770 and casing 2790 are radially expanded through repeated axial strokes of the upper sealing heads, 2725 and 2745, outer sealing mandrels, 2735 and 2755, and expansion cone 2765. Throughout the radial expansion process, the upper end of the casing 2790 is preferably maintained in an overlapping relation with an existing section of wellbore casing.

At the end of the radial expansion process, the upper end of the casing 2790 is expanded into intimate contact with the inside surface of the lower end of the existing wellbore casing. In a preferred embodiment, the sealing members provided at the upper end of the casing 2790 provide a fluidic seal between the outside surface of the upper end of the casing 2790 and the inside surface of the lower end of the existing wellbore casing. In a preferred embodiment, the contact pressure between the casing 2790 and the existing section of wellbore casing ranges from about 400 to 10,000 in order to optimally provide contact pressure for activating the sealing members, provide optimal resistance to axial movement of the expanded casing, and optimally resist typical tensile and compressive loads on the expanded casing.

In a preferred embodiment, as the expansion cone 2765 nears the end of the casing 2790, the operating pressure of the second fluidic material is reduced in order to minimize shock to the apparatus 2700. In an alternative embodiment, the apparatus 2700 includes a shock absorber for absorbing the shock created by the completion of the radial expansion of the casing 2790.

In a preferred embodiment, the reduced operating pressure of the second fluidic material ranges from about 100 to 1,000 psi as the expansion cone 2765 nears the end of the casing 2790 in order to optimally provide reduced axial movement and velocity of the expansion cone 2765. In a preferred embodiment, the operating pressure of the second fluidic material is reduced during the return stroke of the apparatus 2700 to the range of about 0 to 500 psi in order minimize the resistance to the movement of the expansion cone 2765 during the return stroke. In a preferred embodiment, the stroke length of the apparatus 2700 ranges from about 10 to 45 feet in order to optimally provide equipment that can be easily handled by typical oil well rigging equipment and minimize the frequency at which the apparatus 2700 must be re-stroked during an expansion operation.

In an alternative embodiment, at least a portion of the upper sealing heads, 2725 and 2745, include expansion cones for radially expanding the mandrel launcher 2770 and casing 2790 during operation of the apparatus 2700 in order to increase the surface area of the casing 2790 acted upon during the radial expansion process. In this manner, the operating pressures can be reduced.

In an alternative embodiment, mechanical slips are positioned in an axial location between the sealing sleeve 1915 and the first inner sealing mandrel 2720 in order to optimally provide a simplified assembly and operation of the apparatus 2700.

Upon the complete radial expansion of the casing 2790, if applicable, the first fluidic material is permitted to cure within the annular region between the outside of the expanded casing 2790 and the interior walls of the wellbore. In the case where the casing 2790 is slotted, the cured fluidic material preferably permeates and envelops the expanded casing 2790. In this manner, a new-section of wellbore casing is formed within a wellbore. Alternatively, the apparatus 2700 may be used to join a first section of pipeline to an existing section of pipeline. Alternatively, the apparatus 2700 may be used to directly line the interior of a wellbore with a casing, without the use of an outer annular layer of a hardenable material. Alternatively, the apparatus 2700 may be used to expand a tubular support member in a hole.

During the radial expansion process, the pressurized areas of the apparatus 2700 are limited to the fluid passages 2795, 2800, 2802, 2805, and 2810, and the pressure chambers 2915 and 2920. No fluid pressure acts directly on the mandrel launcher 2770 and casing 2790. This permits the use of operating pressures higher than the mandrel launcher 2770 and casing 2790 could normally withstand.

Figure 20:
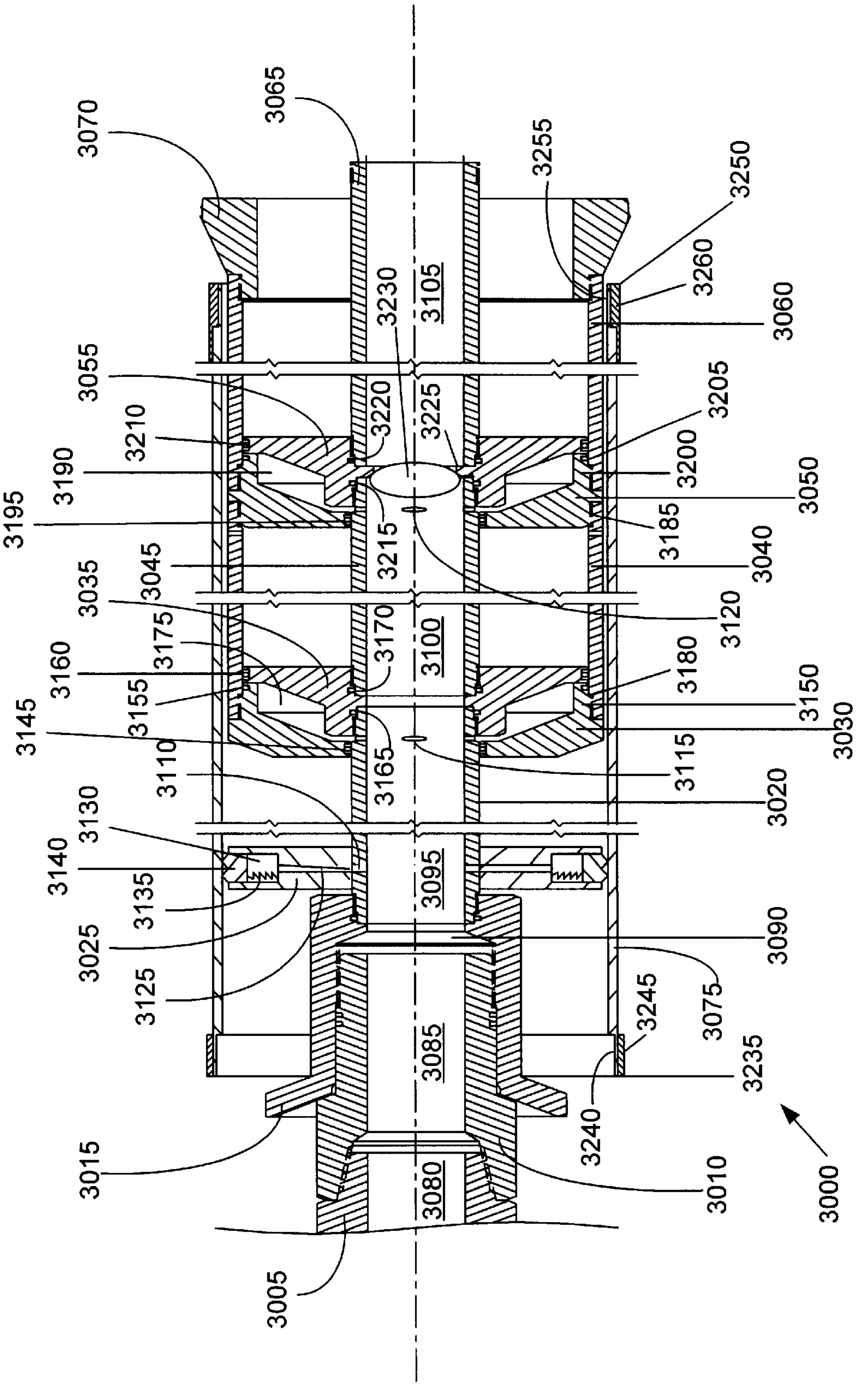
FIG. 20 is an illustration of an embodiment of an apparatus for forming a mono-diameter wellbore casing.

Referring now to FIG. 20, a preferred embodiment of an apparatus 3000 for forming a mono-diameter wellbore casing will be described. The apparatus 3000 preferably includes a drillpipe 3005, an innerstring adapter 3010, a sealing sleeve 3015, a first inner sealing mandrel 3020, hydraulic slips 3025, a first upper sealing head 3030, a first lower sealing head 3035, a first outer sealing mandrel 3040, a second inner sealing mandrel 3045, a second upper sealing head 3050, a second lower sealing head 3055, a second outer sealing mandrel 3060, load mandrel 3065, expansion cone 3070, casing 3075, and fluid passages 3080, 3085, 3090, 3095, 3100, 3105, 3110, 3115 and 3120.

The drillpipe 3005 is coupled to the innerstring adapter 3010. During operation of the apparatus 3000, the drillpipe 3005 supports the apparatus 3000. The drillpipe 3005 preferably comprises a substantially hollow tubular member or members. The drillpipe 3005 may be fabricated from any number of conventional commercially available materials such as, for example, oilfield country tubular goods, low alloy steel, carbon steel, stainless steel or other similar high strength materials. In a preferred embodiment, the drillpipe 3005 is fabricated from coiled tubing in order to faciliate the placement of the apparatus 3000 in non-vertical wellbores. The drillpipe 3005 may be coupled to the innerstring adapter 3010 using any number of conventional commercially available mechanical couplings such as, for example, drillpipe connection, oilfield country tubular goods specialty threaded connection, or a standard threaded connection. In a preferred embodiment, the drillpipe 3005 is removably coupled to the innerstring adapter 3010 by a drillpipe connection.

The drillpipe 3005 preferably includes a fluid passage 3080 that is adapted to convey fluidic materials from a surface location into the fluid passage 3085. In a preferred embodiment, the fluid passage 3080 is adapted to convey fluidic materials such as, for example, cement, epoxy, water, drilling mud or lubricants at operating pressures and flow rates ranging from about 0 to 9,000 psi and 0 to 3,000 gallons/minute.

The innerstring adapter 3010 is coupled to the drill string 3005 and the sealing sleeve 3015. The innerstring adapter 3010 preferably comprises a substantially hollow tubular member or members. The innerstring adapter 3010 may be fabricated from any number of conventional commercially available materials such as, for example, oilfield country tubular goods, low alloy steel, carbon steel, stainless steel, or other similar high strength materials. In a preferred embodiment, the innerstring adapter 3010 is fabricated from stainless steel in order to optimally provide high strength, corrosion resistance, and low friction surfaces.

The innerstring adapter 3010 may be coupled to the drill string 3005 using any number of conventional commercially available mechanical couplings such as, for example, drillpipe connection, oilfield country tubular goods specialty type threaded connection, or a standard threaded connection. In a preferred embodiment, the innerstring adapter 3010 is removably coupled to the drill pipe 3005 by a drillpipe connection. The innerstring adapter 3010 may be coupled to the sealing sleeve 3015 using any number of conventional commercially available mechanical couplings such as, for example, drillpipe connection, oilfield country tubular goods specialty type threaded connection, ratchet-latch type threaded connection or a standard threaded connection. In a preferred embodiment, the innerstring adapter 3010 is removably coupled to the sealing sleeve 3015 by a standard threaded connection.

The innerstring adapter 3010 preferably includes a fluid passage 3085 that is adapted to convey fluidic materials from the fluid passage 3080 into the fluid passage 3090. In a preferred embodiment, the fluid passage 3085 is adapted to convey fluidic materials such as, for example, cement, epoxy, water, drilling mud, or lubricants at operating pressures and flow rates ranging from about 0 to 9,000 psi and 0 to 3,000 gallons/minute.

The sealing sleeve 3015 is coupled to the innerstring adapter 3010 and the first inner sealing mandrel 3020. The sealing sleeve 3015 preferably comprises a substantially hollow tubular member or members. The sealing sleeve 3015 may be fabricated from any number of conventional commercially available materials such as, for example, oilfield country tubular goods, low alloy steel, carbon steel, stainless steel or other similar high strength materials. In a preferred embodiment, the sealing sleeve 3015 is fabricated from stainless steel in order to optimally provide high strength, corrosion resistance, and low friction surfaces.

The sealing sleeve 3015 may be coupled to the innerstring adapter 3010 using any number of conventional commercially available mechanical couplings such as, for example, drillpipe connection, oilfield country tubular goods specialty type threaded connection, ratchet-latch type connection or a standard threaded connection. In a preferred embodiment, the sealing sleeve 3015 is removably coupled to the innerstring adapter 3010 by a standard threaded connection. The sealing sleeve 3015 may be coupled to the first inner sealing mandrel 3020 using any number of conventional commercially available mechanical couplings such as, for example, drillpipe connection, oilfield country tubular goods specialty type threaded connection, ratchet-latch type threaded connection or a standard threaded connection. In a preferred embodiment, the sealing sleeve 3015 is removably coupled to the first inner sealing mandrel 3020 by a standard threaded connection.

The sealing sleeve 3015 preferably includes a fluid passage 3090 that is adapted to convey fluidic materials from the fluid passage 3085 into the fluid passage 3095. In a preferred embodiment, the fluid passage 3090 is adapted to convey fluidic materials such as, for example, cement, epoxy, water, drilling mud, or lubricants at operating pressures and flow rates ranging from about 0 to 9,000 psi and 0 to 3,000 gallons/minute.

The first inner sealing mandrel 3020 is coupled to the sealing sleeve 3015, the hydraulic slips 3025, and the first lower sealing head 3035. The first inner sealing mandrel 3020 is further movably coupled to the first upper sealing head 3030. The first inner sealing mandrel 3020 preferably comprises a substantially hollow tubular member or members. The first inner sealing mandrel 3020 may be fabricated from any number of conventional commercially available materials such as, for example, oilfield country tubular goods, low alloy steel, carbon steel, stainless steel, or similar high strength materials. In a preferred embodiment, the first inner sealing mandrel 3020 is fabricated from stainless steel in order to optimally provide high strength, corrosion resistance, and low friction surfaces.

The first inner sealing mandrel 3020 may be coupled to the sealing sleeve 3015 using any number of conventional commercially available mechanical couplings such as, for example, drillpipe connection, oilfield country tubular goods specialty type threaded connection, ratchet-latch type threaded connection or a standard threaded connection. In a preferred embodiment, the first inner sealing mandrel 3020 is removably coupled to the sealing sleeve 3015 by a standard threaded connection. The first inner sealing mandrel 3020 may be coupled to the hydraulic slips 3025 using any number of conventional commercially available mechanical couplings such as, for example, drillpipe connection, oilfield country tubular goods specialty type threaded connection, ratchet-latch type threaded connection or a standard threaded connection. In a preferred embodiment, the first inner sealing mandrel 3020 is removably coupled to the hydraulic slips 3025 by a standard threaded connection. The first inner sealing mandrel 3020 may be coupled to the first lower sealing head 3035 using any number of conventional commercially available mechanical couplings such as, for example, drillpipe connection, oilfield country tubular goods specialty type threaded connection, ratchet-latch type threaded connection or a standard threaded connection. In a preferred embodiment, the first inner sealing mandrel 3020 is removably coupled to the first lower sealing head 3035 by a standard threaded connection.

The first inner sealing mandrel 3020 preferably includes a fluid passage 3095 that is adapted to convey fluidic materials from the fluid passage 3090 into the fluid passage 3100. In a preferred embodiment, the fluid passage 3095 is adapted to convey fluidic materials such as, for example, water, drilling mud, cement, epoxy, or lubricants at operating pressures and flow rates ranging from about 0 to 9,000 psi and 0 to 3,000 gallons/minute.

The first inner sealing mandrel 3020 further preferably includes fluid passages 3110 that are adapted to convey fluidic materials from the fluid passage 3095 into the pressure chambers of the hydraulic slips 3025. In this manner, the slips 3025 are activated upon the pressurization of the fluid passage 3095 into contact with the inside surface of the casing 3075. In a preferred embodiment, the fluid passages 3110 are adapted to convey fluidic materials such as, for example, cement, epoxy, water, drilling fluids or lubricants at operating pressures and flow rates ranging from about 0 to 9,000 psi and 0 to 3,000 gallons/minute.

The first inner sealing mandrel 3020 further preferably includes fluid passages 3115 that are adapted to convey fluidic materials from the fluid passage 3095 into the first pressure chamber 3175 defined by the first upper sealing head 3030, the first lower sealing head 3035, the first inner sealing mandrel 3020, and the first outer sealing mandrel 3040. During operation of the apparatus 3000, pressurization of the pressure chamber 3175 causes the first upper sealing head 3030, the first outer sealing mandrel 3040, the second upper sealing head 3050, the second outer sealing mandrel 3060, and the expansion cone 3070 to move in an axial direction.

The slips 3025 are coupled to the outside surface of the first inner sealing mandrel 3020. During operation of the apparatus 3000, the slips 3025 are activated upon the pressurization of the fluid passage 3095 into contact with the inside surface of the casing 3075. In this manner, the slips 3025 maintain the casing 3075 in a substantially stationary position.

The slips 3025 preferably include fluid passages 3125, pressure chambers 3130, spring bias 3135, and slip members 3140. The slips 3025 may comprise any number of conventional commercially available hydraulic slips such as, for example, RTTS packer tungsten carbide hydraulic slips or Model 3L retrievable bridge plug with hydraulic slips. In a preferred embodiment, the slips 3025 comprise RTTS packer tungsten carbide hydraulic slips available from Halliburton Energy Services in order to optimally provide resistance to axial movement of the casing 3075 during the expansion process.

The first upper sealing head 3030 is coupled to the first outer sealing mandrel 3040, the second upper sealing head 3050, the second outer sealing mandrel 3060, and the expansion cone 3070. The first upper sealing head 3030 is also movably coupled to the outer surface of the first inner sealing mandrel 3020 and the inner surface of the casing 3075. In this manner, the first upper sealing head 3030, the first outer sealing mandrel 3040, the second upper sealing head 3050, the second outer sealing mandrel 3060, and the expansion cone 3070 reciprocate in the axial direction.

The radial clearance between the inner cylindrical surface of the first upper sealing head 3030 and the outer surface of the first inner sealing mandrel 3020 may range, for example, from about 0.0025 to 0.05 inches. In a preferred embodiment, the radial clearance between the inner cylindrical surface of the first upper sealing head 3030 and the outer surface of the first inner sealing mandrel 3020 ranges from about 0.005 to 0.01 inches in order to optimally provide minimal radial clearance. The radial clearance between the outer cylindrical surface of the first upper sealing head 3030 and the inner surface of the casing 3075 may range, for example, from about 0.025 to 0.375 inches. In a preferred embodiment, the radial clearance between the outer cylindrical surface of the first upper sealing head 3030 and the inner surface of the casing 3075 ranges from about 0.025 to 0.125 inches in order to optimally provide stabilization for the expansion cone 3070 during the expansion process.

The first upper sealing head 3030 preferably comprises an annular member having substantially cylindrical inner and outer surfaces. The first upper sealing head 3030 may be fabricated from any number of conventional commercially available materials such as, for example, oilfield country tubular goods, low alloy steel, carbon steel, or other similar high strength materials. In a preferred embodiment, the first upper sealing head 3030 is fabricated from stainless steel in order to optimally provide high strength, corrosion resistance, and low friction surfaces. The inner surface of the first upper sealing head 3030 preferably includes one or more annular sealing members 3145 for sealing the interface between the first upper sealing head 3030 and the first inner sealing mandrel 3020. The sealing members 3145 may comprise any number of conventional commercially available annular sealing members such as, for example, o-rings, polypak seals or metal spring energized seals. In a preferred embodiment, the sealing members 3145 comprise polypak seals available from Parker seals in order to optimally provide sealing for a long axial stroke.

In a preferred embodiment, the first upper sealing head 3030 includes a shoulder 3150 for supporting the first upper sealing head 3030, first outer sealing mandrel 3040, second upper sealing head 3050, second outer sealing mandrel 3060, and expansion cone 3070 on the first lower sealing head 3035.

The first upper sealing head 3030 may be coupled to the first outer sealing mandrel 3040 using any number of conventional commercially available mechanical couplings such as, for example, drillpipe connection, oilfield country tubular goods specialty type threaded connection, or a standard threaded connection. In a preferred embodiment, the first upper sealing head 3030 is removably coupled to the first outer sealing mandrel 3040 by a standard threaded connection. In a preferred embodiment, the mechanical coupling between the first upper sealing head 3030 and the first outer sealing mandrel 3040 includes one or more sealing members 3155 for fluidicly sealing the interface between the first upper sealing head 3030 and the first outer sealing mandrel 3040. The sealing members 3155 may comprise any number of conventional commercially available sealing members such as, for example, o-rings, polypak seals, or metal spring energized seals. In a preferred embodiment, the sealing members 3155 comprise polypak seals available from Parker Seals in order to optimally provide sealing for a long axial stroke.

The first lower sealing head 3035 is coupled to the first inner sealing mandrel 3020 and the second inner sealing mandrel 3045. The first lower sealing head 3035 is also movably coupled to the inner surface of the first outer sealing mandrel 3040. In this manner, the first upper sealing head 3030, first outer sealing mandrel 3040, second upper sealing head 3050, second outer sealing mandrel 3060, and expansion cone 3070 reciprocate in the axial direction. The radial clearance between the outer surface of the first lower sealing head 3035 and the inner surface of the first outer sealing mandrel 3040 may range, for example, from about 0.0025 to 0.05 inches. In a preferred embodiment, the radial clearance between the outer surface of the first lower sealing head 3035 and the inner surface of the outer sealing mandrel 3040 ranges from about 0.005 to 0.01 inches in order to optimally provide minimal radial clearance.

The first lower sealing head 3035 preferably comprises an annular member having substantially cylindrical inner and outer surfaces. The first lower sealing head 3035 may be fabricated from any number of conventional commercially available materials such as, for example, oilfield country tubular goods, low alloy steel, carbon steel, stainless steel or other similar high strength materials. In a preferred embodiment, the first lower sealing head 3035 is fabricated from stainless steel in order to optimally provide high strength, corrosion resistance, and low friction surfaces. The outer surface of the first lower sealing head 3035 preferably includes one or more annular sealing members 3160 for sealing the interface between the first lower sealing head 3035 and the first outer sealing mandrel 3040. The sealing members 3160 may comprise any number of conventional commercially available annular sealing members such as, for example, o-rings, polypak seals, or metal spring energized seals. In a preferred embodiment, the sealing members 3160 comprise polypak seals available from Parker Seals in order to optimally provide sealing for a long axial stroke.

The first lower sealing head 3035 may be coupled to the first inner sealing mandrel 3020 using any number of conventional commercially available mechanical couplings such as, for example, drillpipe connection, oilfield country tubular goods specialty type threaded connection, ratchet-latch type threaded connection or a standard threaded connection. In a preferred embodiment, the first lower sealing head 3035 is removably coupled to the first inner sealing mandrel 3020 by a standard threaded connection. In a preferred embodiment, the mechanical coupling between the first lower sealing head 3035 and the first inner sealing mandrel 3020 includes one or more sealing members 3165 for fluidicly sealing the interface between the first lower sealing head 3035 and the first inner sealing mandrel 3020. The sealing members 3165 may comprise any number of conventional commercially available sealing members such as, for example, o-rings, polypak seals, or metal spring energized seals. In a preferred embodiment, the sealing members 3165 comprise polypak seals available from Parker Seals in order to optimally provide sealing for a long axial stroke length.

The first lower sealing head 3035 may be coupled to the second inner sealing mandrel 3045 using any number of conventional commercially available mechanical couplings such as, for example, drillpipe connection, oilfield country tubular goods specialty type threaded connection, ratchet-latch type threaded connection or a standard threaded connection. In a preferred embodiment, the first lower sealing head 3035 is removably coupled to the second inner sealing mandrel 3045 by a standard threaded connection. In a preferred embodiment, the mechanical coupling between the first lower sealing head 3035 and the second inner sealing mandrel 3045 includes one or more sealing members 3170 for fluidicly sealing the interface between the first lower sealing head 3035 and the second inner sealing mandrel 3045. The sealing members 3170 may comprise any number of conventional commercially available sealing members such as, for example, o-rings, polypak seals or metal spring energized seals. In a preferred embodiment, the sealing members 3170 comprise polypak seals available from Parker Seals in order to optimally provide sealing for a long axial stroke.

The first outer sealing mandrel 3040 is coupled to the first upper sealing head 3030 and the second upper sealing head 3050. The first outer sealing mandrel 3040 is also movably coupled to the inner surface of the casing 3075 and the outer surface of the first lower sealing head 3035. In this manner, the first upper sealing head 3030, first outer sealing mandrel 3040, second upper sealing head 3050, second outer sealing mandrel 3060, and the expansion cone 3070 reciprocate in the axial direction. The radial clearance between the outer surface of the first outer sealing mandrel 3040 and the inner surface of the casing 3075 may range, for example, from about 0.025 to 0.375 inches. In a preferred embodiment, the radial clearance between the outer surface of the first outer sealing mandrel 3040 and the inner surface of the casing 3075 ranges from about 0.025 to 0.125 inches in order to optimally provide stabilization for the expansion cone 3070 during the expansion process. The radial clearance between the inner surface of the first outer sealing mandrel 3040 and the outer surface of the first lower sealing head 3035 may range, for example, from about 0.005 to 0.125 inches. In a preferred embodiment, the radial clearance between the inner surface of the first outer sealing mandrel 3040 and the outer surface of the first lower sealing head 3035 ranges from about 0.005 to 0.01 inches in order to optimally provide minimal radial clearance.

The first outer sealing mandrel 3040 preferably comprises an annular member having substantially cylindrical inner and outer surfaces. The first outer sealing mandrel 3040 may be fabricated from any number of conventional commercially available materials such as, for example, oilfield country tubular goods, low alloy steel, carbon steel, stainless steel or other similar high strength materials. In a preferred embodiment, the first outer sealing mandrel 3040 is fabricated from stainless steel in order to optimally provide high strength, corrosion resistance, and low friction surfaces.

The first outer sealing mandrel 3040 may be coupled to the first upper sealing head 3030 using any number of conventional commercially available mechanical couplings such as, for example, drillpipe connection, oilfield country tubular goods specialty type threaded connection, ratchet-latch type threaded connection or a standard threaded connection. In a preferred embodiment, the first outer sealing mandrel 3040 is removably coupled to the first upper sealing head 3030 by a standard threaded connection. In a preferred embodiment, the mechanical coupling between the first outer sealing mandrel 3040 and the first upper sealing head 3030 includes one or more sealing members 3180 for sealing the interface between the first outer sealing mandrel 3040 and the first upper sealing head 3030. The sealing members 3180 may comprise any number of conventional commercially available sealing members such as, for example, o-rings, polypak seals or metal spring energized seals. In a preferred embodiment, the sealing members 3180 comprise polypak seals available from Parker Seals in order to optimally provide sealing for a long axial stroke.

The first outer sealing mandrel 3040 may be coupled to the second upper sealing head 3050 using any number of conventional commercially available mechanical couplings such as, for example, drillpipe connection, oilfield country tubular goods specialty type threaded connection, ratchet-latch type threaded connection, or a standard threaded connection. In a preferred embodiment, the first outer sealing mandrel 3040 is removably coupled to the second upper sealing head 3050 by a standard threaded connection. In a preferred embodiment, the mechanical coupling between the first outer sealing mandrel 3040 and the second upper sealing head 3050 includes one or more sealing members 3185 for sealing the interface between the first outer sealing mandrel 3040 and the second upper sealing head 3050. The sealing members 3185 may comprise any number of conventional commercially available sealing members such as, for example, o-rings, polypak seals or metal spring energized seals. In a preferred embodiment, the sealing members 8185 comprise polypak seals available from Parker Seals in order to optimally provide sealing for a long axial stroke.

The second inner sealing mandrel 3045 is coupled to the first lower sealing head 3035 and the second lower sealing head 3055. The second inner sealing mandrel 3045 preferably comprises a substantially hollow tubular member or members. The second inner sealing mandrel 3045 may be fabricated from any number of conventional commercially available materials such as, for example, oilfield country tubular goods, low alloy steel, carbon steel, stainless steel or other similar high strength materials. In a preferred embodiment, the second inner sealing mandrel 3045 is fabricated from stainless steel in order to optimally provide high strength, corrosion resistance, and low friction surfaces.

The second inner sealing mandrel 3045 may be coupled to the first lower sealing head 3035 using any number of conventional commercially available mechanical couplings such as, for example, drillpipe connection, oilfield country tubular goods specialty type threaded connection, ratchet-latch type threaded connection or a standard threaded connection. In a preferred embodiment, the second inner sealing mandrel 3045 is removably coupled to the first lower sealing head 3035 by a standard threaded connection. The second inner sealing mandrel 3045 may be coupled to the second lower sealing head 3055 using any number of conventional commercially available mechanical couplings such as, for example, drillpipe connection, oilfield country tubular goods specialty type threaded connection, ratchet-latch type connection, or a standard threaded connection. In a preferred embodiment, the second inner sealing mandrel 3045 is removably coupled to the second lower sealing head 3055 by a standard threaded connection.

The second inner sealing mandrel 3045 preferably includes a fluid passage 3100 that is adapted to convey fluidic materials from the fluid passage 3095 into the fluid passage 3105. In a preferred embodiment, the fluid passage 3100 is adapted to convey fluidic materials such as, for example, cement, epoxy, water, drilling mud or lubricants at operating pressures and flow rates ranging from about 0 to 9,000 psi and 0 to 3,000 gallons/minute.

The second inner sealing mandrel 3045 further preferably includes fluid passages 3120 that are adapted to convey fluidic materials from the fluid passage 3100 into the second pressure chamber 3190 defined by the second upper sealing head 3050, the second lower sealing head 3055, the second inner sealing mandrel 3045, and the second outer sealing mandrel 3060. During operation of the apparatus 3000, pressurization of the second pressure chamber 3190 causes the first upper sealing head 3030, the first outer sealing mandrel 3040, the second upper sealing head 3050, the second outer sealing mandrel 3060, and the expansion cone 3070 to move in an axial direction.

The second upper sealing head 3050 is coupled to the first outer sealing mandrel 3040 and the second outer sealing mandrel 3060. The second upper sealing head 3050 is also movably coupled to the outer surface of the second inner sealing mandrel 3045 and the inner surface of the casing 3075. In this manner, the second upper sealing head 3050 reciprocates in the axial direction. The radial clearance between the inner cylindrical surface of the second upper sealing head 3050 and the outer surface of the second inner sealing mandrel 3045 may range, for example, from about 0.0025 to 0.05 inches. In a preferred embodiment, the radial clearance between the inner cylindrical surface of the second upper sealing head 3050 and the outer surface of the second inner sealing mandrel 3045 ranges from about 0.005 to 0.01 inches in order to optimally provide minimal radial clearance. The radial clearance between the outer cylindrical surface of the second upper sealing head 3050 and the inner surface of the casing 3075 may range, for example, from about 0.025 to 0.375 inches. In a preferred embodiment, the radial clearance between the outer cylindrical surface of the second upper sealing head 3050 and the inner surface of the casing 3075 ranges from about 0.025 to 0.125 inches in order to optimally provide stabilization for the expansion cone 3070 during the expansion process.

The second upper sealing head 3050 preferably comprises an annular member having substantially cylindrical inner and outer surfaces. The second upper sealing head 3050 may be fabricated from any number of conventional commercially available materials such as, for example, oilfield country tubular goods, low alloy steel, carbon steel, stainless steel or other similar high strength materials. In a preferred embodiment, the second upper sealing head 3050 is fabricated from stainless steel in order to optimally provide high strength, corrosion resistance, and low friction surfaces. The inner surface of the second upper sealing head 3050 preferably includes one or more annular sealing members 3195 for sealing the interface between the second upper sealing head 3050 and the second inner sealing mandrel 3045. The sealing members 3195 may comprise any number of conventional commercially available annular sealing members such as, for example, o-rings, polypak seals or metal spring energized seals. In a preferred embodiment, the sealing members 3195 comprise polypak seals available from Parker Seals in order to optimally provide sealing for a long axial stroke.

In a preferred embodiment, the second upper sealing head 3050 includes a shoulder 3200 for supporting the first upper sealing head 3030, first outer sealing mandrel 3040, second upper sealing head 3050, second outer sealing mandrel 3060, and expansion cone 3070 on the second lower sealing head 3055.

The second upper sealing head 3050 may be coupled to the first outer sealing mandrel 3040 using any number of conventional commercially available mechanical couplings such as, for example, drillpipe connection, oilfield country tubular goods specialty type threaded connection, ratchet-latch type threaded connection, or a standard threaded connection. In a preferred embodiment, the second upper sealing head 3050 is removably coupled to the first outer sealing mandrel 3040 by a standard threaded connection. In a preferred embodiment, the mechanical coupling between the second upper sealing head 3050 and the first outer sealing mandrel 3040 includes one or more sealing members 3185 for fluidicly sealing the interface between the second upper sealing head 3050 and the first outer sealing mandrel 3040. The second upper sealing head 3050 may be coupled to the second outer sealing mandrel 3060 using any number of conventional commercially available mechanical couplings such as, for example, drillpipe connection, oilfield country tubular goods specialty type threaded connection, ratchet-latch type threaded connection, or a standard threaded connection. In a preferred embodiment, the second upper sealing head 3050 is removably coupled to the second outer sealing mandrel 3060 by a standard threaded connection. In a preferred embodiment, the mechanical coupling between the second upper sealing head 3050 and the second outer sealing mandrel 3060 includes one or more sealing members 3205 for fluidicly sealing the interface between the second upper sealing head 3050 and the second outer sealing mandrel 3060.

The second lower sealing head 3055 is coupled to the second inner sealing mandrel 3045 and the load mandrel 3065. The second lower sealing head 3055 is also removably coupled to the inner surface of the second outer sealing mandrel 3060. In this manner, the first upper sealing head 3030, first outer sealing mandrel 3040, second upper sealing mandrel 3050, second outer sealing mandrel 3060, and expansion cone 3070 reciprocate in the axial direction. The radial clearance between the outer surface of the second lower sealing head 3055 and the inner surface of the second outer sealing mandrel 3060 may range, for example, from about 0.0025 to 0.05 inches. In a preferred embodiment, the radial clearance between the outer surface of the second lower sealing head 3055 and the-inner surface of the second outer sealing mandrel 3060 ranges from about 0.005 to 0.01 inches in order to optimally provide minimal radial clearance.

The second lower sealing head 3055 preferably comprises an annular member having substantially cylindrical inner and outer surfaces. The second lower sealing head 3055 may be fabricated from any number of conventional commercially available materials such as, for example, oilfield country tubular goods, low alloy steel, carbon steel, stainless steel, or other similar high strength materials. In a preferred embodiment, the second lower sealing head 3055 is fabricated from stainless steel in order to optimally provide high strength, corrosion resistance, and low friction surfaces. The outer surface of the second lower sealing head 3055 preferably includes one or more annular sealing members 3210 for sealing the interface between the second lower sealing head 3055 and the second outer sealing mandrel 3060. The sealing members 3210 may comprise any number of conventional commercially available annular sealing members such as, for example, o-rings, polypak seals, or metal spring energized seals. In a preferred embodiment, the sealing members 3210 comprise polypak seals available from Parker Seals in order to optimally provide sealing for long axial strokes.

The second lower sealing head 3055 may be coupled to the second inner sealing mandrel 3045 using any number of conventional commercially available mechanical couplings such as, for example, drillpipe connection, oilfield country tubular goods specialty type threaded connection, or a standard threaded connection. In a preferred embodiment, the second lower sealing head 3055 is removably coupled to the second inner sealing mandrel 3045 by a standard threaded connection. In a preferred embodiment, the mechanical coupling between the lower sealing head 3055 and the second inner sealing mandrel 3045 includes one or more sealing members 3215 for fluidicly sealing the interface between the second lower sealing head 3055 and the second inner sealing mandrel 3045. The sealing members 3215 may comprise any number of conventional commercially available sealing members such as, for example, o-rings, polypak seals or metal spring energized seals. In a preferred embodiment, the sealing members 3215 comprise polypak seals available from Parker Seals in order to optimally provide sealing for long axial strokes.

The second lower sealing head 3055 may be coupled to the load mandrel 3065 using any number of conventional commercially available mechanical couplings such as, for example, drillpipe connection, oilfield country tubular goods specialty type threaded connection, or a standard threaded connection. In a preferred embodiment, the second lower sealing head 3055 is removably coupled to the load mandrel 3065 by a standard threaded connection. In a preferred embodiment, the mechanical coupling between the second lower sealing head 3055 and the load mandrel 3065 includes one or more sealing members 3220 for fluidicly sealing the interface between the second lower sealing head 3055 and the load mandrel 3065. The sealing members 3220 may comprise any number of conventional commercially available sealing members such as, for example, o-rings, polypak seals or metal spring energized seals. In a preferred embodiment, the sealing members 3220 comprise polypak seals available from Parker Seals in order to optimally provide sealing for a long axial stroke.

In a preferred embodiment, the second lower sealing head 3055 includes a throat passage 3225 fluidicly coupled between the fluid passages 3100 and 3105. The throat passage 3225 is preferably of reduced size and is adapted to receive and engage with a plug 3230, or other similar device. In this manner, the fluid passage 3100 is fluidicly isolated from the fluid passage 3105. In this manner, the pressure chambers 3175 and 3190 are pressurized. Furthermore, the placement of the plug 3230 in the throat passage 3225 also pressurizes the pressure chambers 3130 of the hydraulic slips 3025.

The second outer sealing mandrel 3060 is coupled to the second upper sealing head 3050 and the expansion cone 3070. The second outer sealing mandrel 3060 is also movably coupled to the inner surface of the casing 3075 and the outer surface of the second lower sealing head 3055. In this manner, the first upper sealing head 3030, first outer sealing mandrel 3040, second upper sealing head 3050, second outer sealing mandrel 3060, and the expansion cone 3070 reciprocate in the axial direction. The radial clearance between the outer surface of the second outer sealing mandrel 3060 and the inner surface of the casing 3075 may range, for example, from about 0.025 to 0.375 inches. In a preferred embodiment, the radial clearance between the outer surface of the second outer sealing mandrel 3060 and the inner surface of the casing 3075 ranges from about 0.025 to 0.125 inches in order to optimally provide stabilization for the expansion cone 3070 during the expansion process. The radial clearance between the inner surface of the second outer sealing mandrel 3060 and the outer surface of the second lower sealing head 3055 may range, for example, from about 0.0025 to 0.05 inches. In a preferred embodiment, the radial clearance between the inner surface of the second outer sealing mandrel 3060 and the outer surface of the second lower sealing head 3055 ranges from about 0.005 to 0.01 inches in order to optimally provide minimal radial clearance.

The second outer sealing mandrel 3060 preferably comprises an annular member having substantially cylindrical inner and outer surfaces. The second outer sealing mandrel 3060 may be fabricated from any number of conventional commercially available materials such as, for example, oilfield country tubular goods, low alloy steel, carbon steel, stainless steel or other similar high strength materials. In a preferred embodiment, the second outer sealing mandrel 3060 is fabricated from stainless steel in order to optimally provide high strength, corrosion resistance, and low friction surfaces.

The second outer sealing mandrel 3060 may be coupled to the second upper sealing head 3050 using any number of conventional commercially available mechanical couplings such as, for example, drillpipe connection, oilfield country tubular goods specialty type threaded connection, or a standard threaded connection. In a preferred embodiment, the outer sealing mandrel 3060 is removably coupled to the second upper sealing head 3050 by a standard threaded connection. The second outer sealing mandrel 3060 may be coupled to the expansion cone 3070 using any number of conventional commercially available mechanical couplings such as, for example, drillpipe connection, oilfield country tubular goods specialty type threaded connection, or a standard threaded connection. In a preferred embodiment, the second outer sealing mandrel 3060 is removably coupled to the expansion cone 3070 by a standard threaded connection.

The first upper sealing head 3030, the first lower sealing head 3035, the first inner sealing mandrel 3020, and the first outer sealing mandrel 3040 together define the first pressure chamber 3175. The second upper sealing head 3050, the second lower sealing head 3055, the second inner sealing mandrel 3045, and the second outer sealing mandrel 3060 together define the second pressure-chamber 3190. The first and second pressure chambers, 3175 and 3190, are fluidicly coupled to the passages, 3095 and 3100, via one or more passages, 3115 and 3120. During operation of the apparatus 3000, the plug 3230 engages with the throat passage 3225 to fluidicly isolate the fluid passage 3100 from the fluid passage 3105. The pressure chambers, 3175 and 3190, are then pressurized which in turn causes the first upper sealing head 3030, the first outer sealing mandrel 3040, the second upper sealing head 3050, the second outer sealing mandrel 3060, and expansion cone 3070 to reciprocate in the axial direction. The axial motion of the expansion cone 3070 in turn expands the casing 3075 in the radial direction. The use of a plurality of pressure chambers, 3175 and 3190, effectively multiplies the available driving force for the expansion cone 3070.

The load mandrel 3065 is coupled to the second lower sealing head 3055. The load mandrel 3065 preferably comprises an annular member having substantially cylindrical inner and outer surfaces. The load mandrel 3065 may be fabricated from any number of conventional commercially available materials such as, for example, oilfield country tubular goods, low alloy steel, carbon steel, stainless steel or other similar high strength materials. In a preferred embodiment, the load mandrel 3065 is fabricated from stainless steel in order to optimally provide high strength, corrosion resistance, and low friction surfaces.

The load mandrel 3065 may be coupled to the lower sealing head 3055 using any number of conventional commercially available mechanical couplings such as, for example, epoxy, cement, water, drilling mud, or lubricants. In a preferred embodiment, the load mandrel 3065 is removably coupled to the lower sealing head 3055 by a standard threaded connection.

The load mandrel 3065 preferably includes a fluid passage 3105 that is adapted to convey fluidic materials from the fluid passage 3100 to the region outside of the apparatus 3000. In a preferred embodiment, the fluid passage 3105 is adapted to convey fluidic materials such as, for example, cement, epoxy, water, drilling mud or lubricants at operating pressures and flow rates ranging from about 0 to 9,000 psi and 0 to 3,000 gallons/minute.

The expansion cone 3070 is coupled to the second outer sealing mandrel 3060. The expansion cone 3070 is also movably coupled to the inner surface of the casing 3075. In this manner, the first upper sealing head 3030, first outer sealing mandrel 3040, second upper sealing head 3050, second outer sealing mandrel 3060, and the expansion cone 3070 reciprocate in the axial direction. The reciprocation of the expansion cone 3070 causes the casing 3075 to expand in the radial direction.

The expansion cone 3070 preferably comprises an annular member having substantially cylindrical inner and conical outer surfaces. The outside radius of the outside conical surface may range, for example, from about 2 to 34 inches. In a preferred embodiment, the outside radius of the outside conical surface ranges from about 3 to 28 inches in order to optimally provide an expansion cone 3070 for expanding typical casings. The axial length of the expansion cone 3070 may range, for example, from about 2 to 8 times the maximum outer diameter of the expansion cone 3070. In a preferred embodiment, the axial length of the expansion cone 3070 ranges from about 3 to 5 times the maximum outer diameter of the expansion cone 3070 in order to optimally provide stabilization and centralization of the expansion cone 3070 during the expansion process. In a particularly preferred embodiment, the maximum outside diameter of the expansion cone 3070 is between about 95 to 99% of the inside diameter of the existing wellbore that the casing 3075 will be joined with. In a preferred embodiment, the angle of attack of the expansion cone 3070 ranges from about 5 to 30 degrees in order to optimally balance the frictional forces with the radial expansion forces.

The expansion cone 3070 may be fabricated from any number of conventional commercially available materials such as, for example, machine tool steel, nitride steel, titanium, tungsten carbide, ceramics, or other similar high strength materials. In a preferred embodiment, the expansion cone 3070 is fabricated from D2 machine tool steel in order to optimally provide high strength and resistance to wear and galling. In a particularly preferred embodiment, the outside surface of the expansion cone 3070 has a surface hardness ranging from about 58 to 62 Rockwell C in order to optimally provide high strength and resistance to wear and galling.

The expansion cone 3070 may be coupled to the second outside sealing mandrel 3060 using any number of conventional commercially available mechanical couplings such as, for example, drillpipe connection, oilfield country tubular goods specialty type threaded connection, ratchet-latch type connection or a standard threaded connection. In a preferred embodiment, the expansion cone 3070 is coupled to the second outside sealing mandrel 3060 using a standard threaded connection in order to optimally provide high strength and easy disassembly.

The casing 3075 is removably coupled to the slips 3025 and the expansion cone 3070. The casing 3075 preferably comprises a tubular member. The casing 3075 may be fabricated from any number of conventional commercially available materials such as, for example, slotted tubulars, oilfield country tubular goods, carbon steel, low alloy steel, stainless steel, or other similar high strength materials. In a preferred embodiment, the casing 3075 is fabricated from oilfield country tubular goods available from various foreign and domestic steel mills in order to optimally provide high strength.

In a preferred embodiment, the upper end 3235 of the casing 3075 includes a thin wall section 3240 and an outer annular sealing member 3245. In a preferred embodiment, the wall thickness of the thin wall section 3240 is about 50 to 100% of the regular wall thickness of the casing 3075. In this manner, the upper end 3235 of the casing 3075 may be easily radially expanded and deformed into intimate contact with the lower end of an existing section of wellbore casing. In a preferred embodiment, the lower end of the existing section of casing also includes a thin wall section. In this manner, the radial expansion of the thin walled section 3240 of casing 3075 into the thin walled section of the existing wellbore casing results in a wellbore casing having a substantially constant inside diameter.

The annular sealing member 3245 may be fabricated from any number of conventional commercially available sealing materials such as, for example, epoxy, rubber, metal or plastic. In a preferred embodiment, the annular sealing member 3245 is fabricated from StrataLock epoxy in order to optimally provide compressibility and wear resistance. The outside diameter of the annular sealing member 3245 preferably ranges from about 70 to 95% of the inside diameter of the lower section of the wellbore casing that the casing 3075 is joined to. In this manner, after radial expansion, the annular sealing member 3245 optimally provides a fluidic seal and also preferably optimally provides sufficient frictional force with the inside surface of the existing section of wellbore casing during the radial expansion of the casing 3075 to support the casing 3075.

In a preferred embodiment, the lower end 3250 of the casing 3075 includes a thin wall section 3255 and an outer annular sealing member 3260. In a preferred embodiment, the wall thickness of the thin wall section 3255 is about 50 to 100% of the regular wall thickness of the casing 3075. In this manner, the lower end 3250 of the casing 3075 may be easily expanded and deformed. Furthermore, in this manner, an other section of casing may be easily joined with the lower end 3250 of the casing 3075 using a radial expansion process. In a preferred embodiment, the upper end of the other section of casing also includes a thin wall section. In this manner, the radial expansion of the thin walled section of the upper end of the other casing into the thin walled section 3255 of the lower end 3250 of the casing 3075 results in a wellbore casing having a substantially constant inside diameter.

The upper annular sealing member 3245 may be fabricated from any number of conventional commercially available sealing materials such as, for example, epoxy, rubber, metal or plastic. In a preferred embodiment, the upper annular sealing member 3245 is fabricated from Stratalock epoxy in order to optimally provide compressibility and resistance to wear. The outside diameter of the upper annular sealing member 3245 preferably ranges from about 70 to 95% of the inside diameter of the lower section of the existing wellbore casing that the casing 3075 is joined to. In this manner, after radial expansion, the upper annular sealing member 3245 preferably provides a fluidic seal and also preferably provides sufficient frictional force with the inside wall of the wellbore during the radial expansion of the casing 3075 to support the casing 3075.

The lower annular sealing member 3260 may be fabricated from any number of conventional commercially available sealing materials such as, for example, epoxy, rubber, metal or plastic. In a preferred embodiment, the lower annular sealing member 3260 is fabricated from StrataLock epoxy in order to optimally provide compressibility and resistance to wear. The outside diameter of the lower annular sealing member 3260 preferably ranges from about 70 to 95% of the inside diameter of the lower section of the existing wellbore casing that the casing 3075 is joined to. In this manner, the lower annular sealing member 3260 preferably provides a fluidic seal and also preferably provides sufficient frictional force with the inside wall of the wellbore during the radial expansion of the casing 3075 to support the casing 3075.

During operation, the apparatus 3000 is preferably positioned in a wellbore with the upper end 3235 of the casing 3075 positioned in an overlapping relationship with the lower end of an existing wellbore casing. In a particularly preferred embodiment, the thin wall section 3240 of the casing 3075 is positioned in opposing overlapping relation with the thin wall section and outer annular sealing member of the lower end of the existing section of wellbore casing. In this manner, the radial expansion of the casing 3075 will compress the thin wall sections and annular compressible members of the upper end 3235 of the casing 3075 and the lower end of the existing wellbore casing into intimate contact. During the positioning of the apparatus 3000 in the wellbore, the casing 3000 is preferably supported by the expansion cone 3070.

After positioning the apparatus 3000, a first fluidic material is then pumped into the fluid passage 3080. The first fluidic material may comprise any number of conventional commercially available materials such as, for example, drilling mud, water, epoxy, cement, slag mix or lubricants. In a preferred embodiment, the first fluidic material comprises a hardenable fluidic sealing material such as, for example, cement, epoxy, or slag mix in order to optimally provide a hardenable outer annular body around the expanded casing 3075.

The first fluidic material may be pumped into the fluid passage 3080 at operating pressures and flow rates ranging, for example, from about 0 to 4,500 psi and 0 to 4,500 gallons/minute. In a preferred embodiment, the first fluidic material is pumped into the fluid passage 3080 at operating pressures and flow rates ranging from about 0 to 3,500 psi and 0 to 1,200 gallons/minute in order to optimally provide operating efficiency.

The first fluidic material pumped into the fluid passage 3080 passes through the fluid passages 3085, 3090, 3095, 3100, and 3105 and then outside of the apparatus 3000. The first fluidic material then preferably fills the annular region between the outside of the apparatus 3000 and the interior walls of the wellbore.

The plug 3230 is then introduced into the fluid passage 3080. The plug 3230 lodges in the throat passage 3225 and fluidicly isolates and blocks off the fluid passage 3100. In a preferred embodiment, a couple of volumes of a non-hardenable fluidic material are then pumped into the fluid passage 3080 in order to remove any hardenable fluidic material contained within and to ensure that none of the fluid passages are blocked.

A second fluidic material is then pumped into the fluid passage 3080. The second fluidic material may comprise any number of conventional commercially available materials such as, for example, water, drilling gases, drilling mud or lubricant. In a preferred embodiment, the second fluidic material comprises a non-hardenable fluidic material such as, for example, water, drilling mud, drilling gases, or lubricant in order to optimally provide pressurization of the pressure chambers 3175 and 3190.

The second fluidic material may be pumped into the fluid passage 3080 at operating pressures and flow rates ranging, for example, from about 0 to 4,500 psi and 0 to 4,500 gallons/minute. In a preferred embodiment, the second fluidic material is pumped into the fluid passage 3080 at operating pressures and flow rates ranging from about 0 to 3,500 psi and 0 to 1,200 gallons/minute in order to optimally provide operational efficiency.

The second fluidic material pumped into the fluid passage 3080 passes through the fluid passages 3085, 3090, 3095, 3100 and into the pressure chambers 3130 of the slips 3025, and into the pressure chambers 3175 and 3190. Continued pumping of the second fluidic material pressurizes the pressure chambers 3130, 3175, and 3190.

The pressurization of the pressure chambers 3130 causes the hydraulic slip members 3140 to expand in the radial direction and grip the interior surface of the casing 3075. The casing 3075 is then preferably maintained in a substantially stationary position.

The pressurization of the pressure chambers 3175 and 3190 cause the first upper sealing head 3030, first outer sealing mandrel 3040, second upper sealing head 3050, second outer sealing mandrel 3060, and expansion cone 3070 to move in an axial direction relative to the casing 3075. In this manner, the expansion cone 3070 will cause the casing 3075 to expand in the radial direction, beginning with the lower end 3250 of the casing 3075.

During the radial expansion process, the casing 3075 is prevented from moving in an upward direction by the slips 3025. A length of the casing 3075 is then expanded in the radial direction through the pressurization of the pressure chambers 3175 and 3190. The length of the casing 3075 that is expanded during the expansion process will be proportional to the stroke length of the first upper sealing head 3030, first outer sealing mandrel 3040, second upper sealing head 3050, and expansion cone 3070.

Upon the completion of a stroke, the operating pressure of the second fluidic material is reduced and the first upper sealing head 3030, first outer sealing mandrel 3040, second upper sealing head 3050, second outer sealing mandrel 3060, and expansion cone 3070 drop to their rest positions with the casing 3075 supported by the expansion cone 3070. The reduction in the operating pressure of the second fluidic material also causes the spring bias 3135 of the slips 3025 to pull the slip members 3140 away from the inside walls of the casing 3075.

The position of the drillpipe 3075 is preferably adjusted throughout the radial expansion process in order to maintain the overlapping relationship between the thin walled sections of the lower end of the existing wellbore casing and the upper end of the casing 3235. In a preferred embodiment, the stroking of the expansion cone 3070 is then repeated, as necessary, until the thin walled section 3240 of the upper end 3235 of the casing 3075 is expanded into the thin walled section of the lower end of the existing wellbore casing. In this manner, a wellbore casing is formed including two adjacent sections of casing having a substantially constant inside diameter. This process may then be repeated for the entirety of the wellbore to provide a wellbore casing thousands of feet in length having a substantially constant inside diameter.

In a preferred embodiment, during the final stroke of the expansion cone 3070, the slips 3025 are positioned as close as possible to the thin walled section 3240 of the upper end 3235 of the casing 3075 in order minimize slippage between the casing 3075 and the existing wellbore casing at the end of the radial expansion process. Alternatively, or in addition, the outside diameter of the upper annular sealing member 3245 is selected to ensure sufficient interference fit with the inside diameter of the lower end of the existing casing to prevent axial displacement of the casing 3075 during the final stroke. Alternatively, or in addition, the outside diameter of the lower annular sealing member 3260 is selected to provide an interference fit with the inside walls of the wellbore at an earlier point in the radial expansion process so as to prevent further axial displacement of the casing 3075. In this final alternative, the interference fit is preferably selected to permit expansion of the casing 3075 by pulling the expansion cone 3070 out of the wellbore, without having to pressurize the pressure chambers 3175 and 3190.

During the radial expansion process, the pressurized areas of the apparatus 3000 are preferably limited to the fluid passages 3080, 3085, 3090, 3095, 3100, 3110, 3115, 3120, the pressure chambers 3130 within the slips 3025, and the pressure chambers 3175 and 3190. No fluid pressure acts directly on the casing 3075. This permits the use of operating pressures higher than the casing 3075 could normally withstand.

Once the casing 3075 has been completely expanded off of the expansion cone 3070, the remaining portions of the apparatus 3000 are removed from the wellbore. In a preferred embodiment, the contact pressure between the deformed thin wall sections and compressible annular members of the lower end of the existing casing and the upper end 3235 of the casing 3075 ranges from about 400 to 10,000 psi in order to optimally support the casing 3075 using the existing wellbore casing.

In this manner, the casing 3075 is radially expanded into contact with an existing section of casing by pressurizing the interior fluid passages 3080, 3085, 3090, 3095, 3100, 3110, 3115, and 3120, the pressure chambers 3130 of the slips 3025 and the pressure chambers 3175 and 3190 of the apparatus 3000.

In a preferred embodiment, as required, the annular body of hardenable fluidic material is then allowed to cure to form a rigid outer annular body about the expanded casing 3075. In the case where the casing 3075 is slotted, the cured fluidic material preferably permeates and envelops the expanded casing 3075. The resulting new section of wellbore casing includes the expanded casing 3075 and the rigid outer annular body. The overlapping joint between the pre-existing wellbore casing and the expanded casing 3075 includes the deformed thin wall sections and the compressible outer annular bodies. The inner diameter of the resulting combined wellbore casings is substantially constant. In this manner, a mono-diameter wellbore casing is formed. This process of expanding overlapping tubular members having thin wall end portions with compressible annular bodies into contact can be repeated for the entire length of a wellbore. In this manner, a mono-diameter wellbore casing can be provided for thousands of feet in a subterranean formation.

In a preferred embodiment, as the expansion cone 3070 nears the upper end 3235 of the casing 3075, the operating flow rate of the second fluidic material is reduced in order to minimize shock to the apparatus 3000. In an alternative embodiment, the apparatus 3000 includes a shock absorber for absorbing the shock created by the completion of the radial expansion of the casing 3075.

In a preferred embodiment, the reduced operating pressure of the second fluidic material ranges from about 100 to 1,000 psi as the expansion cone 3070 nears the end of the casing 3075 in order to optimally provide reduced axial movement and velocity of the expansion cone 3070. In a preferred embodiment, the operating pressure of the second fluidic material is reduced during the return stroke of the apparatus 3000 to the range of about 0 to 500 psi in order minimize the resistance to the movement of the expansion cone 3070 during the return stroke. In a preferred embodiment, the stroke length of the apparatus 3000 ranges from about 10 to 45 feet in order to optimally provide equipment that can be easily handled by typical oil well rigging equipment and also minimize the frequency at which the apparatus 3000 must be re-stroked.

In an alternative embodiment, at least a portion of one or both of the upper sealing heads, 3030 and 3050, includes an expansion cone for radially expanding the casing 3075 during operation of the apparatus 3000 in order to increase the surface area of the casing 3075 acted upon during the radial expansion process. In this manner, the operating pressures can be reduced.

Alternatively, the apparatus 3000 may be used to join a first section of pipeline to an existing section of pipeline. Alternatively, the apparatus 3000 may be used to directly line the interior of a wellbore with a casing, without the use of an outer annular layer of a hardenable material. Alternatively, the apparatus 3000 may be used to expand a tubular support member in a hole.

Figure 21:
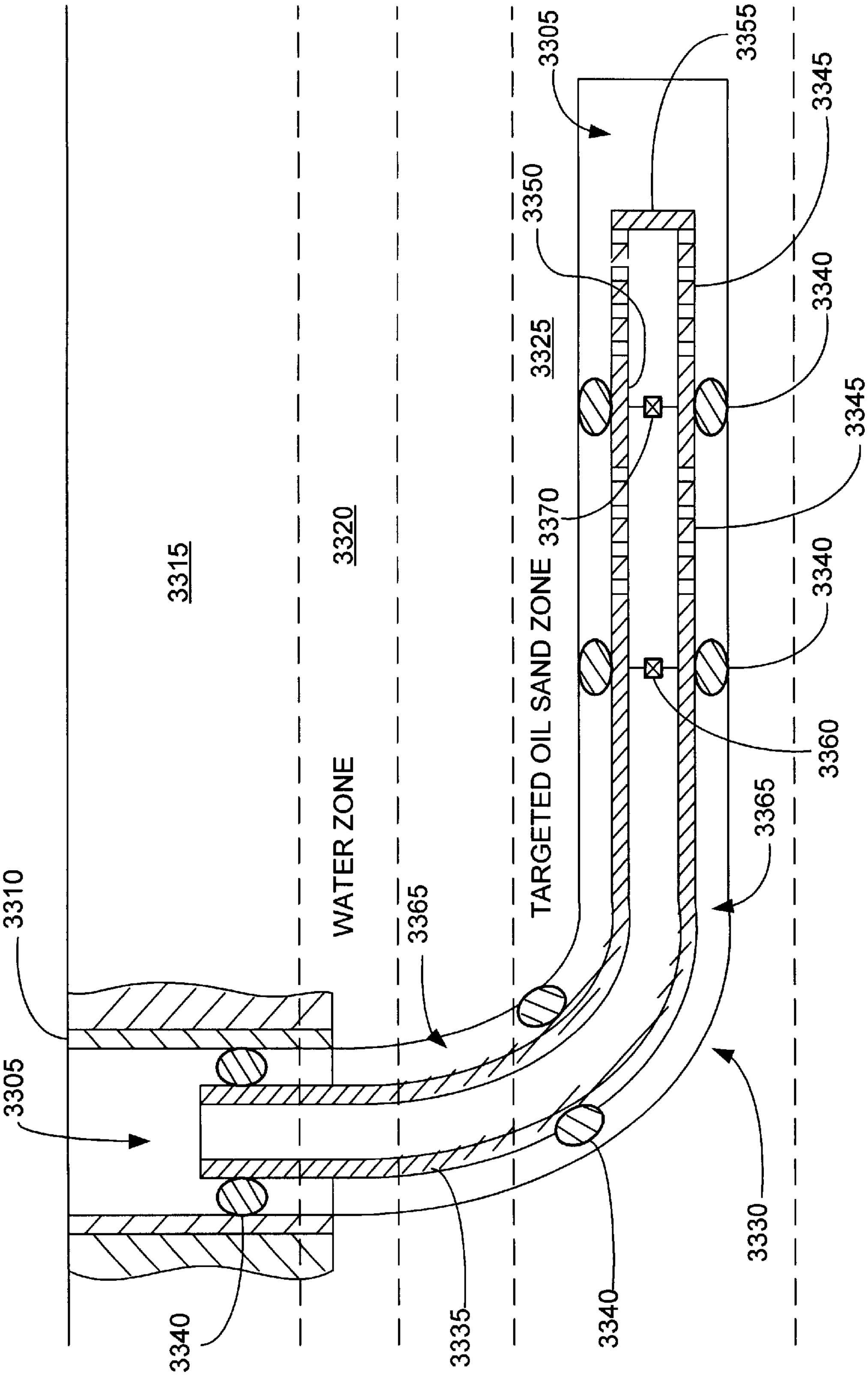
FIG. 21 is an illustration of the isolation of subterranean zones using expandable tubulars.

Referring now to FIG. 21, an apparatus 3330 for isolating subterranean zones will be described. A wellbore 3305 including a casing 3310 are positioned in a subterranean formation 3315. The subterranean formation 3315 includes a number of productive and non-productive zones, including a water zone 3320 and a targeted oil sand zone 3325. During exploration of the subterranean formation 3315, the wellbore 3305 may be extended in a well known manner to traverse the various productive and non-productive zones, including the water zone 3320 and the targeted oil sand zone 3325.

In a preferred embodiment, in order to fluidicly isolate the water zone 3320 from the targeted oil sand zone 3325, an apparatus 3330 is provided that includes one or more sections of solid casing 3335, one or more external seals 3340, one or more sections of slotted casing 3345, one or more intermediate sections of solid casing 3350, and a solid shoe 3355.

The solid casing 3335 may provide a fluid conduit that transmits fluids and other materials from one end of the solid casing 3335 to the other end of the solid casing 3335. The solid casing 3335 may comprise any number of conventional commercially available sections of solid tubular casing such as, for example, oilfield tubulars fabricated from chromium steel or fiberglass. In a preferred embodiment, the solid casing 3335 comprises oilfield tubulars available from various foreign and domestic steel mills.

The solid casing 3335 is preferably coupled to the casing 3310. The solid casing 3335 may be coupled to the casing 3310 using any number of conventional commercially available processes such as, for example, welding, slotted and expandable connectors, or expandable solid connectors. In a preferred embodiment, the solid casing 3335 is coupled to the casing 3310 by using expandable solid connectors. The solid casing 3335 may comprise a plurality of such solid casings 3335.

The solid casing 3335 is preferably coupled to one more of the slotted casings 3345. The solid casing 3335 may be coupled to the slotted casing 3345 using any number of conventional commercially available processes such as, for example, welding, or slotted and expandable connectors. In a preferred embodiment, the solid casing 3335 is coupled to the slotted casing 3345 by expandable solid connectors.

In a preferred embodiment, the casing 3335 includes one more valve members 3360 for controlling the flow of fluids and other materials within the interior region of the casing 3335. In an alternative embodiment, during the production mode of operation, an internal tubular string with various arrangements of packers, perforated tubing, sliding sleeves, and valves may be employed within the apparatus to provide various options for commingling and isolating subterranean zones from each other while providing a fluid path to the surface.

In a particularly preferred embodiment, the casing 3335 is placed into the wellbore 3305 by expanding the casing 3335 in the radial direction into intimate contact with the interior walls of the wellbore 3305. The casing 3335 may be expanded in the radial direction using any number of conventional commercially available methods. In a preferred embodiment, the casing 3335 is expanded in the radial direction using one or more of the processes and apparatus described within the present disclosure.

The seals 3340 prevent the passage of fluids and other materials within the annular region 3365 between the solid casings 3335 and 3350 and the wellbore 3305. The seals 3340 may comprise any number of conventional commercially available sealing materials suitable for sealing a casing in a wellbore such as, for example, lead, rubber or epoxy. In a preferred embodiment, the seals 3340 comprise Stratalock epoxy material available from Halliburton Energy Services.

The slotted casing 3345 permits fluids and other materials to pass into and out of the interior of the slotted casing 3345 from and to the annular region 3365. In this manner, oil and gas may be produced from a producing subterranean zone within a subterranean formation. The slotted casing 3345 may comprise any number of conventional commercially available sections of slotted tubular casing. In a preferred embodiment, the slotted casing 3345 comprises expandable slotted tubular casing available from Petroline in Abeerdeen, Scotland. In a particularly preferred embodiment, the slotted casing 145 comprises expandable slotted sandscreen tubular casing available from Petroline in Abeerdeen, Scotland.

The slotted casing 3345 is preferably coupled to one or more solid casing 3335. The slotted casing 3345 may be coupled to the solid casing 3335 using any number of conventional commercially available processes such as, for example, welding, or slotted or solid expandable connectors. In a preferred embodiment, the slotted casing 3345 is coupled to the solid casing 3335 by expandable solid connectors.

The slotted casing 3345 is preferably coupled to one or more intermediate solid casings 3350. The slotted casing 3345 may be coupled to the intermediate solid casing 3350 using any number of conventional commercially available processes such as, for example, welding or expandable solid or slotted connectors. In a preferred embodiment, the slotted casing 3345 is coupled to the intermediate solid casing 3350 by expandable solid connectors.

The last section of slotted casing 3345 is preferably coupled to the shoe 3355. The last slotted casing 3345 may be coupled to the shoe 3355 using any number of conventional commercially available processes such as, for example, welding or expandable solid or slotted connectors. In a preferred embodiment, the last slotted casing 3345 is coupled to the shoe 3355 by an expandable solid connector.

In an alternative embodiment, the shoe 3355 is coupled directly to the last one of the intermediate solid casings 3350.

In a preferred embodiment, the slotted casings 3345 are positioned within the wellbore 3305 by expanding the slotted casings 3345 in a radial direction into intimate contact with the interior walls of the wellbore 3305. The slotted casings 3345 may be expanded in a radial direction using any number of conventional commercially available processes. In a preferred embodiment, the slotted casings 3345 are expanded in the radial direction using one or more of the processes and apparatus disclosed in the present disclosure with reference to FIGS. 14*a*–20.

The intermediate solid casing 3350 permits fluids and other materials to pass between adjacent slotted casings 3345. The intermediate solid casing 3350 may comprise any number of conventional commercially available sections of solid tubular casing such as, for example, oilfield tubulars fabricated from chromium steel or fiberglass. In a preferred embodiment, the intermediate solid casing 3350 comprises oilfield tubulars available from foreign and domestic steel mills.

The intermediate solid casing 3350 is preferably coupled to one or more sections of the slotted casing 3345. The intermediate solid casing 3350 may be coupled to the slotted casing 3345 using any number of conventional commercially available processes such as, for example, welding, or solid or slotted expandable connectors. In a preferred embodiment, the intermediate solid casing 3350 is coupled to the slotted casing 3345 by expandable solid connectors. The intermediate solid casing 3350 may comprise a plurality of such intermediate solid casing 3350.

In a preferred embodiment, each intermediate solid casing 3350 includes one more valve members 3370 for controlling the flow of fluids and other materials within the interior region of the intermediate casing 3350. In an alternative embodiment, as will be recognized by persons having ordinary skill in the art and the benefit of the present disclosure, during the production mode of operation, an internal tubular string with various arrangements of packers, perforated tubing, sliding sleeves, and valves may be employed within the apparatus to provide various options for commingling and isolating subterranean zones from each other while providing a fluid path to the surface.

In a particularly preferred embodiment, the intermediate casing 3350 is placed into the wellbore 3305 by expanding the intermediate casing 3350 in the radial direction into intimate contact with the interior walls of the wellbore 3305. The intermediate casing 3350 may be expanded in the radial direction using any number of conventional commercially available methods.

In an alternative embodiment, one or more of the intermediate solid casings 3350 may be omitted. In an alternative preferred embodiment, one or more of the slotted casings 3345 are provided with one or more seals 3340.

The shoe 3355 provides a support member for the apparatus 3330. In this manner, various production and exploration tools may be supported by the show 3350. The shoe 3350 may comprise any number of conventional commercially available shoes suitable for use in a wellbore such as, for example, cement filled shoe, or an aluminum or composite shoe. In a preferred embodiment, the shoe 3350 comprises an aluminum shoe available from Halliburton. In a preferred embodiment, the shoe 3355 is selected to provide sufficient strength in compression and tension to permit the use of high capacity production and exploration tools.

In a particularly preferred embodiment, the apparatus 3330 includes a plurality of solid casings 3335, a plurality of seals 3340, a plurality of slotted casings 3345, a plurality of intermediate solid casings 3350, and a shoe 3355. More generally, the apparatus 3330 may comprise one or more solid casings 3335, each with one or more valve members 3360, n slotted casings 3345, n-1 intermediate solid casings 3350, each with one or more valve members 3370, and a shoe 3355.

During operation of the apparatus 3330, oil and gas may be controllably produced from the targeted oil sand zone 3325 using the slotted casings 3345. The oil and gas may then be transported to a surface location using the solid casing 3335. The use of intermediate solid casings 3350 with valve members 3370 permits isolated sections of the zone 3325 to be selectively isolated for production. The seals 3340 permit the zone 3325 to be fluidicly isolated from the zone 3320. The seals 3340 further permits isolated sections of the zone 3325 to be fluidicly isolated from each other. In this manner, the apparatus 3330 permits unwanted and/or non-productive subterranean zones to be fluidicly isolated.

In an alternative embodiment, as will be recognized by persons having ordinary skill in the art and also having the benefit of the present disclosure, during the production mode of operation, an internal tubular string with various arrangements of packers, perforated tubing, sliding sleeves, and valves may be employed within the apparatus to provide various options for commingling and isolating subterranean zones from each other while providing a fluid path to the surface.

Referring to FIGS. 22*a*, 22*b*, 22*c* and 22*d*, an embodiment of an apparatus 3500 for forming a wellbore casing while drilling a wellbore will now be described. In a preferred embodiment, the apparatus 3500 includes a support member 3505, a mandrel 3510, a mandrel launcher 3515, a shoe 3520, a tubular member 3525, a mud motor 3530, a drill bit 3535, a first fluid passage 3540, a second fluid passage 3545, a pressure chamber 3550, a third fluid passage 3555, a cup seal 3560, a body of lubricant 3565, seals 3570, and a releasable coupling 3600.

The support member 3505 is coupled to the mandrel 3510. The support member 3505 preferably comprises an annular member having sufficient strength to carry and support the apparatus 3500 within the wellbore 3575. In a preferred embodiment, the support member 3505 further includes one or more conventional centralizers (not illustrated) to help stabilize the apparatus 3500.

The support member 3505 may comprise one or more sections of conventional commercially available tubular materials such as, for example, oilfield country tubular goods, low alloy steel, stainless steel or carbon steel. In a preferred embodiment, the support member 3505 comprises coiled tubing or drillpipe in order to optimally permit the placement of the apparatus 3500 within a non-vertical wellbore.

In a preferred embodiment, the support member 3505 includes a first fluid passage 3540 for conveying fluidic materials from a surface location to the fluid passage 3545. In a preferred embodiment, the first fluid passage 3540 is adapted to convey fluidic materials such as water, drilling mud, cement, epoxy or slag mix at operating pressures and flow rates ranging from about 0 to 10,000 psi and 0 to 3,000 gallons/minute.

The mandrel 3510 is coupled to and supported by the support member 3505. The mandrel 3510 is also coupled to and supports the mandrel launcher 3515 and tubular member 3525. The mandrel 3510 is preferably adapted to controllably expand in a radial direction. The mandrel 3510 may comprise any number of conventional commercially available mandrels modified in accordance with the teachings of the present disclosure. In a preferred embodiment, the mandrel 3510 comprises a hydraulic expansion tool as disclosed in U.S. Pat. No. 5,348,095, the contents of which are incorporated herein by reference, modified in accordance with the teachings of the present disclosure.

In a preferred embodiment, the mandrel 3510 includes one or more conical sections for expanding the tubular member 3525 in the radial direction. In a preferred embodiment, the outer surfaces of the conical sections of the mandrel 3510 have a surface hardness ranging from about 58 to 62 Rockwell C in order to optimally radially expand the tubular member 3525.

In a preferred embodiment, the mandrel 3510 includes a second fluid passage 3545 fluidicly coupled to the first fluid passage 3540 and the pressure chamber 3550 for conveying fluidic materials from the first fluid passage 3540 to the pressure chamber 3550. In a preferred embodiment, the second fluid passage 3545 is adapted to convey fluidic materials such as water, drilling mud, cement, epoxy or slag mix at operating pressures and flow rates ranging from about 0 to 12,000 psi and 0 to 3,500 gallons/minute in order to optimally provide operating pressure for efficient operation.

The mandrel launcher 3515 is coupled to the tubular member 3525, the mandrel 3510, and the shoe 3520. The mandrel launcher 3515 preferably comprises a tapered annular member that mates with at a portion of at least one of the conical portions of the outer surface of the mandrel 3510. In a preferred embodiment, the wall thickness of the mandrel launcher is less than the wall thickness of the tubular member 3525 in order to facilitate the initiation of the radial expansion process and facilitate the placement of the apparatus in openings having tight clearances. In a preferred embodiment, the wall thickness of the mandrel launcher 3515 ranges from about 50 to 100% of the wall thickness of the tubular member 3525 immediately adjacent to the mandrel launcher 3515 in order to optimally faciliate the radial expansion process and facilitate the insertion of the apparatus 3500 into wellbore casings and other areas with tight clearances.

The mandrel launcher 3515 may be fabricated from any number of conventional commercially available materials such as, for example, oilfield country tubular goods, low alloy steel, carbon steel or stainless steel. In a preferred embodiment, the mandrel launcher 3515 is fabricated from oilfield country tubular goods of higher strength by lower wall thickness than the tubular member 3525 in order to optimally provide a smaller container having approximately the same burst strength as the tubular member 3525.

The shoe 3520 is coupled to the mandrel launcher 3515 and the releasable coupling 3600. The shoe 3520 preferably comprises a substantially annular member. In a preferred embodiment, the shoe 3520 or the releasable coupling 3600 include a third fluid passage 3555 fluidicly coupled to the pressure chamber 3550 and the mud motor 3530.

The shoe 3520 may comprise any number of conventional commercially available shoes such as, for example, cement filled, aluminum or composite modified in accordance with the teachings of the present disclosure. In a preferred embodiment, the shoe 3520 comprises a high strength shoe having a burst strength approximately equal to the burst strength of the tubular member 3525 and mandrel launcher 3515. The shoe 3520 is preferably coupled to the mud motor 3520 by a releasable coupling 3600 in order to optimally provide for removal of the mud motor 3530 and drill nit 3535 upon the completion of a drilling and casing operation.

In a preferred embodiment, the shoe 3520 includes a releasable latch mechanism 3600 for retrieving and removing the mud motor 3530 and drill bit 3535 upon the completion of the drilling and casing formation operations. In a preferred embodiment, the shoe 3520 further includes an anti-rotation device for maintaining the shoe 3520 in a substantially stationary rotational position during operation of the apparatus 3600. In a preferred embodiment, the releasable latch mechanism 3600 is releasably coupled to the shoe 3520.

The tubular member 3525 is supported by and coupled to the mandrel 3510. The tubular member 3525 is expanded in the radial direction and extruded off of the mandrel 3510. The tubular member 3525 may be fabricated from any number of conventional commercially available materials such as, for example, Oilfield Country Tubular Goods (OCTG), 13 chromium steel tubing/casing, automotive grade steel, or plastic tubing/casing. In a preferred embodiment, the tubular member 3525 is fabricated from OCTG in order to maximize strength after expansion. The inner and outer diameters of the tubular member 3525 may range, for example, from approximately 0.75 to 47 inches and 1.05 to 48 inches, respectively. In a preferred embodiment, the inner and outer diameters of the tubular member 3525 range from about 3 to 15.5 inches and 3.5 to 16 inches, respectively in order to optimally provide minimal telescoping effect in the most commonly drilled wellbore sizes. The tubular member 3525 preferably comprises an annular member with solid walls.

In a preferred embodiment, the upper end portion 3580 of the tubular member 3525 is slotted, perforated, or otherwise modified to catch or slow down the mandrel 3510 when the mandrel 3510 completes the extrusion of tubular member 3525. For typical tubular member 3525 materials, the length of the tubular member 3525 is preferably limited to between about 40 to 20,000 feet in length. The tubular member 3525 may comprise a single tubular member or, alternatively, a plurality of tubular members coupled to one another.

The mud motor 3530 is coupled to the shoe 3520 and the drill bit 3535. The mud motor 3530 is also fluidicly coupled to the fluid passage 3555. In a preferred embodiment, the mud motor 3530 is driven by fluidic materials such as, for example, drilling mud, water, cement, epoxy, lubricants or slag mix conveyed from the fluid passage 3555 to the mud motor 3530. In this manner, the mud motor 3530 drives the drill bit 3535. The operating pressures and flow rates for operating mud motor 3530 may range, for example, from about 0 to 12,000 psi and 0 to 10,000 gallons/minute. In a preferred embodiment, the operating pressures and flow rates for operating mud motor 3530 range from about 0 to 5,000 psi and 40 to 3,000 gallons/minute.

The mud motor 3530 may comprise any number of conventional commercially available mud motors, modified in accordance with the teachings of the present disclosure. In a preferred embodiment, the size of the mud motor 3520 and drill bit 3535 are selected to pass through the interior of the shoe 3520 and the expanded tubular member 3525. In this manner, the mud motor 3520 and drill bit 3535 may be retrieved from the downhole location upon the conclusion of the drilling and casing operations.

The drill bit 3535 is coupled to the mud motor 3530. The drill bit 3535 is preferably adapted to be powered by the mud motor 3530. In this manner, the drill bit 3535 drills out new sections of the wellbore 3575.

The drill bit 3535 may comprise any number of conventional commercially available drill bits, modified in accordance with the teachings of the present disclosure. In a preferred embodiment, the size of the mud motor 3520 and drill bit 3535 are selected to pass through the interior of the shoe 3520 and the expanded tubular member 3525. In this manner, the mud motor 3520 and drill bit 3535 may be retrieved from the downhole location upon the conclusion of the drilling and casing operations. In several alternative preferred embodiments, the drill bit 3535 comprises an eccentric drill bit, a bi-centered drill bit, or a small diameter drill bit with an hydraulically actuated under reamer.

The first fluid passage 3540 permits fluidic materials to be transported to the second fluid passage 3545, the pressure chamber 3550, the third fluid passage 3555, and the mud motor 3530. The first fluid passage 3540 is coupled to and positioned within the support member 3505. The first fluid passage 3540 preferably extends from a position adjacent to the surface to the second fluid passage 3545 within the mandrel 3510. The first fluid passage 3540 is preferably positioned along a centerline of the apparatus 3500.

The second fluid passage 3545 permits fluidic materials to be conveyed from the first fluid passage 3540 to the pressure chamber 3550, the third fluid passage 3555, and the mud motor 3530. The second fluid passage 3545 is coupled to and positioned within the mandrel 3510. The second fluid passage 3545 preferably extends from a position adjacent to the first fluid passage 3540 to the bottom of the mandrel 3510. The second fluid passage 3545 is preferably positioned substantially along the centerline of the apparatus 3500.

The pressure chamber 3550 permits fluidic materials to be conveyed from the second fluid passage 3545 to the third fluid passage 3555, and the mud motor 3530. The pressure chamber is preferably defined by the region below the mandrel 3510 and within the tubular member 3525, mandrel launcher 3515, shoe 3520, and releasable coupling 3600. During operation of the apparatus 3500, pressurization of the pressure chamber 3550 preferably causes the tubular member 3525 to be extruded off of the mandrel 3510.

The third fluid passage 3555 permits fluidic materials to be conveyed from the pressure chamber 3550 to the mud motor 3530. The third fluid passage 3555 may be coupled to and positioned within the shoe 3520 or releasable coupling 3600. The third fluid passage 3555 preferably extends from a position adjacent to the pressure chamber 3550 to the bottom of the shoe 3520 or releasable coupling 3600. The third fluid passage 3555 is preferably positioned substantially along the centerline of the apparatus 3500.

The fluid passages 3540, 3545, and 3555 are preferably selected to convey materials such as cement, drilling mud or epoxies at flow rates and pressures ranging from about 0 to 3,000 gallons/minute and 0 to 9,000 psi in order to optimally operational efficiency.

The cup seal 3560 is coupled to and supported by the outer surface of the support member 3505. The cup seal 3560 prevents foreign materials from entering the interior region of the tubular member 3525. The cup seal 3560 may comprise any number of conventional commercially available cup seals such as, for example, TP cups or SIP cups modified in accordance with the teachings of the present disclosure. In a preferred embodiment, the cup seal 3560 comprises a SIP cup, available from Halliburton Energy Services in Dallas, Tex. in order to optimally block the entry of foreign materials and contain a body of lubricant. In a preferred embodiment, the apparatus 3500 includes a plurality of such cup seals in order to optimally prevent the entry of foreign material into the interior region of the tubular member 3525 in the vicinity of the mandrel 3510.

In a preferred embodiment, a quantity of lubricant 3565 is provided in the annular region above the mandrel 3510 within the interior of the tubular member 3525. In this manner, the extrusion of the tubular member 3525 off of the mandrel 3510 is facilitated. The lubricant 3565 may comprise any number of conventional commercially available lubricants such as, for example, Lubriplate, chlorine based lubricants, oil based lubricants or Climax 1500 Antisieze (3100). In a preferred embodiment, the lubricant 3565 comprises Climax 1500 Antisieze (3100) available from Climax Lubricants and Equipment Co. in Houston, Tex. in order to optimally provide optimum lubrication to faciliate the expansion process.

The seals 3570 are coupled to and supported by the end portion 3580 of the tubular member 3525. The seals 3570 are further positioned on an outer surface of the end portion 3580 of the tubular member 3525. The seals 3570 permit the overlapping joint between the lower end portion 3585 of a preexisting section of casing 3590 and the end portion 3580 of the tubular member 3525 to be fluidicly sealed. The seals 3570 may comprise any number of conventional commercially available seals such as, for example, lead, rubber, Teflon, or epoxy seals modified in accordance with the teachings of the present disclosure. In a preferred embodiment, the seals 3570 are molded from Stratalock epoxy available from Halliburton Energy Services in Dallas, Tex. in order to optimally provide a load bearing interference fit between the end 3580 of the tubular member 3525 and the end 3585 of the pre-existing casing 3590.

In a preferred embodiment, the seals 3570 are selected to optimally provide a sufficient frictional force to support the expanded tubular member 3525 from the pre-existing casing 3590. In a preferred embodiment, the frictional force optimally provided by the seals 3670 ranges from about 1,000 to 1,000,000 lbf in order to optimally support the expanded tubular member 3525.

The releasable coupling 3600 is preferably releasably coupled to the bottom of the shoe 3520. In a preferred embodiment, the releasable coupling 3600 includes fluidic seals for sealing the interface between the releasable coupling 3600 and the shoe 3520. In this manner, the pressure chamber 3550 may be pressurized. The releasable coupling 3600 may comprise any number of conventional commercially available releasable couplings suitable for drilling operations modified in accordance with the teachings of the present disclosure.

Figure 22A:
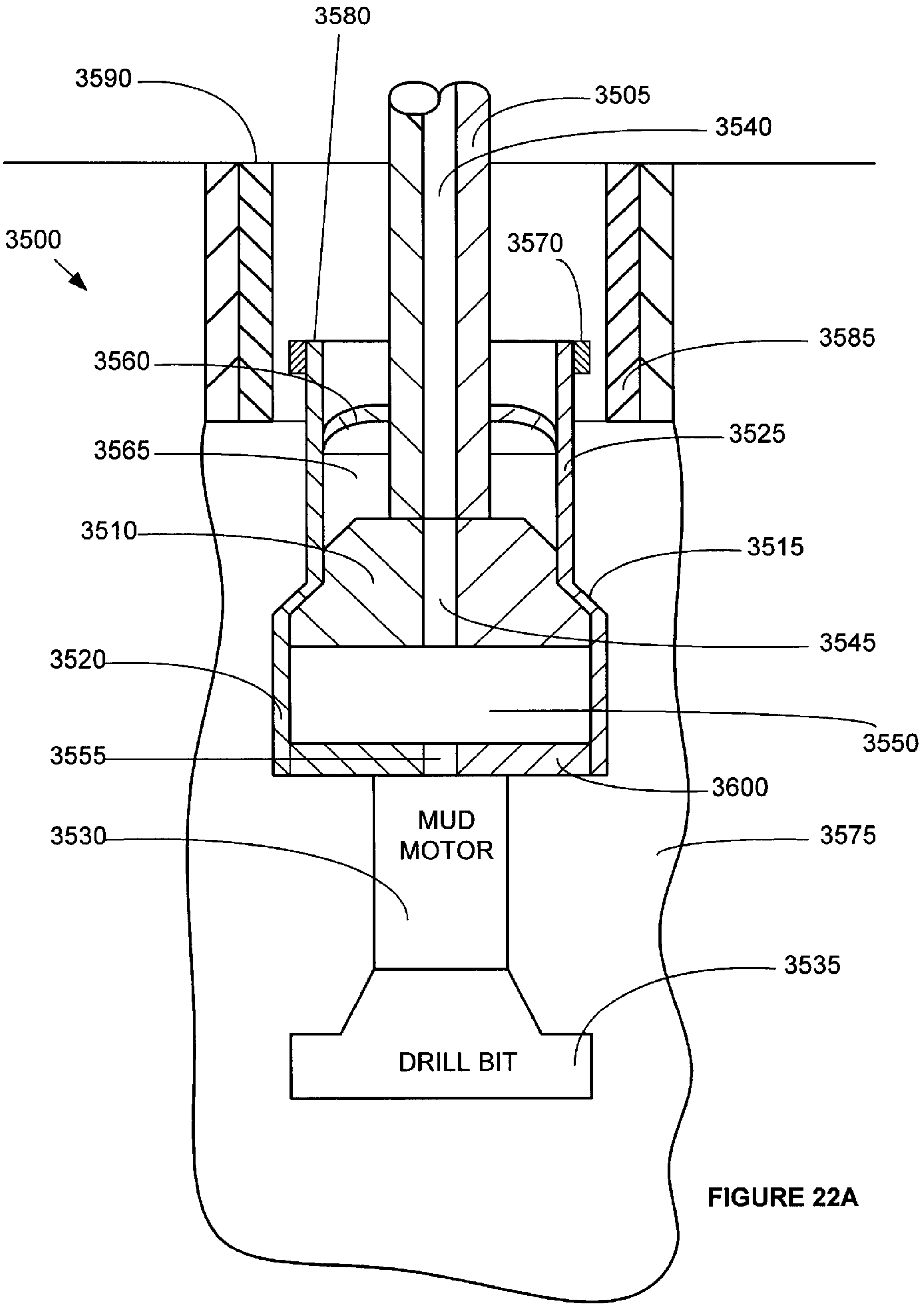
FIG. 22*a* is a fragmentary cross-sectional illustration of an embodiment of an apparatus for forming a wellbore casing while drilling a wellbore.

As illustrated in FIG. 22A, during operation of the apparatus 3500, the apparatus 3500 is preferably initially positioned within a preexisting section of a wellbore 3575 including a preexisting section of wellbore casing 3590. In a preferred embodiment, the upper end portion 3580 of the tubular member 3525 is positioned in an overlapping relationship with the lower end 3585 of the preexisting section of casing 3590. In a preferred embodiment, the apparatus 3500 is initially positioned in the wellbore 3575 with the drill bit 353 in contact with the bottom of the wellbore 3575. During the initial placement of the apparatus 3500 in the wellbore 3575, the tubular member 3525 is preferably supported by the mandrel 3510.

Figure 22B:
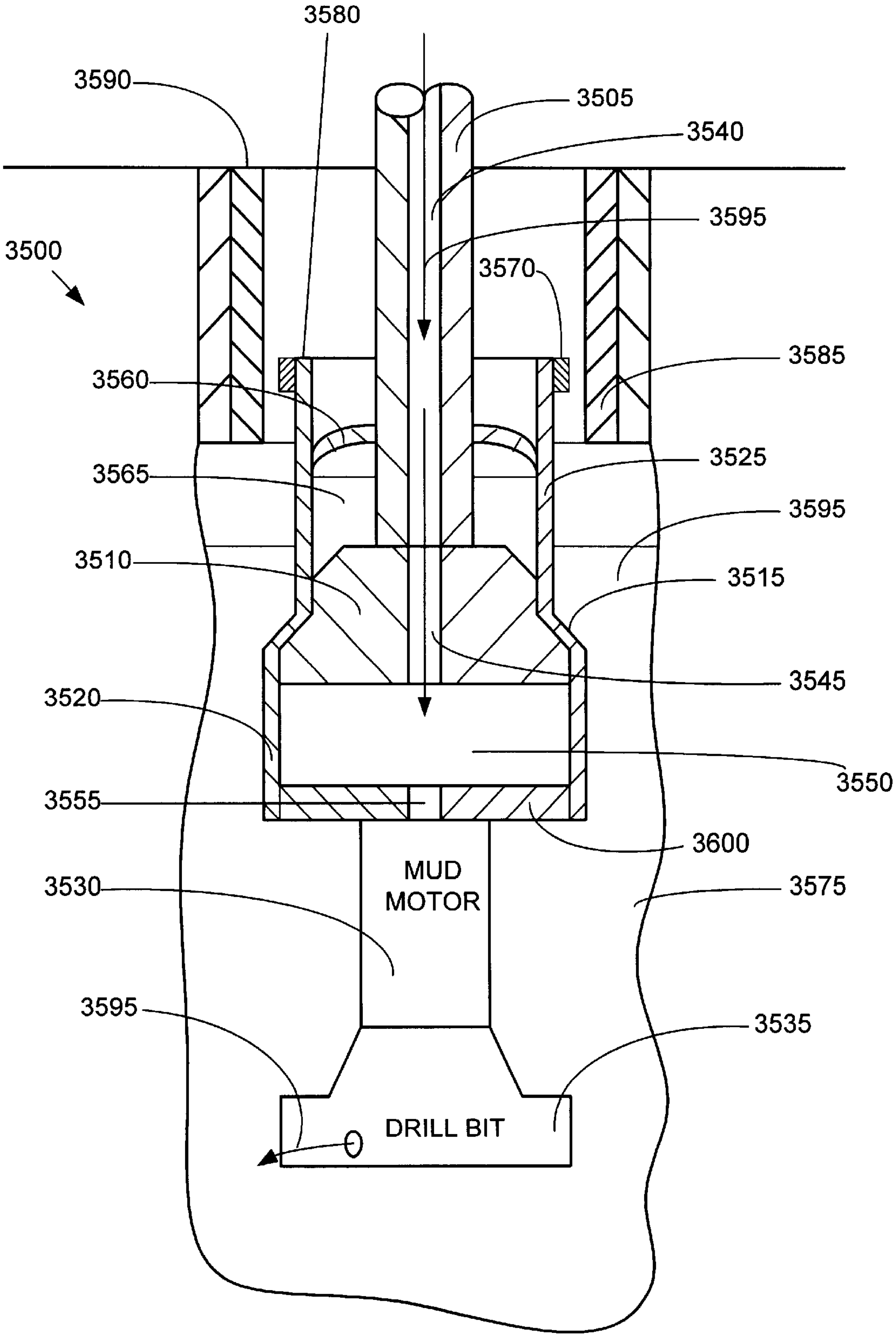
FIG. 22*b* is another fragmentary cross-sectional illustration of the apparatus of FIG. 22*a*.

As illustrated in FIG. 22B, a fluidic material 3595 is then pumped into the first fluid passage 3540. The fluidic material 3595 is preferably conveyed from the first fluid passage 3540 to the second fluid passage 3545, the pressure chamber 3550, the third fluid passage 3555 and the inlet to the mud motor 3530. The fluidic material 3595 may comprise any number of conventional commercially available fluidic materials such as, for example, drilling mud, water, cement, epoxy or slag mix. The fluidic material 3595 may be pumped into the first fluid passage 3540 at operating pressures and flow rates ranging, for example, from about 0 to 9,000 psi and 0 to 3,000 gallons/minute.

The fluidic material 3595 will enter the inlet for the mud motor 3530 and drive the mud motor 3530. The fluidic material 3595 will then exit the mud motor 3530 and enter the annular region surrounding the apparatus 3500 within the wellbore 3575. The mud motor 3530 will in turn drive the drill bit 3535. The operation of the drill bit 3535 will drill out a new section of the wellbore 3575.

In the case where the fluidic material 3595 comprises a hardenable fluidic material, the fluidic material 3595 preferably is permitted to cure and form an outer annular body surrounding the periphery of the expanded tubular member 3525. Alternatively, in the case where the fluidic material 3595 is a non-hardenable fluidic material, the tubular member 3595 preferably is expanded into intimate contact with the interior walls of the wellbore 3575. In this manner, an outer annular body is not provided in all applications.

Figure 22C:
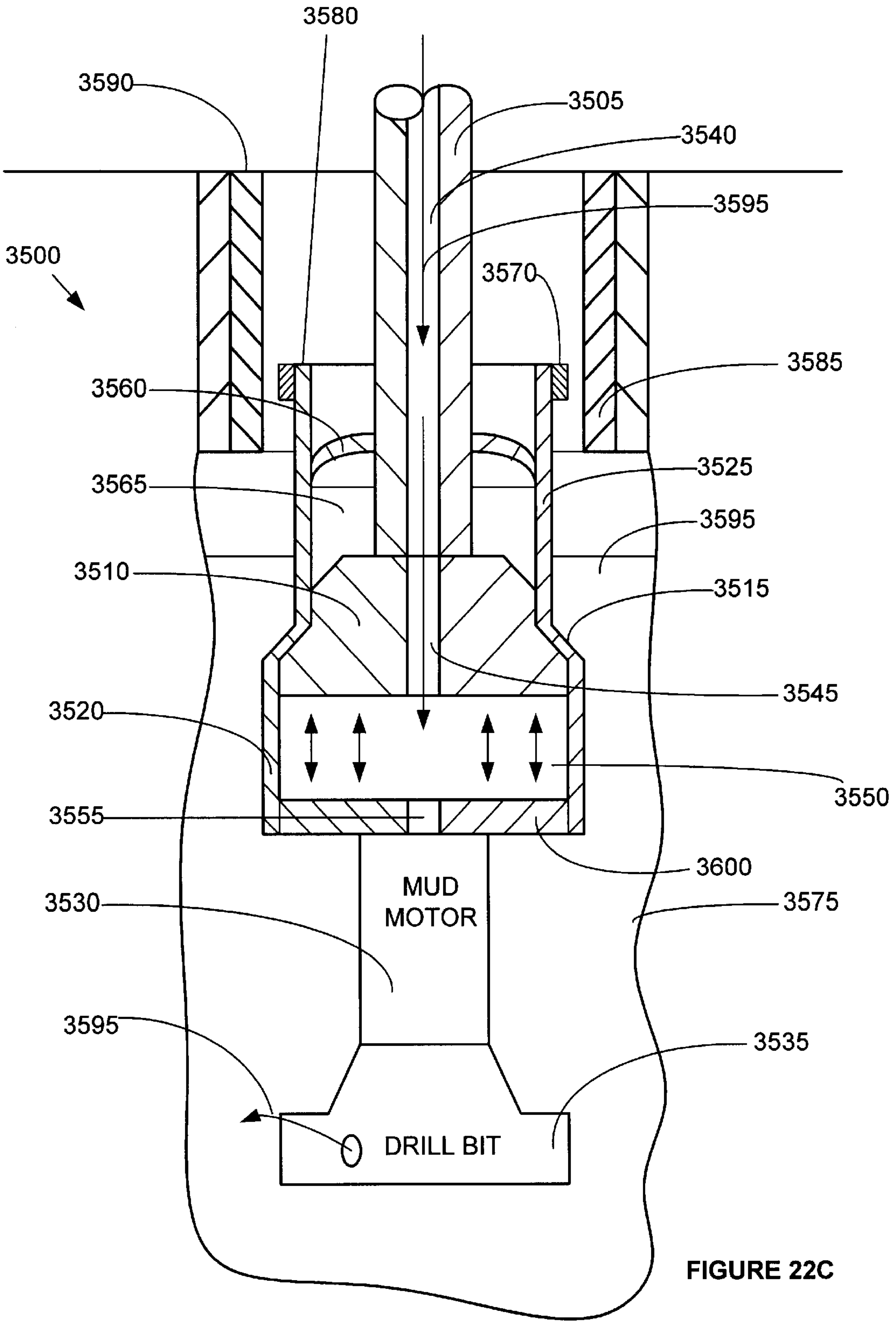
FIG. 22*c* is another fragmentary cross-sectional illustration of the apparatus of FIG. 22*a*.
Figure 22D:
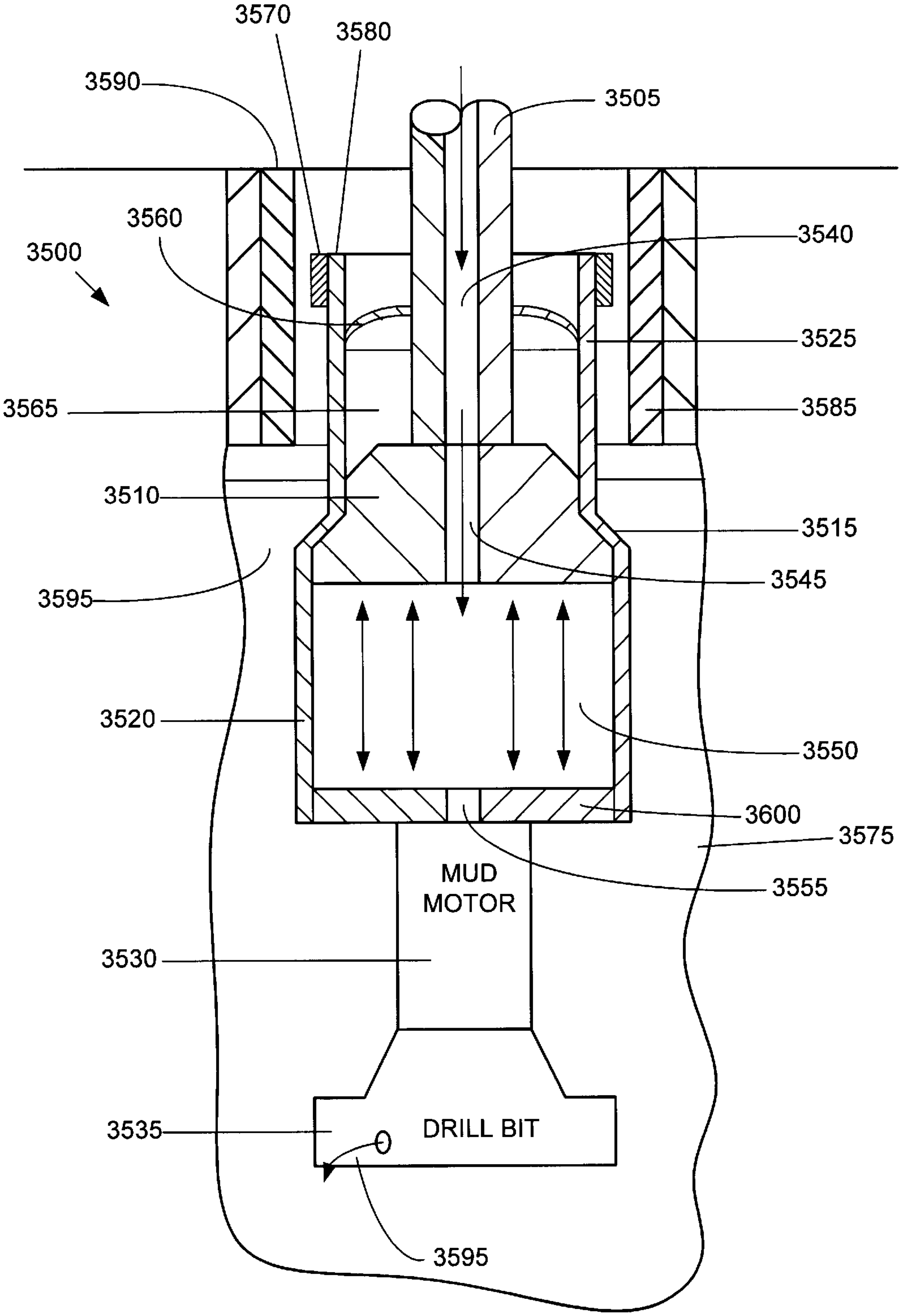
FIG. 22*d* is another fragmentary cross-sectional illustration of the apparatus of FIG. 22*a*.

As illustrated in FIG. 22C, at some point during operation of the mud motor 3530 and drill bit 3535, the pressure drop across the mud motor 3530 will create sufficient back pressure to cause the operating pressure within the pressure chamber 3550 to elevate to the pressure necessary to extrude the tubular member 3525 off of the mandrel 3510. The elevation of the operating pressure within the pressure chamber 3550 will then cause the tubular member 3525 to extrude off of the mandrel 3510 as illustrated in FIG. 22D. For typical tubular members 3525, the necessary operating pressure may range, for example, from about 1,000 to 9,000 psi. In this manner, a wellbore casing is formed simultaneous with the drilling out of a new section of wellbore.

In a particularly preferred embodiment, during the operation of the apparatus 3500, the apparatus 3500 is lowered into the wellbore 3575 until the drill bit 3535 is proximate the bottom of the wellbore 3575. Throughout this process, the tubular member 3525 is preferably supported by the mandrel 3510. The apparatus 3500 is then lowered until the drill bit 3535 is placed in contact with the bottom of the wellbore 3575. At this point, at least a portion of the weight of the tubular member 3525 is supported by the drill bit 3535.

The fluidic material 3595 is then pumped into the first fluid passage 3540, second fluid passage 3545, pressure chamber 3550, third fluid passage 3555, and the inlet of the mud motor 3530. The mud motor 3530 then drives the drill bit 3535 to drill out a new section of the wellbore 3575. Once the differential pressure across the mud motor 3530 exceeds the minimum extrusion pressure for the tubular member 3525, the tubular member 3525 begins to extrude off of the mandrel 3510. As the tubular member 3525 is extruded off of the mandrel 3510, the weight of the extruded portion of the tubular member 3525 is transferred to and supported by the drill bit 3535. In a preferred embodiment, the pumping pressure of the fluidic material 3595 is maintained substantially constant throughout this process. At some point during the process of extruding the tubular member 3525 off of the mandrel 3510, a sufficient portion of the weight of the tubular member 3525 is transferred to the drill bit 3535 to stop the extrusion process due to the opposing force. Continued drilling by the drill bit 3535 eventually transfers a sufficient portion of the weight of the extruded portion of the tubular member 3525 back to the mandrel 3510. At this point, the extrusion of the tubular member 3525 off of the mandrel 3510 continues. In this manner, the support member 3505 never has to be moved and no drillpipe connections have to be made at the surface since the new section of the wellbore casing within the newly drilled section of wellbore is created by the constant downward feeding of the expanded tubular member 3525 off of the mandrel 3510.

Once the new section of wellbore that is lined with the fully expanded tubular member 3525 is completed, the support member 3505 and mandrel 3510 are removed from the wellbore 3575. The drilling assembly including the mud motor 3530 and drill bit 3535 are then preferably removed by lowering a drillstring into the new section of wellbore casing and retrieving the drilling assembly by using the latch 3600. The expanded tubular member 3525 is then cemented using conventional squeeze cementing methods to provide a solid annular sealing member around the periphery of the expanded tubular member 3525.

Alternatively, the apparatus 3500 may be used to repair or form an underground pipeline or form a support member for a structure. In several preferred alternative embodiments, the teachings of the apparatus 3500 are combined with the teachings of the embodiments illustrated in FIGS. 1–21. For example, by operably coupling the mud motor 3530 and drill bit 3535 to the pressure chambers used to cause the radial expansion of the tubular members of the embodiments illustrated and described with reference to FIGS. 1–21, the use of plugs may be eliminated and radial expansion of tubular members can be combined with the drilling out of new sections of wellbore.

A method of creating a casing in a borehole located in a subterranean formation has been described that includes installing a tubular liner and a mandrel in the borehole. A body of fluidic material is then injected into the borehole. The tubular liner is then radially expanded by extruding the liner off of the mandrel. The injecting preferably includes injecting a hardenable fluidic sealing material into an annular region located between the borehole and the exterior of the tubular liner; and a non hardenable fluidic material into an interior region of the tubular liner below the mandrel. The method preferably includes fluidicly isolating the annular region from the interior region before injecting the second quantity of the non hardenable sealing material into the interior region. The injecting the hardenable fluidic sealing material is preferably provided at operating pressures and flow rates ranging from about 0 to 5000 psi and 0 to 1,500 gallons/min. The injecting of the non hardenable fluidic material is preferably provided at operating pressures and flow rates ranging from about 500 to 9000 psi and 40 to 3,000 gallons/min. The injecting of the non hardenable fluidic material is preferably provided at reduced operating pressures and flow rates during an end portion of the extruding. The non hardenable fluidic material is preferably injected below the mandrel. The method preferably includes pressurizing a region of the tubular liner below the mandrel. The region of the tubular liner below the mandrel is preferably pressurized to pressures ranging from about 500 to 9,000 psi. The method preferably includes fluidicly isolating an interior region of the tubular liner from an exterior region of the tubular liner. The method further preferably includes curing the hardenable sealing material, and removing at least a portion of the cured sealing material located within the tubular liner. The method further preferably includes overlapping the tubular liner with an existing wellbore casing. The method further preferably includes sealing the overlap between the tubular liner and the existing wellbore casing. The method further preferably includes supporting the extruded tubular liner using the overlap with the existing wellbore casing. The method further preferably includes testing the integrity of the seal in the overlap between the tubular liner and the existing wellbore casing. The method further preferably includes removing at least a portion of the hardenable fluidic sealing material within the tubular liner before curing. The method further preferably includes lubricating the surface of the mandrel. The method further preferably includes absorbing shock. The method further preferably includes catching the mandrel upon the completion of the extruding.

An apparatus for creating a casing in a borehole located in a subterranean formation has been described that includes a support member, a mandrel, a tubular member, and a shoe. The support member includes a first fluid passage. The mandrel is coupled to the support member and includes a second fluid passage. The tubular member is coupled to the mandrel. The shoe is coupled to the tubular liner and includes a third fluid passage. The first, second and third fluid passages are operably coupled. The support member preferably further includes a pressure relief passage, and a flow control valve coupled to the first fluid passage and the pressure relief passage. The support member further preferably includes a shock absorber. The support member preferably includes one or more sealing members adapted to prevent foreign material from entering an interior region of the tubular member. The mandrel is preferably expandable. The tubular member is preferably fabricated from materials selected from the group consisting of Oilfield Country Tubular Goods, 13 chromium steel tubing/casing, and plastic casing. The tubular member preferably has inner and outer diameters ranging from about 3 to 15.5 inches and 3.5 to 16 inches, respectively. The tubular member preferably has a plastic yield point ranging from about 40,000 to 135,000 psi. The tubular member preferably includes one or more sealing members at an end portion. The tubular member preferably includes one or more pressure relief holes at an end portion. The tubular member preferably includes a catching member at an end portion for slowing down the mandrel. The shoe preferably includes an inlet port coupled to the third fluid passage, the inlet port adapted to receive a plug for blocking the inlet port. The shoe preferably is drillable.

A method of joining a second tubular member to a first tubular member, the first tubular member having an inner diameter greater than an outer diameter of the second tubular member, has been described that includes positioning a mandrel within an interior region of the second tubular member, positioning the first and second tubular members in an overlapping relationship, pressurizing a portion of the interior region of the second tubular member; and extruding the second tubular member off of the mandrel into engagement with the first tubular member. The pressurizing of the portion of the interior region of the second tubular member is preferably provided at operating pressures ranging from about 500 to 9,000 psi. The pressurizing of the portion of the interior region of the second tubular member is preferably provided at reduced operating pressures during a latter portion of the extruding. The method further preferably includes sealing the overlap between the first and second tubular members. The method further preferably includes supporting the extruded first tubular member using the overlap with the second tubular member. The method further preferably includes lubricating the surface of the mandrel. The method further preferably includes absorbing shock.

A liner for use in creating a new section of wellbore casing in a subterranean formation adjacent to an already existing section of wellbore casing has been described that includes an annular member. The annular member includes one or more sealing members at an end portion of the annular member, and one or more pressure relief passages at an end portion of the annular member.

A wellbore casing has been described that includes a tubular liner and an annular body of a cured fluidic sealing material. The tubular liner is formed by the process of extruding the tubular liner off of a mandrel. The tubular liner is preferably formed by the process of placing the tubular liner and mandrel within the wellbore, and pressurizing an interior portion of the tubular liner. The annular body of the cured fluidic sealing material is preferably formed by the process of injecting a body of hardenable fluidic sealing material into an annular region external of the tubular liner. During the pressurizing, the interior portion of the tubular liner is preferably fluidicly isolated from an exterior portion of the tubular liner. The interior portion of the tubular liner is preferably pressurized to pressures ranging from about 500 to 9,000 psi. The tubular liner preferably overlaps with an existing wellbore casing. The wellbore casing preferably further includes a seal positioned in the overlap between the tubular liner and the existing wellbore casing. Tubular liner is preferably supported the overlap with the existing wellbore casing.

A method of repairing an existing section of a wellbore casing within a borehole has been described that includes installing a tubular liner and a mandrel within the wellbore casing, injecting a body of a fluidic material into the borehole, pressurizing a portion of an interior region of the tubular liner, and radially expanding the liner in the borehole by extruding the liner off of the mandrel. In a preferred embodiment, the fluidic material is selected from the group consisting of slag mix, cement, drilling mud, and epoxy. In a preferred embodiment, the method further includes fluidicly isolating an interior region of the tubular liner from an exterior region of the tubular liner. In a preferred embodiment, the injecting of the body of fluidic material is provided at operating pressures and flow rates ranging from about 500 to 9,000 psi and 40 to 3,000 gallons/min. In a preferred embodiment, the injecting of the body of fluidic material is provided at reduced operating pressures and flow rates during an end portion of the extruding. In a preferred embodiment, the fluidic material is injected below the mandrel. In a preferred embodiment, a region of the tubular liner below the mandrel is pressurized. In a preferred embodiment, the region of the tubular liner below the mandrel is pressurized to pressures ranging from about 500 to 9,000 psi. In a preferred embodiment, the method further includes overlapping the tubular liner with the existing wellbore casing. In a preferred embodiment, the method further includes sealing the interface between the tubular liner and the existing wellbore casing. In a preferred embodiment, the method further includes supporting the extruded tubular liner using the existing wellbore casing. In a preferred embodiment, the method further includes testing the integrity of the seal in the interface between the tubular liner and the existing wellbore casing. In a preferred embodiment, method further includes lubricating the surface of the mandrel. In a preferred embodiment, the method further includes absorbing shock. In a preferred embodiment, the method further includes catching the mandrel upon the completion of the extruding. In a preferred embodiment, the method further includes expanding the mandrel in a radial direction.

A tie-back liner for lining an existing wellbore casing has been described that includes a tubular liner and an annular body of a cured fluidic sealing material. The tubular liner is formed by the process of extruding the tubular liner off of a mandrel. The annular body of a cured fluidic sealing material is coupled to the tubular liner. In a preferred embodiment, the tubular liner is formed by the process of placing the tubular liner and mandrel within the wellbore, and pressurizing an interior portion of the tubular liner. In a preferred embodiment, during the pressurizing, the interior portion of the tubular liner is fluidicly isolated from an exterior portion of the tubular liner. In a preferred embodiment, the interior portion of the tubular liner is pressurized at pressures ranging from about 500 to 9,000 psi. In a preferred embodiment, the annular body of a cured fluidic sealing material is formed by the process of injecting a body of hardenable fluidic sealing material into an annular region between the existing wellbore casing and the tubular liner. In a preferred embodiment, the tubular liner overlaps with another existing wellbore casing. In a preferred embodiment, the tie-back liner further includes a seal positioned in the overlap between the tubular liner and the other existing wellbore casing. In a preferred embodiment, tubular liner is supported by the overlap with the other existing wellbore casing.

An apparatus for expanding a tubular member has been described that includes a support member, a mandrel, a tubular member, and a shoe. The support member includes a first fluid passage. The mandrel is coupled to the support member. The mandrel includes a second fluid passage operably coupled to the first fluid passage, an interior portion, and an exterior portion. The interior portion of the mandrel is drillable. The tubular member is coupled to the mandrel. The shoe is coupled to the tubular member. The shoe includes a third fluid passage operably coupled to the second fluid passage, an interior portion, and an exterior portion. The interior portion of the shoe is drillable. Preferably, the interior portion of the mandrel includes a tubular member and a load bearing member. Preferably, the load bearing member comprises a drillable body. Preferably, the interior portion of the shoe includes a tubular member, and a load bearing member. Preferably, the load bearing member comprises a drillable body. Preferably, the exterior portion of the mandrel comprises an expansion cone. Preferably, the expansion cone is fabricated from materials selected from the group consisting of tool steel, titanium, and ceramic. Preferably, the expansion cone has a surface hardness ranging from about 58 to 62 Rockwell C. Preferably at least a portion of the apparatus is drillable.

A wellhead has also been described that includes an outer casing and a plurality of substantially concentric and overlapping inner casings coupled to the outer casing. Each inner casing is supported by contact pressure between an outer surface of the inner casing and an inner surface of the outer casing. In a preferred embodiment, the outer casing has a yield strength ranging from about 40,000 to 135,000 psi. In a preferred embodiment, the outer casing has a burst strength ranging from about 5,000 to 20,000 psi. In a preferred embodiment, the contact pressure between the inner casings and the outer casing ranges from about 500 to 10,000 psi. In a preferred embodiment, one or more of the inner casings include one or more sealing members that contact with an inner surface of the outer casing. In a preferred embodiment, the sealing members are selected from the group consisting of lead, rubber, Teflon, epoxy, and plastic. In a preferred embodiment, a Christmas tree is coupled to the outer casing. In a preferred embodiment, a drilling spool is coupled to the outer casing. In a preferred embodiment, at least one of the inner casings is a production casing.

A wellhead has also been described that includes an outer casing at least partially positioned within a wellbore and a plurality of substantially concentric inner casings coupled to the interior surface of the outer casing by the process of expanding one or more of the inner casings into contact with at least a portion of the interior surface of the outer casing. In a preferred embodiment, the inner casings are expanded by extruding the inner casings off of a mandrel. In a preferred embodiment, the inner casings are expanded by the process of placing the inner casing and a mandrel within the wellbore; and pressurizing an interior portion of the inner casing. In a preferred embodiment, during the pressurizing, the interior portion of the inner casing is fluidicly isolated from an exterior portion of the inner casing. In a preferred embodiment, the interior portion of the inner casing is pressurized at pressures ranging from about 500 to 9,000 psi. In a preferred embodiment, one or more seals are positioned in the interface between the inner casings and the outer casing. In a preferred embodiment, the inner casings are supported by their contact with the outer casing.

A method of forming a wellhead has also been described that includes drilling a wellbore. An outer casing is positioned at least partially within an upper portion of the wellbore. A first tubular member is positioned within the outer casing. At least a portion of the first tubular member is expanded into contact with an interior surface of the outer casing. A second tubular member is positioned within the outer casing and the first tubular member. At least a portion of the second tubular member is expanded into contact with an interior portion of the outer casing. In a preferred embodiment, at least a portion of the interior of the first tubular member is pressurized. In a preferred embodiment, at least a portion of the interior of the second tubular member is pressurized. In a preferred embodiment, at least a portion of the interiors of the first and second tubular members are pressurized. In a preferred embodiment, the pressurizing of the portion of the interior region of the first tubular member is provided at operating pressures ranging from about 500 to 9,000 psi. In a preferred embodiment, the pressurizing of the portion of the interior region of the second tubular member is provided at operating pressures ranging from about 500 to 9,000 psi. In a preferred embodiment, the pressurizing of the portion of the interior region of the first and second tubular members is provided at operating pressures ranging from about 500 to 9,000 psi. In a preferred embodiment, the pressurizing of the portion of the interior region of the first tubular member is provided at reduced operating pressures during a latter portion of the expansion. In a preferred embodiment, the pressurizing of the portion of the interior region of the second tubular member is provided at reduced operating pressures during a latter portion of the expansion. In a preferred embodiment, the pressurizing of the portion of the interior region of the first and second tubular members is provided at reduced operating pressures during a latter portion of the expansions. In a preferred embodiment, the contact between the first tubular member and the outer casing is sealed. In a preferred embodiment, the contact between the second tubular member and the outer casing is sealed. In a preferred embodiment, the contact between the first and second tubular members and the outer casing is sealed. In a preferred embodiment, the expanded first tubular member is supported using the contact with the outer casing. In a preferred embodiment, the expanded second tubular member is supported using the contact with the outer casing. In a preferred embodiment, the expanded first and second tubular members are supported using their contacts with the outer casing. In a preferred embodiment, the first and second tubular members are extruded off of a mandrel. In a preferred embodiment, the surface of the mandrel is lubricated. In a preferred embodiment, shock is absorbed. In a preferred embodiment, the mandrel is expanded in a radial direction. In a preferred embodiment, the first and second tubular members are positioned in an overlapping relationship. In a preferred embodiment, an interior region of the first tubular member is fluidicly isolated from an exterior region of the first tubular member. In a preferred embodiment, an interior region of the second tubular member is fluidicly isolated from an exterior region of the second tubular member. In a preferred embodiment, the interior region of the first tubular member is fluidicly isolated from the region exterior to the first tubular member by injecting one or more plugs into the interior of the first tubular member. In a preferred embodiment, the interior region of the second tubular member is fluidicly isolated from the region exterior to the second tubular member by injecting one or more plugs into the interior of the second tubular member. In a preferred embodiment, the pressurizing of the portion of the interior region of the first tubular member is provided by injecting a fluidic material at operating pressures and flow rates ranging from about 500 to 9,000 psi and 40 to 3,000 gallons/minute. In a preferred embodiment, the pressurizing of the portion of the interior region of the second tubular member is provided by injecting a fluidic material at operating pressures and flow rates ranging from about 500 to 9,000 psi and 40 to 3,000 gallons/minute. In a preferred embodiment, fluidic material is injected beyond the mandrel. In a preferred embodiment, a region of the tubular members beyond the mandrel is pressurized. In a preferred embodiment, the region of the tubular members beyond the mandrel is pressurized to pressures ranging from about 500 to 9,000 psi. In a preferred embodiment, the first tubular member comprises a production casing. In a preferred embodiment, the contact between the first tubular member and the outer casing is sealed. In a preferred embodiment, the contact between the second tubular member and the outer casing is sealed. In a preferred embodiment, the expanded first tubular member is supported using the outer casing. In a preferred embodiment, the expanded second tubular member is supported using the outer casing. In a preferred embodiment, the integrity of the seal in the contact between the first tubular member and the outer casing is tested. In a preferred embodiment, the integrity of the seal in the contact between the second tubular member and the outer casing is tested. In a preferred embodiment, the mandrel is caught upon the completion of the extruding. In a preferred embodiment, the mandrel is drilled out. In a preferred embodiment, the mandrel is supported with coiled tubing. In a preferred embodiment, the mandrel is coupled to a drillable shoe.

An apparatus has also been described that includes an outer tubular member, and a plurality of substantially concentric and overlapping inner tubular members coupled to the outer tubular member. Each inner tubular member is supported by contact pressure between an outer surface of the inner casing and an inner surface of the outer inner tubular member. In a preferred embodiment, the outer tubular member has a yield strength ranging from about 40,000 to 135,000 psi. In a preferred embodiment, the outer tubular member has a burst strength ranging from about 5,000 to 20,000 psi. In a preferred embodiment, the contact pressure between the inner tubular members and the outer tubular member ranges from about 500 to 10,000 psi. In a preferred embodiment, one or more of the inner tubular members include one or more sealing members that contact with an inner surface of the outer tubular member. In a preferred embodiment, the sealing members are selected from the group consisting of rubber, lead, plastic, and epoxy.

An apparatus has also been described that includes an outer tubular member, and a plurality of substantially concentric inner tubular members coupled to the interior surface of the outer tubular member by the process of expanding one or more of the inner tubular members into contact with at least a portion of the interior surface of the outer tubular member. In a preferred embodiment, the inner tubular members are expanded by extruding the inner tubular members off of a mandrel. In a preferred embodiment, the inner tubular members are expanded by the process of: placing the inner tubular members and a mandrel within the outer tubular member; and pressurizing an interior portion of the inner casing. In a preferred embodiment, during the pressurizing, the interior portion of the inner tubular member is fluidicly isolated from an exterior portion of the inner tubular member. In a preferred embodiment, the interior portion of the inner tubular member is pressurized at pressures ranging from about 500 to 9,000 psi. In a preferred embodiment, the apparatus further includes one or more seals positioned in the interface between the inner tubular members and the outer tubular member. In a preferred embodiment, the inner tubular members are supported by their contact with the outer tubular member.

A wellbore casing has also been described that includes a first tubular member, and a second tubular member coupled to the first tubular member in an overlapping relationship. The inner diameter of the first tubular member is substantially equal to the inner diameter of the second tubular member. In a preferred embodiment, the first tubular member includes a first thin wall section, wherein the second tubular member includes a second thin wall section, and wherein the first thin wall section is coupled to the second thin wall section. In a preferred embodiment, first and second thin wall sections are deformed. In a preferred embodiment, the first tubular member includes a first compressible member coupled to the first thin wall section, and wherein the second tubular member includes a second compressible member coupled to the second thin wall section. In a preferred embodiment, the first thin wall section and the first compressible member are coupled to the second thin wall section and the second compressible member. In a preferred embodiment, the first and second thin wall sections and the first and second compressible members are deformed.

A wellbore casing has also been described that includes a tubular member including at least one thin wall section and a thick wall section, and a compressible annular member coupled to each thin wall section. In a preferred embodiment, the compressible annular member is fabricated from materials selected from the group consisting of rubber, plastic, metal and epoxy. In a preferred embodiment, the wall thickness of the thin wall section ranges from about 50 to 100% of the wall thickness of the thick wall section. In a preferred embodiment, the length of the thin wall section ranges from about 120 to 2400 inches. In a preferred embodiment, the compressible annular member is positioned along the thin wall section. In a preferred embodiment, the compressible annular member is positioned along the thin and thick wall sections. In a preferred embodiment, the tubular member is fabricated from materials selected from the group consisting of oilfield country tubular goods, stainless steel, low alloy steel, carbon steel, automotive grade steel, plastics, fiberglass, high strength and/or deformable materials. In a preferred embodiment, the wellbore casing includes a first thin wall at a first end of the casing, and a second thin wall at a second end of the casing.

A method of creating a casing in a borehole located in a subterranean formation has also been described that includes supporting a tubular liner and a mandrel in the borehole using a support member, injecting fluidic material into the borehole, pressurizing an interior region of the mandrel, displacing a portion of the mandrel relative to the support member, and radially expanding the tubular liner. In a preferred embodiment, the injecting includes injecting hardenable fluidic sealing material into an annular region located between the borehole and the exterior of the tubular liner, and injecting non hardenable fluidic material into an interior region of the mandrel. In a preferred embodiment, the method further includes fluidicly isolating the annular region from the interior region before injecting the non hardenable fluidic material into the interior region of the mandrel. In a preferred embodiment, the injecting of the hardenable fluidic sealing material is provided at operating pressures and flow rates ranging from about 0 to 5,000 psi and 0 to 1,500 gallons/min. In a preferred embodiment, the injecting of the non hardenable fluidic material is provided at operating pressures and flow rates ranging from about 500 to 9,000 psi and 40 to 3,000 gallons/min. In a preferred embodiment, the injecting of the non hardenable fluidic material is provided at reduced operating pressures and flow rates during an end portion of the radial expansion. In a preferred embodiment, the fluidic material is injected into one or more pressure chambers. In a preferred embodiment, the one or more pressure chambers are pressurized. In a preferred embodiment, the pressure chambers are pressurized to pressures ranging from about 500 to 9,000 psi. In a preferred embodiment, the method further includes fluidicly isolating an interior region of the mandrel from an exterior region of the mandrel. In a preferred embodiment, the interior region of the mandrel is isolated from the region exterior to the mandrel by inserting one or more plugs into the injected fluidic material. In a preferred embodiment, the method further includes curing at least a portion of the fluidic material, and removing at least a portion of the cured fluidic material located within the tubular liner. In a preferred embodiment, the method further includes overlapping the tubular liner with an existing wellbore casing. In a preferred embodiment, the method further includes sealing the overlap between the tubular liner and the existing wellbore casing. In a preferred embodiment, the method further includes supporting the extruded tubular liner using the overlap with the existing wellbore casing. In a preferred embodiment, the method further includes testing the integrity of the seal in the overlap between the tubular liner and the existing wellbore casing. In a preferred embodiment, the method further includes removing at least a portion of the hardenable fluidic sealing material within the tubular liner before curing. In a preferred embodiment, the method further includes lubricating the surface of the mandrel. In a preferred embodiment, the method further includes absorbing shock. In a preferred embodiment, the method further includes catching the mandrel upon the completion of the extruding. In a preferred embodiment, the method further includes drilling out the mandrel. In a preferred embodiment, the method further includes supporting the mandrel with coiled tubing. In a preferred embodiment, the mandrel reciprocates. In a preferred embodiment, the mandrel is displaced in a first direction during the pressurization of the interior region of the mandrel, and the mandrel is displaced in a second direction during a de-pressurization of the interior region of the mandrel. In a preferred embodiment, the tubular liner is maintained in a substantially stationary position during the pressurization of the interior region of the mandrel. In a preferred embodiment, the tubular liner is supported by the mandrel during a de-pressurization of the interior region of the mandrel.

A wellbore casing has also been described that includes a first tubular member having a first inside diameter, and a second tubular member having a second inside diameter substantially equal to the first inside diameter coupled to the first tubular member in an overlapping relationship. The first and second tubular members are coupled by the process of deforming a portion of the second tubular member into contact with a portion of the first tubular member. In a preferred embodiment, the second tubular member is deformed by the process of placing the first and second tubular members in an overlapping relation ship, radially expanding at least a portion of the first tubular member, and radially expanding the second tubular member. In a preferred embodiment, the second tubular member is radially expanded by the process of supporting the second tubular member and a mandrel within the wellbore using a support member, injecting a fluidic material into the wellbore, pressurizing an interior region of the mandrel, and displacing a portion of the mandrel relative to the support member. In a preferred embodiment, the injecting includes injecting hardenable fluidic sealing material into an annular region located between the borehole and the exterior of the second liner, and injecting non hardenable fluidic material into an interior region of the mandrel. In a preferred embodiment, the wellbore casing further includes fluidicly isolating the annular region from the interior region of the mandrel before injecting the non hardenable fluidic material into the interior region of the mandrel. In a preferred embodiment, the injecting of the hardenable fluidic sealing material is provided at operating pressures and flow rates ranging from about 0 to 5,000 psi and 0 to 1,500 gallons/min. In a preferred embodiment, the injecting of the non hardenable fluidic material is provided at operating pressures and flow rates ranging from about 500 to 9,000 psi and 40 to 3,000 gallons/min. In a preferred embodiment, the injecting of the non hardenable fluidic material is provided at reduced operating pressures and flow rates during an end portion of the radial expansion. In a preferred embodiment, the fluidic material is injected into one or more pressure chambers. In a preferred embodiment, one or more pressure chambers are pressurized. In a preferred embodiment, the pressure chambers are pressurized to pressures ranging from about 500 to 9,000 psi. In a preferred embodiment, the wellbore casing further includes fluidicly isolating an interior region of the mandrel from an exterior region of the mandrel. In a preferred embodiment, the interior region of the mandrel is isolated from the region exterior to the mandrel by inserting one or more plugs into the injected fluidic material. In a preferred embodiment, the wellbore casing further includes curing at least a portion of the fluidic material, and removing at least a portion of the cured fluidic material located within the second tubular liner. In a preferred embodiment, the wellbore casing further includes sealing the overlap between the first and second tubular liners. In a preferred embodiment, the wellbore casing further includes supporting the second tubular liner using the overlap with the first tubular liner. In a preferred embodiment, the wellbore casing further includes testing the integrity of the seal in the overlap between the first and second tubular liners. In a preferred embodiment, the wellbore casing further includes removing at least a portion of the hardenable fluidic sealing material within the second tubular liner before curing. In a preferred embodiment, the wellbore casing further includes lubricating the surface of the mandrel. In a preferred embodiment, the wellbore casing further includes absorbing shock. In a preferred embodiment, the wellbore casing further includes catching the mandrel upon the completion of the radial expansion. In a preferred embodiment, the wellbore casing further includes drilling out the mandrel. In a preferred embodiment, the wellbore casing further include supporting the mandrel with coiled tubing. In a preferred embodiment, the mandrel reciprocates. In a preferred embodiment, the mandrel is displaced in a first direction during the pressurization of the interior region of the mandrel; and wherein the mandrel is displaced in a second direction during a de-pressurization of the interior region of the mandrel. In a preferred embodiment, the second tubular liner is maintained in a substantially stationary position during the pressurization of the interior region of the mandrel. In a preferred embodiment, the second tubular liner is supported by the mandrel during a de-pressurization of the interior region of the mandrel.

An apparatus for expanding a tubular member has also been described that includes a support member including a fluid passage, a mandrel movably coupled to the support member including an expansion cone, at least one pressure chamber defined by and positioned between the support member and mandrel fluidicly coupled to the first fluid passage, and one or more releasable supports coupled to the support member adapted to support the tubular member. In a preferred embodiment, the fluid passage includes a throat passage having a reduced inner diameter. In a preferred embodiment, the mandrel includes one or more annular pistons. In a preferred embodiment, the apparatus includes a plurality of pressure chambers. In a preferred embodiment, the pressure chambers are at least partially defined by annular pistons. In a preferred embodiment, the releasable supports are positioned below the mandrel. In a preferred embodiment, the releasable supports are positioned above the mandrel. In a preferred embodiment, the releasable supports comprise hydraulic slips. In a preferred embodiment, the releasable supports comprise mechanical slips. In a preferred embodiment, the releasable supports comprise drag blocks. In a preferred embodiment, the mandrel includes one or more annular pistons, and an expansion cone coupled to the annular pistons. In a preferred embodiment, one or more of the annular pistons include an expansion cone. In a preferred embodiment, the pressure chambers comprise annular pressure chambers.

An apparatus has also been described that includes one or more solid tubular members, each solid tubular member including one or more external seals, one or more slotted tubular members coupled to the solid tubular members, and a shoe coupled to one of the slotted tubular members. In a preferred embodiment, the apparatus further includes one or more intermediate solid tubular members coupled to and interleaved among the slotted tubular members, each intermediate solid tubular member including one or more external seals. In a preferred embodiment, the apparatus further includes one or more valve members. In a preferred embodiment, one or more of the intermediate solid tubular members include one or more valve members.

A method of joining a second tubular member to a first tubular member, the first tubular member having an inner diameter greater than an outer diameter of the second tubular member, has also been described that includes positioning a mandrel within an interior region of the second tubular member, pressurizing a portion of the interior region of the mandrel, displacing the mandrel relative to the second tubular member, and extruding at least a portion of the second tubular member off of the mandrel into engagement with the first tubular member. In a preferred embodiment, the pressurizing of the portion of the interior region of the mandrel is provided at operating pressures ranging from about 500 to 9,000 psi. In a preferred embodiment, the pressurizing of the portion of the interior region of the mandrel is provided at reduced operating pressures during a latter portion of the extruding. In a preferred embodiment, the method further includes sealing the interface between the first and second tubular members. In a preferred embodiment, the method further includes supporting the extruded second tubular member using the interface with the first tubular member. In a preferred embodiment, the method further includes lubricating the surface of the mandrel. In a preferred embodiment, the method further includes absorbing shock. In a preferred embodiment, the method further includes positioning the first and second tubular members in an overlapping relationship. In a preferred embodiment, the method further includes fluidicly isolating an interior region of the mandrel an exterior region of the mandrel. In a preferred embodiment, the interior region of the mandrel is fluidicly isolated from the region exterior to the mandrel by injecting one or more plugs into the interior of the mandrel. In a preferred embodiment, the pressurizing of the portion of the interior region of the mandrel is provided by injecting a fluidic material at operating pressures and flow rates ranging from about 500 to 9,000 psi and 40 to 3,000 gallons/minute. In a preferred embodiment, the method further includes injecting fluidic material beyond the mandrel. In a preferred embodiment, one or more pressure chambers defined by the mandrel are pressurized. In a preferred embodiment, the pressure chambers are pressurized to pressures ranging from about 500 to 9,000 psi. In a preferred embodiment, the first tubular member comprises an existing section of a wellbore. In a preferred embodiment, the method further includes sealing the interface between the first and second tubular members. In a preferred embodiment, the method further includes supporting the extruded second tubular member using the first tubular member. In a preferred embodiment, the method further includes testing the integrity of the seal in the interface between the first tubular member and the second tubular member. In a preferred embodiment, the method further includes catching the mandrel upon the completion of the extruding. In a preferred embodiment, the method further includes drilling out the mandrel. In a preferred embodiment, the method further include supporting the mandrel with coiled tubing. In a preferred embodiment, the method further includes coupling the mandrel to a drillable shoe. In a preferred embodiment, the mandrel is displaced in the longitudinal direction. In a preferred embodiment, the mandrel is displaced in a first direction during the pressurization and in a second direction during a de-pressurization.

An apparatus has also been described that includes one or more primary solid tubulars, each primary solid tubular including one or more external annular seals, n slotted tubulars coupled to the primary solid tubulars, n-1 intermediate solid tubulars coupled to and interleaved among the slotted tubulars, each intermediate solid tubular including one or more external annular seals, and a shoe coupled to one of the slotted tubulars.

A method of isolating a first subterranean zone from a second subterranean zone in a wellbore has also been described that includes positioning one or more primary solid tubulars within the wellbore, the primary solid tubulars traversing the first subterranean zone, positioning one or more slotted tubulars within the wellbore, the slotted tubulars traversing the second subterranean zone, fluidicly coupling the slotted tubulars and the solid tubulars, and preventing the passage of fluids from the first subterranean zone to the second subterranean zone within the wellbore external to the solid and slotted tubulars.

A method of extracting materials from a producing subterranean zone in a wellbore, at least a portion of the wellbore including a casing, has also been described that includes positioning one or more primary solid tubulars within the wellbore, fluidicly coupling the primary solid tubulars with the casing, positioning one or more slotted tubulars within the wellbore, the slotted tubulars traversing the producing subterranean zone, fluidicly coupling the slotted tubulars with the solid tubulars, fluidicly isolating the producing subterranean zone from at least one other subterranean zone within the wellbore, and fluidicly coupling at least one of the slotted tubulars from the producing subterranean zone. In a preferred embodiment, the method further includes controllably fluidicly decoupling at least one of the slotted tubulars from at least one other of the slotted tubulars.

A method of creating a casing in a borehole while also drilling the borehole also has been described that includes installing a tubular liner, a mandrel, and a drilling assembly in the borehole. A fluidic material is injected within the tubular liner, mandrel and drilling assembly. At least a portion of the tubular liner is radially expanded while the borehole is drilled using the drilling assembly. In a preferred embodiment, the injecting includes injecting the fluidic material within an expandible chamber. In a preferred embodiment, the injecting includes injecting hardenable fluidic sealing material into an annular region located between the borehole and the exterior of the tubular liner. In a preferred embodiment, the injecting of the hardenable fluidic sealing material is provided at operating pressures and flow rates ranging from about 0 to 5,000 psi and 0 to 1,500 gallons/min. In a preferred embodiment, the injecting of the fluidic material is provided at operating pressures and flow rates ranging from about 500 to 9,000 psi and 40 to 3,000 gallons/min. In a preferred embodiment, the injecting of the fluidic material is provided at reduced operating pressures and flow rates during an end portion of the radial expansion. In a preferred embodiment, the method further includes curing at least a portion of the fluidic material; and removing at least a portion of the cured fluidic material located within the tubular liner. In a preferred embodiment, the method further includes overlapping the tubular liner with an existing wellbore casing. In a preferred embodiment, the method further includes sealing the overlap between the tubular liner and the existing wellbore casing. In a preferred embodiment, the method further includes supporting the extruded tubular liner using the overlap with the existing wellbore casing. In a preferred embodiment, the method further includes testing the integrity of the seal in the overlap between the tubular liner and the existing wellbore casing. In a preferred embodiment, the method further includes lubricating the surface of the mandrel. In a preferred embodiment, the method further includes absorbing shock. In a preferred embodiment, the method further includes catching the mandrel upon the completion of the extruding. In a preferred embodiment, the method further includes expanding the mandrel in a radial direction. In a preferred embodiment, the method further includes drilling out the mandrel. In a preferred embodiment, the method further includes supporting the mandrel with coiled tubing. In a preferred embodiment, the wall thickness of the tubular member is variable. In a preferred embodiment, the mandrel is coupled to a drillable shoe.

An apparatus has also been described that includes a support member, the support member including a first fluid passage; a mandrel coupled to the support member, the mandrel including: a second fluid passage; a tubular member coupled to the mandrel; and a shoe coupled to the tubular liner, the shoe including a third fluid passage; and a drilling assembly coupled to the shoe; wherein the first, second and third fluid passages and the drilling assembly are operably coupled. In a preferred embodiment, the support member further includes: a pressure relief passage; and a flow control valve coupled to the first fluid passage and the pressure relief passage. In a preferred embodiment, the support member further includes a shock absorber. In a preferred embodiment, the support member includes one or more sealing members adapted to prevent foreign material from entering an interior region of the tubular member. In a preferred embodiment, the support member includes one or more stabilizers. In a preferred embodiment, the mandrel is expandable. In a preferred embodiment, the tubular member is fabricated from materials selected from the group consisting of Oilfield Country Tubular Goods, automotive grade steel, plastic and chromium steel. In a preferred embodiment, the tubular member has inner and outer diameters ranging from about 0.75 to 47 inches and 1.05 to 48 inches, respectively. In a preferred embodiment, the tubular member has a plastic yield point ranging from about 40,000 to 135,000 psi. In a preferred embodiment, the tubular member includes one or more sealing members at an end portion. In a preferred embodiment, the tubular member includes one or more pressure relief holes at an end portion. In a preferred embodiment, the tubular member includes a catching member at an end portion for slowing down movement of the mandrel. In a preferred embodiment, the support member comprises coiled tubing. In a preferred embodiment, at least a portion of the mandrel and shoe are drillable. In a preferred embodiment, the wall thickness of the tubular member in an area adjacent to the mandrel is less than the wall thickness of the tubular member in an area that is not adjacent to the mandrel. In a preferred embodiment, the apparatus further includes an expandible chamber. In a preferred embodiment, the expandible chamber is approximately cylindrical. In a preferred embodiment, the expandible chamber is approximately annular.

A method of forming an underground pipeline within an underground tunnel including at least a first tubular member and a second tubular member, the first tubular member having an inner diameter greater than an outer diameter of the second tubular member, has also been described that includes positioning the first tubular member within the tunnel; positioning the second tubular member within the tunnel in an overlapping relationship with the first tubular member; positioning a mandrel and a drilling assembly within an interior region of the second tubular member; injecting a fluidic material within the mandrel, drilling assembly and the second tubular member; extruding at least a portion of the second tubular member off of the mandrel into engagement with the first tubular member; and drilling the tunnel. In a preferred embodiment, the injecting of the fluidic material is provided at operating pressures ranging from about 500 to 9,000 psi. In a preferred embodiment, the injecting of the fluidic material is provided at reduced operating pressures during a latter portion of the extruding. In a preferred embodiment, the method further includes sealing the interface between the first and second tubular members. In a preferred embodiment, the method further includes supporting the extruded second tubular member using the interface with the first tubular member. In a preferred embodiment, the method further includes lubricating the surface of the mandrel. In a preferred embodiment, the method further includes absorbing shock. In a preferred embodiment, the method further includes expanding the mandrel in a radial direction. In a preferred embodiment, the method further include sealing the interface between the first and second tubular members. In a preferred embodiment, the method further includes supporting the extruded second tubular member using the first tubular member. In a preferred embodiment, the method further includes testing the integrity of the seal in the interface between the first tubular member and the second tubular member. In a preferred embodiment, the method further includes catching the mandrel upon the completion of the extruding. In a preferred embodiment, the method further includes drilling out the mandrel. In a preferred embodiment, the method further includes supporting the mandrel with coiled tubing. In a preferred embodiment, the method further includes coupling the mandrel to a drillable shoe. In a preferred embodiment, the fluidic material is injected into an expandible chamber. In a preferred embodiment, the expandible chamber is substantially cylindrical. In a preferred embodiment, the expandible chamber is substantially annular. An apparatus has also been described that includes a wellbore, the wellbore formed by the process of drilling the wellbore; and a tubular liner positioned within the wellbore, the tubular liner formed by the process of extruding the tubular liner off of a mandrel while drilling the wellbore. In a preferred embodiment, the tubular liner is formed by the process of: placing the tubular liner and mandrel within the wellbore; and pressurizing an interior portion of the tubular liner. In a preferred embodiment, the interior portion of the tubular liner is pressurized at pressures ranging from about 500 to 9,000 psi. In a preferred embodiment, the -tubular liner is formed by the process of: placing the tubular liner and mandrel within the wellbore; and pressurizing an interior portion of the mandrel. In a preferred embodiment, the interior portion of the mandrel is pressurized at pressures ranging from about 500 to 9,000 psi. In a preferred embodiment, the apparatus further includes an annular body of a cured fluidic material coupled to the tubular liner. In a preferred embodiment, the annular body of a cured fluidic sealing material is formed by the process of: injecting a body of hardenable fluidic sealing material into an annular region external of the tubular liner. In a preferred embodiment, the tubular liner overlaps with an existing wellbore casing. In a preferred embodiment, the apparatus further includes a seal positioned in the overlap between the tubular liner and the existing wellbore casing. In a preferred embodiment, the tubular liner is supported by the overlap with the existing wellbore casing. In a preferred embodiment, the process of extruding the tubular liner includes the pressurizing of an expandible chamber. In a preferred embodiment, the expandible chamber is substantially cylindrical. In a preferred embodiment, the expandible chamber is substantially annular.

A method of forming a wellbore casing in a wellbore has also been described that includes drilling out the wellbore while forming the wellbore casing. In a preferred embodiment, the forming includes: expanding a tubular member in the radial direction. In a preferred embodiment, the expanding includes: displacing a mandrel relative to the tubular member. In a preferred embodiment, the displacing includes: expanding an expandible chamber. In a preferred embodiment, the expandible chamber comprises a cylindrical chamber. In a preferred embodiment, the expandible chamber comprises an annular chamber.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A wellhead, comprising:

an outer casing; and a plurality of substantially concentric and overlapping inner casings coupled to the outer casing;

wherein an end portion of each inner casing is supported by contact pressure between an outer surface of the inner casing and an inner surface of the outer casing;

wherein adjacent inner casings define an annulus therebetween; and wherein the end portion of at least one of the inner casings coupled to the outer casing defines one or more radial passages.

2. The wellhead of claim 1, wherein the outer casing has a yield strength ranging from about 40,000 to 135,000 psi.

3. The wellhead of claim 1, wherein the outer casing has a burst strength ranging from about 5,000 to 20,000 psi.

4. The wellhead of claim 1, wherein the contact pressure between the inner casings and the outer casing ranges from about 500 to 10,000 psi.

5. The wellhead of claim 1, wherein one or more of the inner casings include one or more sealing members that contact with an inner surface of the outer casing.

6. The wellhead of claim 5, wherein the sealing members are selected from the group consisting of rubber, lead, plastic, and epoxy.

7. The wellhead of claim 1, further comprising a Christmas tree coupled to the outer casing.

8. The wellhead of claim 1, further comprising a drilling spool coupled to the outer casing.

9. The wellhead of claim 1, wherein at least one of the inner casings is a production casing.

10. A wellhead, comprising:

an outer casing at least partially positioned within a wellbore; and a plurality of substantially concentric inner casings coupled to the interior surface of the outer casing by the process of expanding an end portion of one or more of the inner casings into contact with at least a portion of the interior surface of the outer casing;

wherein adjacent inner casings define an annulus therebetween; and wherein the end portion of at least one of the inner casings coupled to the outer casing defines one or more radial passages.

11. The wellhead of claim 10, wherein the inner casings are expanded by extruding the inner casings off of a mandrel.

12. The wellhead of claim 11, wherein the inner casings are expanded by the process of:

placing the inner casing and a mandrel within the wellbore; and pressurizing an interior portion of the inner casing.

13. The wellhead of claim 12, wherein during the pressurizing, the interior portion of the inner casing is fluidicly isolated from an exterior portion of the inner casing.

14. The wellhead of claim 13, wherein the interior portion of the inner casing is pressurized at pressures ranging from about 500 to 9,000 psi.

15. The wellhead of claim 10, further comprising one or more seals positioned in the interface between the inner casings and the outer casing.

16. The wellhead of claim 10, wherein the inner casings are supported by their contact with the outer casing.

17. An apparatus, comprising:

an outer tubular member; and a plurality of substantially concentric and overlapping inner tubular members coupled to the outer tubular member;

wherein an end portion of each inner tubular member is supported by contact pressure between an outer surface of the inner casing and an inner surface of the outer inner tubular member;

wherein adjacent inner casings define an annulus therebetween; and wherein the end portion of at least one of the inner casings coupled to the outer casing defines one or more radial passages.

18. The apparatus of claim 17, wherein the outer tubular member has a yield strength ranging from about 40,000 to 135,000 psi.

19. The apparatus of claim 17, wherein the outer tubular member has a burst strength ranging from about 5,000 to 20,000 psi.

20. The apparatus of claim 17, wherein the contact pressure between the inner tubular members and the outer tubular member ranges from about 500 to 10,000 psi.

21. The apparatus of claim 17, wherein one more of the inner tubular members include one or more sealing members that contact with an inner surface of the outer tubular member.

22. The apparatus of claim 21, wherein the sealing members are selected from the group consisting of rubber, lead, plastic, and epoxy.

23. An apparatus, comprising:

an outer tubular member; and a plurality of substantially concentric inner tubular members coupled to the interior surface of the outer tubular member by the process of expanding an end portion of one or more of the inner tubular members into contact with at least a portion of the interior surface of the outer tubular member;

wherein adjacent inner casings define an annulus therebetween; and wherein the end portion of at least one of the inner casings coupled to the outer casing defines one or more radial passages.

24. The apparatus of claim 23, wherein the inner tubular members are expanded by extruding the inner tubular members off of a mandrel.

25. The apparatus of claim 24, wherein the inner tubular members are expanded by the process of:

placing the inner tubular members and a mandrel within the outer tubular member; and pressurizing an interior portion of the inner casing.

26. The apparatus of claim 25, wherein during the pressurizing, the interior portion of the inner tubular member is fluidicly isolated from an exterior portion of the inner tubular member.

27. The apparatus of claim 25, wherein the interior portion of the inner tubular member is pressurized at pressures ranging from about 500 to 9,000 psi.

28. The apparatus of claim 23, further comprising one or more seals positioned in the interface between the inner tubular members and the outer tubular member.

29. The apparatus of claim 23, wherein the inner tubular members are supported by their contact with the outer tubular member.

* * * * *

UNITED STATES PATENT AND TRADEMARK OFFICE

CERTIFICATE OF CORRECTION

PATENT NO. : 6,739,392 B2
DATED : May 25, 2004
INVENTOR(S) : Robert Lance Cook, et al.

It is certified that error appears in the above-identified patent and that said Letters Patent is hereby corrected as shown below:

Column 103,
Line 1, "2716" to -- 2715; --.

Signed and Sealed this

Thirty-first Day of August, 2004

JON W. DUDAS
*Director of the United States Patent and Trademark Office*